(12) United States Patent
Michelson et al.

(10) Patent No.: US 10,360,226 B2
(45) Date of Patent: Jul. 23, 2019

(54) PROCESSING QUALITATIVE RESPONSES AND VISUALIZATION GENERATION

(71) Applicant: FULCRUM MANAGEMENT SOLUTIONS LTD., Rossland (CA)

(72) Inventors: Natalie Sara Michelson, Vancouver (CA); Mark John Jeffery, Rossland (CA); David Anthony MacLeod, Rossland (CA)

(73) Assignee: FULCRUM MANAGEMENT SOLUTIONS LTD., Rossland (CA)

( * ) Notice: Subject to any disclaimer, the term of this patent is extended or adjusted under 35 U.S.C. 154(b) by 399 days.

(21) Appl. No.: 15/216,828

(22) Filed: Jul. 22, 2016

(65) Prior Publication Data

US 2017/0024395 A1    Jan. 26, 2017

Related U.S. Application Data

(60) Provisional application No. 62/196,419, filed on Jul. 24, 2015.

(51) Int. Cl.
G06F 16/35 (2019.01)
G06F 16/2457 (2019.01)
(Continued)

(52) U.S. Cl.
CPC ...... *G06F 16/24578* (2019.01); *G06F 16/287* (2019.01); *G06F 16/355* (2019.01); *G06F 16/9535* (2019.01); *H04L 65/403* (2013.01)

(58) Field of Classification Search
CPC .......... G06F 17/3071; G06F 16/24578; G06F 16/355
See application file for complete search history.

(56) References Cited

U.S. PATENT DOCUMENTS 4,603,232 A   7/1986   Kurland et al.
4,958,284 A   9/1990   Bishop et al.
(Continued)

FOREIGN PATENT DOCUMENTS

WO    2015039240 A1    3/2015

OTHER PUBLICATIONS

Kerr et al., "Bias in Judgement: Comparing individuals and groups", Psychological Review, Oct. 1996 (Year: 1996).*
(Continued)

*Primary Examiner* — Brittany N Allen
(74) *Attorney, Agent, or Firm* — Rossi, Kimms & McDowell LLP

(57) ABSTRACT

Aspects of this disclosure generally are related to significant systems and methods of processing qualitative, comment-style, responses provided by a population, and for corresponding production of significant visualizations configured to efficiently facilitate insight into population characteristics and matters important to the population. According to some embodiments, qualitative, or open-ended, comment-style responses are assigned priority values by participants. Based at least on an analysis of these priority values, groups of participants, qualitative responses, or both, are identified, according to some embodiments. In some embodiments, a significant visualization is generated that visually presents the groups at least in part via clusters of visual representations of participants, qualitative responses, or both based at least on results of the analysis.

52 Claims, 28 Drawing Sheets

(51) Int. Cl.
*H04L 29/06* (2006.01)
*G06F 16/28* (2019.01)
*G06F 16/9535* (2019.01)

(56) References Cited

U.S. PATENT DOCUMENTS

| | | |
|---|---|---|
| 6,687,560 B2 | 2/2004 | Kiser et al. |
| 7,099,819 B2 | 8/2006 | Sakai et al. |
| 7,676,465 B2 | 3/2010 | Poola |
| 7,890,362 B2 * | 2/2011 | Flores .................. G06Q 10/063 |
| | | 705/7.32 |
| 8,516,500 B2 | 8/2013 | Hebeler, Jr. et al. |
| 9,336,302 B1 * | 5/2016 | Swamy ............... G06F 17/3071 |
| 9,450,771 B2 * | 9/2016 | Browning ........... H04L 12/1831 |
| 2007/0067273 A1 * | 3/2007 | Willcock ............... G06Q 30/02 |
| 2012/0022920 A1 | 1/2012 | Balestrieri et al. |
| 2012/0096014 A1 | 4/2012 | Davids |
| 2012/0109714 A1 | 5/2012 | Azar |
| 2013/0124525 A1 | 5/2013 | Anderson et al. |
| 2013/0302775 A1 | 11/2013 | King et al. |
| 2015/0089399 A1 * | 3/2015 | Megill ................ H04L 12/1813 |
| | | 715/753 |
| 2016/0189180 A1 | 6/2016 | Firstbrook et al. |

OTHER PUBLICATIONS

International Search Report issued in PCT/CA2014/050889, dated Oct. 21, 2014. Cited in U.S. Publication No. 1.

Written opinion issued in PCT/CA2014/050889, dated Oct. 21, 2014. Cited in U.S. Publication No. 1.

International Search Report issued in Intl. Appln. No. PCT/CA2016/050870, dated Oct. 7, 2016.

Written Opinion issued in Intl. Appln. No. PCT/CA2016/050870, dated Oct. 7, 2016.

* cited by examiner

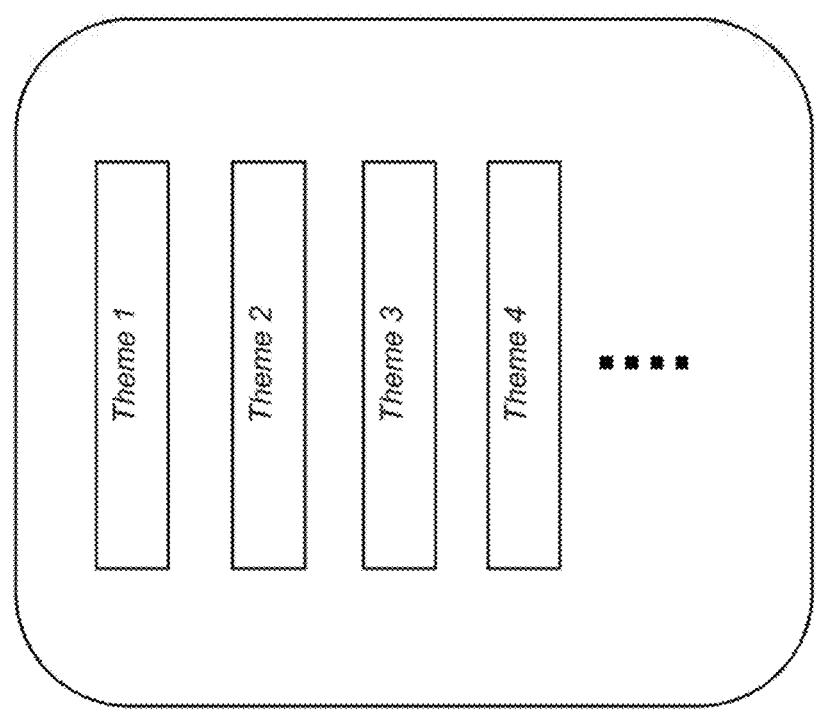

PROCESSING QUALITATIVE RESPONSES AND VISUALIZATION GENERATION

CROSS-REFERENCE TO RELATED APPLICATION

This application claims the benefit of U.S. Provisional Application No. 62/196,419, filed Jul. 24, 2015, the entire disclosure of which is hereby incorporated herein by reference.

TECHNICAL FIELD

Aspects of this disclosure generally are related to significant systems and methods of processing qualitative, comment-style, responses provided by a population, and for corresponding production of significant visualizations configured to efficiently facilitate insight into population characteristics and matters important to the population.

BACKGROUND

Typically, when conducting a 'survey' of participants of a population to gather their input on a topic, two different types of participant responses are elicited: quantitative responses and qualitative responses. A quantitative response is a close-ended response, such as a multiple choice, numeric style, or yes/no response. A qualitative response is an open-ended, comment style response, where the participant has freedom to textualize his or her own personal ideas and is not constrained by pre-determined answers. Accordingly, eliciting qualitative responses may have substantial benefits over quantitative responses in that qualitative responses can provide more precise information about participant thoughts.

However, there are well known limitations with handling, evaluating, or otherwise processing qualitative responses, as compared to quantitative responses. This problem of processing qualitative responses generalizes to dealing with any amount of gathered textual or quantitative information that could be acquired by a survey or by other means (e.g., transcripts of phone conversations).

There is no easy way to aggregate or summarize qualitative textual answers in the way that numeric data can be processed with well known techniques. Conventional techniques for this aggregation are complex and resource-consuming.

Accordingly, a need in the art exists for improved techniques for processing qualitative responses or other information.

SUMMARY

At least the above-discussed needs are addressed and technical solutions are achieved in the art by various embodiments of the present invention. In some embodiments, an inquiry-response evaluation device system may be summarized as including a data processing device system; an input-output device system communicatively connected to the data processing device system; and a processor-accessible memory device system communicatively connected to the data processing device system and storing a program executable by the data processing device system. The data processing device system may be configured by the program at least to: access a plurality of qualitative responses to open-ended inquiries from the processor-accessible memory device system; access a plurality of priority values from the processor-accessible memory device system, each priority value of the plurality of priority values associated with a respective participant of a plurality of participants and associated with a respective qualitative response of the plurality of qualitative responses, and each priority value of the plurality of priority values indicating a priority assigned by the respective participant to the respective qualitative response; identify a plurality of groups of participants of the plurality of participants based at least on an analysis of the plurality of priority values; and facilitate, via the input-output device system, visual presentation of at least one group of the identified plurality of groups of participants. The visual presentation may include at least a cluster of visual representations of the participants in the one group and including at least a visual representation of at least one participant of the plurality of participants that is not in the one group separated from the cluster.

In some embodiments, each qualitative response of at least some of the plurality of qualitative responses may be associated in the processor-accessible memory device system with a respective participant of a plurality of participants, and each qualitative response of the plurality of qualitative responses may indicate a response provided by the respective participant to an open-ended inquiry. In some embodiments, each qualitative response of at least some of the plurality of qualitative responses may represent multiple individual qualitative responses from a plurality of participants.

The analysis of the priority values may include identifying a first priority pattern of at least some of the plurality of priority values associated with at least one of the plurality of qualitative responses and at least some of the plurality of participants. The analysis of the priority values may include identifying a second priority pattern of at least some of the plurality of priority values associated with the at least one of the plurality of qualitative responses and at least one particular participant of the plurality of participants. The identifying of the plurality of groups of participants may include associating at least the one particular participant with at least one particular group of the plurality of groups of participants based at least on a comparison of the first priority pattern and the second priority pattern. The associating the one particular participant with the one particular group may include storing a group-association-value set in the processor-accessible memory device system. The group-association-value set may indicate a degree of association between the one particular participant and the one particular group.

In some embodiments, the at least one group may include a first group whose respective participants' associated priority values of the plurality of priority values for a first set of the plurality of qualitative responses exhibit a pattern that is similar to a first priority pattern within a first threshold range. The first priority pattern may be a pattern of at least some of the plurality of priority values associated with the first set of the plurality of qualitative responses and a first set of the plurality of participants. The at least one group may include a second group of the plurality of participants whose respective participants' associated priority values of the plurality of priority values for the first set of the plurality of qualitative responses exhibit a pattern that is similar to the first priority pattern within a second threshold range providing for less similarity than the first threshold range. The at least one group may include a third group of the plurality of participants whose respective participants' associated priority values of the plurality of priority values for the first set of the plurality of qualitative responses exhibit a pattern that is similar to the first priority pattern within a third threshold range providing for less similarity than the second threshold range.

In some embodiments, the analysis of the plurality of priority values may include identifying, from a first set of the plurality of priority values, a first priority pattern; and identifying a first group of the plurality of participants whose respective participants' associated priority values of the plurality of priority values exhibit a similarity with the first priority pattern within a first threshold range. The at least one group of the identified plurality of groups of participants may include the first group. The analysis of the plurality of priority values may include identifying, from a second set of the plurality of priority values, a second priority pattern. The second set of the plurality of priority values may exclude all priority values of the plurality of priority values associated with the first group of the plurality of participants. The analysis of the plurality of priority values may include identifying a second group of the plurality of participants whose respective participants' associated priority values of the plurality of priority values exhibit a similarity with the second priority pattern within a second threshold range. The second group of the plurality of participants may exclude the first group of the plurality of participants. The at least one group of the identified plurality of groups of participants may include the first group and the second group.

In some embodiments, the analysis of the plurality of priority values may include: identifying a first set of qualitative responses, which may include at least a first pair of qualitative responses from the plurality of qualitative responses; identifying a first priority pattern from a first set of the plurality of priority values associated with a second set of qualitative responses including the first set of the plurality of priority values; and identifying a first group of the plurality of participants whose respective participants' associated priority values of the plurality of priority values exhibit a similarity with the first priority pattern within a first threshold range. The at least one group of the identified plurality of groups of participants may include the first group. The first set of qualitative responses may include three or more qualitative responses. The first set of qualitative responses may include extended seed responses correlated to the first pair of qualitative responses. The first pair of qualitative responses may exhibit a connection score within a threshold range.

In some embodiments, the analysis of the plurality of priority values may include: identifying a first set of qualitative responses, which may include at least a first pair of qualitative responses from the plurality of qualitative responses; identifying a first priority pattern from a first set of the plurality of priority values associated with the first set of qualitative responses; identifying, a first group of the plurality of participants whose respective participants' associated priority values of the plurality of priority values exhibit a similarity with the first priority pattern within a first threshold range; identifying a second set of qualitative responses, which may include at least a second pair of qualitative responses from the plurality of qualitative responses; identifying a second priority pattern from a second set of the plurality of priority values associated with the second set of qualitative responses; and identifying, a second group of the plurality of participants whose respective participants' associated priority values of the plurality of priority values exhibit a similarity with the second priority pattern within a second threshold range. The at least one group of the identified plurality of groups of participants may include the first group and the second group. The first set of qualitative responses may include a user-selected qualitative response. The first group may represent participants of a first orientation, and the second group may represent participants of a second orientation opposite the first orientation. The visual presentation of the at least one group may include a visual representation of the first group along a positive side of an X-axis of at least a one-dimensional plot and a visual representation of the second group along a negative side of the X-axis of the at least the one-dimensional plot. The analysis of the plurality of priority values may include: identifying a third set of qualitative responses, which may include at least a third pair of qualitative responses from the plurality of qualitative responses; identifying a third priority pattern from a third set of the plurality of priority values associated with the third set of qualitative responses; identifying, a third group of the plurality of participants whose respective participants' associated priority values of the plurality of priority values exhibit a similarity with the third priority pattern within a third threshold range; identifying a fourth set of qualitative responses, which may include at least a fourth pair of qualitative responses from the plurality of qualitative responses; identifying a fourth priority pattern from a fourth set of the plurality of priority values associated with the fourth set of qualitative responses; and identifying, a fourth group of the plurality of participants whose respective participants' associated priority values of the plurality of priority values exhibit a similarity with the fourth priority pattern within a fourth threshold range. The at least one group of the identified plurality of groups of participants may include the third group and the fourth group. The third group may represent participants of a third orientation, and the fourth group may represent participants of a fourth orientation opposite the third orientation. The visual presentation of the at least one group may include a visual representation of the first group along a positive side of an X-axis of at least a two-dimensional plot and a visual representation of the second group along a negative side of the X-axis of the at least the two-dimensional plot. The visual presentation of the at least one group may include a visual representation of the third group along a positive side of a Y-axis of the at least the two-dimensional plot and a visual representation of the fourth group along a negative side of the Y-axis of the at least the two-dimensional plot. The first pair of qualitative responses and the second pair of qualitative responses may be mutually exclusive. The first threshold range and the second threshold range may be identical. The analysis of the plurality of priority values may include: identifying a third set of qualitative responses, which may include at least a third pair of qualitative responses from the plurality of qualitative responses; identifying a third priority pattern from a third set of the plurality of priority values associated with the third set of qualitative responses; and identifying, a third group of the plurality of participants whose respective participants' associated priority values of the plurality of priority values exhibit a similarity with the third priority pattern within a third threshold range. The at least one group of the identified plurality of groups of participants may include the first group, the second group, and the third group.

In some embodiments, the at least one group of the identified plurality of groups of participants may include a first group and a second group. The first group may represent participants of a first orientation, and the second group may represent participants of a second orientation opposite the first orientation.

In some embodiments, the at least one group of the identified plurality of groups of participants includes a first group, a second group, and a third group. The first group may represent participants of a first orientation. The second group may represent participants of a second orientation. The third group may represent participants of a third orientation. The first orientation, the second orientation, and the third orientation may be different from each other.

In some embodiments, the data processing device system may be configured by the program at least to: associate the plurality of qualitative responses with the identified plurality of groups; determine, for each respective qualitative response of the plurality of qualitative responses, and with respect to each respective group of the identified plurality of groups, a respective resonance value indicating an amount that the respective qualitative response resonates with at least the participants in the respective group; identify a first set of the plurality of qualitative responses associated with multiple of the identified plurality of groups, the determined respective resonance values associated with the first set within a first range; identify a second set of the plurality of qualitative responses associated with multiple of the identified plurality of groups, the determined respective resonance values associated with the second set within a second range different than the first range; and facilitate, via the input-output device system, visual presentation of one or more indications (a) that at least some of the qualitative responses in the first set represent relative participant agreement, (b) that at least some of the qualitative responses in the second set represent relative participant tension, or both (a) and (b). The first range, the second range, or both, may be derived from a standard deviation. In some embodiments, the visual presentation of the at least one group may further include a visual representation of the one group of the plurality of groups and a visual representation of an agreement group of the plurality of groups, and the data processing device system may be configured by the program at least to facilitate, via the input-output device system, visual presentation of visual representations of the at least some of the qualitative responses in the first set within the visual representation of the agreement group, and visual presentation of visual representations of the at least some of the qualitative responses in the second set within the visual representation of the one group.

In some embodiments, the data processing device system is configured by the program at least to: determine, for each respective participant of the plurality of participants, and with respect to each respective group of the identified plurality of groups, a respective resonance value indicating an amount that priority values assigned by the respective participant resonate with at least some of the participants in the respective group; identify a first set of the plurality of participants associated with multiple of the identified plurality of groups, the determined respective resonance values associated with the first set within a first range; identify a second set of the plurality of participants associated with multiple of the identified plurality of groups, the determined respective resonance values associated with the second set within a second range different than the first range; and facilitate, via the input-output device system, visual presentation of one or more indications (a) that at least some of the participants in the first set represent relative participant agreement, (b) that at least some of the participants in the second set represent relative participant tension, or both (a) and (b). The first range, the second range, or both, may be derived from a standard deviation. In some embodiments, the visual presentation of the at least one group may further include a visual representation of the one group of the plurality of groups and an agreement group of the plurality of groups, and the data processing device system may be configured by the program at least to facilitate, via the input-output device system, visual presentation of visual representations of the at least some of the participants in the first set within the visual representation of the agreement group, and visual presentation of visual representations of the at least some of the participants in the second set within the visual representation of the one group.

In some embodiments, the data processing device system may be configured by the program at least to: associate the plurality of qualitative responses with the identified plurality of groups based at least on a second analysis of the plurality of priority values associated with the plurality of qualitative responses; and facilitate, via the input-output device system, visual presentation of at least one of the plurality of qualitative responses with respect to the at least one group of the identified plurality of groups of participants in a manner consistent with one or more results of the second analysis. In some embodiments, the visual presentation of the at least one of the plurality of qualitative responses with respect to the at least one group includes a visual presentation of the one group as a closed shape. The closed shape may be circular. The closed shape may be visually presented with a color gradient that decreases in color intensity from a geometric center of the closed shape towards an exterior edge of the closed shape. The visual presentation of the at least one of the plurality of qualitative responses with respect to the at least one group may include a visual representation of the at least one of the plurality of qualitative responses within the closed shape. The second analysis may include determining, for each respective qualitative response of the plurality of qualitative responses, and with respect to each respective group of the identified plurality of groups, a respective resonance value indicating an amount that the respective qualitative response resonates with at least the participants in the respective group. The one or more results of the second analysis may indicate at least that the respective resonance values for each of the at least one of the plurality of qualitative responses most closely align the at least one of the plurality of qualitative responses with the one group as compared to each other group of the identified plurality of groups. The second analysis may include determining, for each respective qualitative response of the plurality of qualitative responses, and with respect to each respective group of the identified plurality of groups, a respective resonance value indicating an amount that the respective qualitative response resonates with at least the participants in the respective group. The visual presentation of the one of the plurality of qualitative responses may be in a spaced relationship with the one group. The spaced relationship may be consistent at least with the respective resonance value for the one of the plurality of qualitative responses with respect to the one group. The spaced relationship may result in a representation of the one of the plurality of qualitative responses located within the cluster of visual representations of the participants in the one group. The spaced relationship may result in a representation of the one of the plurality of qualitative responses located outside the cluster of visual representations of the participants in the one group.

In some embodiments, the data processing device system is configured by the program at least to: associate, in a first process, each respective qualitative response in a first set of the plurality of qualitative responses with each respective group of at least one of the plurality of identified groups based at least on an analysis of the priority values associated with the respective qualitative response, the first set of the plurality of qualitative responses associated with a particular participant of the plurality of participants; identify a first particular group of the plurality of identified groups based at least on an analysis of one or more results of the first process; identify a second particular group of the plurality of identified groups based at least on an analysis of priority values associated with the particular participant with respect to each of the identified plurality of groups; and facilitate, via the input-output device system, visual presentation of at least visual representations of the particular participant, the first particular group, and the second particular group. The identifying of the first particular group based at least on the analysis of the one or more results of the first process may include identifying the first particular group as most closely related, as compared to each other of the plurality of identified groups, to the first set of the plurality of qualitative responses. The identifying of the second particular group based at least on the analysis of priority values associated with the particular participant with respect to each of the identified plurality of groups may include identifying the second particular group as most closely related, as compared to each other of the plurality of identified groups, to the priority values associated with the particular participant. Visual presentation of at least visual representations of the particular participant, the first particular group, and the second particular group may include a graphical animation including movement of a visual representation of the particular participant between a visual representation of the first particular group and a visual representation of the second particular group. The graphical animation may including movement of the visual representation of the particular participant between the visual representation of the first particular group and the visual representation of the second particular group may include movement of the visual representation of the particular participant only within an intermediate display region that does not contact the visual representation of the first particular group and the visual representation of the second particular group.

In some embodiments, the visual presentation of the at least one group may include a visual presentation of the one group as a closed shape. The cluster of visual representations of the participants in the one group may be visually represented within the closed shape. The closed shape may be circular. The closed shape may be visually presented with a color gradient that decreases in color intensity from a geometric center of the closed shape towards an exterior edge of the closed shape. The cluster of visual representations of the participants in the one group may be in a manner consistent with one or more results of the analysis of the plurality of priority values. The analysis of the plurality of priority values may include determining, for each respective participant of the plurality of participants, and with respect to each respective group of the identified plurality of groups, a respective resonance value indicating an amount that the respective participant resonates with at least the participants in the respective group. The one or more results of the analysis of the plurality of priority values may indicate at least that the respective resonance values for each of the participants in the one group most closely align the participants in the one group with the one group as compared to each other group of the identified plurality of groups.

In some embodiments, the data processing device system may be configured by the program at least to determine, for each particular group of the plurality of groups, a group alignment value with respect to the particular group and each respective other group of the plurality of groups, thereby determining a plurality of group alignment values associated with each particular group of the plurality of groups. The visual presentation of the at least one group may include a visual representation of the one group, a visual representation of a second group of the plurality of groups, and a visual representation of a third group of the plurality of groups. The visual representation of the one group may be closer to the visual representation of the second group than the visual representation of the third group. At least one of the plurality of group alignment values associated with the one group, at least one of the plurality of group alignment values associated with the second group, and at least one of the plurality of group alignment values associated with the third group may indicate that the one group is more closely related to the second group than the third group. The visual presentation of the at least one group may further include a visual representation of an agreement group of the plurality of groups, the agreement group different than the one group, the second group, and the third group. The visual representation of the agreement group may be surrounded, at least in part, by the visual representations of the one group, the second group, and the third group.

In some embodiments, the visual presentation of the at least one group may include a visual representation of the one group, a visual representation of a second group of the plurality of groups, and a visual representation of a third group of the plurality of groups, the visual representation of the one group closer to the visual representation of the second group than the visual representation of the third group.

In some embodiments, the visual presentation of the at least one group may include visual representations of at least four groups of the plurality of groups, the visual representations of the at least four groups exhibiting distance relationships therebetween that correspond to relatedness between the at least four groups.

In some embodiments, the visual presentation of the at least one group may include visual representations of at least four groups of the plurality of groups, the visual representations of the at least four groups circumferentially arranged in a circumferential order with at least two most closely related groups of the at least four groups in adjacent positions in the circumferential order and at least two least closely related groups of the plurality of groups in non-adjacent positions in the circumferential order.

In some embodiments, the data processing device system may be configured by the program at least to: determine a plurality of group alignment values for each of a plurality of pairs of at least four groups of the plurality of groups; and determine a circumferential order of visual representations of the at least four groups that places at least two most closely related groups of the at least four groups in adjacent positions in the circumferential order and places at least two least closely related groups of the at least four groups in opposite positions in the circumferential order based at least on an analysis of the plurality of group alignment values. The visual presentation of the at least one group may include visual representations of the at least four groups, the visual representations of the at least four groups circumferentially arranged in the circumferential order with at least two most closely related groups of the at least four groups in adjacent positions in the circumferential order and at least two least closely related groups of the plurality of groups in non-adjacent positions in the circumferential order.

In some embodiments, the one group may be a first group, the cluster may be a first cluster, and the visual presentation may include a second group of the identified plurality of groups of participants. The visual presentation may include at least a second cluster of visual representations of the participants in the second group. The visual representation of the one participant of the plurality of participants that is not in the first group may be visually located between the first cluster and the second cluster. The visual representation of the one participant may be visually located between the first cluster and the second cluster at a position, with respect to the first cluster and the second cluster, that is consistent at least with: (a) a first relationship between a participant priority pattern associated with the one participant and a first group priority pattern associated with the first group, and (b) a second relationship between the participant priority pattern and a second group priority pattern associated with the second group. The participant priority pattern may be a priority pattern of a first set of priority values of the plurality of priority values associated with at least some of the plurality of qualitative responses and the one participant. The first group priority pattern may be a priority pattern of a second set of priority values of the plurality of priority values associated with at least some of the plurality of qualitative responses associated with the first group. The second group priority pattern may be a priority pattern of a third set of priority values of the plurality of priority values associated with at least some of the plurality of qualitative responses associated with the second group.

In some embodiments, the visual representations of the participants in the one group are presented with a first set of visual characteristics. The at least the visual representation of the at least one participant of the plurality of participants that is not in the one group may be presented with a second set of visual characteristics different than the first set of visual characteristics. The first set of visual characteristics may include a first color, and the second set of visual characteristics may include a second color different than the first color.

In some embodiments, the visual presentation may include a visual representation of a first qualitative response of the plurality of qualitative responses visually located within one of the groups of the identified plurality of groups.

In some embodiments, the visual presentation may include a visual representation of a first qualitative response of the plurality of qualitative responses visually located between at least two of the groups of the identified plurality of groups. The data processing device system may be configured by the program at least to associate each of at least some of the qualitative responses with each of at least some of the identified plurality of groups. The associating of each of the at least some of the qualitative responses with each of the at least some of the identified plurality of groups may include determining at least a first distance between the first qualitative response and a first group of the two of the groups and a second distance between the first qualitative response and a second group of the two of the groups based at least on the analysis of the priority values associated with the first qualitative response. The visual representation of the first qualitative response may be visually located between at least the two of the groups consistent with the determined first distance and the determined second distance. The at least two of the groups may be at least three of the groups of the identified plurality of groups. The associating of each of the at least some of the qualitative responses with each of the at least some of the identified plurality of groups may include determining at least a third distance between the first qualitative response and a third group of the three of the groups based at least on the analysis of the priority values associated with the first qualitative response. The visual representation of the first qualitative response may be visually located between at least the three of the groups consistent with the determined first distance, the determined second distance, and the determined third distance.

In some embodiments, each of at least some of the priority values may indicate a category of emotion exhibited by the respective participant in response to perceiving the respective qualitative response. Each category of emotion may be represented by a distinct numerical value.

In some embodiments, each of at least some of the priority values may indicate a number of stars assigned by the respective participant to the respective qualitative response.

In some embodiments, an inquiry-response evaluation device system may be summarized as including a data processing device system; an input-output device system communicatively connected to the data processing device system; and a processor-accessible memory device system communicatively connected to the data processing device system and storing a program executable by the data processing device system. The program may include: first access instructions configured to access a plurality of qualitative responses to open-ended inquiries from the processor-accessible memory device system; second access instructions configured to access a plurality of priority values from the processor-accessible memory device system, each priority value of the plurality of priority values associated with a respective participant of a plurality of participants and associated with a respective qualitative response of the plurality of qualitative responses, and each priority value of the plurality of priority values indicating a priority assigned by the respective participant to the respective qualitative response; identification instructions configured to identify a plurality of groups of participants of the plurality of participants based at least on an analysis of the plurality of priority values; and visual presentation instructions configured to facilitate, via the input-output device system, visual presentation of at least one group of the identified plurality of groups of participants, the visual presentation including at least a cluster of visual representations of the participants in the one group and including at least a visual representation of at least one participant of the plurality of participants that is not in the one group separated from the cluster.

In some embodiments, an inquiry-response evaluation method may be executed by a data processing device system according to a program stored by a processor-accessible memory device system communicatively connected to the data processing device system, the data processing device system further communicatively connected to an input-output device system, and the method may be summarized as including: accessing a plurality of qualitative responses to open-ended inquiries from the processor-accessible memory device system; accessing a plurality of priority values from the processor-accessible memory device system, each priority value of the plurality of priority values associated with a respective participant of a plurality of participants and associated with a respective qualitative response of the plurality of qualitative responses, and each priority value of the plurality of priority values indicating a priority assigned by the respective participant to the respective qualitative response; identifying a plurality of groups of participants of the plurality of participants based at least on an analysis of the plurality of priority values; and facilitating, via the input-output device system, visual presentation of at least one group of the identified plurality of groups of participants, the visual presentation including at least a cluster of visual representations of the participants in the one group and including at least a visual representation of at least one participant of the plurality of participants that is not in the one group separated from the cluster.

In some embodiments, a computer-readable storage medium system may include one or more computer-readable storage mediums storing a program executable by one or more data processing devices of a data processing device system communicatively connected to an input-output device system, the program may be summarized as including: a first access module configured to access a plurality of qualitative responses to open-ended inquiries from a processor-accessible memory device system; a second access module configured to access a plurality of priority values from the processor-accessible memory device system, each priority value of the plurality of priority values associated with a respective participant of a plurality of participants and associated with a respective qualitative response of the plurality of qualitative responses, and each priority value of the plurality of priority values indicating a priority assigned by the respective participant to the respective qualitative response; an identification module configured to identify a plurality of groups of participants of the plurality of participants based at least on an analysis of the plurality of priority values; and a visual presentation module configured to facilitate, via the input-output device system, visual presentation of at least one group of the identified plurality of groups of participants, the visual presentation including at least a cluster of visual representations of the participants in the one group and including at least a visual representation of at least one participant of the plurality of participants that is not in the one group separated from the cluster.

In some embodiments, an inquiry-response evaluation device system may be summarized as including: a data processing device system; an input-output device system communicatively connected to the data processing device system; and a processor-accessible memory device system communicatively connected to the data processing device system and storing a program executable by the data processing device system. The data processing device system may be configured by the program at least to: access a plurality of qualitative responses to open-ended inquiries from the processor-accessible memory device system; access a plurality of priority values from the processor-accessible memory device system, each priority value of the plurality of priority values associated with a qualitative response of the plurality of qualitative responses; identify a plurality of groups of qualitative responses of the plurality of qualitative responses based at least on an analysis of the plurality of priority values; and facilitate, via the input-output device system, visual presentation of at least one group of the identified plurality of groups of qualitative responses, the visual presentation including at least a cluster of visual representations of the qualitative responses in the one group and including at least a visual representation of at least one qualitative response of the plurality of qualitative responses that is not in the one group separated from the cluster.

The visual presentation of the at least one group may include a visual presentation of the one group as a closed shape. The closed shape may be circular. The closed shape may be visually presented with a color gradient that decreases in color intensity from a geometric center of the closed shape towards an exterior edge of the closed shape. The visual representations of the qualitative responses in the one group may be presented with a first set of visual characteristics, and the at least the visual representation of the at least one qualitative response of the plurality of qualitative responses that is not in the one group may be presented with a second set of visual characteristics different than the first set of visual characteristics. The first set of visual characteristics may include a first color, and the second set of visual characteristics may include a second color different than the first color.

In some embodiments, an inquiry-response evaluation device system may be summarized as including a data processing device system; an input-output device system communicatively connected to the data processing device system; and a processor-accessible memory device system communicatively connected to the data processing device system and storing a program executable by the data processing device system. The program may include: first access instructions configured to access a plurality of qualitative responses to open-ended inquiries from the processor-accessible memory device system; second access instructions configured to access a plurality of priority values from the processor-accessible memory device system, each priority value of the plurality of priority values associated with a qualitative response of the plurality of qualitative responses; identification instructions configured to identify a plurality of groups of qualitative responses of the plurality of qualitative responses based at least on an analysis of the plurality of priority values; and visual presentation instructions configured to facilitate, via the input-output device system, visual presentation of at least one group of the identified plurality of groups of qualitative responses, the visual presentation including at least a cluster of visual representations of the qualitative responses in the one group and including at least a visual representation of at least one qualitative response of the plurality of qualitative responses that is not in the one group separated from the cluster.

In some embodiments, an inquiry-response evaluation method may be executed by a data processing device system according to a program stored by a processor-accessible memory device system communicatively connected to the data processing device system, the data processing device system further communicatively connected to an input-output device system, and the method may be summarized as including: accessing a plurality of qualitative responses to open-ended inquiries from the processor-accessible memory device system; accessing a plurality of priority values from the processor-accessible memory device system, each priority value of the plurality of priority values associated with a qualitative response of the plurality of qualitative responses; identifying a plurality of groups of qualitative responses of the plurality of qualitative responses based at least on an analysis of the plurality of priority values; and facilitating, via the input-output device system, visual presentation of at least one group of the identified plurality of groups of qualitative responses, the visual presentation including at least a cluster of visual representations of the qualitative responses in the one group and including at least a visual representation of at least one qualitative response of the plurality of qualitative responses that is not in the one group separated from the cluster.

In some embodiments, a computer-readable storage medium system may include one or more computer-readable storage mediums storing a program executable by one or more data processing devices of a data processing device system communicatively connected to an input-output device system, the program may include: a first access module configured to access a plurality of qualitative responses to open-ended inquiries from a processor-accessible memory device system; a second access module configured to access a plurality of priority values from the processor-accessible memory device system, each priority value of the plurality of priority values associated with a qualitative response of the plurality of qualitative responses; an identification module configured to identify a plurality of groups of qualitative responses of the plurality of qualitative responses based at least on an analysis of the plurality of priority values; and a visual presentation module configured to facilitate, via the input-output device system, visual presentation of at least one group of the identified plurality of groups of qualitative responses, the visual presentation including at least a cluster of visual representations of the qualitative responses in the one group and including at least a visual representation of at least one qualitative response of the plurality of qualitative responses that is not in the one group separated from the cluster.

In some embodiments, an inquiry-response evaluation device system may be summarized as including: a data processing device system; an input-output device system communicatively connected to the data processing device system; and a processor-accessible memory device system communicatively connected to the data processing device system and storing a program executable by the data processing device system. The data processing device system may be configured by the program at least to: access a plurality of qualitative responses to open-ended inquiries from the processor-accessible memory device system; access a plurality of priority values from the processor-accessible memory device system, each priority value of the plurality of priority values associated with a qualitative response of the plurality of qualitative responses; identify a plurality of groups of qualitative responses of the plurality of qualitative responses based at least on a first analysis of the plurality of priority values; associate a particular participant with at least a primary group of the identified plurality of groups based at least on a second analysis of a first set of priority values of the plurality of priority values, the first set of priority values associated with a first set of qualitative responses of the plurality of qualitative responses, and the particular participant associated with the first set of qualitative responses in the processor-accessible memory device system; and facilitate, via the input-output device system, visual presentation of a visual representation of at least one qualitative response in the primary group.

The visual presentation may include a visual representation of the particular participant in a spaced relationship with respect to the visual representation of the one qualitative response. The spaced relationship may reflect a degree of agreement between the particular participant and the one qualitative response. The first set of qualitative responses may include those qualitative responses provided by or derived from those provided by the particular participant. The first set of priority values may include those priority values provided by a plurality of participants. The first set of qualitative responses may include those qualitative responses evaluated by the particular participant to produce the first set of priority values. The primary group of qualitative responses whose respective associated priority values of the plurality of priority values may exhibit a pattern that is similar to a first priority pattern within a first threshold range. The first priority pattern may be a pattern of at least some of the plurality of priority values associated with the particular participant. The at least the primary group may include a secondary group of the identified plurality of groups of qualitative responses of the plurality of qualitative responses. The secondary group may include qualitative responses of the plurality of qualitative responses whose respective associated priority values of the plurality of priority values may exhibit a pattern that is similar to the first priority pattern within a second threshold range different than the first threshold range and excluding the first threshold range. The visual presentation may include a visual representation of at least one qualitative response in the secondary group presented after or with a lower visual priority than the visual representation of the at least one qualitative response in the primary group.

In some embodiments, an inquiry-response evaluation device system may be summarized as including a data processing device system; an input-output device system communicatively connected to the data processing device system; and a processor-accessible memory device system communicatively connected to the data processing device system and storing a program executable by the data processing device system, the program may include first access instructions configured to access a plurality of qualitative responses to open-ended inquiries from the processor-accessible memory device system; second access instructions configured to access a plurality of priority values from the processor-accessible memory device system, each priority value of the plurality of priority values associated with a qualitative response of the plurality of qualitative responses; identification instructions configured to identify a plurality of groups of qualitative responses of the plurality of qualitative responses based at least on a first analysis of the plurality of priority values; association instructions configured to associate a particular participant with at least a primary group of the identified plurality of groups based at least on a second analysis of a first set of priority values of the plurality of priority values, the first set of priority values associated with a first set of qualitative responses of the plurality of qualitative responses, and the particular participant associated with the first set of qualitative responses in the processor-accessible memory device system; and facilitation instructions configured to facilitate, via the input-output device system, visual presentation of a visual representation of at least one qualitative response in the primary group.

In some embodiments, an inquiry-response evaluation method may be executed by a data processing device system according to a program stored by a processor-accessible memory device system communicatively connected to the data processing device system, the data processing device system further communicatively connected to an input-output device system, and the method may include: accessing a plurality of qualitative responses to open-ended inquiries from the processor-accessible memory device system; accessing a plurality of priority values from the processor-accessible memory device system, each priority value of the plurality of priority values associated with a qualitative response of the plurality of qualitative responses; identifying a plurality of groups of qualitative responses of the plurality of qualitative responses based at least on a first analysis of the plurality of priority values; associating a particular participant with at least a primary group of the identified plurality of groups based at least on a second analysis of a first set of priority values of the plurality of priority values, the first set of priority values associated with a first set of qualitative responses of the plurality of qualitative responses, and the particular participant associated with the first set of qualitative responses in the processor-accessible memory device system; and facilitating, via the input-output device system, visual presentation of a visual representation of at least one qualitative response in the primary group.

In some embodiments, a computer-readable storage medium system may include one or more computer-readable storage mediums storing a program executable by one or more data processing devices of a data processing device system communicatively connected to an input-output device system, the program may include: a first access module configured to access a plurality of qualitative responses to open-ended inquiries from a processor-accessible memory device system; a second access module configured to access a plurality of priority values from the processor-accessible memory device system, each priority value of the plurality of priority values associated with a qualitative response of the plurality of qualitative responses; an identification module configured to identify a plurality of groups of qualitative responses of the plurality of qualitative responses based at least on a first analysis of the plurality of priority values; an association module configured to associate a particular participant with at least a primary group of the identified plurality of groups based at least on a second analysis of a first set of priority values of the plurality of priority values, the first set of priority values associated with a first set of qualitative responses of the plurality of qualitative responses, and the particular participant associated with the first set of qualitative responses in the processor-accessible memory device system; and a facilitation module configured to facilitate, via the input-output device system, visual presentation of a visual representation of at least one qualitative response in the primary group.

Various systems may include combinations and subsets of all the systems summarized above or otherwise described herein.

Any of the features of any of the methods discussed herein may be combined with any of the other features of any of the methods discussed herein. In addition, a computer program product may be provided that comprises program code portions for performing some or all of any of the methods and associated features thereof described herein, when the computer program product is executed by a computer or other computing device or device system. Such a computer program product may be stored on one or more computer-readable storage mediums.

In some embodiments, each of any or all of the computer-readable storage mediums or medium systems described herein is a non-transitory computer-readable storage medium or medium system including one or more non-transitory computer-readable storage mediums storing the respective program(s).

Further, any or all of the methods and associated features thereof discussed herein may be implemented by all or part of a device system or apparatus, such as any of those described herein.

BRIEF DESCRIPTION OF THE DRAWINGS

It is to be understood that the attached drawings are for purposes of illustrating aspects of various embodiments of the present invention and may include elements that are not to scale.

FIGS. 4-6 illustrate respective display-screen-pages of at least a portion of a graphical user interface of an originator device of FIG. 2, according to some embodiments of the present invention;

DETAILED DESCRIPTION

Figure 1:
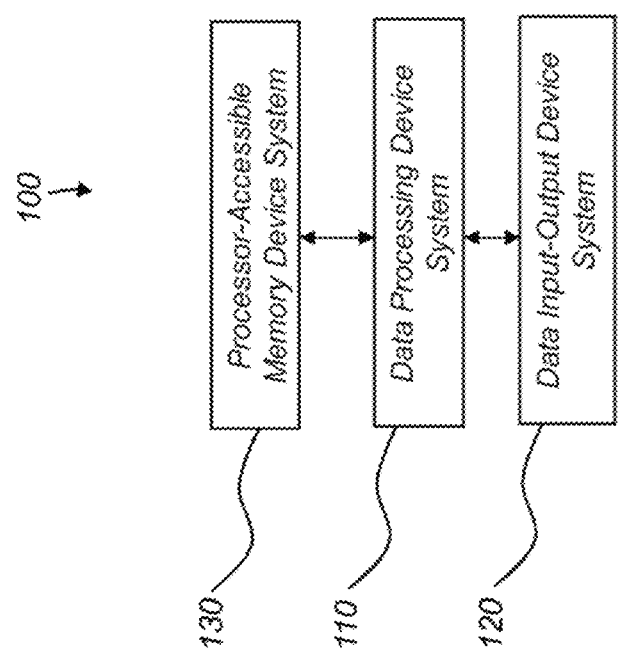
FIG. 1 illustrates a system configured to process qualitative responses and generate resulting significant visualizations, according to some embodiments of the present invention.

At least some embodiments of the present invention significantly improve upon techniques for processing qualitative responses or other textual information and pertain to the generation of significant visualizations configured to efficiently facilitate insight into characteristics of the population that evaluated the qualitative responses and efficiently facilitate identification of matters important to the population. In some embodiments, participant-provided qualitative or comment-style responses to inquiries may be processed to generate processed responses, which may then be evaluated by participants for ranking or prioritization. The ranking (e.g., prioritization) provides a streamlined approach to identifying the most important of the processed responses. The processed responses may reflect respective groups of similar qualitative responses to, among other things, simplify and reduce the amount of data that needs to be reviewed by the participants for ranking. The grouping may be performed via a user-interface (e.g., provided by input-output device system 120) by drag-and-drop or other procedures that simplify the grouping process. Groups of similar qualitative responses may further be grouped into themes or meta-groups to further simplify the process by which participants rank (e.g., prioritize). In some embodiments, participant ranking or other prioritization or evaluation is performed before grouping of responses, such that the participants essentially rank their own and other participants' 'raw' qualitative responses, and then grouping may be performed afterwards, e.g., on only the highest ranked qualitative responses. Grouping after participant ranking may have the benefit of, among other things, simplifying the grouping, which can be resource-expensive in some circumstances.

Based at least on an analysis of these prioritizations, groups of participants, qualitative responses, or both, are identified, according to some embodiments. In some embodiments, a significant visualization is generated that visually presents the groups at least in part via clusters of visual representations of participants, qualitative responses, or both based at least on results of the analysis. The significant visualizations efficiently facilitate insight into characteristics of the participants and efficiently facilitate identification of matters important to the population In the descriptions herein, certain specific details are set forth in order to provide a thorough understanding of various embodiments of the invention. However, one skilled in the art will understand that the invention may be practiced at a more general level without these details. In other instances, well-known structures have not been shown or described in detail to avoid unnecessarily obscuring descriptions of various embodiments of the invention.

Any reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, any appearance of the phrase "in one embodiment" or "in an embodiment" or "in an example embodiment" or "in this illustrated embodiment" or "in this particular embodiment" or the like in this specification is not necessarily all referring to one embodiment or a same embodiment. Furthermore, the particular features, structures or characteristics of different embodiments may be combined in any suitable manner to form one or more other embodiments.

It is noted that, unless otherwise explicitly noted or required by context, the word "or" is used in this disclosure in a non-exclusive sense. In addition, unless otherwise explicitly noted or required by context, the word "set" is intended to mean one or more, and the word "subset" is intended to mean a set having the same or fewer elements of those present in the subset's parent or superset.

Further, the phrase "at least" is used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrases, 'based at least on A' and 'configured at least to A' each include A as well as the possibility of one or more other additional elements besides A. In the same manner, the phrases, 'based on A' and 'configured to A' each include A, as well as the possibility of one or more other additional elements besides A. However, the phrases, 'based only on A' and 'configured only to A' each include only A.

The term "program" in this disclosure should be interpreted as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 212, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). The word "module" may be defined as a set of instructions. In some instances, this disclosure describes that the instructions or modules of a program perform a function. Such descriptions should be deemed to be equivalent to describing that the instructions or modules are configured to cause the performance of the function.

Each of the phrases "derived from", "derivation of", "derivation thereof" and the like is intended to mean to come from at least some part of a source, be created from at least some part of a source, or be developed as a result of a process in which at least some part of a source forms an input. For example, a data set derived from some particular portion of data may include at least some part of the particular portion of data, or may be created from at least part of the particular portion of data, or may be developed in response to a data manipulation process in which at least part of the particular portion of data forms an input. In some embodiments, a data set may be derived from a subset of the particular portion of data. In some embodiments, the particular portion of data is analyzed to identify a particular subset of the particular portion of data, and a data set is derived from the subset. In various ones of these embodiments, the subset may include some, but not all, of the particular portion of data. In some embodiments, changes in least one part of a particular portion of data may result in changes in a data set derived at least in part from the particular portion of data.

In this regard, each of the phrases "derived from", "derivation of", "derivation thereof", and the like is used herein at times merely to emphasize the possibility that such data or information may be modified or subject to one or more operations. For example, if a device generates first data for display, the process of converting the generated first data into a format capable of being displayed may alter the first data. This altered form of the first data may be considered a derivative or derivation of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative or derivation of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derived from" or "derivation of" or "derivation thereof" or the like is used in reference to the information or data. As indicated above, usage of the phrase "derived from" or "derivation of" or "derivation thereof" or the like merely emphasizes the possibility of such changes. Accordingly, the addition of or deletion of the phrase "derived from" or "derivation of" or "derivation thereof" or the like should have no impact on the interpretation of the respective data or information. For example, the above-discussed color-coded bar chart may be considered a derivative of the respective first data or may be considered the respective first data itself.

The word "device" and the phrase "device system" both are intended to include one or more physical devices or sub-devices (e.g., pieces of equipment or hardware) that interact to perform one or more functions, regardless of whether such devices or sub-devices are located within a same housing or different housings. In this regard, the word "device" may equivalently be referred to as a "device system".

Further, the phrase "in response to" may be used in this disclosure. For example, this phrase might be used in the following context, where an event A occurs in response to the occurrence of an event B. In this regard, such phrase includes, for example, that at least the occurrence of the event B causes or triggers the event A.

Further still, example methods are described herein with respect to at least FIGS. 3 and 9-11. Such figures include blocks representing steps in a process, and the blocks may be deemed to be associated with computer-executable instructions configured to execute the respective steps described herein. It should be noted that the respective instructions associated with any such blocks herein need not be separate instructions and may be combined with other instructions to form a combined instruction set. The same set of instructions may be associated with more than one block. In this regard, the block arrangement shown in each of the method figures herein is not limited to an actual structure of any program or set of instructions or required ordering of method steps, and such method figures, according to some embodiments, merely illustrate the steps that instructions are configured to perform, for example upon execution by a data processing device system in conjunction with interactions with one or more other devices or device systems.

FIG. 1 schematically illustrates a qualitative response processing system 100, according to some embodiments of the present invention. The system 100 may include a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as those in the system 100, methods of various embodiments of the present invention, including the example methods of at least FIGS. 3 and 9-11 described herein. Each of the phrases "data processing device", "data processor", "processor", and "computer" and the like is intended to include any data processing device, such as a central processing unit ("CPU"), a desktop computer, a laptop computer, a mainframe computer, a tablet computer such as an iPad (Trademark Apple Inc., Cupertino Calif.), a personal digital assistant, a cellular phone, a smartphone, or any other device for processing data, managing data, or handling data, whether implemented with electrical, magnetic, optical, biological components, or otherwise.

The memory device system 130 includes one or more processor-accessible memory devices configured to store program instructions and other information, including the information and program instructions needed to execute the methods of various embodiments, including the example methods of at least FIGS. 3 and 9-11. In this regard, each of the steps illustrated in the example methods of at least FIGS. 3 and 9-11 may represent program instructions stored in the memory device system 130 and configured to cause execution of the respective step. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" and the like is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending on the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 may be implemented by a single application-specific integrated circuit (ASIC) in some embodiments.

The input-output device system 120 may include a mouse, a keyboard, a touch screen, a computer, a processor-accessible memory device, a network-interface-card or network-interface circuitry, or any device or combination of devices from which a desired selection, desired information, instructions, or any other data is input to the data processing device system 110. The input-output device system 120 may include a user-activatable control system that is responsive to a user action. The input-output device system 120 may include any suitable interface for receiving a selection, information, instructions, or any other data from other devices or systems described in various ones of the embodiments.

The input-output device system 120 also may include an image generating device system, a display device system, a computer, a processor-accessible memory device, a network-interface-card or network-interface circuitry, or any device or combination of devices to which information, instructions, or any other data is output by the data processing device system 110. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130.

Figure 2:
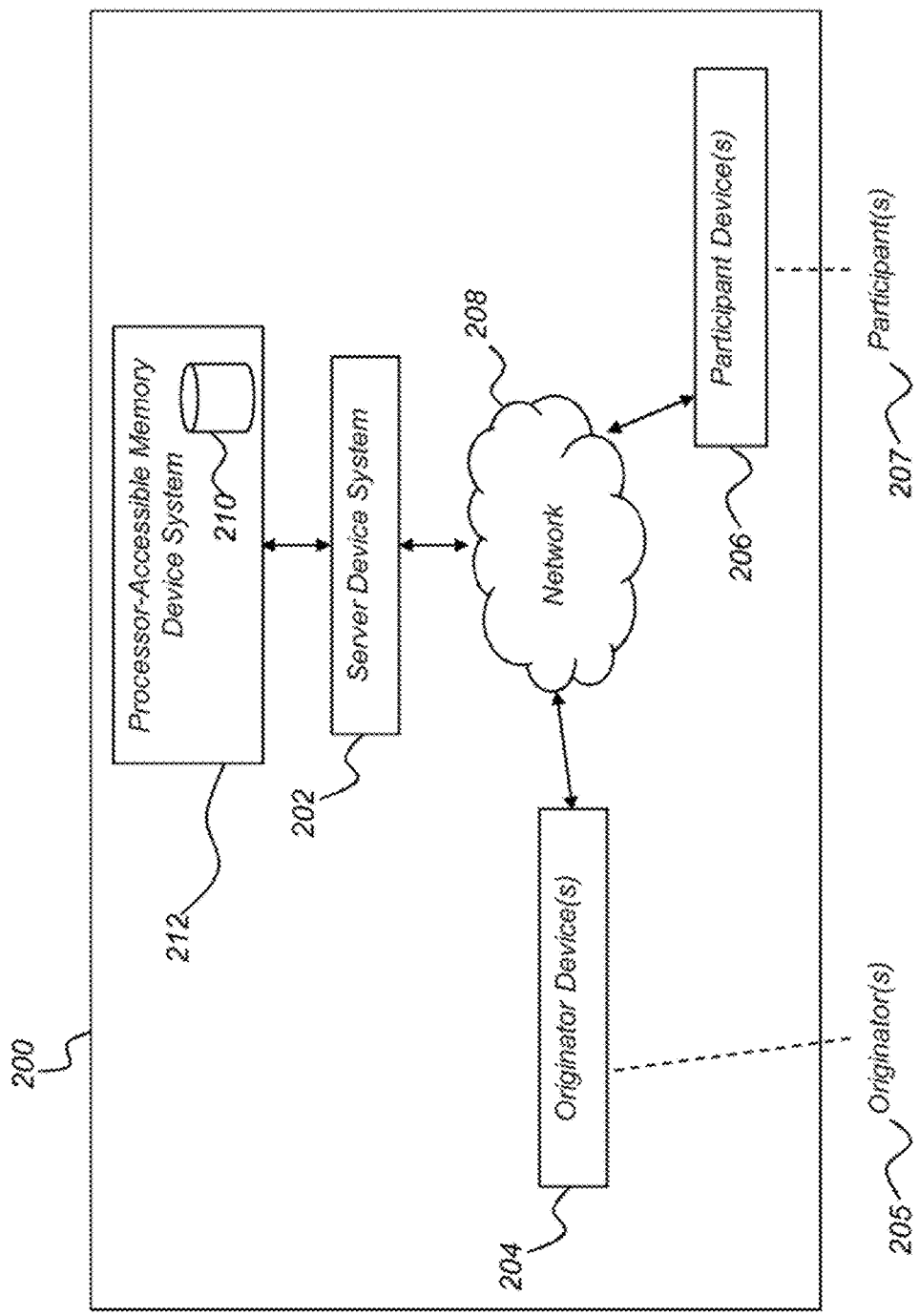
FIG. 2 illustrates some particular versions of the system of FIG. 1, according to some embodiments of the present invention.

According to some embodiments of the present invention, the data processing device system 100 includes the data processing device system 200 shown in FIG. 2, or vice versa. In this regard, the data processing device system 200 may include a server device system 202 (including one or more data processing devices), one or more originator devices 204 (each including one or more data processing devices), and one or more participant devices 206 (each including one or more data processing devices). The devices 202, 204, 206 may be communicatively connected to each other, for example, via a network 208. The network 208 may be the Internet, any local area network ("LAN"), any wide area network ("WAN"), or any other network know in the art. In addition, the network 208 is merely provided in FIG. 2 as an example of a communicative connection, and it should be noted that the network 208 may be replaced with any other communicative connection. A processor-accessible memory device system 212 may be communicatively connected to the server device system 202. In some embodiments, the processor accessible memory device system 212 includes one or more databases 210 that store, among other things, inquiries and participant responses to such inquiries, as discussed in more detail below.

The system 200 may facilitate one or more users or originators 205 acquiring information from one or more other users or participants 207. An originator 205 may be a manager or business owner, and the participants 207 may be employees who report to the manager or are employed by the business owner. However, the present invention is not limited to any particular originator 205 or participant 207. For example, in some embodiments, an originator 205 may be associated with an organization that is different than an organization to which the participants 207 belong, and the participants 207 need not belong to the same organization as each other. For instance, an originator 205 may be associated with an organization that conducts surveys, and the participants 207 may include anyone that responds to the survey.

In this regard, an originator 205 may input inquiries or questions into an originator device 204. At least some of these inquiries are open-ended and designed to prompt the participants 207 to provide qualitative, comment-style, discussion-like responses. The originator device 204 may transmit the input inquiries to the server device system 202 via the network 208 for storage in the processor-accessible memory device system 212, for example, by storage in one or more databases 210 stored in the processor-accessible memory device system 212.

The server device system 202 may transmit or distribute the inquiries (or derivatives thereof) to the participant devices 206, so that the participants 207 may respond to such inquiries via respective participant devices 206. These participant responses, referred to herein as "qualitative responses", (or derivatives thereof) may be transmitted by the respective participant devices 206 to the server device system 202 for storage in the processor-accessible memory device system 212, for example, by storage in the one or more databases 210 stored in the processor-accessible memory device system 212. In some embodiments, the server device system 202 processes the qualitative responses, possibly in response to input from an originator 205 via an originator device 204 to generate processed qualitative responses, or "processed responses". In this regard, the processed responses may be deemed a derivative of the qualitative responses. This processing of the qualitative responses may include removal of inappropriate qualitative responses, combining of duplicate responses, spell-checking, grammar checking, grouping of similar qualitative responses into groups, grouping the groups into themes, a combination of some or all of these processings, or other processing.

In some embodiments, the processed responses are distributed to the participant devices 206 for participant evaluation, such as ranking or prioritization to assign a priority value thereto, where each of some or all of the participants 207 have the opportunity to evaluate some or all of the responses earlier provided by other participants 207. The "participant-evaluated responses" may be transmitted from the respective participant devices 206 to the server device system 202 for storage in the processor-accessible memory device system 212, for example, by storage in the one or more databases 210 stored in the processor-accessible memory device system 212. The participant-evaluated responses may undergo post-processing by the server device system, which may involve input from one or more originators 205 via respective originator devices 204. This post-processing may include grouping the participant-evaluated responses into groups, especially if grouping was not performed on the original qualitative responses, grouping the groups into themes, summarizing the participant-evaluated responses into reports for analysis, a combination of some or all of these post-processings, or other post-processing. The above-discussed sequence of events is described in more detail below with respect to FIG. 3.

Although FIG. 2 illustrates a particular configuration of devices, the present invention is not limited to such configuration. For example, although the originator device(s) 204 and the participant device(s) 206 are shown separately in FIG. 2, it should be noted that an originator device 204 and a participant device 206 may be the same device, according to some embodiments of the present invention. For instance, an originator 205 and a participant 206 may operate the same device at different times. For another example, although FIG. 2 illustrates the server device system 202 as its own entity, the functions of the server device system 202 may be part of an originator device 204, part of a participant device 206, or both. For instance, the server device system 202 (including the processor-accessible memory device system 212) and an originator device 204 may be the same device (e.g., column 204 and column 202 in FIG. 3, discussed below may represent activity and communications with a same device), or the server device system 202 (including the processor-accessible memory device system 212) and a participant device 206 may be the same device (e.g., column 202 and column 206 in FIG. 3, discussed below may represent activity and communications with a same device). In some embodiments, the server device system 202, one or more originator devices 204, and one or more participant devices 206 are formed as a single device that executes the method 300 of FIG. 3, discussed below. For example, the entire system 200 may be formed as a single computer that both the originator(s) 205 and the participant(s) 207 use. For a more particular example, the entire system 200 may be formed as a single tablet computer that may be passed from an originator 205 to respective participants 207, with the server device system 202 and processor-accessible memory device system 212 implemented in that single tablet computer.

With respect to relationships between FIGS. 1 and 2, the processor-accessible memory device system 212 may correspond to the processor-accessible memory device system 130. The originator device(s) 204, the server device system 202, and the participant device(s) 206 may all correspond to the data processing device system 110. Alternatively, or in addition, each device of the originator device(s) 204, the server device system 202, and the participant device(s) 206 may all individually correspond to an implementation of the system 100. In some embodiments, the server device system 202 corresponds to the data processing device system 110, and each of the originator device(s) 204 and the participant device(s) 206 correspond to the data input-output-device system 120 that is communicatively connected (e.g., via the network 208) to the data processing device system 110, with the processor-accessible memory device system 212 may correspond to the processor-accessible memory device system 130. Similarly, in some embodiments, the originator device(s) 204 correspond to the data processing device system 110, and each of the participant device(s) 206 and the server device system 202 correspond to the data input-output-device system 120 that is communicatively connected (e.g., via the network 208) to the data processing device system 110, with the processor-accessible memory device system 130 comprising local memory of the respective originator device(s) 204. Similarly, in some embodiments, the participant device(s) 206 correspond to the data processing device system 110, and each of the originator device(s) 204 and the server device system 202 correspond to the data input-output-device system 120 that is communicatively connected (e.g., via the network 208) to the data processing device system 110, with the processor-accessible memory device system 130 comprising local memory of the respective participant device(s) 206.

Further, although the system 200 in FIG. 2 is shown to include all of the devices 202, 204, 206, 212, the system 200 may instead include a subset of these devices. For example, the system 200, in some embodiments, includes the server device system 202 and the processor-accessible memory device system 212, with the originator device(s) 204 and the participant device(s) 206 being excluded from the system 200, but being communicatively connected to the server device system 202 (e.g., via network 208). For another example, the system 200 may include an originator device 204 and the processor-accessible memory device system 212 directly connected to (or within a same housing as) the originator device 204, with the devices 206 and 202 excluded from the system 200, but (at least the server device system 202) being communicatively connected to the originator device 204. Similarly, the system 200 may include a participant device 206 and the processor-accessible memory device system 212 directly connected to (or within) participant device 206, with the devices 204 and 202 excluded from the system 200, but (at least the server device system 202) being communicatively connected to the participant device 206.

Further, FIG. 2 illustrates the processor-accessible memory device system 212 as being directly connected to the server device system 202. In this regard, because some or all of the devices 204 and 206 in FIG. 2 may be communicatively connected with each other, the processor-accessible memory device system 212 may be deemed to be communicatively connected to any of the devices 204, 206 indirectly, in some embodiments, e.g., by way of the server device system 202. However, in some embodiments, although FIG. 2 illustrates the processor-accessible memory device system 212 as being only connected to the server device system 210, the processor-accessible memory device system 212 may include, in some embodiments, some or all of the processor-accessible memory devices directly connected to (or within the same housing(s) of) the originator device(s) 204, the participant device(s) 206, and the server device system 202.

Accordingly, it can be seen that the invention is not limited to any particular arrangement of devices or communicative connections between devices, and those illustrated in FIG. 2 are merely provided as one possible example.

Figure 3:
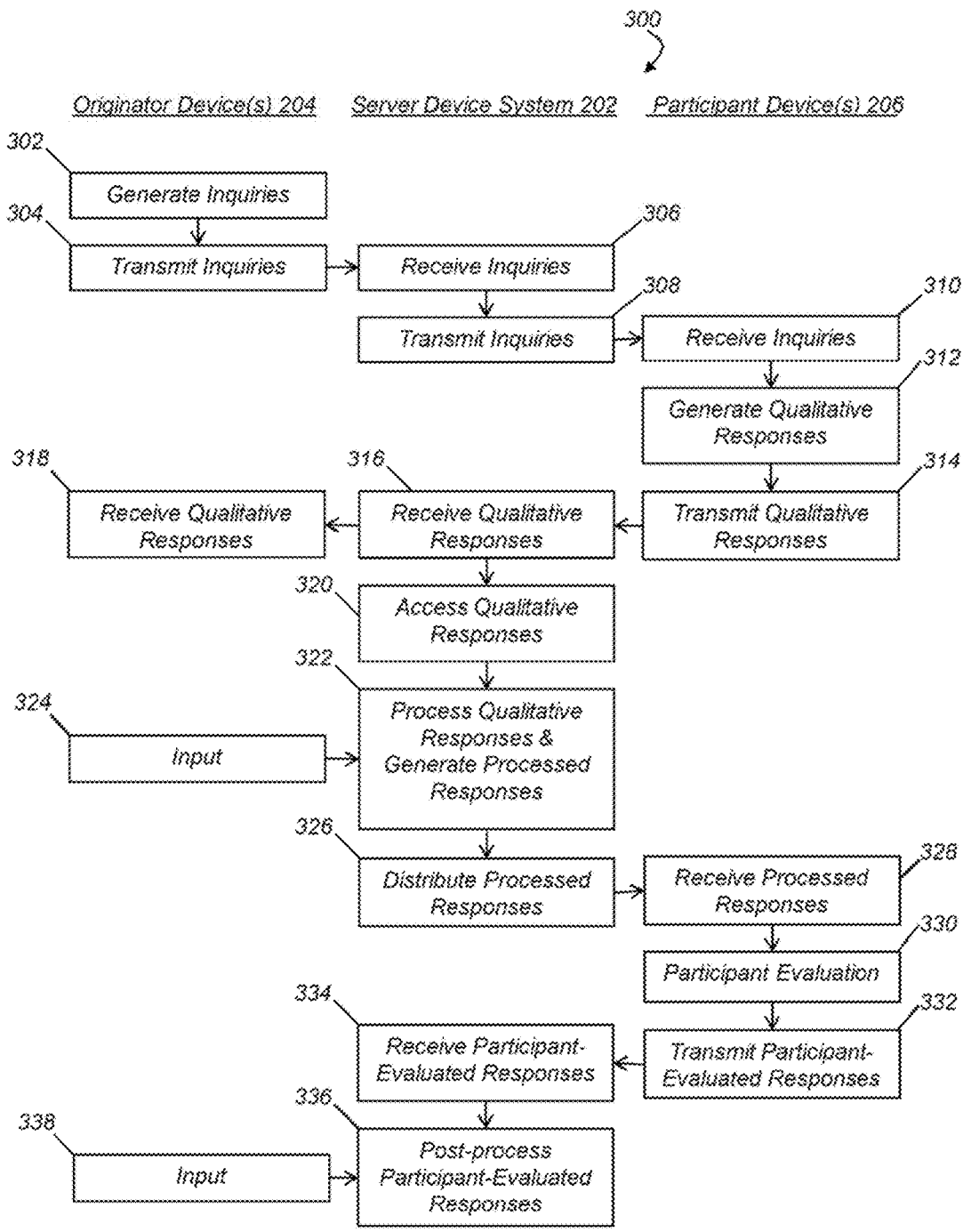
FIG. 3 illustrates a significant method of processing qualitative responses executed by at least part of the system of FIG. 1 or the system of FIG. 2, according to some embodiments of the present invention.

FIG. 3 illustrates a method 300 implemented or executed by the system 200 or the system 100, according to some embodiments of the present invention. In this regard, the method 300 provides examples of actions that may be performed by the originator device(s) 204, the server device system 202, and the participant device(s) 206, according to some embodiments.

At step 302, an originator device 204 generates open-ended inquiries requiring comment-style, qualitative responses, according to some embodiments. An example of such an open-ended inquiry that avoids a single-word (e.g., yes, no) answer may be, "How can your organization improve technologically?" The originator device 204 may generate these inquiries with the assistance of an originator 205. For example, the originator device 204 may be configured to provide a user interface for the originator 205, through which the originator 205 may type or otherwise input such inquiries. Upon generation of these inquiries, the originator device 204 may be configured to transmit such inquiries to the communicatively-connected server device system 202 through the network 208. See, e.g., step 304 in FIG. 3. In some embodiments, multiple originators 205 using one or more originator devices 204 collectively input such inquiries, and the respective subsets of such inquiries may be transmitted at step 304 by the respective originator devices 204 for accumulation at the server device system 202.

Upon receipt of the inquiries at step 306, the server device system 202 may store such inquiries in the processor-accessible memory device system 212 (or in one or more databases 210 stored therein). In order to obtain the responses to such inquiries, the server device system 202 may distribute or otherwise transmit, at step 308 via the network 208, the inquiries, or a link (e.g., a hyperlink) or other access capability to a storage location where the inquiries may be accessed, to each of a plurality of participant devices 206, where the participants 207 may input their responses to the inquiries. In this regard, the one or more originators 205 that assisted in the development of the inquiries may also provide a distribution list identifying the participants 207 that are to provide their responses to the inquiries. For example, an originator 205 may identify such participants 207 by selecting e-mail addresses from a contact book at an originator device 204, and the server device system 202 may distribute the inquiries, or a link (e.g., a hyperlink) or other access capability to a storage location where the inquiries may be accessed, at step 308 via e-mail. In this regard, it should be noted that the present invention is not limited to the manner in which participant devices 206 and their participants 207 gain access and provide responses to the inquiries.

At step 310, a participant device 206 receives the inquiries or at least access to the inquiries (e.g., by way of a hyperlink), according to some embodiments. In this regard, the participant device 206 may be configured to present the inquiries to the participant 207, possibly with the assistance of information provided by the server device system 202 (e.g., by way of javascript or HTML), via a user interface. It should be noted that the present invention is not limited to any particular user interface by which the inquiries are presented to and corresponding responses are received from the participant 207 at a participant device 206.

At step 312, the participant device 206 generates qualitative (e.g., open-ended, comment-based) responses to the inquiries based at least on input received from a participant 207. For example, a sequence of keyboard strokes reflecting a response to an inquiry from a participant 207 may be used by the participant device 206 to generate a qualitative response at step 312. The generated qualitative responses may be transmitted by the respective participant device 206 to the server device system 202 via the network 208 at step 314. When multiple participant devices 206 are providing qualitative responses, each of the one or more participant devices 206 may transmit the respectively generated qualitative responses to the server device system 202 at step 314 for accumulation.

The qualitative responses transmitted by the one or more participant devices 206 at step 314 may be received by the server device system 202 at step 316. The server device system 202 may store such qualitative responses in the processor-accessible memory device system 212 (or in the one or more databases 210 stored therein) at step 316. In some embodiments, the qualitative responses also are transmitted via the network 208 to one or more of the originator devices 204 or other devices at step 314 for review by one or more originators 205 or other users. See, e.g., step 318, where the qualitative responses are illustrated as being received by one or more originator devices 204. The transmission of the qualitative responses to one or more originator devices 204 or other devices may occur by way of the server device system 202 or directly (e.g., via the network 208, in some embodiments) from one or more of the participant devices 206. In this regard, it should be noted that a device that receives the qualitative responses at step 318 need not be an originator device 204, and may be a device associated with a user that was not an originator 205 of the inquiries that led to the qualitative responses. For example, it may be beneficial to have the qualitative responses transmitted to a manager or other decision-maker, other than an originator 205, for review.

At step 320, the server device system 202 accesses or retrieves the qualitative responses to the inquiries from the processor-accessible memory device system 212 (or the one or more databases 210 therein). At step 322, the server device system 202 processes the accessed qualitative responses to generate processed responses. In some embodiments, the processing at step 322 may include text or formatting corrections, such as spelling or grammar corrections, deletion or censoring of inappropriate responses, or the removal of identical responses. In this regard, in some embodiments, step 322 may be referred to as an approval step where moderating activities, such as corrective or censoring actions are performed. In some embodiments, the processing performed at step 322 may include combining (e.g., duplicate or substantially duplicate) qualitative responses, grouping the accessed qualitative responses, or generating themes for organizing groups of qualitative responses, as discussed below with respect to FIGS. 4-6. According to some embodiments, the processing performed at step 322 is performed based at least on input from one or more originator devices 204. See, e.g., step 324.

Figure 4:
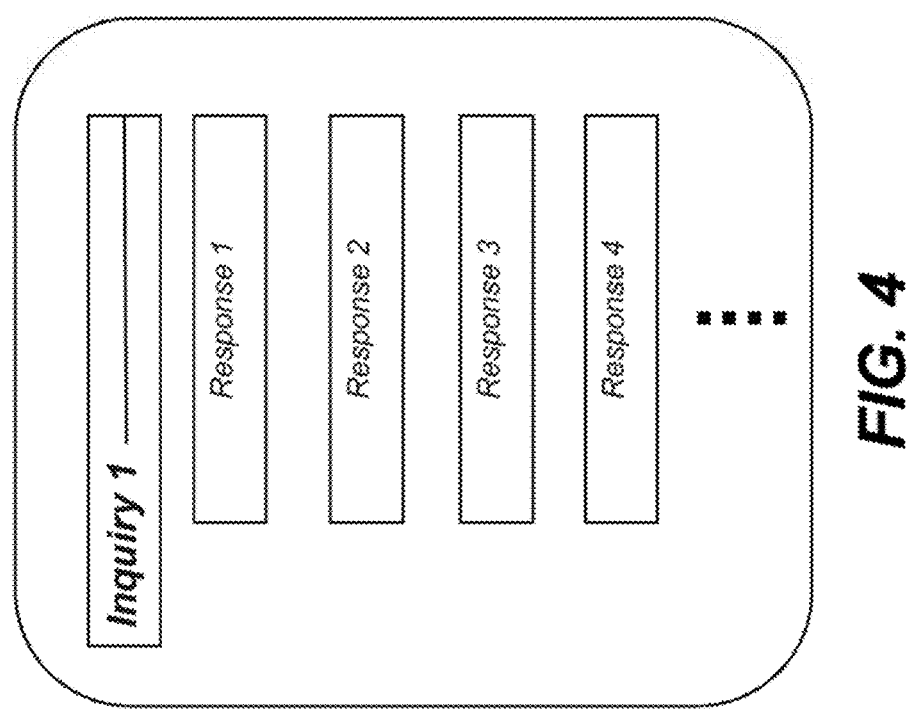
Figure 5:
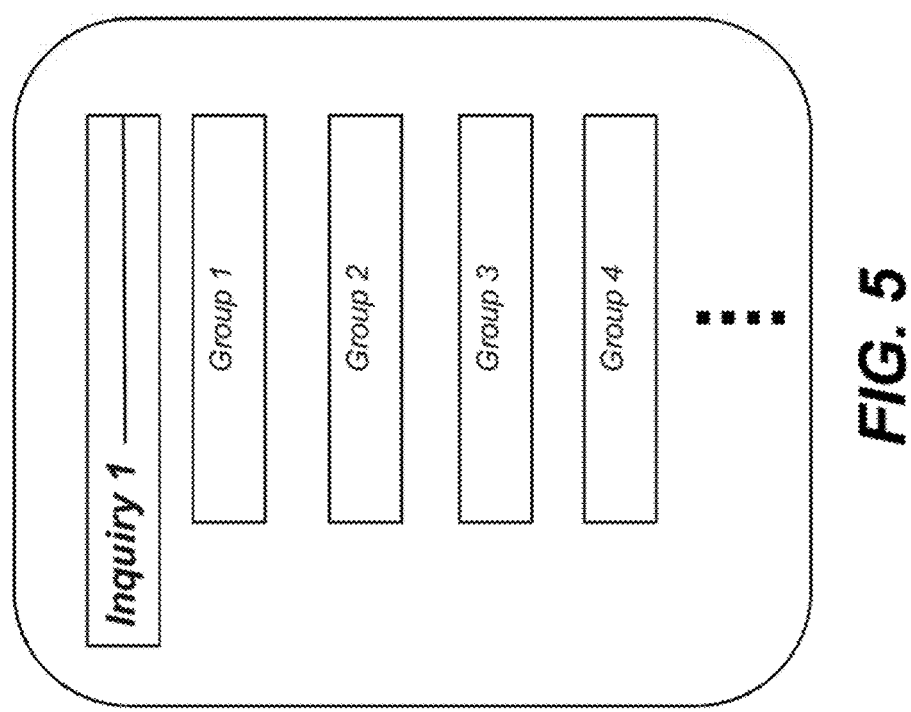

FIGS. 4-6 illustrate a user interface that may be presented by an originator device 204 to an originator 205 to facilitate the provision of the input at step 324, according to some embodiments of the present invention. (However, it should be noted that the graphical user interfaces of FIGS. 4-6 need not be displayed at an originator device 204 for an originator 205 and may, instead, be displayed at another device for another user.)

With respect to FIG. 4, an originator device 204 may be configured to display, on a graphical user interface, via a display device system, a plurality of the qualitative responses provided by one or more participants 207. In the example of FIG. 4, only four qualitative responses ("Response 1" to "Response 4") to an inquiry ("Inquiry 1") are shown for ease of explanation. Of course, the present invention is not limited to any particular number of displayed qualitative responses. Additional qualitative responses to an inquiry (e.g., "Inquiry 1") or to other inquiries may be presented to an originator 205 on different display pages or screens, or on a same page by enabling display scrolling functionality. This discussion also applies to the user interfaces of at least FIGS. 7A, 7B, 8A, 8B, and 8C, discussed below.

In the example of FIG. 4, it should be noted that the boxes for "Inquiry 1", "Response 1", "Response 2", "Response 3", and "Response 4" are illustrated symbolically, and that such boxes would be replaced with the actual text of the respective inquiry and responses, for example, in an actual implementation of a user interface, according to some embodiments. For instance, the box label "Inquiry 1" in FIG. 4 might be replaced with the text, "How can your organization improve technologically?", the box label "Response 1" in FIG. 4 might be replaced with the text, "The support staff could use new computers", etc., according to some embodiments. This symbolic approach is used for each of the figures subsequent to FIG. 4 as well.

In order to group similar qualitative responses as part of the processing of step 322, according to some embodiments, an originator 205 may, via the user-interface, select a response, move the selected response at least partially over another response, and unselect the moved response in order to combine those two responses into a group. For example, a user might click, drag, and release box "Response 1" (FIG. 4) on top of box "Response 2" (FIG. 4) in order to create a group (e.g., box "Group 1" in FIG. 5) including "Response 1" and "Response 2". A result of creating a group may be the generation of a graphical representation of the group, such as the box "Group 1" in FIG. 5. For another example, a user might select, drag, or otherwise provide an indication via the user-interface that "Response 1" (FIG. 4) should be designated to become a group (e.g., box "Group 1" in FIG. 5), which, at first, includes only "Response 1". In this example, "Response 2" could be added by the user to the newly formed "Group 1", e.g., by clicking, dragging, and releasing "Response 2" on top of a graphical representation of the newly formed "Group 1", as described in more detail below, so that "Group 1" would now include both "Response 1" and "Response 2". In this regard, it should be noted that the present invention is not limited to any particular technique for creating a group of responses.

When combining qualitative responses into a group, the group may acquire or adopt title text (e.g., a title of the group) from a representative one of the qualitative responses that make up the group. For example, assume that "Response 1" is, "The support staff could use new computers," and that "Response 2" is, "Our computers are too old." If "Response 1" and "Response 2" are combined to create "Group 1", the title text of the qualitative responses represented by "Group 1" could be "The support staff could use new computers." In this regard, "Group 1" may be considered a "processed response" representing the qualitative responses "Response 1" and "Response 2", according to some embodiments. When a participant evaluates such a group (e.g., by prioritizing or ranking the group to assign a priority value thereto), the participant may rely on the title text of the group, inspect (e.g., by way of a graphical user interface on a participant device 206) the respective responses contained within the group, or both, to perform the evaluation.

Although in the example, the text of the qualitative response "Response 1" was used as the title text for "Group 1", the text of the qualitative response "Response 2", or text manually input by an originator 205, a participant 206, or other user may be adopted as the title text of the group. In the case of manual input of such text, one or more keywords input by one or more participants 207, originators 205, or other users may be used as the title text. The decision about what text of a qualitative response should represent the title text of a group may be provided by an originator 205 or other user, or may at least be initiated (e.g., by a default selection) by an originator device 204 or the server device system 202. For example, the text of the qualitative response (i.e., the "destination response") that is "landed on" by another qualitative response (i.e., the "source response") by an originator 205 via a select-move-and-unselect procedure may be used as a default selection for the title text represented by the newly created group. For instance, if an originator 205 selects "Response 1" (i.e., the source response in this example) and moves and releases it on "Response 2" (i.e., the destination response in this example) via the user interface of FIG. 4, the text of the qualitative response "Response 2" (i.e., the destination response in this example) may be used as the title text for "Group 1" (which is an example of a processed response from step 322). In other words, in some embodiments, the text of the destination response is used as the title text of the group. On the other hand, in some embodiments, the text of the qualitative response (i.e., the source response) that is "dragged-and-dropped" onto another qualitative response (i.e., the destination response) by an originator 205 via a select-move-and-unselect procedure may be used as a default selection for the title text represented by the newly created group. For instance, if an originator 205 selects "Response 1" (i.e., the source response in this example) and moves and releases it on "Response 2" (i.e., the destination response in this example) via the user interface of FIG. 4, the text of the qualitative response "Response 1" may be used as the title text for "Group 1" (which is an example of a processed response). In other words, in some embodiments, the text of the source response is used as the title text of the group. Accordingly, it should be noted that the present invention is not limited to any particular technique by which responses are grouped or by which groups are assigned title text. The process by which groups (or other response types, such as themes) are assigned title text also is referred to herein as "naming", such as naming a group or a theme.

In order to add qualitative responses to a newly created group, the user interface of an originator device 204 may be configured to allow an originator 205 to select a third qualitative response (e.g., "Response 3" in FIG. 4, and an example of a source response), move the third qualitative response at least partially over a graphical depiction of the newly created group (e.g., a box like "Group 1" in FIG. 5, and an example of a "destination group"), and unselect the third qualitative response in order to combine the third qualitative response with the newly created group. It should be noted, however, that the present invention is not limited to any particular technique for adding responses to an existing group. The title text assigned to the existing group to which an additional qualitative response is added may remain the same after the additional qualitative response is added, or it may be changed according to any one of the various techniques discussed above.

FIG. 5 illustrates a result of the grouping process described above with respect to FIG. 4, according to some embodiments of the present invention. Each group illustrated in FIG. 5 may include a set of similar qualitative responses and may itself represent a "processed response" to an inquiry (e.g., "Inquiry 1"). For example, box "Group 1" in FIG. 5 may represent a processed response that states, by way of its title text, "The support staff could use new computers," box "Group 2" in FIG. 5 may represent a processed response that states, by way of its title text, "We need more projectors for the conference rooms," and the box for "Group 3" may represent a different processed response, by way of its title text, etc. In other words, in some embodiments, each of the plurality of processed responses (e.g., "Group 1", "Group 2", "Group 3", and "Group 4" in FIG. 5) is or represents a different group of the plurality of qualitative responses accessed by the server device system 202 from the processor-accessible memory device system 212. In instances where at least two duplicate or identical qualitative responses are joined to form a single group, it may be said that the processing of step 322 includes combining at least two duplicate ones of the plurality of qualitative responses accessed at step 320 into a single group that is considered one processed response.

According to some embodiments, grouped qualitative responses may be further combined into themes or meta-groups. For example, the groups of FIG. 5 may be combined, according to the same grouping and naming techniques described above with respect to FIG. 4 for grouping responses, to form themes illustrated, for example, in FIG. 6. In this regard, the themes of FIG. 6 may have the same characteristics as the groups of FIG. 5, except that their constituent elements are groups instead of individual responses. As with the naming of groups discussed above with respect to FIG. 4, the themes of FIG. 6 may be named in the same manner, including manual naming by use of keywords input by one or more participants 207, originators 205, or other users.

Returning to FIG. 3, at step 326, the server device system 202 may distribute or otherwise transmit over the network 208 some or all of the processed responses generated at step 322 to each of a plurality of the participant devices 206 for participant evaluation, according to some embodiments. In this regard, in some embodiments, all of the processed responses are transmitted to each of a plurality of the participant devices 206 for participant evaluation.

However, in some embodiments, some or all of the processed responses are transmitted to participant devices 206, such that the server device system 202 distributes a different set of the plurality of processed responses over the network to each of at least some of the plurality of participant devices for the participant evaluation. For example, a first set of the processed responses generated at step 322 may be distributed by the server device system 202 over the network 208 to one of the plurality of participant devices 206 for participant evaluation, and a second set (different than the first set) of the processed responses may be distributed by the server device system 202 over the network 208 to another of the plurality of participant devices 206 for participant evaluation. In this regard, the first set, the second set, or each of the first set and the second set, may be a subset of processed responses generated at step 322. Such embodiments may allow each participant to evaluate a fewer number (e.g., less than all) of the processed responses. For example, if the processed responses generated at step 322 consist of five processed responses R1, R2, R3, R4, and R5, a first participant (e.g., at a respective first participant device) could evaluate processed responses R1 and R2 (e.g., a first subset of the processed responses), and a second participant (e.g., at a respective second participant device) could evaluate processed responses R3, R4, and R5 (e.g., a second subset of the processed responses). In this manner, the burden on each of the first participant and the second participant has been reduced (because neither had to evaluate all five processed responses), and, yet, all of the processed responses are evaluated. Such an approach may be suitable when more participants are available, so the total number of processed responses that need to be evaluated is able to be divided into sufficiently small subsets.

In some embodiments, the server device system 202 records which responses are distributed to each respective participant at step 326 in the processor-accessible memory device system 212. The respective participant device 206 may store this information in addition to or in lieu of the server device system 202. In the above-example, in some embodiments, the server device system 202, the respective participant device 206, or both, may record that the first participant is to receive the first subset of processed responses including responses R1 and R2, and that the second participant is to receive the second subset of processed responses including responses R3, R4, and R5. Recording this information may be beneficial in situations where a participant does not complete the participant evaluation of step 330 in one session. In this case, it may be important to ensure that when the participant starts the second session to complete the evaluation that the participant sees the same subset of processed responses. In this regard, in some embodiments, the server device system 202, the respective participant device 206, or both, may record participant-evaluation-session information, such as the processed responses that have been viewed (e.g., via a screen like FIG. 7A, FIG. 7B, FIG. 8A, or FIG. 8B, discussed below), by the respective participant, the processed responses that have been prioritized (assigned a priority (e.g., a star) value) by the respective participant, or both, to aid in managing multi-session participant evaluations.

In some embodiments, it may be beneficial to track the number of times each processed response has been participant-evaluated, in order to ensure that each processed response has been distributed or participant-evaluated a sufficient (e.g., a user-defined threshold) number of times. In this regard, in some embodiments, the server device system 202 may record a number of times each of at least some of the plurality of processed responses has been placed in a subset as part of step 322 or 326 for evaluation by a particular participant at step 330. In some embodiments, in addition to or in lieu of recording a number of times each of at least some of the plurality of processed responses has been placed in a subset as part of step 322 or 326 for evaluation by a particular participant at step 330, the server device system 202 may record a number of times each of at least some of the plurality of processed responses has been participant-evaluated, based at least on information provided by the respective participant devices. In some embodiments, "participant-evaluated", in this context, means that the processed response has been presented to the participant (e.g., displayed on a screen like FIG. 7A, FIG. 7B, FIG. 8A, or FIG. 8B, discussed below), regardless of whether or not the respective participant actually prioritized (e.g., assigned a priority (e.g., a star) value to) the processed response. (Some embodiments do not require that a priority be assigned to each processed response, while other embodiments do so require.) In some embodiments, "participant-evaluated", in this context, means that the processed response has been prioritized (e.g., assigned a priority (e.g., a star) value) by the respective participant. Either or both definitions may be preferred and implemented in various circumstances.

With some or all of this information (i.e., one or more of the recorded numbers of times discussed above), the server device system 202 (with or without user input, e.g., from an originator device 204) may be configured by a program stored in memory device system 212 to ensure that each of the processed responses is evaluated at step 330 the same or approximately the same number of times. For example, when generating a plurality of subsets of processed responses for distribution at step 326, each subset directed to a particular participant (or participant device 206), the server device system 102 (with or without user input, e.g., from an originator device 204) may perform a "Flattening Process" to ensure that such subsets, collectively, represent the same or approximately the same number of occurrences of each processed response.

For example, in some embodiments, the distribution of step 326 or the evaluation at step 330 occurs over a period of time, such that the respective subsets of processed responses evaluated by respective participants at step 330 are generated over a period of time. In some of these embodiments, the server device system 202 may record the number of times the that each processed response has been distributed for evaluation at step 326 or evaluated at step 330, so that when a new subset of processed responses is to be generated for distribution at step 326, evaluation at step 330, or both, the server device system 202 chooses processed responses that are associated with a number of times fewer than others of the processed responses to be included in that new subset. This approach has the effect of evening out the recorded numbers of times.

However, the generation of the subsets of processed responses for distribution at step 326 and evaluation at step 330 need not occur over an extended period of time, and, instead, may occur contemporaneously, such that the server device system 202 generates a plurality of subsets of processed responses for distribution to and evaluation by respective participants at step 326 and step 330 that exhibit an equal or substantially equal number of occurrences among all of the plurality of processed responses to be evaluated at step 330.

In some embodiments, when generating a plurality of subsets of processed responses for distribution at step 326, the server device system 202 (with or without user input, e.g., from an originator device 204) may perform a "Diversification Process" to ensure that each subset directed to a particular participant (or participant device 206) represents processed responses originating from a diverse group of participants. For example, according to some embodiments, demographic or other information about the participants that generate the qualitative responses at step 312 may be stored in the memory device system 212 and used by the server device system 202 (with or without user input, e.g., from an originator device 204) to generate diverse groups of processed responses for each subset of processed responses to be distributed at step 326 to respective participants. For instance, assuming that geographic diversity is desired, each subset of processed responses to be distributed at step 326 to respective participants may be generated to include processed responses originating (e.g., at step 312) from participants from a plurality of different geographic regions. It should be noted, however, that the invention is not limited to geographic diversity and includes any particular type of diversity or combination of different types of diversity in this regard, such as employment status, gender, income bracket, political preference, religion, or any other characteristic of a participant that can be asked, e.g., in a multiple choice question. In the case of employment status, a school district may seek the opinions from both parents (non-employees representing one group of participants) and employees (e.g., teachers representing another group of participants). In this case, the above-discussed Diversification Process may cause each subset of processed responses to be distributed at step 326 to respective participants to include processed responses from both parents and employees to ensure diversity.

On the other hand, according to some embodiments of the present invention, the server device system 110 (with or without user input, e.g., from an originator device 204) executes a "Similarity Process" to ensure that each subset of processed responses for distribution to a respective participant at step 326 includes processed responses originating from one or more other participants that have one or more similarities with the respective participant that is to perform the evaluation at step 330. For example, if a school district is seeking the opinions from both parents (as one group of participants) and employees (as another group of participants), it may be beneficial in certain circumstances to have parents evaluate at step 330 processed responses originating only from other parents, whereas employees (e.g., teachers) may be caused to evaluate at step 330 processed responses originating only from other employees. In this regard, the present invention is not limited to any particular type of similarity or combination of similarities between the evaluating participant (e.g., step 330) and the originating participant(s) that originated (e.g., at step 312) the processed responses being evaluated by the evaluating participant at step 330. For example, the types of similarities may include one or more of the types of diversity discussed, above, such as geographic, employment status, gender, income bracket, political preference, religion, or any other characteristic of a participant that can be asked, e.g., in a multiple choice question.

In this regard, it may be important in certain circumstances for a participant to see his or her own responses generated at step 312 when such participant performs the evaluation at step 330. In particular, if the participant sees his or her own responses during the evaluation of step 330, such participant may experience a greater sense of participation in the process 300 and may feel that his or her contribution at step 312 is valued and important. Accordingly, in some embodiments of the present invention, each subset of processed responses for distribution to a respective participant at step 326 for evaluation of step 330 includes at least the responses that respective participant generated at step 312. This process of ensuring that each subset of processed responses for distribution to a respective participant at step 326 for evaluation of step 330 includes at least the responses that respective participant generated at step 312 may be referred to as an "Own Response Process".

In some embodiments, the above-discussed Flattening Process may be executed in conjunction with the above-discussed Diversification Process, the Similarity Process, the Own Response Process, or a combination of at least some of these or other processes. For example, assume that the server device system 110 is generating a subset S1 of four processed responses from the set of processed responses R1-R7 shown in Table I, below, to be delivered at step 326 to a participant P1.

TABLE I

| | Originating Participant | Participant Status | # Times Used |
|---|---|---|---|
| R1 | P1 | Teacher | 8 |
| R2 | P2 | Parent | 4 |
| R3 | P3 | Parent | 12 |
| R4 | P1 | Teacher | 7 |
| R5 | P4 | Teacher | 7 |
| R6 | P5 | Parent | 9 |
| R7 | P6 | Parent | 8 |

Also assume, for example, that the above-discussed Flattening Process is being executed in conjunction with the above-discussed Diversification Process and the Own Response Process. Also assume that the Own Process takes priority over the Diversification Process and the Flattening Process, and that the Diversification Process takes priority over the Flattening Process. In this example, according to some embodiments, the subset S1 of four processed responses to be delivered at step 326 to participant P1 for evaluation at step 330 will include responses R1 and R4, because those responses were generated by participant P1 at step 312, as indicated by the "Originating Participant" column in Table I, and according to the Own Response Process. Since participant P1 is a teacher, and, therefore, responses R1 and R4 are both responses from a teacher as indicated by the "Participant Status" column in Table I, the Diversification Process may attempt to fill the two remaining response-places in the subset S1 with responses from a parent. Responses R2, R3, R6, and R7 meet this criteria. In order to select which two of responses R2, R3, R6, and R7, the Flattening Process may select the two responses that have been used (e.g., in other subsets of responses to be delivered at step 326 or, e.g., have been evaluated by a participant at step 330) the fewest number of times, according to the "# Times Used" column in Table I. In this example, R2 and R7 would be selected for inclusion in subset S1, so that subset S1 would finally include responses R1, R2, R4, and R7.

At step 328, each of the respective participant devices 206 may receive the processed responses (e.g., respective subsets of processed responses), or a link (e.g., a hyperlink) or other access capability to a storage location where the processed responses may be accessed, from the server device system 202, and the participant evaluation may occur at step 330.

In some embodiments, the participant evaluation at step 330 includes a participant prioritization of at least some of the plurality of processed responses. In this regard, the participant evaluation may provide an opportunity for each of the participants 207 to review their own responses in addition to responses of other participants 207 and, within this context, prioritize or rank which responses the respective participant 207 believes are more important than other responses.

One potential difficulty associated with such a participant evaluation procedure may occur when the number of processed responses (e.g., from step 322) is large, which can cause 'information overload' for the participants 207. In this regard, the grouping of responses, the grouping of groups according to themes, or both, which may be implemented at least as part of the processing of step 322, may mitigate this difficulty. However, in situations where grouping does not occur at step 322 or where the number of groups generated at step 322 is large, one or more additional 'information overload' mitigation techniques may be required as part of the participant evaluation of step 330.

According to some embodiments, one of these mitigation techniques includes presenting different sets of processed responses (e.g., generated at step 322) on a display screen or display-screen-page-by-display-screen-page basis, so that the participant 207 has manageable 'bite-size' chunks or segments of information to evaluate at any one period of time. For example, the participant evaluation of step 330 may, in some embodiments, present processed responses on a display-screen-page-by-display-screen-page basis. Each processed response may be presented on at least one of multiple display-screen-pages, with each of the multiple display-screen-pages displaying a different set of the processed responses.

Figure 7B:
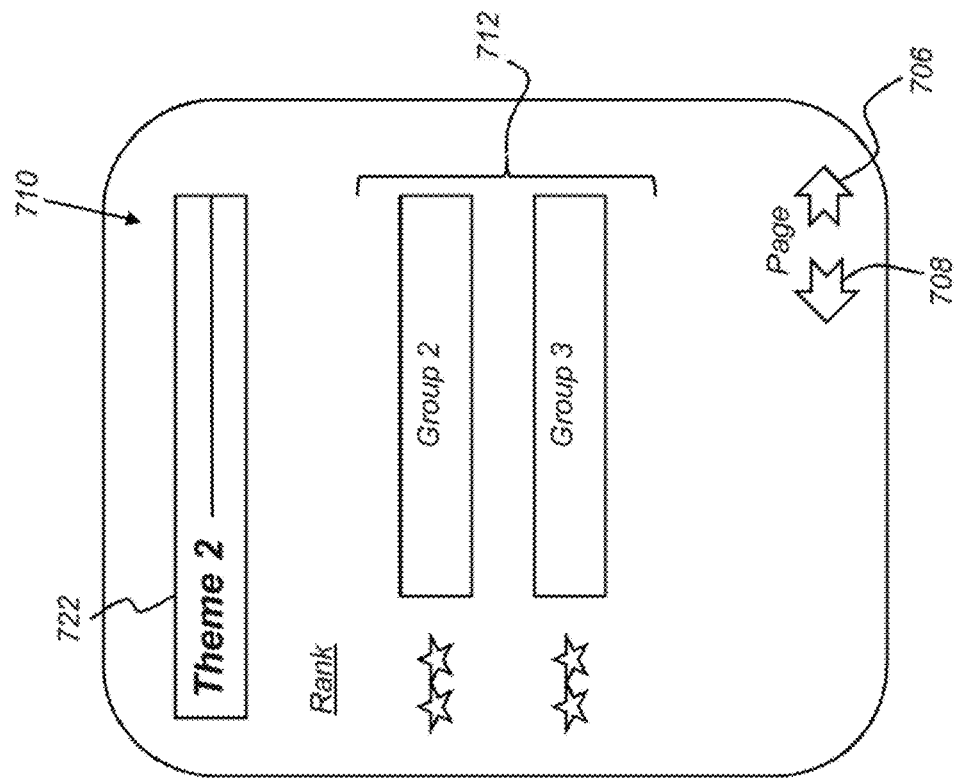
FIGS. 7A and 7B illustrate respective display-screen-pages of at least a portion of a graphical user interface of a participant device of FIG. 2, according to some embodiments of the present invention.
Figure 7A:
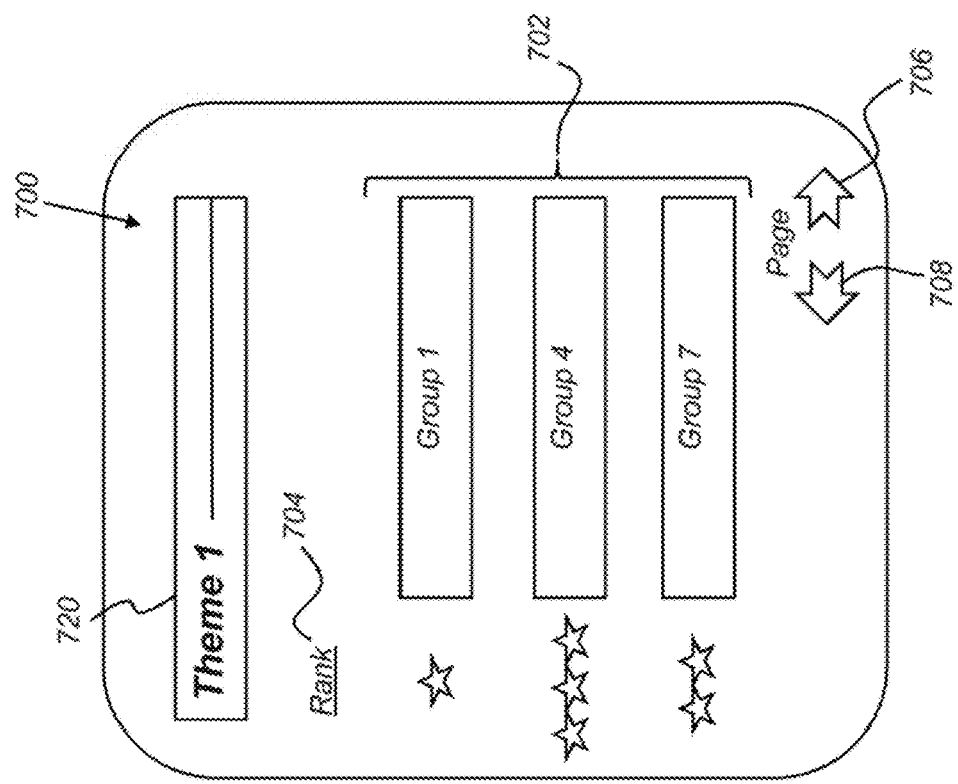

For instance, FIG. 7A and FIG. 7B illustrate a user interface provided by a participant device 206 through which participant evaluation of processed responses (e.g., generated at step 222) by a participant 207 may occur, according to some embodiments. FIG. 7A illustrates a first display screen or page 700 of the user interface that allows a participant 207 to evaluate or rank a subset 702 of the plurality of processed responses (e.g., generated at step 322). In some embodiments, a participant 207 assigns a priority or rank 704 to each of the processed responses in the subset 702. In the example of FIG. 7A, the participant 207 assigns a low priority or rank (e.g., one star) to a first processed response "Group 1", a higher priority or rank (e.g., two stars) to a third processed response "Group 7", and an even higher priority or rank (e.g., three stars) to a second processed response "Group 4". The first processed response "Group 1" and the second processed response "Group 4" may correspond to the processed responses "Group 1" and "Group 4", respectively, shown in FIG. 5. Although FIG. 7A and the subsequent figures (e.g., at least through FIG. 8C) illustrate the use of a star-based ranking system, it should be noted, however, that the present invention is not limited to any particular technique for prioritizing or ranking processed responses. Although FIG. 7A and each of the subsequent figures (e.g., at least through FIG. 8C) respectively illustrate a particular number of processed responses for the participant 207 to evaluate, the present invention is not limited to any particular number, and, in some embodiments, the number of processed responses presented for evaluation on any one display screen or page may be user-customizable, e.g., defined by an administrator, an originator 205, each respective participant 207 for their own respective user-interface, or other user.

A participant 207 may proceed to evaluate another subset of processed responses on another display screen or page by use of navigation controls provided by the user-interface.

FIG. 7A illustrates an example of such navigation controls as a forward-page software button (also referred to as a forward navigation button) 706 and a backward-page software button (also referred to as a backward navigation button) 708. It should be noted, however, that the present invention is not limited to any particular technique for navigating display screens or display pages.

In some embodiments, selection of the forward-page software button 706 by a participant 207 causes the display of a second display screen or page 710 of the user interface shown at FIG. 7B. This second page 710 includes a different subset 712 of the plurality of processed responses (e.g., generated at step 322) than the subset 702. In some embodiments, each of the plurality of processed responses (e.g., generated at step 322) is presented on only one of the multiple display-screen-pages (e.g., 700, 710, etc.). That is, in some embodiments each of the plurality of processed responses (e.g., generated at step 322) is not present in more than one of the multiple display-screen-pages. Compare, for example, FIG. 7A and FIG. 7B, where no group number is duplicated. However, in other embodiments, each of one or more of the plurality of processed responses (e.g., generated at step 322) may be displayed on more than one display-screen-page. For example, it may be beneficial, in certain contexts, to have a participant see a particular processed response alongside different sets of other processed responses to see how the participant's evaluation might change with respect to the particular processed response. Compare, for example, FIG. 8A and FIG. 8B, where the processed response "Response 4" is presented on both the display screens or pages 800 and 810, where the display screen or page 800 presents a first subset of processed responses 802, and the display screen or page 810 presents a second subset of processed responses 812 different than the first set 802. In other words, at least two of multiple-display-screen-pages may display a same one of the processed responses at a same one of the participant devices 206.

Returning to FIG. 7B, the participant 207 may prioritize or rank the processed responses (e.g., "Group 2" and "Group 3") in the subset 712 as discussed with respect to FIG. 7A. In addition, the participant 207 may advance to a next display screen or page via the forward navigation button 706, or return to view or modify the prioritizations performed in the preceding display screen or page 700 via the backward navigation button 708.

As illustrated in FIG. 7A and FIG. 7B, according to some embodiments, each respective page (e.g., 700, 710) of multiple display screen pages may be associated with a respective theme (e.g., 720, 722, respectively) where only those processed responses (e.g., 702, 712, respectively) associated with the respective theme are displayed on the respective page. In some embodiments, at least some of the multiple pages are associated with a same theme. In some embodiments, at least some of the multiple pages are associated with a different theme (e.g., themes 720, 722) than others of the multiple pages.

Figure 8B:
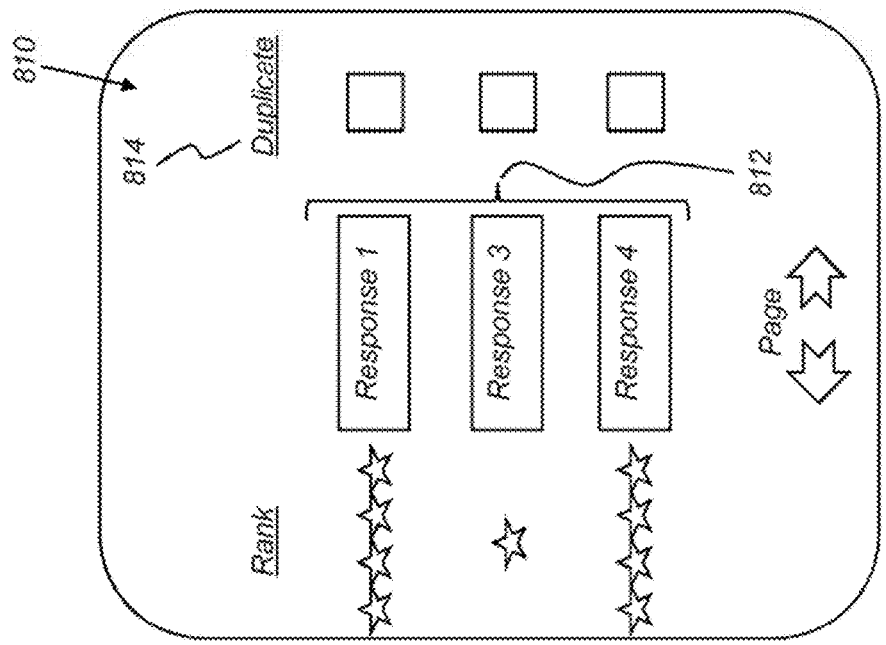
FIGS. 8A, 8B, and 8C illustrate respective display-screen-pages of at least a portion of a graphical user interface of a participant device of FIG. 2, according to some embodiments of the present invention.
Figure 8A:
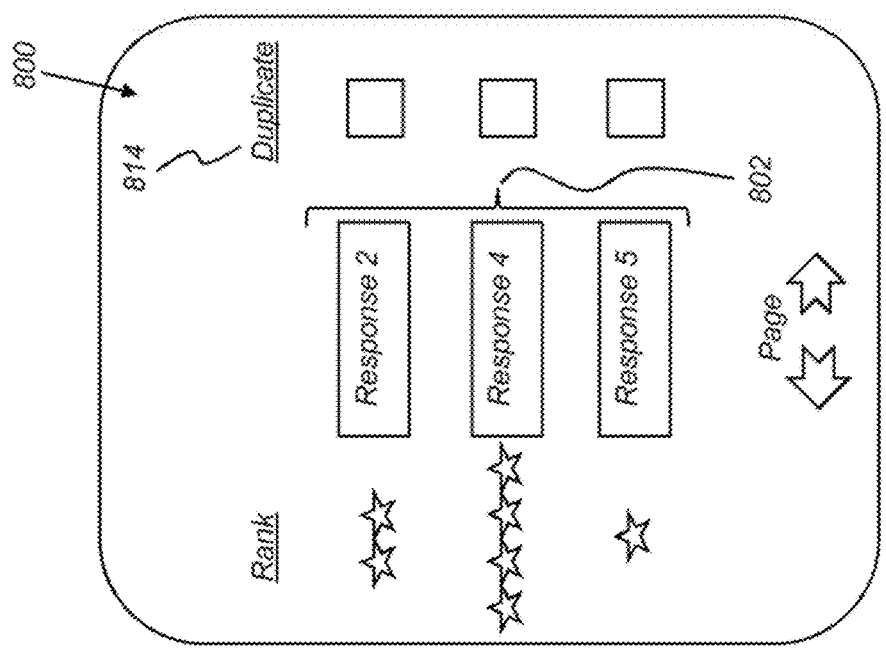

According to some embodiments of the present invention, FIG. 8A and FIG. 8B illustrate a user interface on a participant device 206 like that described above with respect to FIG. 7A and FIG. 7B, except that the processed responses are not groups. Instead, the processed responses in FIG. 8A and FIG. 8B are individual qualitative responses (e.g., corresponding to at least some of those generated at step 312 in FIG. 3), according to some embodiments. Such embodiments may be beneficial in certain contexts at least because they may eliminate the need to perform some or all of the grouping that is performed at step 322 in some embodiments, although elimination of duplicate or inappropriate responses at step 322 may still be performed. In other words, in some embodiments, the processing at step 322 does not include grouping similar qualitative responses, such that each of a plurality of processed responses generated at step 322 does not represent or correspond to multiple similar qualitative responses, but, instead, each of the plurality of processed responses generated at step 322 represents or corresponds to a different one of the plurality of qualitative responses (e.g., accessed at step 320).

In this regard, the grouping of similar qualitative responses that may be performed at step 322 may require the use of an expert originator 205 to effectively create the groups of similar qualitative responses, and, therefore, may be cost inefficient. Accordingly, in embodiments where this grouping of similar qualitative responses is not performed at step 322, the participants 207 may be presented essentially with all or most of the 'raw' qualitative responses generated by the participants 207 at step 312. An example of this participant evaluation of 'raw' qualitative responses is illustrated in FIG. 8A and FIG. 8B, where, e.g., "Response 1" in FIG. 8B, "Response 2" in FIG. 8A, "Response 3" in FIG. 8B, and "Response 4" in FIG. 8B may correspond to the equivalent responses in FIG. 4 in a case where no grouping of similar responses is performed at step 322 (although other processing, such as elimination of duplicates or inappropriate responses, spell checking, grammar checking, or other processing may still be performed at step 322 (e.g., as part of an approval step) in such embodiments). In at least some of these embodiments, the grouping of individual qualitative responses, the grouping of groups into themes, or both, may instead be performed (if at all) after the participant evaluation of step 330, for example, at a post-processing step (e.g., 336 discussed below). In some embodiments, the grouping of individual qualitative responses, the grouping of groups into themes, or both performed after the participant evaluation of step 330 may be performed on only those qualitative responses evaluated at step 330 to have a priority above a threshold priority. In this manner, the number of qualitative responses that have to be grouped is reduced, which may be beneficial in certain contexts.

In embodiments such as those encompassing FIG. 8A and FIG. 8B where participants 207 are evaluating ungrouped qualitative responses, and the removal of duplicate responses has not occurred at step 322, the user interfaces of the participant devices 206 may be configured to allow a participant 207 to flag a qualitative response as a duplicate. Although the present invention is not limited to any particular technique for identifying duplicate qualitative responses, FIG. 8A and FIG. 8B respectively show a sequence of check boxes under a heading "Duplicate" 814. Because it may be easier to identify duplicate qualitative responses, i.e., responses that cover essentially the same subject matter, than it is to identify similar responses involved in the grouping described, for example, with respect to FIG. 4 and FIG. 5, the task of identifying duplicate responses may be appropriate for participants 207, who may not be experts like an originator 205, according to some embodiments.

Figure 8C:
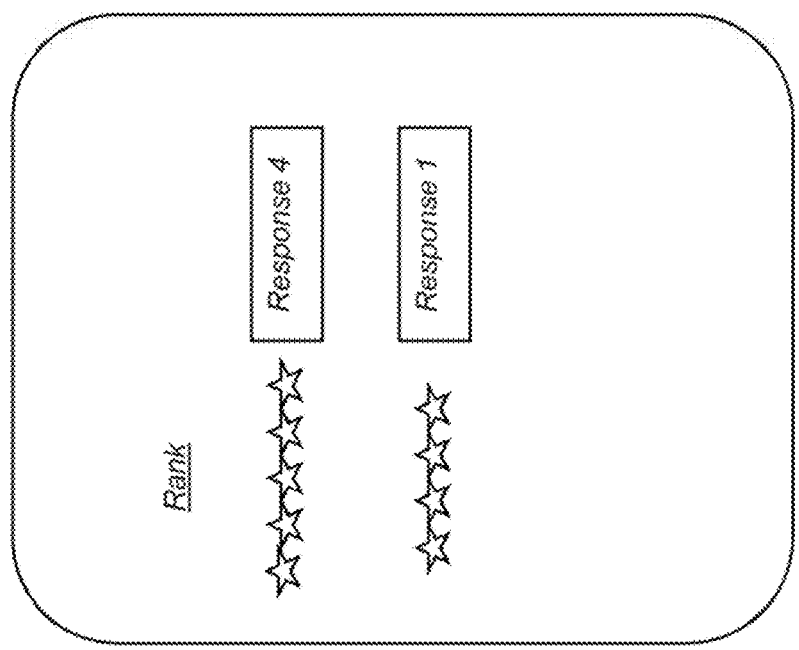

In embodiments encompassing the examples of FIG. 8A and FIG. 8B, one or more participants 207 may rank or prioritize the respective processed responses (e.g., in subsets 802, 812) as described above with respect to FIG. 7A and FIG. 7B. In some embodiments, the ranking or prioritization illustrated, e.g., in each of (a) FIGS. 7A, 7B and (b) FIGS. 8A, 8B may be considered a first participant prioritization. In this regard, in some embodiments, the participant evaluation of step 330 may include this first participant prioritization followed by a second participant prioritization, the second participant prioritization being a participant prioritization of a highest priority subset of the processed responses that were prioritized highest in the first participant prioritization. For example, in a first participant prioritization of FIGS. 8A, 8B, processed response "Response 4" in FIG. 8A and FIG. 8B and processed response "Response 1" in FIG. 8B are respectively prioritized with four stars. According to some embodiments, it may be beneficial to have the respective participant 207 view these highest-priority processed responses again, but together, as shown in FIG. 8C, for example, so that the respective participant 207 has an opportunity to be certain about which processed responses the respective participant 207 truly believes are the most important processed responses. In the example of FIG. 8C, the respective participant 207 may opt to increase the ranking or priority of "Response 4" to five stars, so that it now has a higher ranking or priority than "Response 1".

Results of the participant evaluation performed at step 330 may be transmitted as participant-evaluated-responses at step 332 by the respective participant devices 206 to the server device system 202 via the network 208 for accumulation. If participants 207 provided indications of duplicate responses, e.g., by way of the check boxes under the heading 814, the transmissions at step 332 may include such indications. In some embodiments, the participant-evaluated responses transmitted at step 332 include respective priority values assigned by respective participants to respective processed qualitative responses at step 330. In this regard, in some embodiments, each priority value may be associated with a respective participant, a respective processed qualitative response, or both. In some embodiments, each priority value may indicate a priority assigned by the respective participant to the respective qualitative response.

The server device system 202 may be configured to receive the participant-evaluated responses (and possibly any indications of duplicate processed responses) at step 334 and to store such responses in the processor-accessible memory device system 212 (or the one or more databases 210 stored therein), according to some embodiments. In some embodiments, the participant-evaluated responses received at step 334 include respective priority values assigned by respective participants to respective qualitative responses at step 330. In this regard, in some embodiments, each priority value received at step 334 may be stored by the server device system 202 in the processor-accessible memory device system 212 in association with a respective participant, a respective processed qualitative response, or both a respective participant and a respective processed qualitative response. In this regard, each priority value may indicate a priority assigned by the respective participant to the respective qualitative response, according to some embodiments. It may be deemed that the receiving of the participant-evaluated responses at step 334 occurs in response to the distributing of the processed responses at step 326, according to some embodiments.

Post-processing of the received participant-evaluated responses by the server device system 202 may be performed at step 336. Such post-processing may be based at least on input received by the server device system 202 from one or more of the originator devices 204, as shown at step 338. In some embodiments, the post-processing of step 226 accounts for the participant indications of duplicate processed responses, e.g., by eliminating the duplicates in accordance with those participant indications. In embodiments where the grouping of similar qualitative responses, the grouping of groups into themes, or both, does not occur at step 322, such grouping may occur, as discussed above, as at least part of the post-processing of step 336 on at least a subset of the participant-evaluated responses. In this regard, the input at step 338 may correspond to the input discussed above with respect to step 324. However, in some embodiments, such grouping need not be performed on all participant-evaluated responses at step 336 and may, instead, be performed on a subset of all of the participant-evaluated responses, such as only the highest priority or highest ranked participant-evaluated responses (e.g., above a threshold priority or rank, which may be user-defined).

As discussed above, in some embodiments, the post-processing of step 336 includes the grouping of similar qualitative responses, the grouping of groups into themes, or both, discussed above with respect to step 322 on at least a subset of the participant-evaluated responses received by the server device system 202 at step 334. This grouping, when performed at least as part of step 336 may be referred to as a "Discovery Process", where, e.g., one or more originators learn what responses are important to the participants. In some embodiments, such grouping performed at step 336 includes determining a priority assigned to a group based at least on an analysis of the priorities assigned to the group's constituent participant-evaluated responses.

For example, assume that a group of participant-evaluated responses is formed at step 336 consisting of a first participant-evaluated response "R1" and a second participant-evaluated response "R2". Also assume that response R1 was evaluated by a first participant P1 to have two stars, and that the response R2 was evaluated by the first participant P1 to have three stars. Also assume that response R1 was evaluated by a second participant P2 to have one star, and that the response R2 was evaluated by the second participant P2 to have two stars, as shown in Table II, below, where the asterisks represent the participant-assigned star values.

TABLE II

|    | P1  | P2  |
|----|-----|-----|
| R1 | **  | *   |
| R2 | *** | **  |

In a situation such as this, when responses R1 and R2 are grouped into a group "G1", some embodiments of the present invention determine and assign a priority to group G1 based on the priorities (star-values, in this example) assigned to the constituent responses R1 and R2 at step 330.

In some embodiments, a "Summing" method is executed, e.g., by the server device system 202 (with or without user input, e.g., from an originator device 204) at step 336 to determine the priority or "group priority value" to be assigned to or associated with the group G1. According to this Summing method, in some embodiments, all of the priorities (star-values, in this example) assigned by all participants to all constituent responses in the group are summed, and the resulting sum-value is assigned as the priority for the group. In the example of Table II, the priorities assigned by participant P1 for response R1 and response R2 are summed to form a first sub-total value, the priorities assigned by participant P2 for response R1 and response R2 are summed to form a second sub-total value, and then the first and second sub-total values are summed to identify a total priority value or "group priority value" (which may be one of several group priority values)

assigned to or associated with the group (e.g., in memory device system 212), as shown in Table III, below.

TABLE III

|    | P1                          | P2                           |                              |
|----|-----------------------------|------------------------------|------------------------------|
| R1 | **                          | *                            |                              |
| R2 | ***                         | **                           |                              |
|    | First Sub-Total Value = ***** | Second Sub-Total Value = *** | G1 Total Priority Value = ******** |

In some embodiments, a "Maxing" method is executed, e.g., by the server device system 202 (with or without user input, e.g., from an originator device 204) at step 336 to determine the priority or "group priority value" to be assigned to or associated with the group G1. This Maxing method may be executed in addition to (i.e., resulting in multiple assigned priorities) or in lieu of the "Summing" or other group-priority-determination method. According to the Maxing method, in some embodiments, the maximum priority assigned by a participant among all of the constituent responses belonging to the group in question is assigned as a respective sub-total value (or "maximum priority value") associated with that participant. This same maximum-priority process is executed for each participant, and then all of the respective sub-total values (or "maximum priority values") are summed to arrive at the priority or "group priority value" to be assigned to associated with the corresponding group. In the example of Table II, the maximum priority that participant P1 assigned to constituent responses R1 and R2 is the three stars that participant P1 assigned to response R2. Therefore, according to the Maxing method, the first sub-total value (or "maximum priority value") associated with participant P1 is assigned the value of three stars, corresponding to the three stars that participant P1 assigned to response R2. Similarly, the maximum priority value that participant P2 assigned to constituent responses R1 and R2 is the two stars that participant P1 assigned to response R2. Therefore, according to the Maxing method, the second sub-total value (or "maximum priority value") associated with participant P2 is assigned the value of two stars, corresponding to the two stars that participant P2 assigned to response R2. Then, the first and second sub-total values (e.g., "maximum priority values") are summed to identify a total priority value or "group priority value" (which may be one of several group priority values) assigned to or associated with the group (e.g., in memory device system 212), as shown in Table IV, below.

TABLE IV

|    | P1                         | P2                          |                             |
|----|----------------------------|-----------------------------|-----------------------------|
| R1 | **                         | *                           |                             |
| R2 | ***                        | **                          |                             |
|    | First Sub-Total Value = *** | Second Sub-Total Value = ** | G1 Total Priority Value = ***** |

The Summing approach may be beneficial in circumstances where it is valuable to capture the entirety of the assigned-priority data set. In other words, there is no data loss in the Summing approach. The Maxing approach may be beneficial as it does not allow the priority associated with any particular participant to exceed a maximum value. For example, if five-stars is the maximum priority value that a participant can assign to a response, the sub-total value (e.g., the bottom cell in each of the P1 and P2 columns in Table IV) corresponding to any particular participant will not exceed that maximum priority value. In addition, the data loss associated with the Maxing approach should be insubstantial, assuming that the constituent responses of the group (e.g., R1 and R2 in Table IV) are similar. For example, it should be rare that a participant would assign vastly different priority values to similar responses (e.g., one star to a first response and five stars to a similar second response). To the contrary, it is much more likely that a participant would assign the same or close to the same priority values to similar responses. Accordingly, the data loss associated with the Maxing approach when calculating respective sub-total values (e.g., the bottom cell in each of the P1 and P2 columns in Table IV) should be insubstantial in some embodiments.

In some embodiments, a "Frequency-Based Revision" method is executed, e.g., by the server device system 202 (with or without user input, e.g., from an originator device 204) at step 336 to revise each of at least some of the group priority values (e.g., calculated by the Summing or Maxing approach, discussed above) to account for a number of times that the constituent responses in the respective group were viewed or prioritized by participants. In some embodiments, the Frequency-Based Revision method generates a respective revised group priority value in a manner that expresses an inverse relationship between the respective group priority and the number of times the constituent responses in the respective group were viewed or prioritized. For example, in some embodiments, the respective revised group priority is the group priority value divided by the number of times the constituent responses in the respective group were viewed (but not necessarily prioritized in this example). For instance, assume a group G1 of responses R1-R3 with the characteristics shown in Table V, below.

TABLE V

| Response | "Summing" Method Priority Sub-Total From All Participants | # Times Viewed |
|----------|------------------------------------------------------------|-----------------|
| R1       | 12 Stars                                                   | 3               |
| R2       | 15 Stars                                                   | 4               |
| R3       | 13 Stars                                                   | 3               |
|          | Group Priority Value = 40 Stars                            | Total Times Viewed = 10 |

In the example of Table V, the response R1 was viewed three times by participants, and among those three viewings, the response R1 received a total of 12 stars. (Although the Summing method is used in this example, the Maxing method or some other method may be used.) The same analysis applies to responses R2 and R3. In some embodiments, the Frequency-Based Revision method revises the Group Priority Value of 40 stars by dividing it by the total number of times the constituent responses R1-R3 in the respective group G1 were viewed (i.e., 10 times) to generate a "revised group priority value" of 4.

It should also be noted that a group need not be assigned only one type of group priority value. For example, Table III, Table IV, and Table V illustrate respective total priority values for group G1, one based on the Summing method, one based on the Maxing method, and a revised one based on the Frequency-Based Revision method. One or more of these respective total priority values may be assigned to or associated with (e.g., in the memory device system 212) the respective group (e.g., G1). In addition to, or in lieu of, one or more of these total priority values, one or more other priority values may be assigned to the respective group. For example, the sub-total values, e.g., of Table III, Table IV, or both; an overall average priority value (e.g., the average of the asterisk-cells of Table II ((two-stars+one-star+three-stars+two-stars)/4=two stars)); one or more individual-participant average priority values (e.g., the average of the P1 column, the P2 column, or the respective averages of the P1 column and the P2 column in Table 1), or a combination of some or all of these or other values may be assigned to or associated with the respective group in the memory device system 212.

In some embodiments, the post-processing of step 336 may include the generation of results-based information summarizing the participant-evaluated-responses, their priorities, or associated group priorities for presentation to a manager, an administrator, some other decision-maker, or some other user via a data processing device or device system, such as an originator device 204. Results of the post-processing of step 336 may be stored in the processor-accessible memory device system 212 (or in the one or more databases 210 stored therein), or may be transmitted to another device for output, such as to an originator device 204 or another user's device for storage, display, or mechanism for review by a user with appropriate authority.

In some embodiments, the post-processing of step 336 of FIG. 3 includes analyzing the priority values assigned by participants to qualitative responses at step 330 to determine and present characteristics of one or more participants, one or more participant-evaluated qualitative responses, or both characteristics of one or more participants and one or more participant-evaluated qualitative responses. Such information may be useful at least for the originator(s) who generated the inquiries at step 302 or other decision-maker(s) in order to assist such decision-maker(s) in choosing effective and efficient future courses of action that are most beneficial to or in agreement with the population of participants. In addition, such information may be useful at least for respective participants in order to allow each participant to understand his or her relationships, commonalities, or differences with respect to other participants in the population of participants.

In some embodiments, such determined characteristics of one or more participants, one or more participant-evaluated qualitative responses, or both, include identifying groups of participants, groups of participant-evaluated qualitative responses, or both, based at least on an analysis of the priority values assigned by participants to qualitative responses at step 330.

Figure 9:
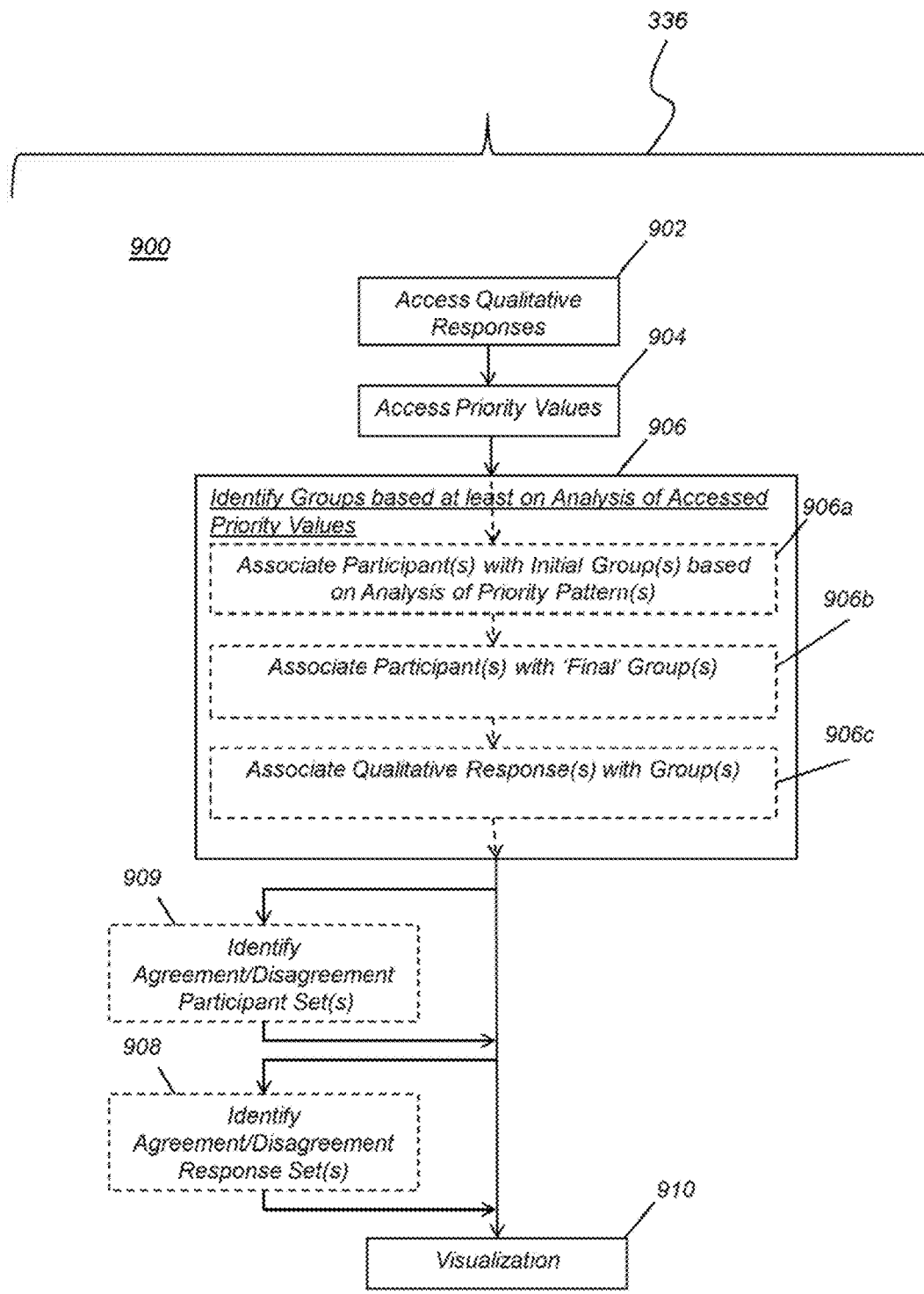
FIG. 9 illustrates a method of identifying groups of participants, qualitative responses, or both participants and qualitative responses and generating corresponding significant visualizations, according to some embodiments of the present invention.

For example, FIG. 9 illustrates a method 900 for identifying such groups, according to some embodiments. The method 900 may be included in step 336 and, consequently, may be executed by the server device system 202 according to one or more programs implementing all or part of the method 900. However, the method 900 need not be limited to being included in step 336 or even a single iteration of the method 300. For example, one iteration of method 300 may result in a first set of participants evaluating a first set of qualitative responses during a first period of time, and another iteration of method 300 may result in a second set of participants evaluating a second set of qualitative responses during a second period of time. The second set of participants may include none, some, or all of the same participants as the first set. The same applies to the sets of qualitative responses. That is, the second set of qualitative responses may include none, some, or all of the same qualitative responses as the first set. The second period of time may be later than the first period of time. For instance, the first period of time could be a particular month during a first year, and the second period of time could be the same particular month, but during the year immediately after the first year. Of course, any other periods of time may be selected, but there may be benefits in selecting the same period over different years in some embodiments. In any event, when executing the method 900 for multiple iterations of the method 300, the method 900 may identify groups of participants based on the multiple sets of participants and qualitative responses associated with the multiple iterations of the method 300, according to some embodiments.

In some embodiments, the method 900 includes a step 902 of accessing a plurality of participant-evaluated qualitative responses to open-ended inquiries from the processor-accessible memory device system 212 (or one or more databases 210 therein). Each of at least some of the qualitative responses accessed at step 902 may be an individual qualitative response provided by a respective participant or may represent multiple qualitative responses provided by a plurality of participants, e.g., a group of qualitative responses or a theme as discussed above (e.g., at least with respect to step 322). For example, each of at least some of the qualitative responses accessed at step 902 may be associated in a processor-accessible memory device system (e.g., 212 or database(s) 210 stored therein) with a respective participant, and each such qualitative response may indicate a response provided by the respective participant to an open-ended inquiry. On the other hand, each of at least some of the qualitative responses accessed at step 902 may represent multiple individual qualitative responses (e.g., a group of qualitative responses or a theme, as discussed above) originating or associated with a plurality of participants.

At step 904, the server device system 202 may be configured (e.g., by one or more programs) to access a plurality of priority values from the processor-accessible memory device system 212 (or one or more databases 210 therein). Each of the accessed priority values may indicate a priority assigned by a respective participant to a respective qualitative response. In some embodiments, each of the plurality of priority values that are accessed according to step 904 are associated with (a) a respective participant that provided the priority value at step 330, (b) a respective qualitative response (e.g., processed qualitative response) to which the respective participant assigned the priority value at step 330, or both (a) and (b). In this regard, step 904 may occur contemporaneously with, as part of, or prior to the accessing of qualitative responses of step 902. Accordingly, it should be noted that any method illustrated or discussed herein need not occur in the respective sequence(s) illustrated or discussed, and such respective sequence(s) illustrated or discussed are provided as one or more example(s) according to some embodiments of the present invention.

At step 906, the server device system 202 may be configured to identify (i) a plurality of groups of participants, (ii) a plurality of groups of qualitative responses, or both (i) and (ii), based at least on an analysis of the priority values accessed at step 904. The broken line boxes and arrows illustrated within step 906 in FIG. 9 represent a few example implementations of aspects of step 906 for illustration purposes, according to some embodiments, and are described in more detail below.

Upon identifying one or more groups of participants, qualitative responses, or both at step 906, the server device system 202 may be configured to output at step 910 a visual presentation (e.g., via the input-output device system 120 communicatively connected to the server device system 202) of one or more or all of such groups. In some embodiments, such visual presentation may include at least a cluster of visual representations of participants, qualitative responses, or both in the one of such groups. FIGS. 12-17 and 19-24 illustrates some examples of such a visual presentation, according to some embodiments, which will be described in more detail below.

In some embodiments where a plurality of groups of participants are identified according to step 906, the analysis of the priority values performed at step 906 may include associating at least one particular participant with a particular group of participants at step 906a, 906b, or both 906a and 906b based at least on a comparison of a first priority pattern associated with the particular group and a second priority pattern associated with the particular participant. If a result of the comparison is within a defined threshold range, it may be determined at step 906a, 906b, or both 906a and 906b that the particular participant should be assigned to the particular group, according to some embodiments.

For example, the analysis of the priority values performed as part of step 906 may include identifying a first priority pattern of at least some of the priority values that are associated with a first set of qualitative responses and at least some of the participants. For instance, the first priority pattern may be identified from priority values provided by multiple participants for the first set of qualitative responses, according to some embodiments. In these instances, the first priority pattern may be considered a "group" priority pattern (e.g., identified at step 906a, 906b, or both) in some embodiments, at least because the first priority pattern is identified from priority values provided by multiple participants (e.g., pursuant to step 330), according to some embodiments.

With such a "group" priority pattern determined, the analysis of priority values performed as part of step 906 may also include identifying a second priority pattern (e.g., as part of step 906a, 906b, or both, in some embodiments) of at least some of the priority values associated with the first set of qualitative responses and the particular participant that the server device system 202 is attempting to assign to a group, according to some embodiments. In other words, the second priority pattern may be considered an "individual" priority pattern, because it is identified or determined from priority values provided by the particular participant (e.g., pursuant to step 330).

With the "group" priority pattern and the "individual" priority pattern determined, the server device system 202 may be configured according to step 906 (e.g., 906a, 906b, or both 906a and 906b), to associate or assign the particular participant (associated with the "individual" priority pattern) to the particular group (associated with the "group" priority pattern), based at least on a comparison of the "group" (e.g., "first") priority pattern and the "individual" (e.g., "second") priority pattern. In some embodiments, the comparison includes determining if the "individual" (e.g., "second") priority pattern is similar to the "group" (e.g., "first") priority pattern within a defined threshold range. If the "individual" (e.g., "second") priority pattern is similar to the "group" (e.g., "first") priority pattern within the defined threshold range, the server device system 202 may be configured according to step 906 (e.g., 906a, 906b, or both 906a and 906b), to associate or assign the particular participant (associated with the "individual" priority pattern) to the particular group (associated with the "group" priority pattern).

However, it should be noted that individual participants need not be assigned to any particular group according to step 906, but may be associated with each of some or all of the groups by respective relative degrees-of-association. For example, if multiple groups are identified according to step 906, each participant may be associated with each of the multiple groups at step 906 (e.g., 906a, 906b, or both 906a and 906b) via a respective group-association-value stored by the server device system 202 in the processor-accessible memory device system 212 (or one or more databases 210 stored therein). For instance, in some embodiments, a group-association-value of 1 (or 100%) between a respective participant and a respective group indicates that the respective participant-provided priority values for a set of qualitative responses are identical to priority values determined or identified for the set of qualitative responses for the respective group. In other words, the respective participant's "individual" priority pattern matches the "group" priority pattern for the set of qualitative responses, according to some embodiments. A lower value or percentage may indicate one or more differences between the priority values provided by the respective participant for the set of qualitative responses and the priority values determined or identified for the set of qualitative responses, according to some embodiments. In other words, the respective participant's "individual" priority pattern has one or more differences from the "group" priority pattern for the set of qualitative responses, according to some embodiments. Relatively lower values or percentages of group-association-values may indicate relatively greater differences, according to some embodiments, but any convention may be used.

In any event, each respective participant may have a set or plurality of group-association-values stored therefor in the processor-accessible memory device system 212 (or one or more databases 210 therein), each value associating the respective participant with a respective group. Continuing the above example, for a particular participant, the highest group-association-value indicates the group to which the particular participant is most closely aligned, according to some embodiments. Of course, as discussed above, the invention is not limited to any particular form or definition of group-association-values, and the form (e.g., percentage) and definition (e.g., higher value indicating closer association) provided above are merely one example.

In some embodiments, step 906 includes a first substep 906a where the server device system 202 associates one or more participants with one or more initial groups based at least on an analysis of one or more priority patterns. In some embodiments, step 906 includes a second substep 906b following substep 906a at which the server device system 202 associates the participant(s) with one or more final groups based at least on an analysis of the initial group(s) identified at step 906a.

For example, assume that a plurality of participants P1-P7 evaluated qualitative responses QR1-QR3 at step 330 in FIG. 3, as shown in Table VI, below.

TABLE VI

| Participant | QR1 | QR2 | QR3 |
|---|---|---|---|
| P1 | *** | ***** | **** |
| P2 | ** | **** | *** |
| P3 | * | **** | ***** |
| P4 | *** | *** | **** |
| P5 | * | **** | **** |
| P6 | ** | ***** | ** |
| P7 | *** | ** | *** |

In this example, also assume that execution of step 906a by the server device system 202 results in the identification of three initial groups of the participants from Table VI:

Group A of participants P1, P3, and P7; Group B of participants P4 and P5; and Group C of participants P2 and P6. (Note that each of FIG. 10 and FIG. 11 and the accompanying descriptions below provide examples of how the server device system 202 may be configured to generate initial groups of participants according to step 906a, but such examples use their own data sets, below, not the data set of Table VI.) Table VII, below, illustrates these initial groups A, B, and C, with additional information, referred to below.

TABLE VII

| Group | Participant | QR1 | QR2 | QR3 |
|---|---|---|---|---|
| A | P1 | *** | ***** | **** |
|   | P3 | * | **** | ***** |
|   | P7 | *** | ** | *** |
|   | Average | (3 + 1 + 3)/3 = 2.33 | (5 + 4 + 2)/3 = 3.67 | (4 + 5 + 3)/3 = 4 |
| B | P4 | *** | *** | **** |
|   | P5 | * | **** | **** |
|   | Average | (3 + 1)/2 = 2 | (3 + 4)/2 = 3.5 | (4 + 4)/2 = 4 |
| C | P2 | ** | **** | *** |
|   | P6 | ** | ***** | ** |
|   | Average | (2 + 2)/2 = 2 | (4 + 5)/2 = 4.5 | (3 + 2)/2 = 2.5 |

The following discussion will elaborate on how some embodiments of step 906b may result in the server device system 202 generating final groupings at least by revising the initial groupings shown in Table VII, above. In this regard, in some embodiments of step 906b, a "group" priority pattern may be determined for each respective group, equal to the average number of stars assigned by all the participants associated with the respective group to each qualitative response. In the example of Table VII, the average number of stars assigned by the participants in Group A, i.e., participants P1, P3, and P7, to qualitative response QR1 is (3+1+3)/3=2.33, if rounded to two decimal places; the average number of stars assigned by the participants in Group A to qualitative response QR2 is (5+4+2)/3=3.67, if rounded to two decimal places; and the average number of stars assigned by the participants in Group A to qualitative response QR3 are (4+5+3)/3=4. Therefore, in this example, the "group" priority pattern determined at step 906b for Group A is {2.33, 3.67, 4}, according to some embodiments.

Similarly, the average number of stars assigned by the participants in Group B, i.e., participants P4 and P5, to qualitative response QR1 is (3+1)/2=2; the average number of stars assigned by the participants in Group B to qualitative response QR2 is (3+4)/2=3.5; and the average number of stars assigned by the participants in Group B to qualitative response QR3 is (4+4)/2=4. Therefore, in this example, the "group" priority pattern determined at step 906b for Group B is {2, 3.5, 4}, according to some embodiments.

The average number of stars assigned by the participants in Group C, i.e., participants P2 and P6, to qualitative responses QR1, QR2, and QR3 are (2+2)/2=2, (4+5)/2=4.5, and (3+2)/2=2.5, respectively. Therefore, in this example, the "group" priority pattern determined at step 906b for Group C is {2, 4.5, 2.5}, according to some embodiments.

In some embodiments, an "individual" priority pattern may be determined for each respective participant at step 906b, equal to the numbers of stars assigned by the respective participant to each qualitative response. For example, numbers of stars assigned by participant P1 to qualitative responses QR1, QR2, and QR3 are 3, 5, and 4, respectively, so the "individual" priority pattern for participant P1 is {3, 5, 4}, according to some embodiments. Similarly, the "individual" priority pattern for participant P2 is {2, 4, 3}.

In some embodiments of step 906b, a difference value may be determined for each respective participant and each respective group by comparing the respective "individual" priority pattern with the respective "group" priority pattern. In some embodiments, this difference value may be the average over each of the qualitative responses of the absolute difference between the number of stars assigned by the respective participant to each qualitative response and the average number of stars assigned by all the participants associated with the respective group to each qualitative response. In the example of Table VII, the "individual" priority pattern for participant P1 is {3, 5, 4}, and the "group" priority pattern for Group A is {2.33, 3.67, 4}, so the difference value between participant P1 and Group A is (|3−2.33|+|5−3.67|+|4−4|)/3=0.67, according to some embodiments. Similarly, the "group" priority pattern for Group B is {2, 3.5, 4}, so the difference value between participant P1 and Group B is (|3−2|+|5−3.5|+|4−4|)/3=0.83, if rounded to two decimal places, according to some embodiments. The "group" priority pattern for Group C is {2, 4.5, 2.5}, so the difference value between participant P1 and Group C is (|3−2|+|5−4.5|+|4−2.5|)/3=1, according to some embodiments.

This comparison indicates that the "individual" priority pattern for participant P1 is closer to the "group" priority pattern for Group A, with a difference value of 0.67, than to the "group" priority patterns for Groups B or C, with difference values of 0.83 and 1, respectively. Accordingly, in some embodiments where the difference values are determinative of whether a participant should be moved to another group as part of the process of defining final groups at step 906b, the server device system 202 may be configured at step 906b to retain participant P1 in Group A, because the difference value between participant P1 and Group A is the minimum difference value associated with participant P1. However, as discussed below, in some embodiments, the server device system 202 is configured to implement step 906b (e.g., by program instructions) to determine group-association-values, which may be derived from or be considered the respective difference values, according to some embodiments, in order to determine where to move participants when revising groupings according to step 906b.

In any event, continuing the example of Table VII, above, the "individual" priority pattern for participant P2 is {2, 4, 3}, and the "group" priority pattern for Group A is {2.33, 3.67, 4}, so the difference value between participant P2 and Group A is (|2−2.33|+|4−3.67|+|3−4|)/3=0.56, according to some embodiments. Similarly, the "group" priority pattern for Group B is {2, 3.5, 4}, so the difference value between participant P2 and Group B is (|2−2|+|4−3.5|+|3−4|)/3=0.5, according to some embodiments. The "group" priority pattern for Group C is {2, 4.5, 2.5}, so the difference value between participant P2 and Group C is (|2−2|+|4−4.5|+|3−2.5|)/3=0.33, according to some embodiments. This comparison indicates that the "individual" priority pattern for participant P2 is closer to the "group" priority pattern for Group C, with a difference value of 0.33, than to the "group" priority patterns for Groups A or B, with difference values of 0.56 and 0.5, respectively. Accordingly, in some embodiments where the difference values are determinative of whether a participant should be moved to another group as part of the process of defining final groups at step 906b, the server device system 202 may be configured at step 906*b* to retain participant P2 in Group C, because the difference value between participant P1 and Group C is the minimum difference value associated with participant P2.

However, as discussed above, the server device system 202 may be configured (e.g., by program instructions) to determine a group-association-value as part of step 906*b* from the difference value for each respective participant and each respective group, according to some embodiments. In some embodiments, the server device system 202 may be configured (e.g., by program instructions) to determine the group-association-values from the difference values according to the following function: (1−([difference value]/[highest difference value])). Continuing the example of Table VII, above, the highest difference value between any participant and any group is 1.33. For example, the "individual" priority pattern for participant P7 is {3, 2, 3}, and the "group" priority pattern for Group C is {2, 4.5, 2.5}, so the difference value between participant P7 and Group C is (|3−2|+|2−4.5|+|3−2.5|)/3=1.33, if rounded to two decimal places, according to some embodiments. The difference value between participant P1 and Group A is 0.67, so the group-association-value for participant P1 and Group A is (1−(0.67/1.33))=0.5, according to some embodiments. Similarly, the difference value between participant P1 and Group B is 0.83, so the group-association-value for participant P1 and Group B is (1−(0.83/1.33))=0.38, if rounded to two decimal places, according to some embodiments. The difference value between participant P1 and Group C is 1, so the group-association-value for participant P1 and Group C is (1−(1/1.33))=0.25, according to some embodiments. For a particular participant, the highest group-association-value indicates the group to which the particular participant is most closely aligned, according to some embodiments. In this example, participant P1 may be retained in Group A, since the group-association-value for participant P1 and Group A, i.e., 0.5, is higher than for participant P1 and Groups B or C, i.e., 0.38 and 0.25, respectively.

In this regard, the server device system 202 may be configured to determine, as at least part of step 906*b*, group-association-values between each combination of participant and qualitative response in the above-discussed manner, as shown in Table VIII, below.

TABLE VIII

| Participant | Group-Association-Value for Group A | Group-Association-Value for Group B | Group-Association-Value for Group C |
|---|---|---|---|
| P1 | 0.50 | 0.38 | 0.25 |
| P2 | 0.58 | 0.63 | 0.75 |
| P3 | 0.33 | 0.38 | 0.00 |
| P4 | 0.67 | 0.63 | 0.00 |
| P5 | 0.58 | 0.63 | 0.25 |
| P6 | 0.08 | 0.13 | 0.75 |
| P7 | 0.17 | 0.13 | 0.00 |

By determining the highest or greatest group-association-value associated with each respective participant P1-P7, the server device system may revise the initial groupings of Table VII into the following new groupings based on each participant's respective highest group-association-value: Group A of participants P1, P4, and P7; Group B of participants P3 and P5; and Group C of participants P2 and P6. In some embodiments, these new groupings may represent the final groupings of participants at step 906*b*, and processing may then proceed to step 906*c* discussed below or, if step 906*c* is not performed, to step 908, 909, or 910.

However, in some embodiments, the re-assigning of participants to groups at step 906*b* may be an iterative process. For example, after the first re-assignment (e.g., from Table VII to the revised grouping of Group A of participants P1, P4, and P7; Group B of participants P3 and P5; and Group C of participants P2 and P6 pursuant to Table VIII), a new "group" priority pattern may be found for each new, revised group, based on the participants now assigned to that group. The process leading up to Table VIII may be repeated for these new, revised groups, which will result in yet another iteration of revised groups based on whether each participant's "individual" priority pattern is similar to each group's new "group" priority pattern within a defined threshold range. These iterations may repeat until an iteration results in no changes in the assignment of participants to groups.

Of course, the example of Tables VI-VIII is just one example of many possible examples according to various embodiments of the present invention that is provided for illustration purposes only. Accordingly, it should be noted that the present invention is not limited to the particular analysis of priority patterns performed in the example of Tables VI-VIII and is not limited to the particular definition of difference values, group-association-values between participants and groups, or conversions between difference values and group-association-values. For example, the "individual" priority pattern for each respective participant, rather than being equal to the numbers of stars assigned by the respective participant to each qualitative response, may be equal to the number of stars assigned by the respective participant to each qualitative response divided by the total number of stars assigned by the respective participant to all qualitative responses. Further, the "group" priority pattern for each respective group, rather than being equal to the average number of stars assigned by all the participants associated with the respective group to each qualitative response, may be equal to the total number of stars assigned by all the participants associated with the respective group to each qualitative response divided by the total number of stars assigned by all the participants associated with the respective group to all qualitative responses. Further, a different function may be implemented to determine a group-association-value from the difference value for each respective participant and each respective group. For example, instead of the function (1−([difference value]/[highest difference value])) implemented in the example of Tables VI-VIII, the function (1−(½×[difference value])) or any other suitable function may be implemented to determine a group-association-value in the range 0-1 from a difference value in the range 0-2. Of course, however, group-association-values need not be in the range of 0-1. Further, the process of associating participants with groups based on an analysis of priority patterns, iterative or otherwise, at step 906*b* may be omitted, and instead participants may be associated with groups based on the identification of initial groups of participants at step 906*a*. In this regard, each of FIGS. 10 and 11, discussed below, provide examples according to various embodiments regarding configurations of the server device system 202 to generate the initial group(s) at step 906*a*. Results of the methods of FIGS. 10, 11, or both, may or may not lead into the process of determining one or more final groups according to step 906*b*, according to various embodiments.

In some embodiments, groups of qualitative responses may be identified (e.g., as at least part of step 906*c* in some embodiments) in addition to or in lieu of identifying groups of participants. In some embodiments where a plurality of groups of participants are identified according to step 906, the analysis of the priority values performed at step 906 may include associating at least one particular qualitative response with a particular group of participants at step 906*c* based at least on an analysis of the priority values associated with the particular qualitative response and with the participants in the particular group. If a result of the analysis is within a defined threshold range, it may be determined at step 906c that the particular qualitative response should be assigned to the particular group, according to some embodiments.

However, it should be noted that individual qualitative responses need not be assigned to any particular group according to step 906, but may be associated with each of some or all of the groups by respective relative degrees-of-association. For example, if multiple groups of participants are identified according to step 906 (e.g., 906a, 906b, or both), each qualitative response may be associated with each of the multiple groups at step 906c via a respective group-association-value (which may also be referred to as a respective resonance value) stored by the server device system 202 in the processor-accessible memory device system 212 (or one or more databases 210 stored therein). For instance, in some embodiments, a group-association-value of 1 (or 100%) between a respective qualitative response and a respective group indicates that participants associated with the respective group provided all the priority values for the respective qualitative response, other than zero priority values (e.g., stars), and that participants associated with groups other than the respective group provided no priority values for the respective qualitative response, other than zero priority values (e.g., stars), according to some embodiments. A lower value or percentage may indicate that participants associated with groups other than the respective group provided one or more priority values for the respective qualitative response, other than zero priority values (e.g., stars), according to some embodiments. Relatively lower values or percentages of group-association-values may indicate that relatively greater contributions of priority values for the respective qualitative response from participants associated with groups other than the respective group, according to some embodiments, but any convention may be used.

Accordingly, each respective qualitative response may have a plurality of group-association-values (which may also be referred to as a plurality of resonance values) stored therefor in the processor-accessible memory device system 212 (or one or more databases 210 therein), each value associating the respective qualitative response with a respective group. Stated differently, each respective group-association-value or resonance value may indicate an amount that the respective qualitative response resonates with at least the participants in the respective group. In this case, for a particular qualitative response, the highest group-association-value indicates the group to which the particular qualitative response is most closely aligned, according to some embodiments. Of course, the invention is not limited to any particular form or definition of group-association-values, and the form (e.g., percentage) and definition (e.g., higher value indicating closer association) provided above are merely one example.

The example of Table IX, below, illustrates an example of such a determination of group-association-values (or resonance values) between qualitative responses and groups, based on an analysis of priority patterns (which may be considered an example of a 'second analysis' of a plurality of priority values associated with a plurality of qualitative responses), and associating qualitative responses with groups, based on these group-association-values or resonance values (e.g., as part of step 906c in some embodiments). Continuing with the example of Tables VI-VIII, above, recall that participants P1-P7 assigned stars to 3 particular qualitative responses, QR1-QR3, as shown in Table VI, above; and that 3 initial groups have been identified at step 906a, as shown in Table VII, above: Group A of participants P1, P3, and P7; Group B of participants P4 and P5; and Group C of participants P2 and P6. In some embodiments, after associating participants with groups based on an analysis of priority patterns (e.g., as part of step 906b in some embodiments), a group-association-value may be determined for each respective qualitative response and each respective group, equal to the average number of stars assigned by the participants associated with the respective group to the respective qualitative response, divided by the maximum number of stars that may be assigned by any one participant to any one qualitative response.

As shown in Table VII, above, the average number of stars assigned by the participants in Group A, i.e., participants P1, P3, and P7, to qualitative response QR1 is (3+1+3)/3=2.33; the average number of stars assigned by the participants in Group B, i.e., participants P4 and P5, to qualitative response QR1 is (3+1)/2=2; and the average number of stars assigned by the participants in Group C, i.e., participants P2 and P6, to qualitative response QR1 is (2+2)/2=2. In this example, the maximum number of stars that may be assigned by any one participant to any one qualitative response is 5. Therefore, according to some embodiments, the group-association-value for qualitative response QR1 and Group A is $2.33/5=0.47$, if rounded to two decimal places, the group-association-value for qualitative response QR1 and Group B is $2/5=0.4$, and the group-association-value for qualitative response QR1 and Group C is $2/5=0.4$, as shown in Table IX, below.

Similarly, the average number of stars assigned by the participants in Group A to qualitative response QR2 is (5+4+2)/3=3.67, if rounded to two decimal places; the average number of stars assigned by the participants in Group B to qualitative response QR2 is (3+4)/2=3.5; and the average number of stars assigned by the participants in Group C to qualitative response QR2 is (4+5)/2=4.5. Therefore, according to some embodiments, the group-association-value for qualitative response QR2 and Group A is $3.67/5=0.73$, if rounded to two decimal places, the group-association-value for qualitative response QR2 and Group B is $3.5/5=0.7$, and the group-association-value for qualitative response QR2 and Group C is $4.5/5=0.9$, as shown in Table IX, below.

The average number of stars assigned by the participants in Groups A, B, and C to qualitative response QR3 are (4+5+3)/3=4, (4+4)/2=4, and (3+2)/2=2.5, respectively. Therefore, according to some embodiments, the group-association-value for qualitative response QR3 and Groups A, B, and C are $4/5=0.8$, $4/5=0.8$ and $2.5/5=0.5$, respectively, as shown in Table IX, below.

TABLE IX

| Qualitative Response | Group-Association-Value for Group A | Group-Association-Value for Group B | Group-Association-Value for Group C |
|---|---|---|---|
| QR1 | 0.47 | 0.73 | 0.8 |
| QR2 | 0.67 | 0.7 | 0.9 |
| QR3 | 0.67 | 0.8 | 0.5 |

For a particular qualitative response, the highest group-association-value indicates the group to which the particular participant is most closely aligned, according to some embodiments. In this example, the server device system 202 may be configured to assign qualitative response QR1 to Group C at step 906c, since the group-association-value for qualitative response QR1 and Group C, i.e., 0.8, is higher than for qualitative response QR1 and Groups A or B, i.e., 0.47 and 0.73 respectively. Similarly, qualitative response QR2 may also be assigned to Group C at step 906c, since the group-association-value for qualitative response QR2 and Group C, i.e., 0.9, is higher than for qualitative response QR2 and Groups A or B, i.e., 0.67 and 0.7 respectively. However, qualitative response QR3 may be assigned to Group B at step 906c, since the group-association-value for qualitative response QR3 and Group B, i.e., 0.8, is higher than for qualitative response QR3 and Groups A or C, i.e., 0.67 and 0.5, respectively.

Of course, the example of Table IX is just one example of many possible examples according to various embodiments of the present invention that is provided for illustration purposes only. Accordingly, it should be noted that the present invention is not limited to the particular analysis of priority values performed in the example of Table IX and is not limited to the particular definition of the group-association-values between qualitative responses and groups. For example, the group-association-value for each respective qualitative response and each respective group, rather than being equal to the average number of stars assigned by the participants associated with the respective group to the respective qualitative response, divided by the maximum number of stars that may be assigned by any one participant to any one qualitative response, may instead be equal to the total number stars assigned to the respective qualitative response by participants associated with the respective group, divided by the total number stars assigned to all qualitative responses by participants associated with the respective group. Another example, the group-association-value for each respective qualitative response and each respective group may be normalized by dividing it by the total of all the unnormalized group-association-values for the respective qualitative response across all groups, so that the sum of the normalized group-association-values for the each qualitative response across all groups is 1.

Figure 10:
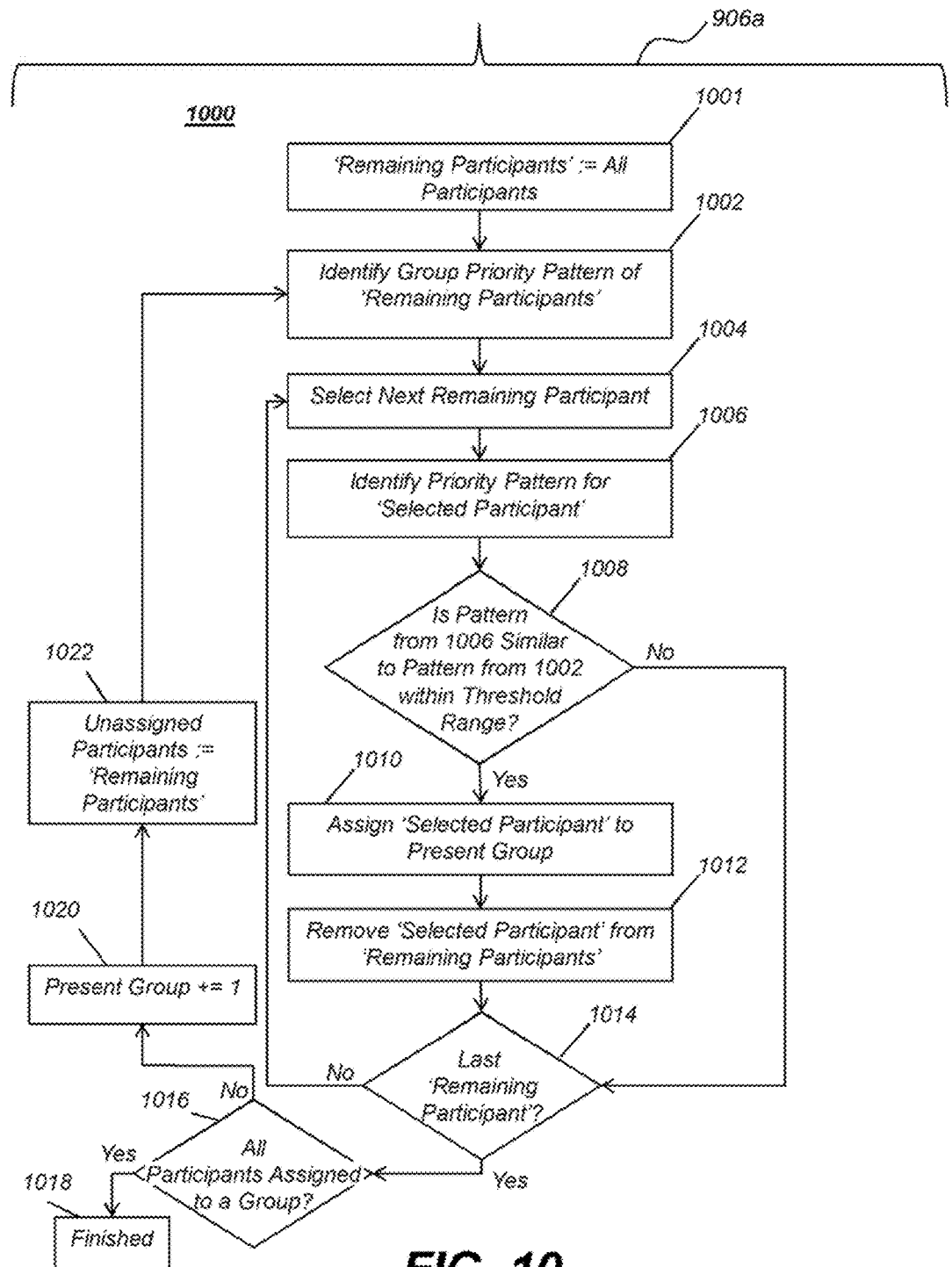
FIG. 10 illustrates a method of identifying groups of participants, according to some embodiments of the present invention.

FIG. 10 illustrates a method 1000 of associating participants with groups, according to some embodiments of the present invention. In some embodiments, the method 1000 represents particular implementations of at least some of step 906 (e.g., some or all of step 906a, in some embodiments) where a plurality of groups of participants are identified. In some embodiments, the method 1000 represents an iterative process that begins by identifying a group of participants that are most typical with respect to the population of participants as a whole in a first iteration, and then identifies increasingly atypical groups of participants with respect to the population of participants as a whole in the subsequent iterations. The method 1000 may be beneficial at least to identify a spectrum of different groups of participants, each group increasingly divergent from a norm.

In this regard, the method 1000 may include a step 1001, where a set of one or more data record pointers, known in the computer-engineering arts, to all "remaining participants" is initialized in the processor-accessible memory device system 212 (or one or more databases 210 stored therein) to point to all participants (e.g., to point to an initial data record in a linked list of data records identifying all participants) that evaluated responses at step 330, according to some embodiments of the present invention. It should be noted, however, that other data structures besides one or more pointers, a linked list, or both may be used to identify such "remaining participants".

At step 1002, which may initiate a particular iteration of multiple iterations within step 906a to identify one or more initial groups in some embodiments, a first priority pattern is identified by the server device system 202 from a first set of the priority values that were provided at step 330, according to some embodiments. In some embodiments, this first set of priority values is associated with a first set of qualitative responses (e.g., a first set of the participant-evaluated processed qualitative responses evaluated at step 330) and the "remaining participants" (e.g., a first set of participants). In the first iteration of step 1002, the "remaining participants" are all of the participants that evaluated responses at step 330, and the first set of qualitative responses are those qualitative responses evaluated by at least one of the "remaining participants" at step 330, according to some embodiments. In at least some of these embodiments, in the first iteration of step 1002, a priority pattern is identified based at least on an analysis of how all participants assigned priority values to the qualitative responses they evaluated at step 330.

In some embodiments, the priority pattern, identified by the server device system 202 according to program instructions associated with step 1002, is identified by averaging priority values assigned by the "remaining participants" to the first set of qualitative responses. Table X, below, illustrates an example of such a process, where participants P1-P5 (different than participants P1-P7 from earlier examples) represents the "remaining participants", and the qualitative responses QR1-QR3 (different than qualitative responses QR1-QR3 from earlier examples) represent the first set of qualitative responses. In the example of Table X, the first priority pattern identified at step 1002 is identified by averaging the numbers of stars assigned by the "remaining participants" to each qualitative response in the first set of qualitative responses. As shown in Table X, the total number of stars assigned to each of the qualitative responses QR1-QR3 is divided by 5, which represents the number of the "remaining participants" P1-P5, in order to generate the average number of stars assigned to the respective qualitative response. Also as shown in Table X, the resulting first priority pattern is identified to be the resulting sequence of number-of-star averages for the first set of qualitative responses QR1-QR3. In this regard, in the example of Table X, the first priority pattern is identified to be the set {2, 4, 4} respectively corresponding to the average priority values determined for the qualitative responses QR1-QR3, respectively.

Of course, the example of Table X is just one example of many possible examples according to various embodiments of the present invention that is provided for illustration purposes only. Accordingly, it should be noted that the present invention is not limited to the particular analysis of priority values performed in the example of Table X and is not limited to the particular definition and format of the first priority pattern. For example, rather than averaging the numbers of stars assigned by the "remaining participants" to each qualitative response, the first priority pattern may be determined by dividing the total number of stars assigned by all the "remaining participants" to each qualitative response by the total number of stars assigned by all the "remaining participants" to all the qualitative responses.

TABLE X

| Participant | QR1 | QR2 | QR3 |
|---|---|---|---|
| P1 | *** | ***** | **** |
| P2 | ** | **** | *** |
| P3 | * | **** | ***** |
| P4 | *** | *** | **** |
| P5 | * | **** | **** |
| First Priority Pattern: | 10/5 = 2 | 20/5 = 4 | 20/5 = 4 |

Because the first priority pattern identified at step 1002 is associated with a plurality of participants (e.g., the "remaining participants"), such first priority pattern may be considered a "group" priority pattern, as discussed above. Having identified such a "group" priority pattern at step 1002, step 1004 may then be executed, according to some embodiments. In this regard, step 1004 may begin a process of identifying an "individual" priority pattern.

At step 1004, a "next remaining participant" is identified or selected, according to some embodiments. The "next remaining participant" may be a pointer to a location in a linked list of participants (e.g., a linked list of data records identifying participants) that evaluated qualitative responses at step 330, the linked list stored in the processor-accessible memory device system 212 (or one or more databases 210 stored therein). In the first iteration of step 1004, the "next remaining participant" points to the first participant in the linked list, according to some embodiments. As stated earlier, however, the invention is not limited to any particular form of data structure, and other data structures besides one or more pointers, a linked list, or both may be used.

At step 1006, a second priority pattern is identified, according to some embodiments. The second priority pattern may represent a priority pattern associated with the priority values assigned by the "next remaining participant" to the first set of the plurality of qualitative responses or a subset thereof. Recall that, in some embodiments, the first set of the plurality of qualitative responses are those analyzed to produce the group priority pattern at step 1002. Continuing with the example of Table X, assume that the "next remaining participant" selected at step 1004 is participant P1. In this regard, the second priority pattern identified at step 1006 may be the set {3, 5, 4}, which represents the respective number of stars assigned by participant P1 to each qualitative response in the first set of qualitative responses QR1-QR3. As mentioned above, this second priority pattern may represent an "individual" priority pattern. Of course, this example associated with Table X is just one example that is provided for illustration purposes, and the present invention is not limited to such example or the particular analysis of priority values or the particular definition and format of the second priority pattern provided in such example.

For example, according to some embodiments, instead of defining the second or "individual" priority pattern as the number of stars assigned by the "next remaining participant" to each qualitative response, the second or "individual" priority pattern may be the number of stars assigned by the "next remaining participant" to each qualitative response divided by the total number of stars assigned by the "next remaining participant" to all qualitative responses in the first set. In the example of Table X, the second or "individual" priority pattern associated with participant P1 as the "next remaining participant" would be the set of values {3/12, 5/12, 4/12} (or {0.2500, 0.4166, 0.3333}, if truncated at four decimal places). In this example, the first or "group" priority pattern determined at step 1002 may be the average number of stars assigned by all "remaining participants" to each qualitative response divided by the total of the average number of stars assigned by all "remaining participants" to all qualitative responses in the first set. For instance, in the example of Table X, the first or "group" priority pattern for the first set of qualitative responses could be the set of values {2/10, 4/10, 4/10} or {0.2, 0.4, 0.4}, according to some embodiments. However, for ease of discussion and continuity, the process for determining the first or "group" priority pattern and the process for determining the second or "individual" priority pattern will be as originally described with respect to Table X (e.g., generating the first or "group" priority pattern from average stars from the "remaining participants" (e.g., the set {2, 4, 4} from Table X), and generating the second or "individual" priority pattern from the respective stars assigned by the "next remaining participant" (e.g., the set {3, 5, 4} from Table X).

As discussed above, it should be noted that the method 1000 or any other method discussed herein is not limited to the particular sequence of steps shown, which are provided to illustrate some embodiments. For instance, determination of the first or "group" priority pattern at step 1002 need not occur before determination of the second or "individual" priority pattern at step 1006.

Having identified the first "group" priority pattern at step 1002 and the second "individual" priority pattern at step 1006, the method 1000 may proceed to step 1008. According to program instructions implementing step 1008, the server device system 202 may be configured to compare the second or "individual" priority pattern with the first or "group" priority pattern to determine whether or not the "individual" priority pattern is similar to the "group" priority pattern within a first threshold range. If so, the "next remaining participant" (e.g., the participant selected at step 1004) is assigned to a first or present group at step 1010.

For example, continuing the original discussion regarding Table X, the second or "individual" priority pattern was {3, 5, 4}, while the first or "group" priority pattern was {2, 4, 4}, revealing a difference set of {(3−2), (5−4), (4−4)} or {1, 1, 0}. In some embodiments, this difference set may represent the group-association-value set, discussed above, for the "next remaining participant". In some embodiments, this difference set is compared to a threshold value range at step 1008 to determine whether or not the "next remaining participant" should be assigned to the present group. In some embodiments, this difference set is converted into a difference value by summing the absolute values of the elements in the difference set. Continuing with the above example, the difference set {1, 1, 0} would be converted at step 1008 to a difference value of two, according to some embodiments. In some embodiments, the threshold value range is less than or equal to one, such that a difference value of one or zero would place the "next remaining participant" in the present group. Accordingly, continuing with the above example, the difference value of two would be outside of the threshold value range and, therefore, the "next remaining participant" P1 would not be assigned to the present group. In this case, the method 1000 would proceed from step 1008 to step 1014 to determine if there are any further remaining participants.

Of course, the example of Table X is just one example of many possible examples according to various embodiments of the present invention that is provided for illustration purposes. However, it should be noted that the present invention is not limited to the particular analysis of priority values performed in the example of Table X and is not limited to the particular method of assigning the "next remaining participant" to the present group. For example, the "next remaining participant" may be assigned to the present group if the difference value, rather than being less than or equal to one, is less than or equal to the average difference value across all the "remaining participants".

To continue with the above example with respect to Table X, the server device system 202 would determine at step 1014 that participant P1 is not the last "remaining participant", because participants P2-P5 have not yet been selected. In this example, processing would proceed from step 1014 back to step 1004, where the next "remaining participant" would be selected as participant P2.

Upon the second iteration of step 1006, the "individual" priority pattern associated with participant P2 would be determined as the set {2, 4, 3}, according to the example of Table X. At step 1008, the server device system 202 would determine that the difference set associated with participant P2 and the first set of qualitative responses is {(2−2), (4−4), (3−4)}, or {0, 0, −1} (recalling that the first "group" priority pattern in this example is {2, 4, 4}), according to some embodiments. This difference set would be converted by the server device system 202 to a difference value of one (i.e., zero plus zero plus the absolute value of negative one). In this case, the difference value is within the threshold value range of less than or equal to one in this example. Consequently, in this example, the "next remaining participant" P2 would be assigned to the present group at step 1010. According to the method 1000, any selected next remaining participant that is assigned to the present group is removed from the population of "remaining participants" at step 1012, e.g., by removing the assigned participant from the linked list of remaining participants. After removing the assigned participant (e.g., participant P2) from the population of "remaining participants" at step 1012, processing may proceed to step 1014.

Continuing with the above example, the server device system 202 would then determine that the participant P2 is not the last remaining participant at step 1014, and processing would proceed back to step 1004, where participant P3 is selected as the "next remaining participant". The loop from step 1004 to step 1014, and back to step 1004, is repeated for each remaining participant (e.g., participants P3, P4, and P5). In the example associated with Table X, participant P3 is not assigned to the present group because it has an associated difference value of two (NO at the respective iteration of step 1008), participant P4 also is not assigned to the present group because it has an associated difference value of two (NO at the respective iteration of step 1008), and participant P5 is assigned to the present group because it has an associated difference value of one (YES at the respective iteration of step 1008).

Upon reaching step 1014 with participant P5 as the selected participant (e.g., the "next remaining participant"), the server device system 202 determines that participant P5 is the last remaining participant at step 1014. In this regard, identification of the first group of participants (Participants P2 and P5 in this example), whose respective associated priority values exhibit a similarity with the first "group" priority pattern within a first threshold range (e.g., a difference value less than or equal to one), is complete, and processing proceeds to step 1016 to determine whether all participants have been assigned to a group, according to some embodiments.

Continuing with the above example, only participants P2 and P5 have been assigned to the present group (e.g., the first group or group #1), and participants P1, P3, and P4 have not yet been assigned to a group. Accordingly, in this example, a determination of "NO" would result at step 1016, and processing would proceed to step 1020 to begin creation of a next group (e.g., group #2, e.g., by incrementing a "Present Group" pointer to a new group data record in a linked list at step 1020), according to some embodiments. Also, the population of remaining participants is reinitialized at step 1022 (which need not come after step 1020, as shown in FIG. 10, and could, e.g., occur just before step 1020) to represent all participants that have not yet been assigned to a group, e.g., participants P1, P3, and P4. From step 1022, processing may return to step 1002 to identify a new "group" priority pattern (which may be referred to as a second "group" priority pattern for the second iteration of step 1002) from the newly reinitialized population of remaining participants, as shown in the example of Table XI, below.

TABLE XI

| Participant | QR1 | QR2 | QR3 |
| --- | --- | --- | --- |
| P1 | *** | ***** | **** |
| P3 | * | **** | ***** |
| P4 | *** | *** | **** |
| First Priority Pattern: | 7/3 = 2.33 | 12/3 = 4 | 13/3 = 4.33 |

Accordingly, the "group" priority pattern in the second iteration of step 1002 may be identified from a second set of the plurality of priority values provided at step 330 in FIG. 3. This second set of priority values may exclude all priority values associated with the first group (e.g., Group #1 of Participants P2 and P5) of participants. For example, the priority values associated with Participants P1-P5 in Table X may represent a first set of priority values, and the priority values associated with Participants P1, P3, and P4 in Table XI may represent a second set of priority values, the second set of priority values excluding the priority values in Table X associated with participants P2 and P5 assigned to the first group (e.g., Group #1).

With reference to Table XI, in the second iteration of step 1002, the "group" priority pattern becomes the set {2.33, 4, 4.33}, in this example. In this regard, assuming that the threshold value range of step 1008 is expanded to be a second, larger (or wider) threshold value range, of less than or equal to 2 for the second iteration of step 1002, the loop of step 1004 to step 1014 and back to step 1004 for each of participants P1, P3, and P4, results in each of these participants having difference values of 2, and being assigned to the present group (e.g., group #2) at step 1010. Accordingly, the second iteration of such loop results in identification of a second group of participants (e.g., participants P1, P3, and P4) whose respective associated priority values exhibit a similarity with a second "group" priority pattern (e.g., determined in the second iteration of step 1002) within a second threshold range (e.g., difference value less than or equal to two), where the second group of participants excludes the first group of participant (e.g., participants P2 and P5).

Accordingly, the method 1000, when run on the data in Table X, as described above, results in the identification of two groups of participants (e.g., Group #1 and Group #2) at step 906 (or, e.g., 906a), each subsequent group including participants that are less typical as compared to the population as a whole. In the above-discussed example, Group #1 includes participants P2 and P5, which provided priority values closer to the first "group" priority pattern shown in Table X than the participants P1, P3, and P4 in Group #2. In other words, participants P2 and P5 in Group #1 each exhibited a difference value from the first "group" priority pattern shown in Table X that was less than or equal to one, whereas participants P1, P3, and P4 in Group #2 each exhibited a difference value from the first "group" priority pattern shown in Table X that was greater than one. Stated differently, according to some embodiments, the first group includes participants whose respective participants' associated priority values for the first set of the plurality of qualitative responses (e.g., QR1-QR3) exhibit a pattern (e.g., respective "individual" priority pattern) that is similar to a first "group" priority pattern (e.g., from Table X) within a first threshold range (e.g., difference value less than or equal to one), the first "group" priority pattern being a pattern of the plurality of priority values (e.g., in Table X) associated with a first set of the plurality of qualitative responses (e.g., QR1-QR3) and a first set of participants (e.g., P1-P5). On the other hand, according to some embodiments, the second group includes participants whose respective participants' associated priority values for the first set of the plurality of qualitative responses (e.g., QR1-QR3) exhibit a pattern (e.g., respective "individual" priority pattern) that is similar to the first "group" priority pattern (e.g., from Table X) within a second threshold range (e.g., difference value less than or equal to two but greater than one) providing for less similarity than the first threshold range.

In this regard, it can be seen that the iterations within the method 1000 may produce more than two groups, in some embodiments. In some embodiments, a third group of participants may be produced whose respective participants' associated priority values for a first set of the plurality of qualitative responses (e.g., the same set from which the first two groups were produced) exhibit a pattern that is similar to the first "group" priority pattern (e.g., the "group" priority pattern generated from the first group in the first iteration of step 1002) within a third threshold range providing for less similarity than the second threshold range (e.g., for the second group in the second iteration of step 1008) and the first threshold range (e.g., for the first group in the first iteration of step 1008). Accordingly, each iteration within the method 1000 may produce a less typical group as compared to the population as a whole, according to some embodiments.

The above-discussed example of Tables X and XI is just one possible example provided for illustration purposes. However, it should be noted that the present invention is not limited to the particular instances of priority values shown in Tables X and XI and is not limited to the case where each of the participants assigns one or more stars to each of the qualitative responses. For example, a participant may assign zero stars to a qualitative response. Further, a different subset of the qualitative responses may be distributed to each participant for evaluation, so that a different subset of participants is invited to assign stars to each qualitative response. Where a qualitative response was not distributed to a participant for evaluation, this may be handled in the same way as if the qualitative response had been distributed to the participant for evaluation but the participant had assigned zero stars to the qualitative response. Alternatively, qualitative responses that were not distributed to a participant for evaluation may be omitted from the calculation of the difference value, in recognition of the distinction between the case where a qualitative response is not distributed to a participant for evaluation, and the case where a qualitative response is distributed to a participant for evaluation and the participant chooses to assign zero stars to the qualitative response.

Further, the priority values may not be stars, and may be some other form of evaluation that can be converted into a binary or numerical value. For example, a participant may be asked to perceive respective qualitative responses and select those that resonate with them. This form of evaluation could yield a binary value, true if the participant selects the respective qualitative response or false if the participant does not select the respective qualitative response. As another example, a participant may be asked to assign a word, phrase, or icon representing a category of emotion, to a qualitative response. This form of evaluation could yield a numerical value, such as a positive number if the word, phrase or icon represents a positive emotion (the more positive the emotion, the more positive the number), zero if the word, phrase or icon represents a neutral emotion, or a negative number if the word, phrase or icon represents a negative emotion (the more negative the emotion, the more negative the number). In this regard, in some embodiments, a priority value may indicate a category of emotion exhibited by a respective participant in response to perceiving a respective qualitative response.

Table XII below illustrates an example of a process in which a different subset of qualitative responses is distributed to each participant for evaluation at step 330 in FIG. 3 and in which a participant may assign zero stars to a qualitative response. In this example, each of the "remaining participants", i.e., participants P1-P5 (different from earlier examples), evaluates only 2 out of 3 of the first set of qualitative responses, i.e., qualitative responses QR1-QR3 (different from earlier examples). Table XII shows the number of stars assigned by each of the participants P1-P5 to each of qualitative responses QR1-QR3, with "0" where the respective participant assigned zero stars to the respective qualitative response, and with "X" where the respective qualitative response was not distributed to the respective participant for evaluation.

TABLE XII

| Participant | QR1 | QR2 | QR3 |
|---|---|---|---|
| P1 | X | ***** | **** |
| P2 | 0 | **** | X |
| P3 | * | X | ***** |
| P4 | ** | *** | X |
| P5 | X | **** | 0 |
| First Priority Pattern: | 3/3 = 1 | 16/4 = 4 | 9/3 = 3 |

In the example of Table XII, the first or "group" priority pattern identified at step 1002 may be identified by averaging the numbers of stars assigned by the "remaining participants" to each qualitative response in the first set of qualitative responses, including instances in which participants assigned zero stars to a qualitative response, but excluding instances in which the qualitative response was not distributed to the participant for evaluation. For example, the calculation of the average numbers of stars assigned by the "remaining participants" to qualitative response QR1 includes participants P2, P3, and P4, who assigned 0, 1, and 2 stars, respectively, to qualitative response QR1, but excludes participants P1 and P5, to whom qualitative response QR1 was not distributed for evaluation, according to some embodiments. Therefore, the average number of stars assigned by the "remaining participants" to qualitative response QR1 is the total number of stars assigned by the "remaining participants" to qualitative response QR1, i.e., 0+1+2=3, divided by the number of participants to whom qualitative response QR1 was distributed for evaluation, i.e., 3, giving an average of 3/3=1.

Similarly, the determination of the average numbers of stars assigned by the "remaining participants" to qualitative response QR2 includes participants P1, P2, P4, and P5, who assigned 5, 4, 3, and 4 stars, respectively, but excludes participant P4, to whom qualitative response QR2 was not distributed for evaluation. Therefore, the average number of stars assigned by the "remaining participants" to qualitative response QR2 is the total number of stars assigned by the "remaining participants" to qualitative response QR2, i.e., 5+4+3+4=16, divided by the number of participants to whom qualitative response QR2 was distributed for evaluation, i.e., 4, giving an average of 16/4=4. The calculation of the average numbers of stars assigned by the "remaining participants" to qualitative response QR3 includes participants P1, P3, and P5, who assigned 4, 5, and 0 stars, respectively, to qualitative response QR3, but excludes participants P2 and P4, to whom qualitative response QR3 was not distributed for evaluation. Therefore, the average number of stars assigned by the "remaining participants" to qualitative response QR2 is (4+5+0)/3=3. As shown in Table XII, the resulting first priority pattern is identified to be the resulting sequence of number-of-star averages for the first set of qualitative responses QR1-QR3, according to some embodiments. In this regard, in the example of Table XII, the first priority pattern is identified to be the set {1, 4, 3}, respectively corresponding to the average priority values determined for the qualitative responses QR1-QR3, respectively.

Having identified a first priority pattern, which may be considered a "group" priority pattern, as discussed above, at step 1002, the example of Table XII may proceed through step 1004, at which a "next remaining participant" may be selected, and step 1006, at which a second priority pattern may be identified, which may be considered an "individual" priority pattern, to step 1008, at which the second or "individual" priority pattern may be compared with the first or "group" priority pattern, in some embodiments. Continuing with the example of Table XII, the "next remaining participant" selected at step 1004 would be participant P1, and the second or "individual" priority pattern for the "next remaining participant", i.e., participant P1, identified at step 1006, would be the set {0, 4, X}, according to the example of Table XII. This set represents the respective number of stars assigned by participant P1 to each qualitative response in the first set of qualitative responses QR1-QR3, with "X" where the respective qualitative response was not distributed to participant P1 for evaluation. Recall that the first or "group" priority pattern was {1, 4, 3}, revealing a difference set of {X, (5-4), (4-3)} or {X, 1, 1}, which may be converted to a difference value of two (i.e., one plus one, omitting the "X"). By omitting the "X" where the respective qualitative response was not distributed to participant P1 for evaluation, the difference value may be calculated and compared to a threshold value range at step 1008 to determine whether or not the participant P1 should be assigned to the present group, omitting any consideration of the qualitative response that was not distributed to participant P1 for evaluation. If the threshold value range is less than or equal to one, the difference value of two would be outside of the threshold value range and, therefore, the "next remaining participant" P1 would not be assigned to the present group.

The example of Table XII may proceed to through step 1014, at which it would be determined that participant P1 is not the last "remaining participant", and back to step 1004, as discussed in the example of Tables X and XII, above. At the second iteration through step 1004, the next "remaining participant" selected at step 1004 would be participant P2, and the second or "individual" priority pattern for the "next remaining participant", i.e., participant P2, identified at step 1006, would be the set {0, 4, X}, according to the example of Table XII. Recall that the first or "group" priority pattern was {1, 4, 3}, revealing a difference set of {(0-1), (4-4), X} or {-1, 0, X}, which may be converted to a difference value of one (i.e., the absolute value of negative one plus zero, omitting the "X"). In this case, the difference value is within the threshold value range of less than or equal to one in this example. Consequently, in this example, the "next remaining participant" P2 would be assigned to the present group at step 1010.

The example of Table XII may continue to iterate through the loop of step 1004 to step 1014 and back to step 1004 for each of participants P1-P5, as discussed in the example of Tables X and XII, above. Of course, the example of Table XII is just one example of many possible examples according to various embodiments of the present invention that is provided for illustration purposes. However, it should be noted that the present invention is not limited to the particular analysis of priority values performed in the example of Table XII and is not limited to the particular method of handling instances of a qualitative response which has not been distributed to a participant for evaluation or to which a participant has assigned zero stars. For example, rather than omitting qualitative responses that have not been distributed to a participant from the calculation of the difference value, such qualitative responses may be handled as if the participant had assigned zero stars to them.

Although the above-discussion describes some embodiments where different iterations of step 1008 include different threshold value ranges, other embodiments include the same threshold value range between two or more (e.g., for all, in some embodiments) iterations of step 1008.

For example, assume that the "individual" priority pattern is determined at step 1006 as the number of stars assigned by the "next remaining participant" to each qualitative response divided by the total number of stars assigned by the "next remaining participant" to all qualitative responses in the respective set for the respective iteration. Also assume that the "group" priority pattern is determined at step 1002 as the average number of stars assigned by all "remaining participants" to each qualitative response divided by the total of the average number of stars assigned by all "remaining participants" to all qualitative responses in the respective set.

In this case, the data from Table X above would result in the following Table XIII, showing the "individual" and "group" priority patterns at the respective iterations of steps 1002 and 1006:

TABLE XIII

| Participant | QR1 | QR2 | QR3 | "Individual" Priority Pattern | Difference Value |
|---|---|---|---|---|---|
| P1 | *** | ***** | **** | {3/12, 5/12; 4/12} | \|0.25 − 0.20\| + \|0.42 − 0.40\| + \|0.33 − 0.40\| = 0.73 |
| P2 | ** | **** | *** | {2/9, 4/9, 3/9} | \|0.22 − 0.20\| + \|0.44 − 0.40\| + \|0.33 − 0.40\| = 0.72 |
| P3 | * | **** | ***** | {1/10; 4/10; 5/10} | \|0.10 − 0.20\| + \|0.40 − 0.40\| + \|0.50 − 0.40\| = 0.20 |

TABLE XIII-continued

| Participant | QR1 | QR2 | QR3 | "Individual" Priority Pattern | Difference Value |
|---|---|---|---|---|---|
| P4 | *** | *** | **** | {3/10; 3/10; 4/10} | \|0.30 − 0.20\| + \|0.30 − 0.40\| + \|0.40 − 0.40\| = 0.20 |
| P5 | * | **** | **** | {1/9; 4/9; 4/9} | \|0.11 − 0.20\| + \|0.44 − 0.40\| + \|0.44 − 0.40\| = 0.17 |
| "Group" Priority Pattern | 2/10 | 4/10 | 4/10 | | |

In the example of Table XIII, if the threshold value range for step 1008 is less than or equal to 0.20, then participants P3, P4, and P5 are assigned to the first group, according to some embodiments. The assigning of participants to the second group would be based on Table XIV, below:

TABLE XIV

| Participant | QR1 | QR2 | QR3 | "Individual" Priority Pattern | Difference Value |
|---|---|---|---|---|---|
| P1 | *** | ***** | **** | {3/12, 5/12; 4/12} | \|0.25 − 0.24\| + \|0.42 − 0.43\| + \|0.33 − 0.33\| = 0.02 |
| P2 | ** | **** | *** | {2/9, 4/9, 3/9} | \|0.22 − 0.24\| + \|0.44 − 0.43\| + \|0.33 − 0.33\| = 0.02 |
| "Group" Priority Pattern | 2.5/10.5 | 4.5/10.5 | 3.5/10.5 | | |

In this case, if the threshold value range of less than or equal to 0.20 from the first group is maintained for the second group at step 1008, then participants P1 and P2 would be assigned to the second group.

In this regard, it can be seen that by changing the definition of the "individual" and "group" priority patterns, a constant threshold value range may be maintained at step 1008, and different groupings of participants may be produced with the constant threshold value, according to some embodiments.

In some embodiments, a variable threshold value range may be determined at each iteration through step 1008 according to a formula. For example, the threshold value range for step 1008 may be less than or equal to the average value across all "remaining participants", according to some embodiments. Adapting the example of Tables XIII and XIV, above, the threshold value range at the first iteration through step 1008 is the average difference value across all "remaining participants", i.e., participants P1-P5, in this example. From Table XIII, this average difference value is (0.73+ 0.72+0.20+0.20+0.17)/5=0.40, if rounded to two decimal places, so participants P3, P4, and P5 are assigned to the first group, according to some embodiments, since the difference values for these participants, i.e., 0.20, 0.20, and 0.17, respectively, are less than or equal to the average difference value, i.e., 0.40. The threshold value range at the second iteration through step 1008 is the average difference value across all "remaining participants", i.e., participants P1 and P2, in this example. From Table XIV, this average difference value is (0.02+0.02)/2=0.02, so participants P1 and P2 are assigned to the second group, according to some embodiments, since the difference values for these participants, i.e., 0.02 and 0.02, respectively, are less than or equal to the average difference value, i.e., 0.02.

In some embodiments, the comparison of the second or "individual" priority pattern with the first or "group" priority pattern at step 1008 to determine whether or not the "individual" priority pattern is similar to the "group" priority pattern within a threshold range may, in some instances, result in zero participants being assigned to the present group at step 1010. Step 1016, which, according to some embodiments, determines whether all participants have been assigned to a group and proceeds to step 1020 to begin creation of a next group if the determination is "NO", may, in the case in which zero participants are assigned to the present group at step 1010, proceed instead to step 1018, in some embodiments, preventing infinite iterations through the loop from step 1002 to step 1016. In this case, the present group, to which no participants have been assigned, may be discarded, and the "remaining participants" may remain unassigned to any group, according to some embodiments. Alternatively, all the "remaining participants" may be assigned to the present group, according to other embodiments.

When all participants have been assigned to a group at step 1016, the method 1000 may terminate at step 1018, according to some embodiments. In embodiments where method 1000 is an implementation of step 906 in FIG. 9, the method 900 may include, at step 910, the server device system 202 outputting a visual presentation (e.g., via the input-output device system 120 communicatively connected to the server device system 202) of at least one group of participants determined according to a respective one or more iterations of method 1000, such as at least the above-discussed first group (e.g., Group #1), the above-discussed second group (e.g., Group #2), or both groups of participants. In some embodiments, such visual presentation may include at least a cluster of visual representations of participants in at least the first group, the second group, or both groups. See, e.g., FIG. 12, discussed in more detail below, which illustrates a first cluster 1206, which may represent the first group of participants shown by outlines of people in one color, and a second cluster 1207, which may represent the second group of participants shown by outlines of people in another color.

Figure 11:
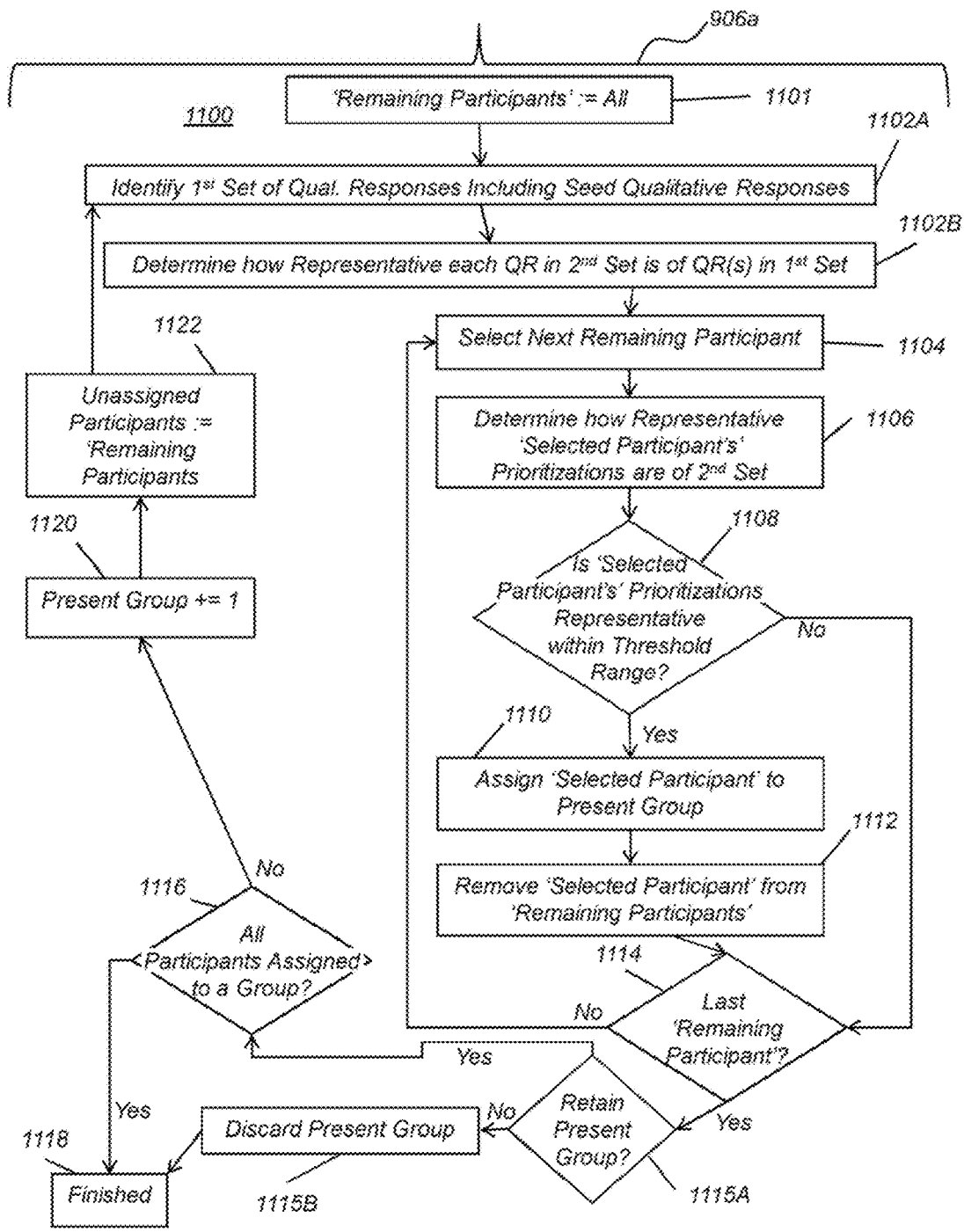
FIG. 11 illustrates a method of identifying groups of participants, according to some embodiments of the present invention.

FIG. 11 illustrates a method 1100 for associating participants with groups, according to some embodiments of the present invention. In some embodiments, the method 1100 represents a particular implementation of at least some of step 906 (e.g., step 906a, in some embodiments) where a plurality of groups of participants are identified.

In some embodiments, the method 1100 may include a step 1101, which corresponds to step 1001 in FIG. 10 where "remaining participants" are initialized to include all participants that evaluated responses at step 330. At step 1102A, a set or "first" set of the participant-evaluated qualitative responses is identified by the server device system 202. This set of the participant-evaluated qualitative responses may be generated by first identifying at least multiple seed qualitative responses (e.g., a first pair of participant-evaluated seed qualitative responses in some embodiments, but three or more participant-evaluated seed qualitative responses in other embodiments). In some embodiments, the seed qualitative responses are identified as two or more unexpectedly highly-connected qualitative responses.

In some embodiments, the server device system 202 is configured, e.g., by program instructions, to identify these two or more unexpectedly highly-connected qualitative responses at least by determining a connection score between each respective qualitative response and each other qualitative response of a set of some or all of the participant-evaluated qualitative responses evaluated at step 330, equal to the sum, across all respective participants, of: the number of stars assigned to the respective qualitative response by the respective participant multiplied by the number of stars assigned to the other qualitative response by the respective participant. Tables XV-XVIII, below, illustrate an example of a determination performed by the server device system 202 of the connection scores between qualitative response QR1 and each of three other qualitative responses QR2, QR3, and QR4. Table XV begins with some preliminary determinations performed by the server device system 202, according to some embodiments, that are later referred to as discussed below in order to complete the identification of the seed qualitative responses at step 1102A, according to some embodiments.

TABLE XV

| Participant | QR1 | QR2 | QR3 | QR4 |
|---|---|---|---|---|
| P1 | ** | *** | **** | ** |
| P2 | **** | ** | ***** | **** |
| P3 | ***** | * | *** | **** |
| P4 | *** | *** | ***** | ** |
| 135 | **** | * | *** | **** |
| Total Star Assignment | 18 | 10 | 19 | 16 |
| Square of Total Star Assignment | $18^2 = 324$ | $10^2 = 100$ | $19^2 = 361$ | $16^2 = 256$ |

Table XVI, below, illustrates an example determination by the server device system 202 of a connection score between qualitative responses QR1 and QR2. In this example, participant P1 assigned two stars to qualitative response QR1 and three stars to qualitative response QR2, so participant P1's contribution to the connection score between QR1 and QR2 is 2×3=6, according to some embodiments. Further, participant P2 assigned four stars to qualitative response QR1 and two stars to qualitative response QR2, so participant P2's contribution to the connection score between QR1 and QR2 is 4×2=8, according to some embodiments. Summing the contributions from all participants P1-P5 gives a connection score, according to some embodiments, between QR1 and QR2 of 6+8+5+9+4=32, as shown in Table XVI, below.

TABLE XVI

| Participant | QR1 | QR2 | Participant Connection Score |
|---|---|---|---|
| P1 | ** | *** | 2 × 3 = 6 |
| P2 | **** | ** | 4 × 2 = 8 |
| P3 | ***** | * | 5 × 1 = 5 |
| P4 | *** | *** | 3 × 3 = 9 |
| P5 | **** | * | 4 × 1 = 4 |
| Total | | | 32 |

Similarly, Table XVII, below, illustrates an example determination by the server device system 202 of a connection score between qualitative responses QR1 and QR3. In this example, participant P1 assigned two stars to qualitative response QR1 and four stars to qualitative response QR3, so participant P1's contribution to the connection score between QR1 and QR3 is 2×4=8, according to some embodiments. Further, participant P2 assigned four stars to qualitative response QR1 and five stars to qualitative response QR3, so participant P2's contribution to the connection score between QR1 and QR3 is 4×5=20, according to some embodiments. Summing the contributions from all participants P1-P5 gives a connection score, according to some embodiments, between QR1 and QR3 of 8+20+15+15+12=70, as shown in Table XVII, below.

TABLE XVII

| Participant | QR1 | QR3 | Participant Connection Score |
|---|---|---|---|
| P1 | ** | **** | 2 × 4 = 8 |
| P2 | **** | ***** | 4 × 5 = 20 |
| P3 | ***** | *** | 5 × 3 = 15 |
| P4 | *** | ***** | 3 × 5 = 15 |
| P5 | **** | *** | 4 × 3 = 12 |
| Total | | | 70 |

Table XVIII, below, illustrates an example determination by the server device system 202 of a connection score between qualitative responses QR1 and QR4. Summing the contributions from all participants P1-P5 gives a connection score, according to some embodiments, between QR1 and QR4 of 4+16+20+6+16=62, as shown in Table XVIII, below.

TABLE XVIII

| Participant | QR1 | QR4 | Participant Connection Score |
|---|---|---|---|
| P1 | ** | ** | 2 × 2 = 4 |
| P2 | **** | **** | 4 × 4 = 16 |
| P3 | ***** | **** | 5 × 4 = 20 |
| P4 | *** | ** | 3 × 2 = 6 |
| P5 | **** | **** | 4 × 4 = 16 |
| Total | | | 62 |

Figure 18:
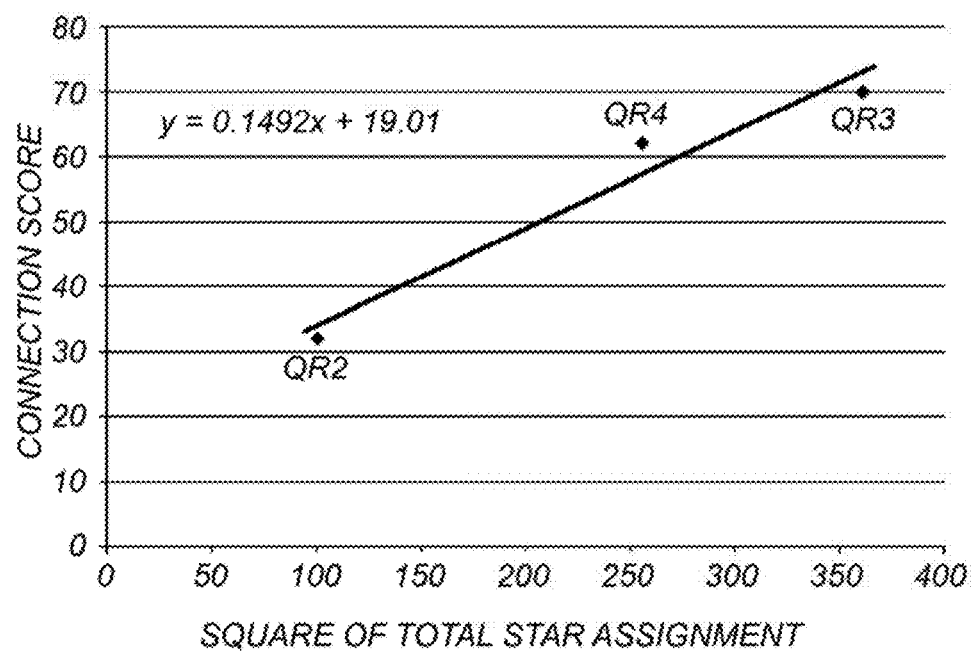
FIG. 18 illustrates an example of a linear regression performed by a data processing device system on a plot of a connection score between qualitative responses, according to some embodiments of the present invention.

In this example, qualitative response QR1 is determined to be most highly connected to qualitative response QR3, with a connection score of 70, less highly connected to qualitative response QR4, with a connection score of 62, and least highly connected to qualitative response QR2, with a connection score of 32. However, given that participants assigned more stars to QR3 than to either of the other qualitative responses (a total of 19 stars assigned to QR3, compared to a total of 10 to QR2 and a total of 16 to QR4), it might be expected that the connection score between QR1 and QR3 would be higher than the connection scores between QR1 and the other qualitative responses. In some embodiments, the server device system 202 is configured to perform a regression analysis to determine whether the qualitative response QR1 is more highly connected to each of the qualitative responses QR2, QR3, and QR4 than would be expected, given the total number of stars assigned to each of QR2, QR3, and QR4. In this regard, the server device system 202 may be configured to perform linear regression, which is a statistical technique known in the art to fit trendlines to scatter plots. FIG. 18 illustrates an example of such a linear regression performed by the server device system 202, according to some embodiments, on a plot of the connection score between qualitative response QR1 and each of the qualitative responses QR2, QR3, and QR4 on the y-axis, against the square of the total number of stars assigned to each of the qualitative responses QR2, QR3, and QR4 on the x-axis.

The trendline in FIG. 18, y=0.1492x+19.01, if rounded to four decimal places, indicates the connection score between qualitative response QR1 and another qualitative response that might be expected, given the square of the total number of stars assigned to the other qualitative response, according to some embodiments. In this example, qualitative responses QR2 and QR3 are below the trendline, indicating that they are less highly connected to QR1 than might be expected, but qualitative response QR4 is above the trendline, indicating it is unexpectedly highly connected to QR1, according to some embodiments. This result is consistent with Table XV, which shows that participants P1-P5 assigned stars to qualitative responses QR1 and QR4 in a very similar way. The extent to which qualitative response QR1 is unexpectedly highly connected to qualitative responses QR2, QR3, and QR4 may be quantified by programming the server device system 202 to calculate the vertical distance from each of the points to the trendline. For example, according to some embodiments, the expected connection score between QR1 and QR2 may be determined by substituting the square of the total star assignment for QR2, i.e., x=100, into the equation of the trendline, i.e., y=0.1492x+19.01, giving an expected connection score of y=33.9, if rounded to one decimal place. However, the actual connection score, according to some embodiments, between QR1 and QR2 is 32. The difference between these two numbers, an excess connection score of 32−33.9=−1.9, is a measure of the extent to which QR1 is unexpectedly highly connected to QR2 (in this case, it is negative, indicating that qualitative response QR1 is less highly connected to QR2 than might be expected), according to some embodiments. Similarly, the expected connection score between QR1 and QR4 may be determined by substituting the square of the total star assignment for QR4, i.e., x=256, into the equation of the trendline, i.e., y=0.1492x+19.01, giving an expected connection score, according to some embodiments, of y=57.2, if rounded to one decimal place. However, the actual connection score, according to some embodiments, between QR1 and QR4 is 62. The difference between these two numbers, an excess connection score of 62−57.2=4.8, is a measure of the extent to which QR1 is unexpectedly highly connected to QR4 (in this case, it is positive, indicating that qualitative response QR1 is more highly connected to QR4 than might be expected), according to some embodiments.

The above analyses performed by the sever device system 202 in some embodiments to determine the excess connection score between QR1 and each of the other qualitative responses may be performed in the same way to determine the excess connection score between QR2 and each of the other qualitative responses, between QR3 and each of the other qualitative responses and between QR4 and each of the other qualitative responses. The excess connection scores yielded by these analyses, rounded to one decimal place, are shown in Table XIX, below.

TABLE XIX

| Excess Connection Scores | QR1 | QR2 | QR3 | QR4 |
|---|---|---|---|---|
| QR1 | — | −1.9 | −2.9 | 4.8 |
| QR2 | −3.7 | — | 2.4 | 1.3 |
| QR3 | −0.1 | 0.0 | — | 0.1 |
| QR4 | 2.7 | −0.4 | −2.4 | — |

The above analysis performed by the server device system 202 according to some embodiments yields two excess connection scores between each unique pair of qualitative responses. For example, the excess connection score between qualitative response QR1 and qualitative response QR4 is 4.8, but the excess connection score between qualitative response QR4 and qualitative response QR1 is 2.7. In some embodiments, the server device system 202 is configured (e.g., by program instructions) to further determine, as part of step 1102A, a mutual excess connection score between each unique pair of qualitative responses, equal to the sum of the two excess connection scores. For example, the mutual excess connection score between qualitative response QR1 and qualitative response QR4 is 4.8+2.7=7.5, according to some embodiments. The mutual excess connection score, according to some embodiments, between each unique pair of qualitative responses in the above analysis, rounded to one decimal place, is shown in Table XX, below.

TABLE XX

| Mutual Excess Connection Scores | QR1 | QR2 | QR3 | QR4 |
|---|---|---|---|---|
| QR1 | — | −5.6 | −3.0 | 7.5 |
| QR2 | — | — | 2.4 | 0.9 |
| QR3 | — | — | — | −2.3 |
| QR4 | — | — | — | — |

In some embodiments, the unique pair of qualitative responses with the highest mutual excess connection score is selected by the server device system 202 as the first pair of participant-evaluated seed qualitative responses at step 1102A in FIG. 11. In the example of Table XX, the unique pair of qualitative responses with the highest mutual excess connection score is QR1 and QR4, with a mutual excess connection score of 7.5, indicating that these qualitative responses are unexpectedly highly-connected. Again, this result is consistent with Table XV, which shows that participants P1-P5 assigned stars to qualitative responses QR1 and QR4 in a very similar way. In this example, therefore, qualitative responses QR1 and QR4 may be identified by the server device system 202 as the first pair of participant-evaluated seed qualitative responses according to program instructions configured to implement step 1102A. It may be deemed that this first pair of seed qualitative responses exhibit a connection score within a threshold range, which in the above example, is defined as the highest mutual excess connection score, according to some embodiments.

Of course, the example of Tables XV-XX is just one example of many possible examples according to various embodiments of the present invention for implementing step 1102A that is provided for illustration purposes only. Accordingly, it should be noted that the present invention is not limited to the particular analysis of priority values performed in the example of Tables XV-XX and is not limited to the particular definition of connection scores or the particular method of identifying unexpectedly highly connected qualitative responses or threshold definitions associated therewith. For example, the connection score may be calculated as the sum across all participants of the number of stars assigned to the one qualitative response added to, rather than multiplied by, the number of stars assigned to the other qualitative response, an alternative that will tend to de-emphasize participants' stronger opinions. As another example, simple linear regression may be performed on a plot of the connection score between a qualitative response and each of the other qualitative responses on the y-axis, and the total number of stars assigned to each of the other qualitative responses, rather than the square of the total number of stars assigned to each of the other qualitative responses, on the x-axis. Simple linear regression may also be performed on a plot of the natural logarithm of the connection score between a qualitative response and each of the other qualitative responses on the y-axis, and the square of the total number of stars assigned to each of the other qualitative responses on the x-axis, so that the trendline represents a logarithmic rather than a linear relationship. Further, in a process in which a different subset of qualitative responses is distributed to each participant for evaluation, the calculation of connection scores between two qualitative responses may include only participants to which both qualitative responses were distributed for evaluation, and exclude any participants to which only one of the two qualitative responses, or neither of the two qualitative responses, was distributed for evaluation.

Additional considerations may apply to the selection of unexpectedly highly connected qualitative responses. For example, pairs of qualitative responses selected as the first pair of participant-evaluated seed qualitative responses in earlier iterations through the loop of Steps 1102A-1122 may be excluded from consideration as the first pair of participant-evaluated seed qualitative responses in later iterations.

Having identified the seed participant-evaluated qualitative responses, step 1102A may also include adding additional participant-evaluated qualitative responses to the seed qualitative responses, in order to build a larger "first" set of qualitative responses from which a group of participants may be subsequently identified at steps via the loop 1104-1114, according to some embodiments. These additional participant-evaluated qualitative responses may be referred to as extended seed qualitative responses that are correlated to the seed participant-evaluated qualitative responses.

In some embodiments, a particular qualitative response is selected as an extended seed qualitative response if the mutual excess connection scores, discussed above, between each of the seed qualitative responses and the particular qualitative response are all of the same sign, i.e., either all positive, indicating that the particular qualitative response is positively correlated with each of the seed qualitative responses, or all negative, indicating that the particular qualitative response is negatively correlated with each of the seed qualitative responses. Continuing with the example of Tables XV-XX, in which qualitative responses QR1 and QR4 are selected as the first pair of participant-evaluated seed qualitative responses, qualitative response QR2 is not selected, according to some embodiments, by the server device system 202, as an extended seed qualitative response, because the mutual excess connection score between seed qualitative response QR1 and qualitative response QR2, i.e., −5.6, is negative, but the mutual excess connection score between seed qualitative response QR4 and qualitative response QR2, i.e., 0.9, is positive, i.e., these mutual excess connection scores are of different signs. However, qualitative response QR3 is selected, according to some embodiments, by the server device system 202, as an extended seed qualitative response at step 1102A, because the mutual excess connection score between seed qualitative response QR1 and qualitative response QR3, i.e., −3.0, is negative, and the mutual excess connection score between seed qualitative response QR4 and qualitative response QR3, i.e., −2.3, is also negative, i.e., these mutual excess connection scores are of the same sign, indicating that qualitative response QR3 is negatively correlated with both seed qualitative responses QR1 and QR4. In this example, therefore, extended seed qualitative response QR3 is added by the server device system 202 to the seed qualitative responses QR1 and QR4 to form the set of qualitative responses of step 1102A.

It should be noted that the present invention is not limited to the particular method of selecting extended seed qualitative responses in the example above. For example, a particular qualitative response may be selected as an extended seed qualitative response only if it is positively correlated with each of the seed qualitative responses, rather than either positively or negatively correlated. As another example, a particular qualitative response may be selected as an extended seed qualitative response only if its positive or negative correlation with each of the seed qualitative responses exceeds a particular threshold. Further, a linear regression may be performed, for instance, on a plot of the product of the mutual excess connection scores between each of the seed qualitative responses and a particular qualitative response on the y-axis, against a rank order of the product of the mutual excess connection scores between each of the seed qualitative responses and the particular qualitative response (e.g., 1 for the particular qualitative response with the highest product, 2 for the particular qualitative response with the second-highest product, etc.) on the x-axis, and a particular qualitative response may be selected as an extended seed qualitative response only if the product of the mutual excess connection scores between each of the seed qualitative responses and the particular qualitative response is unexpectedly high, given its rank order. Further, in some embodiments, extended seed qualitative responses are not added to the seed qualitative responses at step 1102A. For example, the set of qualitative responses identified at step 1102A may include only the seed qualitative responses, according to some embodiments.

In some embodiments, having identified a first set of qualitative responses at step 1102A, which may include the seed qualitative responses and optionally the extended seed quantitative responses, processing may proceed to step 1102B, which represents a configuration of the server device system 202 to determine how representative or correlated each of some or all of the qualitative responses evaluated at step 330 (e.g., a "second" set of qualitative responses) is of the first set of qualitative responses identified at step 1102A.

In some embodiments, step 1102B includes the assignment of weights to each of the qualitative responses in the first set of qualitative responses identified at step 1102A. In this regard, it should be noted that the example of Tables XV-XX omits any determination of the connection score, excess connection score, or mutual excess connection score between a qualitative response and itself, hence the empty diagonal cells in Table XIX. However, in some embodiments, the assignment of weights to each of the qualitative responses in the first set of qualitative responses identified at step 1102A may require that the connection score, excess connection score, and mutual excess connection score between each of the qualitative responses and itself be determined, in the same way as it is between each of the qualitative responses and each of the other qualitative responses, but without changing the regression analysis.

For example, Table XXI, below, illustrates an example of the calculation of a connection score between qualitative response QR1 and itself. Participant P1 assigned two stars to qualitative response QR1, so Participant P1's contribution to the connection score between QR1 and QR1 is 2×2=4, according to some embodiments. Further, Participant P2 assigned four stars to qualitative response QR1, so Participant P2's contribution to the connection score between QR1 and itself is 4×4=16, according to some embodiments. Summing the contributions from all participants P1-P5 gives a connection score, according to some embodiments, between QR1 and itself of 4+16+25+9+16=70.

TABLE XXI

| Participant | QR1 | QR1 | Participant Connection Score |
|---|---|---|---|
| P1 | ** | ** | 2 × 2 = 4 |
| P2 | **** | **** | 4 × 4 = 16 |
| P3 | ***** | ***** | 5 × 5 = 25 |
| P4 | *** | *** | 3 × 3 = 9 |
| P5 | **** | **** | 4 × 4 = 16 |
| Total | | | 70 |

According to some embodiments, the expected connection score between QR1 and itself may be determined by substituting the square of the total star assignment for QR1, i.e., x=324, into the equation of the trendline from FIG. 18, i.e., y=0.1492x+19.01, without changing the regression analysis, giving an expected connection score of y=67.4, if rounded to one decimal place. However, the actual connection score between QR1 and itself is 70, according to some embodiments. The difference between these two numbers is the excess connection score of 70−67.4=2.6, according to some embodiments.

The connection scores and excess connection scores between each of the other qualitative responses and itself may be determined by the server device system 202 in the same way, allowing the diagonal cells in Table XIX to be completed, as shown in Table XXII, below.

TABLE XXII

| Excess Connection Scores | QR1 | QR2 | QR3 | QR4 |
|---|---|---|---|---|
| QR1 | 2.6 | −1.9 | −2.9 | 4.8 |
| QR2 | −3.7 | 18.0 | 2.4 | 1.3 |
| QR3 | −0.1 | 0.0 | 9.4 | 0.1 |
| QR4 | 2.7 | −0.4 | −2.4 | 4.1 |

A mutual excess connection score between each qualitative response and itself may be determined by the server device system 202, equal to twice the excess connection score between each qualitative response and itself, according to some embodiments. For example, the mutual excess connection score between qualitative response QR1 and itself is 2.6+2.6=5.2, according to some embodiments. The mutual excess connection score between each of the other qualitative responses and itself may be determined in the same way, allowing the diagonal cells in Table XX to be completed, as shown in Table XXIII, below.

TABLE XXIII

| Mutual Excess Connection Scores | QR1 | QR2 | QR3 | QR4 |
|---|---|---|---|---|
| QR1 | 5.2 | −5.6 | −3.0 | 7.5 |
| QR2 | — | 36.0 | 2.4 | 0.9 |
| QR3 | — | — | 18.8 | −2.3 |
| QR4 | — | — | — | 8.2 |

In some embodiments, at step 1102B, each qualitative response of the first set of qualitative responses identified at step 1102A is assigned a weight by the server device system 202 according to how it is correlated with the seed qualitative responses, equal to the sum of the mutual excess connection scores between each of the seed qualitative responses and the particular qualitative response. Continuing with the example of Tables XV-XXIII, recall that qualitative responses QR1 and QR4 were selected as the first pair of participant-evaluated seed qualitative responses, and qualitative response QR3 was selected as an extended seed qualitative response, so that the first set of qualitative responses identified at step 1102A is qualitative responses QR1, QR3, and QR4.

The weight of qualitative response QR1, the first qualitative response of this set of qualitative responses identified at step 1102B, may be calculated by the server device system 202 as follows. The mutual excess connection score, according to some embodiments, between the seed qualitative response QR1 and the particular qualitative response QR1, i.e., between QR1 and itself, is 5.2, from Table XXIII, above. The mutual excess connection score between the seed qualitative response QR4 and the particular qualitative response QR1 is 7.5, according to some embodiments. The unnormalized weight, according to some embodiments, assigned to qualitative response QR1 is equal to the sum of these mutual excess connection scores, i.e., 5.2+7.5=12.7. This large, positive weight indicates that qualitative response QR1 is highly positively correlated with the seed qualitative responses QR1 and QR4, as would be expected, given that it is one of the seed qualitative responses.

Similarly, the weight of qualitative response QR3, the second qualitative response of the first set of qualitative responses identified at step 1102A, may be calculated as follows. The mutual excess connection score between the seed qualitative response QR1 and the particular qualitative response QR3 is −3.0, according to some embodiments. The mutual excess connection score between the seed qualitative response QR4 and the particular qualitative response QR3 is −2.3, according to some embodiments. The weight assigned to qualitative response QR1 may be equal to the sum of these mutual excess connection scores, i.e., −3.0+−2.3=−5.3. This smaller, negative weight indicates that qualitative response QR3 is moderately negatively correlated with the seed qualitative responses QR1 and QR4.

The weight of qualitative response QR4, the last qualitative response of the first set of qualitative responses identified at step 1102A, may be calculated in the same way, giving 7.5+8.2=15.7. This large, positive weight indicates that qualitative response QR4 is highly positively correlated with the seed qualitative responses QR1 and QR4, again, as would be expected, given that it is one of the seed qualitative responses.

These weights may be normalized by the server device system 202 by dividing each unnormalized weight by the sum of the absolute values of the unnormalized weights across the first set of qualitative responses identified at step 1102A, i.e., dividing each unnormalized weight by |12.7|+|−5.3|+|15.7|=33.7. This yields the weights in Table XXIV, below, rounded to two decimal places.

TABLE XXIV

| Qualitative Response in Set of Qualitative Responses Identified at Step 1102B | Mutual Excess Connection Score Between Seed Qualitative Response QR1 and Qualitative Response in Set | Mutual Excess Connection Score Between Seed Qualitative Response QR4 and Qualitative Response in Set | Unnormalized Weight | Weight |
|---|---|---|---|---|
| QR1 | 5.2 | 7.5 | 5.2 + 7.5 = 12.7 | 12.7/33.7 = 0.38 |
| QR3 | −3.0 | −2.3 | −3.0 + −2.3 = −5.3 | −5.3/33.7 = −0.16 |
| QR4 | 7.5 | 8.2 | 7.5 + 8.2 = 15.7 | 15.7/33.7 = 0.46 |

In some embodiments, step 1102B is completed by the server device system 202 determining a representativeness score for each particular qualitative response of a set (e.g., a "second" set) of some or all of the participant-evaluated qualitative responses evaluated at step 330, equal to the sum, over the qualitative responses in the first set of qualitative responses identified at step 1102A, of: the mutual excess connection score between the qualitative response in the first set of qualitative responses identified at step 1102A and the particular qualitative response multiplied by the weight of the qualitative response in the first set of qualitative responses identified at step 1102A. In other words, in some embodiments, the representativeness score may be summarized or notated as: sum(mutual excess connection score× weight).

Continuing with the example of Tables XV-XXIV, recall that the first set of qualitative responses identified at step 1102A is qualitative responses QR1, QR3, and QR4. The mutual excess connection scores between qualitative response QR1 and these qualitative responses QR1, QR3, and QR4 are 5.2, −3.0, and 7.5, respectively, from Table XXIII, above. The weights of the qualitative responses QR1, QR3, and QR4 are 0.38, −0.16, and 0.46, respectively, from Table XXIV, above. So, according to some embodiments, the server device system 202 may be configured (e.g., by program instructions) to determine the representativeness score, according to some embodiments, for qualitative response QR1 as (5.2× 0.38)+(−3.0×−0.16)+(7.5χ 0.46) =5.91, rounded to two decimal places. This large, positive representativeness score indicates that qualitative response QR1 is highly representative of the first set of qualitative responses identified at step 1102A, as would be expected, given that it is one of the seed qualitative responses.

The mutual excess connection scores between qualitative response QR2 and qualitative responses QR1, QR3, and QR4 are −5.6, 2.4, and 0.9, respectively, from Table XXIII, above. So, the representativeness score, according to some embodiments, for qualitative response QR2 is (−5.6×0.38)+ (2.4×−0.16)+(0.9×0.46)=2.10, rounded to two decimal places. This smaller, negative representativeness score indicates that qualitative response QR2 is moderately unrepresentative of the first set of qualitative responses identified at step 1102A.

The mutual excess connection scores between qualitative response QR3 and qualitative responses QR1, QR3, and QR4 are −3.0, 18.8 and −2.3, respectively, from Table XXIII, above. So the representativeness score, according to some embodiments, for qualitative response QR3 is (−3.0× 0.38)+(18.8×−0.16)+(−2.3×0.46)=5.21, rounded to two decimal places. This large, negative representativeness score indicates that qualitative response QR3 is highly unrepresentative of the first set of qualitative responses identified at step 1102A. This result, indicating that qualitative response QR3 is highly unrepresentative of the first set of qualitative responses identified at step 1102A, is consistent with the above-discussed negative mutual excess connection scores and resulting negative correlations between qualitative response Q3 and the seed qualitative responses Q1 and Q4. Recall that qualitative response QR3 was selected as an extended seed qualitative response at step 1102A because it had negative mutual excess connection scores with seed qualitative responses Q1 and Q4. However, in some embodiments, as discussed above, qualitative responses may be selected as extended seed qualitative responses, among other manners, when they have only positive mutual excess connection scores with seed qualitative responses.

The mutual excess connection scores between qualitative response QR4 and qualitative responses QR1, QR3, and QR4 are 7.5, −2.3, and 8.2, respectively, from Table XXIII, above. So the representativeness score, according to some embodiments, for qualitative response QR4 is (7.5×0.38)+ (−2.3×−0.16)+(8.2×0.46)=6.99, rounded to two decimal places. This large, positive representativeness score indicates that qualitative response QR4 is highly representative of the first set of qualitative responses identified at step 1102A, as would be expected, given that it is one of the seed qualitative responses.

These representativeness scores are summarized in Table XXV, below, indicating how representative each qualitative response is of the first set of qualitative responses identified at step 1102A.

TABLE XXV

| Qualitative Response | Representativeness Score |
|---|---|
| QR1 | 5.91 |
| QR2 | −2.10 |
| QR3 | −5.21 |
| QR4 | 6.99 |

It should be noted that steps 1102A and 1102B of FIG. 11, which may result in the server device system's (202) generation of the above-discussed representativeness scores, may be deemed to be the generation of a "group" priority pattern, according to some embodiments, akin to step 1002 in FIG. 10, but in a different manner. In other words, the representativeness scores may be deemed a "group" priority pattern for the second set of qualitative responses of step 1102B, according to some embodiments. For example, the set of all representativeness scores in Table XXV (i.e., 5.91, −2.10, −5.21, 6.99) may be considered such a "group" priority pattern, according to some embodiments. Further, although step 1102A is discussed in the context of a "first" set of qualitative responses, and step 1102B is discussed in the context of a "second" set of qualitative responses, the references to "first" and "second" in this regard are merely to provide labels to distinguish the sets of qualitative responses from steps 1102A and 1102B, and any other label or labels may be used to refer to the sets of qualitative responses from steps 1102A and 1102B. For example, the "second" set of qualitative responses referred to at step 1102B could be referred to as a "first" set of qualitative responses, and the set of qualitative responses referred to at step 1102A could be referred to merely as a "set" of qualitative responses. Accordingly, the reference to "first", "second", or any other label provided to identify a set or other object (e.g., a threshold range, a group, or other object) herein is not limiting and is merely used for identification purposes, unless otherwise required by context.

Having determined at step 1102B how representative each qualitative response in the second set is of the "first" set of qualitative responses identified at step 1102A, step 1104 may then be executed by the server device system 202, according to some embodiments. At step 1104, a "next remaining participant" is identified or selected, according to some embodiments. In this regard, in some embodiments, step 1104 in FIG. 11 corresponds to step 1004 in FIG. 10. Accordingly, the description of this step will not be repeated.

At step 1106, it is determined how closely the "selected participant's" pattern of prioritization of at least some of the "second" set (e.g., from step 1102B) of qualitative responses matches the pattern of correlation between this "second" set of qualitative responses and the first set (e.g., from step 1102A) of qualitative responses, each of this first set of qualitative responses being weighted according to its correlation with the seed qualitative responses, according to some embodiments. In other words, it is determined how representative the "selected participant's" prioritizations are of an orientation defined by the seed qualitative responses and any extended seed qualitative responses (identified at step 1102A). In this regard, a representativeness score may be determined for the "selected participant", according to some embodiments, from the priority values assigned by the "selected participant" to at least some of the qualitative responses (e.g., those qualitative responses evaluated by the "selected participant" at step 330, according to some embodiments). In some embodiments, this "individual" representativeness score may be equal to the sum over all qualitative responses evaluated by the "selected participant" of the representativeness score for the qualitative response multiplied by the number of stars assigned by the "selected participant" to the qualitative response.

For example, continuing the discussion of Tables XV-XXV, above, assume that the "next remaining participant" selected at step 1104 is participant P1. The representativeness scores for qualitative responses QR1-QR4 are 5.91, −2.10, −5.21, and 6.99, respectively, from Table XXV, above, and the numbers of stars assigned by participant P1 to qualitative responses QR1-QR4 are 2, 3, 4, and 2, respectively, from Table XV, above. In this example, therefore, the representativeness score for participant P1, according to some embodiments, is (5.91×2)+(−2.10×3)+(−5.21×4)+(6.99×2)=−1.34. This small, negative representativeness score indicates that participant P1's prioritizations are slightly unrepresentative of the orientation defined by the seed qualitative responses and any extended seed qualitative responses (identified at step 1102A).

It should be noted that the above-discussed process of determining the "selected participant's" representativeness at step 1106 may be considered to involve an analysis of the "selected participant's" "individual" priority pattern, as it may involve the prioritizations (e.g., numbers of stars) assigned by the "selected participant" (e.g., participant P1) to the "second" set of qualitative responses (e.g., qualitative responses QR1-QR4). In the above example from Table XV, the numbers of stars assigned by participant P1 to qualitative responses QR1-QR4 are 2, 3, 4, and 2, respectively, so the "selected participant's" "individual" priority pattern may be considered the set {2, 3, 4, 2}. Since, in the above example, this "individual" priority pattern (e.g., {2, 3, 4, 2}) is combined (e.g., by respective multiplications and then summing) with the "group" priority pattern (e.g., the representativeness scores for the second set of qualitative responses QR1-QR4 are 5.91, −2.10, −5.21, and 6.99, respectively, from Table XXV, above), the representativeness score for the selected participant (e.g., participant P1's representativeness score of −1.34) determined at step 1106 may be considered a result of a comparison between an "individual" priority pattern and a "group" priority pattern.

Having determined, at step 1106, how representative the "selected participant's" prioritizations are of the orientation defined by the seed qualitative responses and any extended seed qualitative responses (identified at step 1102A), the method 1100 may proceed to step 1108. According to program instructions implementing step 1108, the server device system 202 may be configured to determine whether the "selected participant's" representativeness determined at step 1106 is within a threshold range. If so, the "selected participant" (e.g., the participant selected at step 1104) is assigned to the present group at step 1110.

In some embodiments, the threshold value range is greater than zero, such that a representativeness score of greater than zero would place the "selected participant" in the present group. Accordingly, continuing with the above example, the representativeness score of −1.34 would be outside of the threshold value range and, therefore, the "selected participant" P1 would not be assigned to the present group. In this case, the method 1100 would proceed from step 1108 (NO) to step 1114 to determine if there are any further remaining participants, according to some embodiments. Of course, the example of Tables XV-XXV is just one example of many possible examples according to various embodiments of the present invention that is provided for illustration purposes. However, it should be noted that the present invention is not limited to the particular analysis of priority values performed in the example of Tables XV-XXV and is not limited to the particular method of assigning the "selected participant" to the present group. For example, the "selected participant" may be assigned to the present group if the representativeness score, rather than being greater than zero, is greater than the average representativeness score across all the "remaining participants".

To continue with the above example with respect to Tables XV-XXV, the server device system 202 would determine at step 1114 that participant P1 is not the last "remaining participant", because participants P2-P5 have not yet been selected. In this example, processing would proceed from step 1114 back to step 1104, where the next "remaining participant" would be selected as participant P2.

The representativeness scores, according to some embodiments, for qualitative responses QR1-QR4 are 5.91, −2.10, −5.21, and 6.99, respectively, from Tables XV-XXV, above, and the numbers of stars assigned by participant P2 to qualitative responses QR1-QR4 are 4, 2, 5, and 4, respectively, from Table XV, above. Upon the second iteration of step 1106, therefore, the representativeness score, according to some embodiments, for participant P2 is (5.91×4)+(−2.10×2)+(−5.21×5)+(6.99×4)=21.35. This large, positive representativeness score indicates that participant P2's prioritizations are highly representative of the orientation defined by the seed qualitative responses and any extended seed qualitative responses (identified at step 1102A). At step 1108, the server device system 202 would determine that the representativeness score of 21.35 would be inside of the threshold value range, i.e., greater than zero, and, therefore, in this example, the "selected participant" P2 would be assigned to the present group at step 1110. According to the method 1100, the "selected participant" assigned to the present group at step 1110 is removed from the population of remaining participants at step 1112 (like step 1012 in FIG. 10), e.g., by removing the assigned participant from the linked list of remaining participants. After removing the assigned participant (e.g., participant P2) from the population of remaining participants at step 1112, processing may proceed to step 1114.

Continuing with the above example, the server device system 202 may then determine that the participant P2 is not the last remaining participant at step 1114, and processing would proceed back to step 1104, where participant P3 is selected as the "next remaining participant". The loop from step 1104 to step 1114, and back to step 1104, is repeated for each remaining participant (e.g., participants P3, P4, and P5), according to some embodiments. In the example associated with Tables XV-XXV, according to some embodiments, participant P3 is assigned to the present group because it has an associated representativeness score of 39.78 (YES at the respective iteration of step 1108), participant P4 is not assigned to the present group because it has an associated representativeness score of −0.64 (NO at the respective iteration of step 1108), and participant P5 is assigned to the present group because it has an associated representativeness score of 33.87 (YES at the respective iteration of step 1108).

These representativeness scores are summarized in Table XXVI, below, indicating how representative each participant's pattern of prioritization of the "second" set of qualitative responses (e.g., QR1-QR4) is of the pattern of correlation between this "second" set of qualitative responses and the first set of qualitative responses identified at step 1102A.

TABLE XXVI

| Participant | Representativeness Score |
| --- | --- |
| P1 | −1.34 |
| P2 | 21.35 |
| P3 | 39.78 |
| P4 | −0.64 |
| P5 | 33.87 |

Upon reaching step 1114 with participant P5 as the selected participant (e.g., the "next remaining participant"), the server device system 202 determines that participant P5 is the last remaining participant at step 1114. In this regard, identification of the first group of participants (Participants P2, P3, and P5 in this example) is complete. This group of participants (and each group of participants concluded at step 1114 (YES), and possibly step 1115A (YES), discussed below, in some embodiments) provided respective associated priority values that are representative of an orientation defined by the seed qualitative responses and any extended seed qualitative responses (identified at step 1102A) within a first threshold range (e.g., a representativeness score greater than zero). Stated in another way, this group of participants (and each group of participants concluded at step 1114 (YES), and possibly step 1115A (YES), discussed below, in some embodiments) may be said to have an orientation represented by the seed qualitative responses and any extended seed qualitative responses, the orientation, e.g., being a tendency to prioritize highly (e.g., within the threshold range) the seed qualitative responses and any extended seed qualitative responses (which may be referred to as a set of highly correlated qualitative responses pursuant to, e.g., the above analyses described with respect to step 1102A). In this regard, it may be deemed, according to some embodiments, that the group-identifying-loop in method 1100 concluding with step 1114 (YES) (and step 1115A (YES), discussed below, in some embodiments) is an identifying of a respective group of the plurality of participants whose respective participants' associated priority values (e.g., embodied in each respective participant's above-discussed representativeness score from step 1106) exhibit a similarity with the "group" priority pattern (e.g., embodied in the qualitative response representativeness scores from step 1102B (e.g., Table XXV) within a threshold range (e.g., pursuant to step 1108 (YES)). As discussed in more detail below, one or more of the groups generated according to FIG. 11 (or FIG. 10) (or as further refined by step 906b in some embodiments), may be included in a visual presentation pursuant to step 910.

Upon a determination by the server device system 202 of "YES" at step 1114, processing may optionally proceed to step 1115A to determine whether the present group of participants should be retained. In some embodiments, at step 1115A, the server device system 202 may be configured to determine whether to retain the present group according to whether it meets a coherence criteria. In some embodiments, the present group is determined to be coherent, and is therefore retained, if the mutual excess connection score between the first pair of participant-evaluated seed qualitative responses identified at step 1102A is greater than a threshold, equal to the number of "remaining participants". Continuing the example of Table XX, the seed qualitative responses identified at step 1102A are QR1 and QR4, with a mutual excess connection score of 7.5, which is greater than the number of "remaining participants" of 5, so the present group is retained by the server device system 202 at step 1115A (YES), according to some embodiments.

Of course, this is just one example of many possible examples according to various embodiments of the present invention that is provided for illustration purposes only. Accordingly, it should be noted that the present invention is not limited to the particular criteria for determining whether to retain the present group in this example and is not limited to the particular method of determining whether the present group is coherent. For example, the present group may be retained on the first iteration of step 1115A regardless of its coherence, and the threshold for determining whether the present group is coherent on subsequent iterations through the loop may be set to a fixed percentage of the mutual excess connection score between the first pair of participant-evaluated seed qualitative responses identified at step 1102A on the first iteration through the loop. For another example, the present group may be retained, regardless of its coherence, until a predetermined number of groups, e.g., three groups, have been defined. Alternatively, step 1115A may be omitted entirely, so that the present group is always retained.

If it is determined at step 1115A that the present group should not be retained, e.g., is not sufficiently coherent (e.g., a NO at step 1115A), method 1100 may proceed to step 1115B, at which the present group is discarded by the server device system 202, and then the server device system 202 may be configured to terminate the method 1100 at step 1118, even though some participants have not been assigned to a group. On the other hand, if it is determined at step 1115A that the present group should be retained, e.g., is sufficiently coherent (e.g., a YES at step 1115A), then method 1100 may proceed to step 1116, which is associated with program instructions which configure the server device system 202, according to some embodiments, to determine whether or not all participants have been assigned to a group, as was described above with respect to step 1016.

If all participants have not been assigned to a group, as determined at step 1116, processing may proceed to step 1120, at which a next group is created by the server device system 202, and "remaining participants" are reinitialized by the server device system 202 to include all participants that have not yet been assigned to a group at step 1122, pursuant to the above descriptions of steps 1020 and 1022 in FIG. 10. However, it should be noted that, according to some embodiments of method 1100, step 1122 leads to step 1102A, where a new "first" set of qualitative responses is prepared at step 1102A from, e.g., those qualitative responses evaluated at step 330 by the newly reinitialized "remaining participants". This new "first" set of qualitative responses leads to a new determination at step 1102B of how correlated each qualitative response in a new "second" set of qualitative responses (e.g., those evaluated at step 330 by the "remaining participants") is to each qualitative response in the new "first" set of qualitative responses from step 1102A, according to some embodiments. In this regard, the loop of steps 1102A to 1122 and back to 1102A repeats, according to some embodiments, until either all participants have been assigned to a group pursuant to step 1116 or it is determined that a newly-completed group should not be retained, e.g., is not sufficiently coherent, pursuant to step 1115A.

Of course, the example of Tables XV-XXVI is just one example of many possible examples according to various embodiments of the present invention that is provided for illustration purposes only. Accordingly, it should be noted that the present invention is not limited to the particular analysis of priority values performed in the example of Tables XV-XXVI and is not limited to the particular method of assigning participants to groups or cohorts based on the representativeness of qualitative responses and participants.

Further, it should be noted that the example of Table IX, above, is an example of a determination of group-association-values between qualitative responses and groups and associating qualitative responses with groups (e.g., as part of step 906c in some embodiments) after associating participants with groups (e.g., as part of step 906b in some embodiments). However, group-association-values between qualitative responses and groups may be determined and qualitative responses may be associated with groups without any association of participants with groups in some embodiments. For instance, although method 1100 and the example of Tables XV-XXVI, as described above, associate participants with groups, according to some embodiments, method 1100 and the example of Tables XV-XXVI may be adapted, according to some embodiments, to associate qualitative responses with groups, based on an analysis of priority patterns (e.g., as part of step 906c in some embodiments), without any association of participants with groups.

For example, the server device system 202, at step 1101, may instead initialize "remaining qualitative responses" to include some or all qualitative responses generated at step 312, according to some embodiments. At step 1102A, in some embodiments, a set or "first" set of the participant-evaluated qualitative responses is identified by the server device system 202, as discussed in the example of Tables XV-XXVI, above, from the "remaining qualitative responses". At step 1102B, in some embodiments, a representativeness score is calculated for each particular qualitative response of a set (e.g., a "second" set) of the "remaining qualitative responses", indicating how representative each qualitative response is of the first set of qualitative responses identified at step 1102A, like the representativeness scores summarized in Table XXV, above.

The server device system 202 may then be configured to execute a loop, corresponding to the loop of steps 1104-1114, except that, instead of assigning participants to groups, the loop may assign qualitative responses to groups, according to some embodiments. Accordingly, at step 1104, a "next remaining qualitative response" may be identified or selected. Step 1106 may be omitted, according to some embodiments, since the server device system 202 has already, at step 1102B, determined how representative each qualitative response is of the first set of qualitative responses identified at step 1102A. At step 1108, it is determined by the server device system 202 whether the "selected qualitative response's" representativeness determined at step 1102A is within a threshold range. If so, the "selected qualitative response" (e.g., the qualitative response selected at step 1104) is assigned to the present group at step 1110 and removed from the "remaining qualitative responses" at step 1112, according to some embodiments. In some embodiments, the threshold value range is greater than zero, such that a representativeness score of greater than zero would place the "selected qualitative response" in the present group. Accordingly, continuing with this adaptation of the example of Tables XV-XXVI, in the first iteration of steps 1104-1114, the "selected qualitative response" may be QR1, and the representativeness score for this "selected qualitative response", i.e., 5.91, from Table XXV, would be inside of the threshold value range, i.e., greater than zero, and, therefore, in this example, the "selected qualitative response" QR1 would be assigned to the present group at step 1110 and removed from the "remaining qualitative responses" at step 1112.

At step 1114, instead of determining if there are any further remaining participants, the adapted method 1110 may determine if there are any further remaining qualitative responses, according to some embodiments. To continue with the above example with respect to Tables XV-XXVI, the server device system 202 would determine at step 1114 that qualitative response QR1 is not the last remaining qualitative response, because qualitative responses QR2-QR4 have not yet been selected. In this example, processing would proceed from step 1114 back to step 1104, where the next "remaining qualitative response" would be selected as qualitative response QR2.

In the second iteration of adapted steps 1104-1114, the representativeness score for the "selected qualitative response" QR2, i.e., −2.10, from Table XXV, would be outside of the threshold value range and, therefore, in this example, the "selected qualitative response" QR2 would not be assigned to the present group or removed from the "remaining qualitative responses". In this case, the adapted method 1100 would proceed from step 1108 (NO) to step 1114 to determine if there are any further remaining qualitative responses, according to some embodiments. The loop from step 1104 to step 1114, and back to step 1104, is repeated for each remaining qualitative response (e.g., QR3 and QR4), according to some embodiments. In the example of Tables XV-XXVI, qualitative response QR3 is not assigned to the present group because it has an associated representativeness score of −5.21, from Table XXV (NO at the respective iteration of step 1108), and qualitative response QR4 is assigned to the present group because it has an associated representativeness score of 6.99, from Table XXV (YES at the respective iteration of step 1108), according to some embodiments.

In the fourth iteration of adapted steps 1104-1114, qualitative response QR4 is identified as the last remaining qualitative response at step 1114 (NO). Steps 1115A and 1115B may be omitted, according to some embodiments, and the adapted method 1100 may proceed to step 1116. At step 1116, instead of determining whether or not all participants have been assigned to a group, the adapted method 1100 may determine whether or not all qualitative responses have been assigned to a group, according to some embodiments. If all qualitative responses have not been assigned to a group, as determined at adapted step 1116, processing may proceed to step 1120, at which a next group is created by the server device system 202, and "remaining qualitative responses" are reinitialized by the server device system 202 to include all qualitative responses that have not yet been assigned to a group at step 1122. In the example of Tables XV-XXVI, qualitative responses QR1 and QR4 would be assigned to a first group, and further iterations through the loop of steps 1102A-1122 would assign qualitative responses QR2 and QR3 to a further group or groups.

In some embodiments, the adapted method 1100, having associated qualitative responses with groups, may be extended to determine group-association-values between qualitative responses and groups (e.g., as part of step 906c in some embodiments), without any association of participants with groups. For example, in each iteration through the loop of adapted steps 1102A-1122, the server device system 202 may determine, according to program instructions, a representativeness score for each of the plurality of participant-evaluated qualitative responses evaluated at step 330, in some embodiments, in addition to determining a representativeness score (e.g., as part of step 1102B in some embodiments) for each particular qualitative response of a set (e.g., a "second" set) of the "remaining qualitative responses". According to some embodiments, the server device system 202 may determine a group-association-value between each of the plurality of participant-evaluated qualitative responses evaluated at step 330 and the "present group" (e.g., as part of step 1102B in some embodiments) from the representativeness score for the respective qualitative response according to the function arctan([representativeness score])/$\pi$+½, in some embodiments, where arctan is the inverse tangent function giving a result in radians.

To continue with the above example with respect to Tables XV-XXVI, in the first iteration through the loop of adapted steps 1102A-1122, the server device system 202 would determine that the representativeness scores for qualitative responses QR1-QR4 are 5.91, −2.10, 5.21, and 6.99, respectively, from Table XXV, according to some embodiments. Therefore, according to some embodiments, the group-association-value between qualitative response QR1 and the "present group", i.e., the group defined in the first iteration, would be arctan(5.91)/$\pi$+½, i.e., 0.95, if rounded to two decimal places, indicating that qualitative response QR1 is closely associated with the present group. The group-association-value between qualitative response QR2 and the "present group" would be arctan(−2.10)/$\pi$+½, i.e., 0.14, if rounded to two decimal places, indicating that qualitative response QR2 is not closely associated with the present group, according to some embodiments. Further, according to some embodiments, the group-association-value between qualitative response QR3 and the "present group" would be arctan(−5.21)/$\pi$+½, i.e., 0.06, if rounded to two decimal places, indicating that qualitative response QR3 is not closely associated with the present group, and the group-association-value between qualitative response QR4 and the "present group" would be arctan(6.99)/$\pi$+½, i.e., 0.95, if rounded to two decimal places, indicating that qualitative response QR4 is closely associated with the present group. Similarly, in each further iteration through the loop of adapted steps 1102A-1122, the server device system 202 would determine, according to some embodiments, a representativeness score for each of the qualitative responses QR1-QR4, and determine group-association-values between each of the qualitative responses QR1-QR4 and the "present group", i.e., the group defined in the respective iteration, from the representativeness score for the respective qualitative response.

Of course, the adaptations of the example of Tables XV-XXVI above are just some adaptations of many possible adaptations according to various embodiments of the present invention that are provided for illustration purposes only. Accordingly, it should be noted that the present invention is not limited to the particular analysis of priority values performed in the example of Tables XV-XXVI, and other methods may be used to determine group-association-values between qualitative responses and groups and associate qualitative responses with groups (e.g., as part of step 906c in some embodiments) without any association of participants with groups.

Having concluded the above-discussion of a modified version of method 1100, which may associate qualitative responses to groups independent of an association of participants with groups, we return to the original above-discussed method 1100, which associates participants with groups. In this context, each iteration of step 1102A of method 1100 may identify seed qualitative responses and any extended seed qualitative responses specifically tailored to identify a group of participants that has a different orientation than every other group. For example, if it is desired to identify two groups of participants with opposing orientations, a first iteration of step 1102A may identify a "first" set of qualitative responses as two or more seed qualitative responses and any extended seed qualitative responses that are tailored to identify a first group of participants of a first orientation (via the first iteration of method 1100 through step 1114 (YES) (and optionally step 1115A (YES)), and a second iteration of step 1102A may identify a "second" set of qualitative responses as two or more seed qualitative responses and any extended seed qualitative responses tailored to identify a second group of participants of a second orientation (via the second iteration of method 1100 through step 1114 (YES) (and optionally step 1115A (YES)) opposite the first orientation. In embodiments such as these, each "present group" may be retained at step 1115A of method 1100, regardless of its coherence, until a predetermined number of groups of participants have been defined. In this regard, two or three or more groups of different orientations may be defined according to the method of 1100, in some embodiments.

The two or more seed qualitative responses for each group of participants may be selected by an analyst (which may be or may not be associated with an originator operating originator device 204 in FIG. 3) to reflect predetermined orientations, in some embodiments. The predetermined orientation may be a tendency to highly prioritize, within a defined threshold range, the selected seed qualitative responses and any associated extended seed qualitative responses. For example, within a process in which participants evaluate qualitative responses to open-ended inquiries about a wider issue, such as a budget, the analyst may seek to determine participants' orientations on a narrower issue, such as whether to include a particular item in the budget, e.g., funds for the construction of a sports stadium. The analyst may seek to assign participants to two groups, one reflecting the orientation "in favor of funding the construction of a sports stadium", the other reflecting the opposite orientation "against funding the construction of a sports stadium". For each of these pre-determined orientations, the analyst may select two or more seed qualitative responses (e.g., as input to the server device system 202 for step 1102A) that are highly likely to resonate with participants of that orientation. For example, the analyst may select, as a first set of qualitative responses for a first iteration of step 1102A to identify a first group of participants of a first orientation, seed qualitative responses "Our community must have a stadium" and "I will only support the budget if it includes the stadium" for the first orientation "in favor of funding the construction of a sports stadium". The analyst may select, as a second set of qualitative responses for a second iteration of step 1102A to identify a second group of participants of a second orientation opposite the first orientation, seed qualitative responses "The stadium is too expensive" and "It's wrong to spend money on a stadium when there are so many other more important items" for the second, opposite orientation "against funding the construction of a sports stadium". Accordingly, the respective sets of seed qualitative responses may be mutually exclusive, but need not be in all cases, according to some embodiments. In view of the above-discussion, the server device system 202 executing the method 1100 with these respective sets of seed qualitative responses, may identify the first group of the plurality of participants whose respective participants' associated priority values exhibit a similarity with a first "group" priority pattern within a first threshold range (e.g., step 1108), and the second group of the plurality of participants whose respective participants' associated priority values exhibit a similarity with a second "group" priority pattern within a second threshold range (e.g., step 1108) in at least the manners discussed above, according to some embodiments. These first and second threshold ranges may be the same or different according to various embodiments. These first and second groups may be visually presented to a user at step 910 (e.g., pursuant to a user interface display like at least 1200 in FIG. 12 or any other user interface display described herein, for example, the user interface displays of FIGS. 13-17, 19-25, and 27), according to some embodiments.

In some cases, the analyst may seek to assign participants to two or more groups that reflect orientations that are not opposites. For example, the analyst may seek to assign participants to three groups, one reflecting the orientation "in favor of funding the construction of a sports stadium", a second reflecting the orientation "in favor of funding the renovation of elementary schools" and a third reflecting the orientation "in favor of spending less". In this example, the analyst may select seed qualitative responses (e.g., as a first set of seed qualitative responses for a first iteration of step 1102A to identify a respective first group of participants) "Our community must have a stadium" and "I will only support the budget if it includes the stadium" for the orientation "in favor of funding the construction of a sports stadium", seed qualitative responses (e.g., as a second set of seed qualitative responses for a second iteration of step 1102A to identify a respective second group of participants) "Our elementary schools need more money for repairs" and "The focus of this budget must be spending on elementary schools" for the second orientation "in favor of funding the renovation of elementary schools", and seed qualitative responses (e.g., as a third set of seed qualitative responses for a third iteration of step 1102A to identify a respective third group of participants) "We're already spending too much money" and "The budget includes too many items we can't afford" for the third orientation "in favor of spending less". Of course, this process may be extended to four or more orientations, groups, and respective sets of seed qualitative responses, with the respective groups being visually presented at step 910 (e.g., pursuant to a user interface display like at least 1200 in FIG. 12 or any other user interface display described herein, for example, the user interface displays of FIGS. 13-17, 19-25, and 27, according to some embodiments. Although the above examples refer to respective sets of seed qualitative responses as having two seed qualitative responses per set, it should be noted that three or more seed qualitative responses may be selected for each iteration of step 1102A, according to some embodiments.

Another consideration that may influence the analyst's choice of seed qualitative responses may be that the seed qualitative responses for each group of participants be highly connected. In this case, the analyst may refer to the connection score determined by the server device system 202 that is, in some embodiments, calculated between each qualitative response and each other qualitative response, as in example of Tables XV-XVIII. For example, the qualitative responses "Our community must have a stadium" and "I will only support the budget if it includes the stadium" may have a high connection score, indicating that many participants who assigned high priority values to the one qualitative response also assigned high priority values to the other. These two qualitative responses may therefore prove effective seed qualitative responses for the server device system 202 at step 1102A for the orientation "in favor of funding the construction of a sports stadium", giving rise to a coherent group that may include many of the participants who assigned high priority values to both seed qualitative responses. However, the qualitative responses "Our community must have a stadium" and "I would like to see more projects funded in the budget" may have a low connection score, indicating that few participants who assigned high priority values to the one qualitative response also assigned high priority values to the other. This circumstance may be because participants who assigned high priorities to the latter qualitative response did not have a sports stadium in mind when they assigned a high priority to funding more projects. These two qualitative responses may therefore prove ineffective seed qualitative responses for the orientation "in favor of funding the construction of a sports stadium", giving rise to an incoherent group that may include the disparate participants who assigned high priority values to one or the other seed qualitative responses, but not both.

In this regard, it can be seen that, in some embodiments of FIG. 11, step 1102A includes the server device system 202 identifying the "first" set of qualitative responses on its own accord as discussed above, with respect to at least Tables XV to XX (and the accompanying description regarding identifying seed qualitative responses and extended seed qualitative responses). In some embodiments, the "first" set of qualitative responses may be identified by the server device system 202 based at least in part on user-input (e.g., a user-selection), such as input from an originator or analyst via an originator device 204 that identifies at least seed qualitative responses for step 1102A. Extended seed qualitative responses may also be identified based at least on user-input, or the server device system 202 may be configured to identify extended seed qualitative responses according to the procedures discussed above, but from user-defined seed qualitative responses.

Of course, the invention is not limited to any particular method of selecting two or more seed qualitative responses or extended seed qualitative responses for each group of participants, and the considerations discussed above are merely examples.

FIGS. 10 and 11, discussed above, provide examples of how initial groups of participants may be identified, e.g., at least at step 906a in FIG. 9, in some embodiments. In some embodiments, participants may be reassigned to groups based on an analysis of priority patterns, iterative or otherwise, e.g., at least at step 906b in FIG. 9, as discussed above. In some embodiments, groups of qualitative responses may be identified, e.g., at least at step 906c in FIG. 9, in some embodiments, in addition to or in lieu of identifying groups of participants.

Having identified groups according to step 906, the server device system 202 may be configured according to program instructions implementing step 910 to cause, via its input-output device system (e.g., input-output device system 120), visual presentation of at least some information regarding all or part of at least one of the groups identified at step 906.

For example, in some embodiments where a plurality of groups of participants are identified at step 906, step 910 may include the server device system 202 facilitating, via its input-output device system (e.g., input-output device system 120), visual presentation of at least one group of the plurality of groups of participants identified according to step 906. The visual presentation may include at least a cluster of visual representations of the participants in at least the one group.

Figure 12:
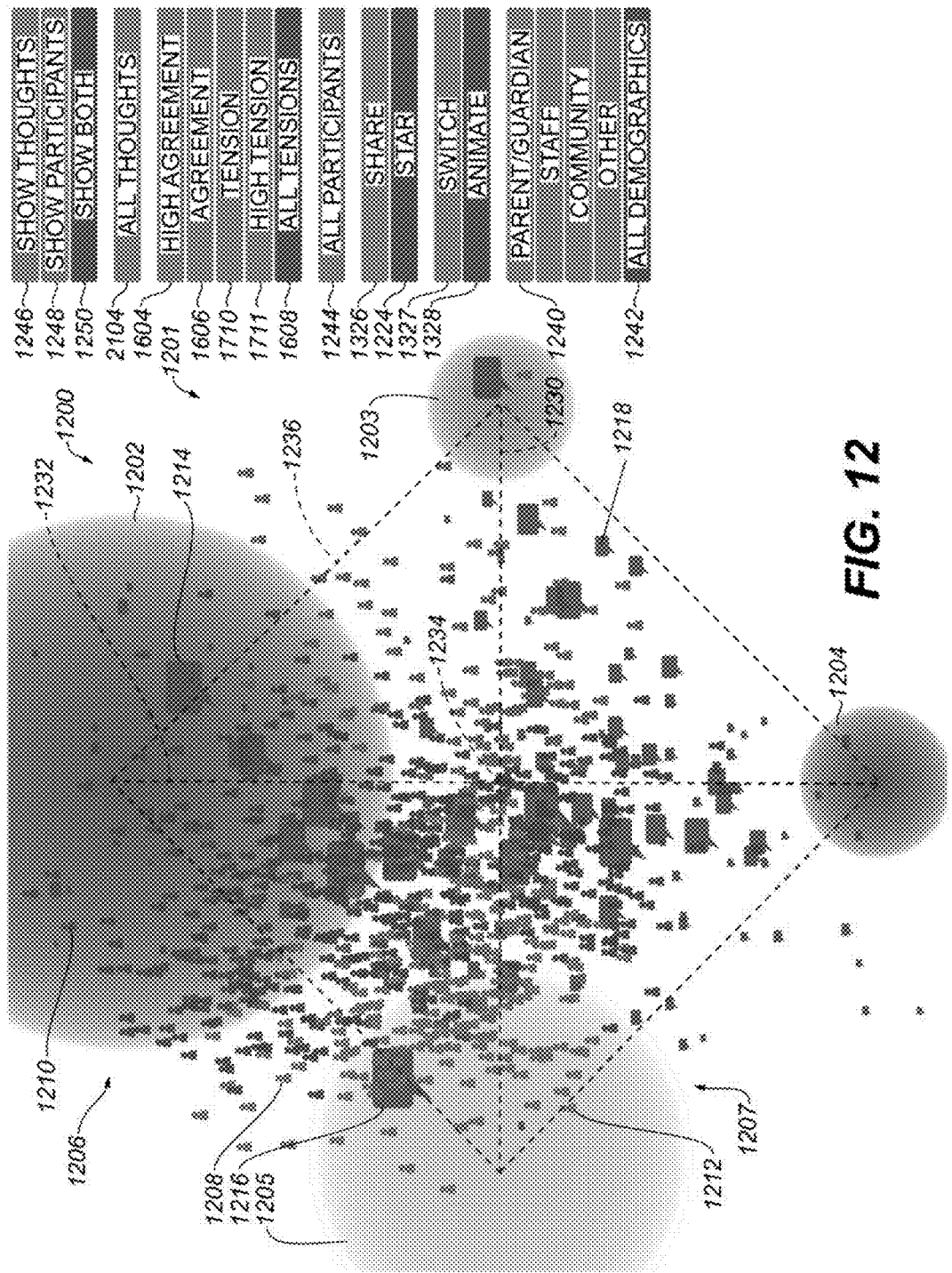
FIG. 12 illustrates a significant visualization presented via a user interface display or graphical user interface that provides visual representations of groups of participants and qualitative responses, according to some embodiments of the present invention.

In this regard, FIG. 12 illustrates an example of a user interface display 1200, which visually presents information regarding results of the analysis performed at step 906, according to some embodiments of the present invention. In some embodiments, the server device system 202 is configured by program instructions to facilitate, via a display device system of the input-output device system 120 of the server device system 202, visual presentation of the user interface display 1200 (as well as the user interface displays shown in FIGS. 13-17, 19-25, and 27).

In the user interface display 1200, a plurality of the groups 1202-1205 identified, e.g., according to step 906, are visually presented, according to some embodiments. The location of any or all groups (e.g., 1202-1205) in the user interface display 1200 may be randomly generated or otherwise defined. For example, the locations of the groups may be defined to have equal spacing between geometric centers of the groups. In the example of FIG. 12, the geometric centers of the groups 1202-1205 are equally spaced, and since there are four groups 1202-1205 in FIG. 12, such geometric centers are located on the points of a four-pointed diamond 1236. Further in this regard, the geometric centers of the groups 1202-1205 in FIG. 12 are also located on respective X and Y axes 1230, 1232 of a two-dimensional plot, according to some embodiments. In particular, the geometric center of group 1202 is located on the positive side of the Y axis 1232, the geometric center of group 1203 is located on the positive side of the X axis 1230, the geometric center of group 1204 is located on the negative side of the Y axis 1232, and the geometric center of group 1205 is located on the negative side of the X axis 1230. Such an arrangement may be beneficial at least when identifying groups of opposing or different orientations, as discussed above with respect to FIG. 11, according to some embodiments. For example, each of the groups 1202-1205 in FIG. 12 may represent a different orientation as discussed above with respect to FIG. 11, according to some embodiments. In some embodiments, opposing groups on positive and negative sides of the same axis may represent opposite orientations (e.g., group 1202 could be configured to represent a first orientation, group 1204 could be configured to represent a second orientation opposite the first orientation, group 1203 could be configured to represent a third orientation, and group 1205 could be configured to represent a fourth orientation opposite the third orientation, pursuant to the above-discussion with respect to FIG. 11, according to some embodiments). In this regard, it should be noted that the invention is not limited to the number of groups or axes shown in FIG. 12 (or any other user interface display described herein, for example, the user interface displays of FIGS. 13-17, 19-25, and 27), and any number of groups may be visually represented. For instance, if it is desired to identify only two groups with opposite orientations, as discussed above with respect to some embodiments of FIG. 11, the user interface display 1200 may instead include a single axis (1230 or 1232, but not both in some embodiments) of a one-dimensional plot, where a visual representation of a group having a first orientation is located along a positive side of the single axis and a visual representation of a second group having a second orientation opposite the first orientation is located along a negative side of the single axis. It should also be noted that one or more of the broken-line illustrations of the four-pointed diamond 1236, the X-axis 1230, and the Y-axis 1232 may be but need not be visually presented in the user interface display 1200, and may just be shown in FIG. 12 for purposes of illustrating to the reader of this document the spatial relationships of the groups 1202-1205.

In some embodiments, the visual presentation of groups 1202-1205 includes visual representations of closed shapes, which, in this example, are circles or spheres each including a color gradient that decreases in color intensity from a geometric center of the circle or sphere towards an exterior edge of the circle or sphere. However, other shapes besides circles or spheres or even closed shapes may be implemented. For example, while closed shapes may be preferable in some embodiments, as they may provide a continuous boundary that may be easier for a viewer to demarcate, non-closed shapes may still be effective and may also be implemented, according to some embodiments. According to some embodiments, the size of the shape representing a group is proportional to the number of participants in the group or at least associated with the group within a threshold value range.

In some embodiments, the visual presentations of groups 1202-1205 include respective clusters of visual representations of participants in the respective group. For example, cluster 1206 represents visual representations of participants (e.g., including visual representation 1210 of a particular participant) that are associated at least with group 1202. In this regard, in the example of FIG. 12, the cluster 1206 of visual representations of participants are displaced from the center 1234 of the visualization region 1201 of the user interface display 1200 (as distinguished from the geometric center of the closed shape 1202) towards the closed shape of group 1202. The visualization region 1201 may represent a region of the user interface display 1201 where the groups (e.g., 1202-1205), visual representations of participants (e.g., 1210 etc.), the visual representations of qualitative responses (e.g., 1214 etc.), or a combination of some or all of the groups, visual representations of participants, and visual representations of qualitative responses are displayed. In the example of FIG. 12, cluster 1207 represents visual representations of participants (e.g., including visual representation 1212 of a participant) that are displaced from the center 1234 of the visualization region 1201 towards the closed shape of group 1205. In some embodiments, groups are not represented by shapes at all, and, in at least some of these embodiments, the groups may be represented by the respective clusters (1206, 1207, etc.) without the display of shapes 1202-1205.

In light of the above-discussion, in some embodiments, the visual presentation of user interface display 1200 may include at least a cluster (e.g., 1206) of visual representations of participants in a group (e.g., 1202), as well as at least a visual representation of at least one participant (e.g., 1208), that is not in the group (e.g., 1202), visually separated from the cluster (e.g., 1206). In some embodiments, such visual separation may be that the at least one participant (e.g., 1208) is visually presented outside of the closed shape of the group (e.g., 1202).

In this regard, in some embodiments, the visual presentation of user interface display 1200 may include a first cluster (e.g., 1206) of visual representations of participants in a first group (e.g., 1202), as well as a second cluster (e.g., 1207) of visual representations of participants in a second group (e.g., 1205), with at least a visual representation of at least one participant (e.g., 1208), that is not in either of the groups (e.g., 1202, 1205), visually separated from the clusters (e.g., 1206, 1207).

According to some embodiments, the location of the visual representations of participants (e.g., 1208, 1210, 1212) in the user interface display 1200 may be determined by the server device system 202 based at least on an analysis of the respective participant's above-discussed group-association-values (which may be deemed resonance values indicating an amount that the respective participant resonates with the respective groups of participants, according to some embodiments) with respect to at least each of the displayed groups (e.g., groups 1202-1205).

For example, assume that a participant "P.A1" is represented by visual representation 1212 in FIG. 12. Also assume that group 1202 is "Group A", group 1203 is "Group B", group 1204 is "Group C", and group 1205 is "Group D". Also assume that participant "P.A1" has the following group-association-values for these groups shown in Table XXVII:

TABLE XXVII

| Participant | Group-Association-Value for Group A | Group-Association-Value for Group B | Group-Association-Value for Group C | Group-Association-Value for Group D |
|---|---|---|---|---|
| P.A1 | 0.01 | 0.03 | 0.06 | 0.90 |

In this example, each group-association-value must be between zero and one, inclusive, with a group-association-value closer to one indicating stronger association, according to some embodiments. Also, the sum of all group-association-values for a particular participant is one in this example. However, different group-association-value characteristics may be used. For instance, if the difference-value-sets discussed above with respect to Tables X-XIV are implemented as group-association-values, the server device system 202 may be configured to convert such difference-value-sets into group-association-values between zero and one, inclusive, according to some embodiments. For example, a difference-value-set may be calculated, as discussed above, for between each participant and each group that is ultimately identified (e.g., from step 906a, 906b, or both). In this regard, difference-value-sets generated, e.g., according to the process described above with respect to Table XIV, may be converted by the server device system 2020 to group-association-values according to the function (1−([difference value]/[number of qualitative responses])). For instance, for the 3 qualitative responses in the example of Tables X-XIV, a difference value of 0.72 would be converted to a group association value of 0.76.

In the example of Table XXVII, the respective group-association-values may be leveraged to generate X- and Y-axis shifts, assuming that the geometric center 1234 of the visualization region 1201 is an origin, and the geometric center of "Group A" (e.g., 1202) is located on the positive-Y-axis-side of axis 1232, the geometric center of "Group B" (e.g., 1203) is located on the positive-X-axis-side of axis 1230, the geometric center of "Group C" (e.g., 1204) is located on the negative-Y-axis-side of axis 1232, and the geometric center of "Group D" (e.g., 1205) is located on the negative-X-axis-side of axis 1230, with the geometric center of each group an equal distance from the origin 1234, according to some embodiments. (It should be noted that the X-axis 1230, the Y-axis 1232, and the origin 1234 need not be displayed and may just be present in FIG. 12 to illustrate the locations of various items that are displayed.)

Accordingly, the group-association-value of 0.90 for "Group D" (e.g., 1202) indicates a strong association between participant P.A1 and "Group D" (e.g., 1205), which may cause the server device system 202 to generate a strong negative X-axis shift for the visual representation 1212 of participant "P.A1" toward "Group D" (e.g., 1205). In the example of Table XXVII, since the group-association-value for "Group C" (e.g., 1204) is greater than the group-association-value for "Group A" (e.g., 1202), the server device system 202 may be configured to cause a negative Y-axis shift toward "Group C" (e.g., 1204) away from "Group A" (e.g., 1202). Similarly, the group-association-value for "Group B" (e.g., 1203) may temper the negative X-axis shift caused by the group-association-value for "Group D" (e.g., 1205), but since the group-association-value for "Group B" (e.g., 1203) is small, the tempering effect may be small.

According to some embodiments, if a group-association-value is very small or nil for one group, and a group-association-value is very large for an opposing group, the server device system 202 may be configured to cause the visual representation of the corresponding participant to be placed beyond the geometric center of the opposing group. For example, visual representation 1210 of a participant is beyond (in the above-discussed positive Y-axis direction) the geometric center of group 1202, which may indicate that visual representation 1210 is for a participant that has a group-association-value indicating a very strong association with group 1202, but that the participant has another associated group-association-value indicating a very weak or no association with group 1204, according to some embodiments.

Recalling that group-association-values may be determined based on a relationship between "individual" priority patterns and "group" priority patterns, it can be seen that, in some embodiments, the visual representation (e.g., 1208) of a participant may be visually located between a first cluster (e.g., 1207) or group (e.g., 1205) and a second cluster (e.g., 1206) or group (e.g., 1202) at a position in the visualization region 1201, with respect to the first cluster or group and the second cluster or group, that is consistent at least with: (a) a first relationship between a participant or individual priority pattern associated with the participant and a first group priority pattern associated with the first cluster or group, and (b) a second relationship between the participant or individual priority pattern and a second group priority pattern associated with the second cluster or group. The participant or individual priority pattern may be a priority pattern of a first set of priority values associated with qualitative responses and the one participant. The first group priority pattern may be a priority pattern of a second set of priority values associated with qualitative responses associated with the first cluster or group. The second group priority pattern may be a priority pattern of a third set of priority values associated with qualitative responses associated with the second cluster or group.

Table XXVIII, below, illustrates an example of a determination of locations of visual representations of participants in a user interface display (e.g., 1200), based on an analysis of the respective participant's group-association-values with respect to the groups. Continuing with the example of Tables VI-VIII, above, recall that a final set of group-association-values for each of the participants P1-P7 and each of the Groups A, B, and C were determined, according to Table VIII, above. In this example, the respective group-association-values (e.g., from Table VIII) may be leveraged to generate X- and Y-axis shifts, assuming that the geometric center 1234 of the visualization region 1201 is an origin.

The geometric center of each of the Groups A, B, and C may be equally spaced around the circumference of a unit circle, i.e., a circle of radius 1, centered on the origin, with the geometric center of Group A located at the intersection of the circumference of a unit circle and the positive Y axis, Group B located 120° counterclockwise around the circumference of the unit circle from Group A, and Group C located 120° clockwise around the circumference of the unit circle from Group A. Using the vector notation (x, y) to indicate a location at position x on the X-axis and position y on the Y-axis, the locations of Groups A, B, and C are therefore (0, 1), (−0.87, −0.5) and (0.87, −0.5), with coordinates rounded to two decimal places. Note that the units used throughout this example may be different and may be scaled as required for a particular user interface display. For example, if the visual presentation is to be shown on a user interface display of size 1000 pixels×1000 pixels, the units used throughout this example may be multiplied by 400 pixels, so that the unit circle, i.e., the circle of radius 1, is scaled to a circle of radius 400 pixels.

A displacement from the origin 1234 towards the geometric center of each of the groups in the user interface display may be determined for each of the participants, equal to the respective participant's group-association-value with respect to the respective group multiplied by the vector location of the respective group, in some embodiments. In this example, the group-association-value for participant P6 and Group A is 0.08, from Table VIII, above. Recall that the location of Group A is (0, 1) in vector notation. Therefore, the X, Y displacement, according to some embodiments, for participant P6 and Group A is 0.08×(0, 1)=(0, 0.08), in vector notation, as shown in Table XXVIII, below, using scalar×vector multiplication, known in the art. Similarly, the group-association-value for participant P6 and Group B is 0.13, from Table VIII, above, and the location of Group B is (−0.87, −0.5), so the displacement for participant P6 and Group B is 0.13×(−0.87, −0.5)=(−0.11, −0.06), if rounded to two decimal places, as shown in Table XXVIII, below. The group-association-value for participant P6 and Group C is 0.75, from Table VIII, above, and the location of Group C is (0.87, −0.5), so the displacement for participant P6 and Group C is 0.75×(0.87, −0.5)=(0.65, −0.38), if rounded to two decimal places.

The location of the visual representation of a participant in the user interface display may be equal to the total of the displacements for the respective participant and each of the groups, in some embodiments. In this example, the displacements for participant P6 and Groups A, B, and C are (0, 0.08), (−0.11, −0.06) and (0.65, −0.38), respectively, so the total displacement for participant P6 is (0, 0.08)+(−0.11, −0.06)+(0.65, −0.38)=(0.54, −0.35), using standard vector addition, as shown in Table XXVIII, below. Therefore, the location of the visual representation of participant P6 in the user interface display (e.g., 1200) in this example is position 0.54 on the X-axis (e.g., 1230) and position −0.35 on the Y-axis (e.g., 1232). This places participant P6 displaced towards the geometric center of Group C at location (0.87, −0.5), reflecting the high group-association-value for participant P6 and Group C, i.e., 0.75, away from the geometric centers of Groups A and B, reflecting the low group-association-values for participant P6 and Groups A and B, i.e., 0.08 and 0.13 respectively.

Continuing with the example of Table XXVIII, the group-association-value for participant P4 and Groups A, B, and C are 0.67, 0.63, and 0, respectively, from Table VIII, above. Recall that the locations of Groups A, B, and C are (0, 1), (−0.87, −0.5) and (0.87, −0.5), respectively. Therefore, the displacements for participant P4 and Groups A, B, and C are 0.67×(0, 1)=(0, 0.67), 0.63×(−0.87, −0.5)=(−0.54, −0.31) and 0×(0.87, −0.5)=(0, 0), respectively, if rounded to two decimal places, and the total displacement for participant P4 is (0, 0.67)+(−0.54, −0.31)+(0, 0)=(−0.54, 0.35), if rounded to two decimal places, as shown in Table XXVIII, below. Therefore, the location of the visual representation of participant P4 in the user interface display in this example is position −0.54 on the X-axis and position 0.35 on the Y-axis. This places participant P4 displaced towards a position between the geometric centers of Groups A and B at locations (0, 1) and (−0.87, −0.5), respectively, reflecting the high group-association-values for participant P4 and Groups A and B, i.e., 0.67 and 0.63, respectively, and away from the geometric center of Group C, reflecting the low group-association-value for participant P4 and Group C, i.e., 0.

The locations of the visual representations of each of the other participants in the user interface display may be determined by the server device system at step 910 in this manner, as shown in Table XXVIII, below.

TABLE XXVIII

| Participant | Displacement for Group A | Displacement for Group B | Displacement for Group C | Total Displacement |
|---|---|---|---|---|
| P1 | (0, 0.5) | (−0.32, −0.19) | (0.22, −0.13) | (−0.11, 0.19) |
| P2 | (0, 0.58) | (−0.54, −0.31) | (0.65, −0.38) | (0.11, −0.1) |
| P3 | (0, 0.33) | (−0.32, −0.19) | (0, 0) | (−0.32, 0.15) |
| P4 | (0, 0.67) | (−0.54, −0.31) | (0, 0) | (−0.54, 0.35) |
| P5 | (0, 0.58) | (−0.54, −0.31) | (0.22, −0.13) | (−0.32, 0.15) |
| P6 | (0, 0.08) | (−0.11, −0.06) | (0.65, −0.38) | (0.54, −0.35) |
| P7 | (0, 0.17) | (−0.11, −0.06) | (0, 0) | (−0.11, 0.1) |

In some embodiments, the visual presentation of each respective group in the user interface display includes a visual representation of a closed shape, and the visual representations of each respective participant is located within the closed shape for the group with which the respective participant is associated, e.g., the group to which the respective participant is assigned based on an analysis of priority patterns, iterative or otherwise, e.g., at least at step 906*b* in FIG. 9, as discussed above.

Figure 24:
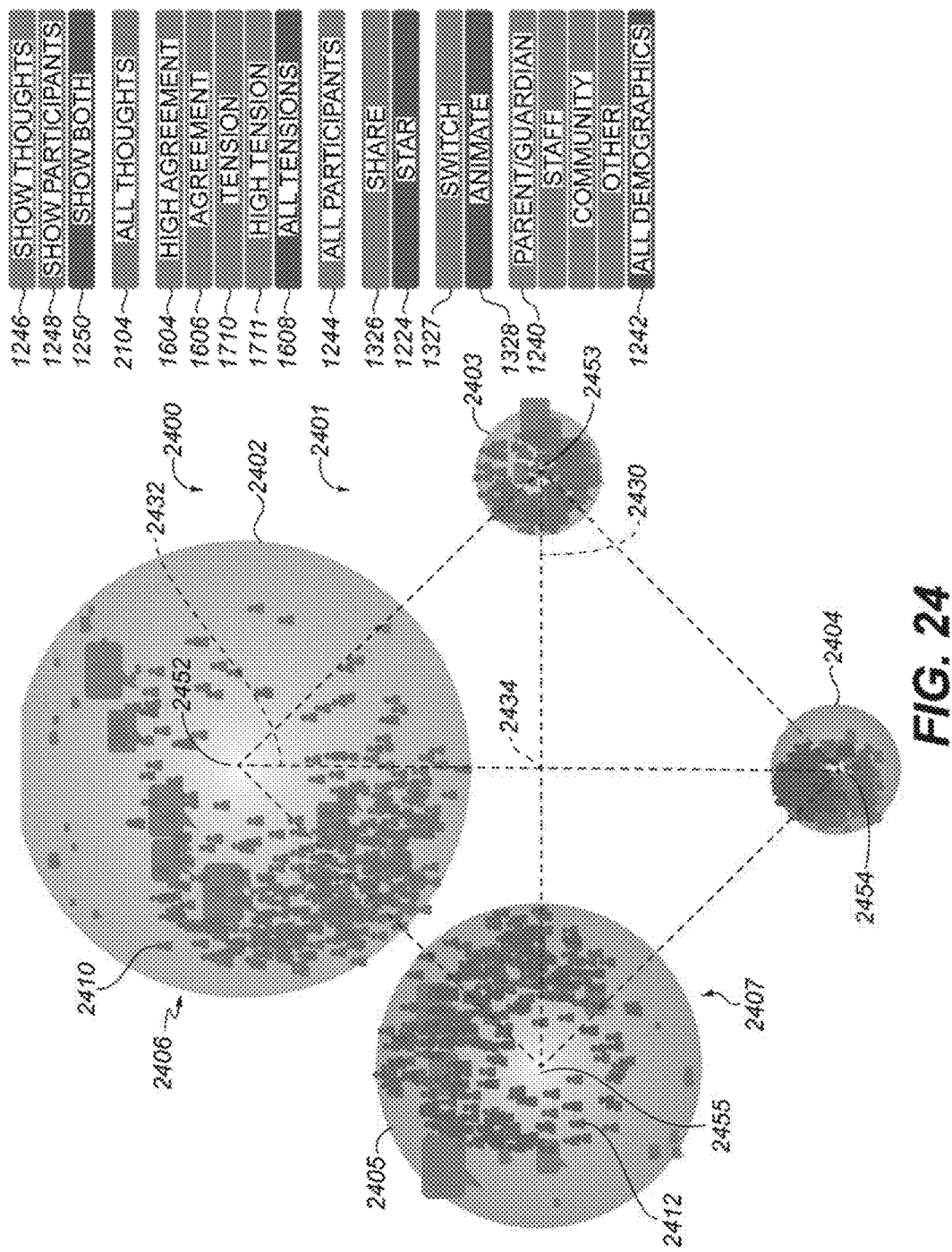
FIG. 24 illustrates a significant visualization presented via a user interface display or graphical user interface of qualitative responses and participants within closed shapes of groups, according to some embodiments of the present invention.

In this regard, FIG. 24 illustrates an example of a user interface display 2400, which may be generated by the server device system 202, and which visually presents information regarding results of the analysis performed at step 906, according to some embodiments of the present invention. In some embodiments, the visual presentation of groups 2402-2405 includes visual representations of closed shapes, which, in this example, are circles. As stated earlier, other shapes besides circles or even closed shapes may be implemented. For example, while closed shapes may be preferable in some embodiments, as they may provide a continuous boundary that may be easier for a viewer to demarcate, non-closed shapes may still be effective and may also be implemented, according to some embodiments. In some embodiments, the visual presentations of groups 2402-2405 include respective clusters of visual representations of participants in the respective group. For example, cluster 2406 represents visual representations of participants (e.g., including visual representation 2410 of a particular participant) that are associated at least with group 2402. In this example, the visual representations (or at least the geometric centers of the visual representations) of each of the participants associated with each of the respective groups are shown within the visual representation of a closed shape for the respective group. For example, each of the visual representations (or at least the geometric centers of the visual representations) of the participants in cluster 2406 are located within the bounds of the closed shape of group 2402, and none associated with cluster 2406 are located outside the bounds of the closed shape of group 2402. In this regard, in the example of FIG. 24, the visual presentation 2410 of a participant associated with group 2402 is displaced from the geometric center 2452 of the closed shape of group 2402 (as distinguished from the center 2434 of the visualization region 2401 of the user interface display 2400) in a direction that reflects the respective participant's relative associations with each of the groups 2402-2405 (e.g., based on an analysis of the respective participant's group-association-values with respect to the groups) and by a distance that ensures that the visual representation of the respective participant remains within the visual representation of the closed shape of group 2402 (e.g., by a distance less than the radius of the circle enclosing group 2402).

In the example of FIG. 24, cluster 2407 represents visual representations of participants (e.g., including visual representation 2412 of a participant) that are associated at least with group 2405. In this example, each of the visual representations (or at least the geometric centers of each of the visual representations) of the participants in cluster 2407 is located within the bounds of the closed shape of group 2405, and none associated with cluster 2407 are located outside the bounds of the closed shape of group 2405. In this regard, in the example of FIG. 24, the visual presentation 2412 of a participant associated with group 2405 is displaced from the geometric center 2455 of the closed shape of group 2405 in a direction that reflects the respective participant's relative associations with each of the groups 2402-2405 (e.g., based on an analysis of the respective participant's group-association-values with respect to the groups) and by a distance that ensures that the visual representation (or at least the geometric centers of the visual representation) of the respective participant remains within the visual representation of the closed shape of group 2405 (e.g., by a distance less than the radius of the circle for 2405).

In this regard, the cluster (e.g., cluster 2407) of visual representations of the participants in a group (e.g., group 2405) is represented in a manner consistent with one or more results of an analysis of priority values (e.g., as discussed above, which may involve the determination of participant group-association-values, which may be deemed resonance values, as discussed above), according to some embodiments. The one or more results of the analysis may indicate at least that the respective resonance values for each of the participants in a particular group (e.g., group 2405) most closely align the participants in the particular group with the particular group as compared to each other group (e.g., groups 2402, 2403, 2404) of the plurality of groups (e.g., groups 2402-2405). Further in this regard, the location of the visual representations of participants (e.g., 2410, 2412) in the user interface display 2400 may be determined by the server device system 202 based at least on an analysis of the respective participant's above-discussed group-association-values (which may be deemed resonance values indicating amounts that the respective participant resonates with the respective groups of participants, according to some embodiments) with respect to at least each of the displayed groups (e.g., groups 2402-2405). Continuing with the example of Table XXVII, assume that the participant "P.A1" is represented by visual representation 2412 in FIG. 24. Also assume that group 2402 is "Group A", group 2403 is "Group B", group 2404 is "Group C", and group 2405 is "Group D". Also assume that participant "P.A1" has the group-association-values for these groups shown in Table XXVII above. In this example, these group-association-values indicate that the participant "P.A1" is most closely associated or aligned with "Group D", since the group-association-value of 0.90 for participant "P.A1" and "Group D" is higher than the group-association-values of 0.01, 0.03 and 0.06 for participant "P.A1" and "Group A", "Group B" and "Group C" respectively. In this example, the visual representation 2412 of participant "P.A1" in the user interface display 2400 is located within the closed shape for the group with which the participant "P.A1" is most closely associated or aligned, i.e., within the closed shape for "Group D" 2405.

The respective group-association-values in Table XXVII may be leveraged by the server device system 202 to generate X- and Y-axis shifts. X- and Y-axes for the visualization region 2401 may be constructed by assuming that the geometric center 2434 of the visualization region 2401 is an origin, and the geometric center 2452 of "Group A" 2402 is located on the positive-Y-axis-side of axis 2432, the geometric center 2453 of "Group B" 2403 is located on the positive-X-axis-side of axis 2430, the geometric center 2454 of "Group C" 2404 is located on the negative-Y-axis-side of axis 2432, and the geometric center 2455 of "Group D" 2405 is located on the negative-X-axis-side of axis 2430, with the geometric center of each group an equal distance from the origin 1234. (It should be noted that the X-axis 2430, the Y-axis 2432, and the origin 2434 need not be displayed and may just be present in FIG. 24 to illustrate the locations of various items that are displayed.)

Accordingly, the group-association-value of 0.90 for "Group D" (e.g., 2402) indicates a strong association between participant "P.A1" and "Group D" (e.g., 2405), which may cause the server device system 202 to generate a strong negative X-axis shift for the visual representation 2412 of participant "P.A1" toward "Group D" (e.g., 2405). In the example of Table XXVII, since the group-association-value for "Group C" (e.g., 2404) is greater than the groupassociation-value for "Group A" (e.g., 2402), the server device system 202 may be configured to cause a negative Y-axis shift toward "Group C" (e.g., 2404) away from "Group A" (e.g., 2402). Similarly, the group-association-value for "Group B" (e.g., 2403) may temper the negative X-axis shift caused by the group-association-value for "Group D" (e.g., 2405), but since the group-association-value for "Group B" (e.g., 2403) is small, the tempering effect may be small.

The X- and Y-axis shifts for participant "P.A1" with respect to the origin (i.e., the geometric center 2434 of the visualization region 2401), are then scaled and translated by the server device system 202 so that the visual representation of participant "P.A1", along with the visual representations of each of the other participants associated with "Group D", are located within the closed shape for "Group D" 2405, in some embodiments. If the closed shape for "Group D" 2405 is a circle, the server device system 202 may be configured to scale the X- and Y-axis shifts for each of the participants associated with "Group D" by finding the displacement from the origin with the highest magnitude across all these participants, then scaling the X- and Y-axis shifts for each respective participant by dividing by this highest magnitude and multiplying by the radius of the circle enclosing group 2405, in some embodiments. Further, the server device system 202 may be configured to translate the scaled X- and Y-axis shifts for each of the participants associated with "Group D" by a distance and in a direction equal to the distance and direction of the geometric center 2455 of the closed shape for "Group D" 2405 from the center 2434 of the visualization region 2401, in some embodiments.

For example, if the closed shape for "Group D" 2405 is a circle of radius 100 pixels, and the maximum magnitude of the X- and Y-axis shifts from the origin, i.e., from the center 2434 of the visualization region 2401, for each of the participants associated with "Group D" is 400 pixels, then the X- and Y-axis shifts for each of these participant may be divided by 400 and multiplied by 100, so that the scaled X- and Y-axis shifts are all within 100 pixels of the origin. Continuing with this example, if the geometric center 2455 of the closed shape for "Group D" 2405 is at a distance of 200 pixels along the negative X-axis from the origin, i.e., from the center 2434 of the visualization region 2401, the scaled X- and Y-axis shifts for each of the participants associated with "Group D" may then be translated by a distance of 200 pixels along the negative X-axis. In this example, the result of this scaling and translation is that the visual representation of each of the participants associated with "Group D" is located within 100 pixels of the geometric center 2455 of the circle enclosing group 2405, that is, each of the visual representations of the participants associated with "Group D" is located within the bounds of the closed shape for "Group D" 2405, and none of the visual representations of these participants is located outside the bounds of the closed shape for "Group D" 2405. In this way, the location of the visual representation of each of the participants within the closed shape for the group with which the respective participant is associated, relative to the offset of the geometric center of each of the groups from the center 2434 of the visualization region 2401, may reflect the group-association-value for the respective participant and the respective group.

According to some embodiments, the shift for the group with which a participant is associated may be scaled down so that it does not overwhelm the shifts for each of the other groups. In the example of Table XXVII, the group-association-value of 0.90 for participant "P.A1" and "Group D" is higher than the group-association-values for participant "P.A1" and each of the other groups (that is, the participant "P.A1" is most closely associated or aligned with "Group D"), so the server device system 202 generates a strong negative X-axis shift for the visual representation 2412 of participant "P.A1". After the scaling and translation so that the visual representation 2412 of participant "P.A1" is located within the closed shape for "Group D" 2405, this strong negative X-axis shift may become a strong shift from the center 2455 toward the outer edge of the closed shape for "Group D" 2405. Similarly, for each of the other participants associated with "Group D", the group-association-value for the respective participant and "Group D" is higher than the group-association-values for the respective participant and each of the other groups, so the server device system 202 may be configured to generate a strong negative X-axis shift for the visual representation of the respective participant. Again, after scaling and translation so that the visual representation of the respective participant is located within the closed shape for "Group D" 2405, this strong negative X-axis shift may be become a strong shift from the center 2455 toward the outer edge of the closed shape for "Group D" 2405. These strong negative X-axis shifts for each of the participants in "Group D" tend to overwhelm the weaker positive Y-axis shift, positive X-axis shift and negative Y-axis shift for "Group A", "Group B" and "Group C", so that the visual representations of these participants tend to cluster toward the outer edge of the closed shape for "Group D" 2405. To avoid this clustering, the negative X-axis shift for "Group D", i.e., for the group with which these participants are associated, may be scaled down by the server device system 202, in some embodiments, e.g., by dividing it by two. This scaling down may cause the visual representations of these participants to be distributed more evenly across the closed shape for "Group D" 2405 in a way that better reflects each respective participant's relative associations with each of "Group A", "Group B", "Group C", and "Group D".

Tables XXVIII-A to XXVIII-D, below, illustrate an example of a determination by the server device system 202 of locations of visual representations of participants in a user interface display (e.g., 2400), based on an analysis of the respective participant's group-association-values with respect to the groups, in which the visual presentation of each respective group in the user interface display includes a visual representation of a closed shape, and the visual representations of each respective participant is located within the closed shape for the group with which the respective participant is associated. Continuing with the example of Table XXVIII, above, recall that the geometric center of each of the Groups A, B, and C were equally spaced around the circumference of a unit circle, i.e., a circle of radius 1, in this example centered on the geometric center 2434 of the visualization region 2401, with the locations of Groups A, B, and C being (0, 1), (−0.87, −0.5) and (0.87, −0.5), respectively, with coordinates rounded to two decimal places. Recall also that a displacement from the origin, in this example the geometric center 2434 of the visualization region 2401, towards the geometric center of each of the groups in the user interface display was determined for each of the participants P1-P7, equal to the respective participant's group-association-value with respect to the respective group multiplied by the vector location of the respective group, and that the locations of the visual representations of each of these participants in the user interface display was determined to be the total of the displacements for the respective participant and each of the groups, as shown in Table XXVIII, above. For example, the group-association-values for participant P6 and Groups A, B, and C were 0.08, 0.13 and 0.75, respectively, from Table VIII, above. Therefore, the X, Y displacements for participant P6 and Groups A, B, and C were 0.08×(0, 1)=(0, 0.08), 0.13×(−0.87, −0.5)=(−0.11, −0.06), and 0.75×(0.87, −0.5)=(0.65, −0.38), respectively, if rounded to two decimal places. Therefore, the location of the visual representation of participant P6 in the user interface display was equal to the total displacement (0, 0.08)+(−0.11, −0.06)+(0.65, −0.38)=(0.54, −0.35), if rounded to two decimal places.

In this example, these X- and Y-axis shifts for each of the participants P1-P7 may be scaled and translated by the server device system 202 so that the visual representation of each respective participant is located within the closed shape for the group with which the respective participant is most closely associated or aligned. In this example, the group-association-values from Table VIII, above, indicate that participant P6 is most closely associated or aligned with Group C, since the group-association-value of 0.75 for participant P6 and Group C is higher than the group-association-values of 0.08 and 0.13 for participant P6 and Group A and Group B respectively. Similarly, the participant P2, with group-association-values of 0.58, 0.63 and 0.75 for Group A, Group B, and Group C, respectively, is also most closely associated or aligned with Group C, while participants P1, P4, and P7 are most closely associated or aligned with Group A, and participants P3 and P5 are most closely associated or aligned with Group B, as shown in Table XXVIII-A, below.

The magnitudes of the displacements for each the participants from the origin may be determined by the server device system 202 using vector magnitude, known in the art. For example, the total displacement for participant P6 is (0.54, −0.35), from Table XXVIII, above, so the server device system may be configured by a program to determine the magnitude of the displacement of participant P6 from the origin as the square root of (0.54×0.54+−0.35×−0.35)=0.64, if rounded to two decimal places. Similarly, the total displacement for participant P2 is (0.11, −0.1), from Table XXVIII, above, so the magnitude of the displacement of participant P2 from the origin is the square root of (0.11×0.11+−0.1×−0.1)=0.15, if rounded to two decimal places. The displacements of each of the other participants may be determined by the server device system 202 in the same way, as shown in Table XXVIII-A, below.

TABLE XXVIII-A

| Participant | Group | Displacement (from Table XXVIII) | Magnitude of Displacement |
|---|---|---|---|
| P1 | A | (−0.11, 0.19) | 0.22 |
| P2 | C | (0.11, −0.1) | 0.15 |
| P3 | B | (−0.32, 0.15) | 0.35 |
| P4 | A | (−0.54, 0.35) | 0.64 |
| P5 | B | (−0.32, 0.15) | 0.35 |
| P6 | C | (0.54, −0.35) | 0.64 |
| P7 | A | (−0.11, 0.1) | 0.15 |

The magnitudes of the displacements for the participants most closely associated or aligned with Group C, that is, for participants P6 and P2, are 0.64 and 0.15, respectively, from Table XXVIII-A, above. Therefore, the highest magnitude of the displacement from the origin across all the participants in Group C is 0.64, since 0.64 is higher than 0.15. Similarly, the magnitudes of the displacements of the participants most closely associated or aligned with Group A, i.e., participants P1, P4, and P7, are 0.22, 0.64 and 0.15, respectively, from Table XXVIII-A, above. Therefore, the highest magnitude of the displacement from the origin across all the participants in Group A is 0.64. Similarly, the magnitudes of the displacements of the participants most closely associated or aligned with Group B, i.e., participants P3 and P5, are 0.35 and 0.35, respectively, from Table XXVIII-A, above. Therefore the highest magnitude of the displacement from the origin across all the participants in Group B is 0.35. These highest magnitudes are shown in Table XXVIII-B, below.

In some embodiments, the visual presentation of each respective group in the user interface display includes a visual representation of a closed shape, and the closed shape may be a circle, and the radius of the circle may reflect the number of participants in the respective group. In this example, the radius of the circle for each respective group is calculated so that the area of the respective circle is proportional to the number of participants in the respective group, and the total area of all the circles is fixed, e.g., at 4, according to some embodiments. The number of participants in Group A, i.e., participants P1, P4, and P7, is 3, while the number of participants in Group B, i.e., participants P3 and P5, is 2, and the number of participants in Group C, i.e., participants P2 and P6, is 2. Therefore, the area of the circle for Group A is 3×A, where A is a constant area, while the areas of the circles for each of Group B and Group C is 2×A, where A is the same constant area. Since the total area of all the circles is fixed at 4, according to some embodiments, (3×A)+(2×A)+(2×A)=4, and therefore, A=0.57, if rounded to two decimal places. The area of the circle for Group A is 3×A=1.71, if rounded to two decimal places, while the areas of the circles for each of Group B and Group C is 2×A=1.14, if rounded to two decimal places, according to some embodiments. The radius of each of these circles may be determined from the geometrical relationship radius=square root (area÷π). Therefore, the radius of the circle for Group A is square root (1.71÷π)=0.74, if rounded to two decimal places, while the radii of the circles for each of Group B and Group C is square root (1.14÷π)=0.60, if rounded to two decimal places, as shown in Table XXVIII-B, below.

TABLE XXVIII-B

| Group | Highest Magnitude of Displacement | Number of Participants | Area of Circle | Radius of Circle |
|---|---|---|---|---|
| A | 0.64 | 3 | 1.71 | 0.74 |
| B | 0.35 | 2 | 1.14 | 0.60 |
| C | 0.64 | 2 | 1.14 | 0.60 |

In this example, these X- and Y-axis shifts for each of the participants P1-P7 may be scaled by the server device system 202 by dividing by the highest magnitude of the displacement from the origin across all the participants in the group with which the respective participant is most closely associated or aligned, and multiplying by the radius of the circle for the group with which the respective participant is most closely associated or aligned, in some embodiments. This scaling ensures that the visual representations of all the participants in each respective group are distributed over an area of the visualization region 2401 that may be entirely enclosed within the circle for the respective group. For example, participant P6 is most closely associated or aligned with Group C, and the total displacement for participant P6 is (0.54, −0.35), from Table XXVIII-A, above. The highest magnitude of displacement for the participants most closely associated or aligned with Group C is 0.64, and the radius of the circle for Group C is 0.60, from Table XXVIII-B, above. Therefore, according to some embodiments, the X- and Y-axis shifts for participant P6 are scaled from (0.54, −0.35) by dividing by 0.64 and multiplying by 0.60, giving a scaled X displacement of 0.54÷0.64×0.60=0.51 and a scaled Y displacement of −0.35÷0.64×0.60=−0.33, i.e., a scaled displacement of (0.51, −0.33), if rounded to two decimal places. Similarly, participant P2 is also most closely associated or aligned with Group C, and the total displacement for participant P2 is (0.11, −0.1), from Table XXVIII-A, above. Therefore, according to some embodiments, the X- and Y-axis shifts for participant P2 are scaled by dividing by 0.64 and multiplying by 0.60, giving a scaled X displacement of 0.11÷0.64× 0.60=0.10 and a scaled Y displacement of −0.1÷0.64× 0.60=−0.09, i.e., a scaled displacement of (0.10, −0.09), if rounded to two decimal places. Similarly, the scaled displacements for each of the other participants may be calculated in the same way, as shown in Table XXVIII-C, below.

group with which the respective participant is most closely associated or aligned. This translation ensures that the visual representation of each respective participant is located within the closed shape for the group with which the respective participant is most closely associated or aligned. For example, participant P6 is most closely associated or aligned with Group C, and the scaled displacement for participant P6 is (0.51, −0.33), from Table XXVIII-C, above, and the location of Group C is (0.87, −0.5). Therefore, in this example, the displacement for participant P6 is translated to (0.51, −0.33)+(0.87, −0.5)=(1.38, −0.83), using vector addition, known in the art. Similarly, participant P2 is also most closely associated or aligned with Group C, and the scaled displacement for participant P2 is (0.10, −0.09), from Table XXVIII-C, above. Therefore, in this example, the displacement for participant P2 is translated to (0.10, −0.09)+(0.87, −0.5)=(0.97, −0.59). Similarly, the translated displacements for each of the other participants may be calculated by the server device system 202 in the same way, as shown in Table XXVIII-D, below.

TABLE XXVIII-C

| Participant | Group (from Table XXVIII-A) | Displacement (from Table XXVIII-A) | Highest Magnitude of Displacement for Group (from Table XXVIII-B) | Radius of Circle for Group (from Table XXVIII-B) | Scaled Displacement |
|---|---|---|---|---|---|
| P1 | A | (−0.11, 0.19) | 0.64 | 0.74 | (−0.13, 0.22) |
| P2 | C | (0.11, −0.1) | 0.64 | 0.60 | (0.10, −0.09) |
| P3 | B | (−0.32, 0.15) | 0.35 | 0.60 | (−0.55, 0.26) |
| P4 | A | (−0.54, 0.35) | 0.64 | 0.74 | (−0.62, 0.40) |
| P5 | B | (−0.32, 0.15) | 0.35 | 0.60 | (−0.55, 0.26) |
| P6 | C | (0.54, −0.35) | 0.64 | 0.60 | (0.51, −0.33) |
| P7 | A | (−0.11, 0.1) | 0.64 | 0.74 | (−0.13, 0.12) |

The scaling of the displacements for the participants in Group C, i.e., participants P6 and P2, ensures that the visual representations of these participants are distributed over an area of the visualization region 2401 that may be entirely enclosed within the circle for Group C. This result can be seen by calculating the magnitudes of the scaled displacements for each of these participants from the origin using vector magnitude, known in the art. The magnitude of the scaled displacement (0.51, −0.33) of participant P6 from the origin is the square root of (0.51×0.51+−0.33×−0.33)=0.60, if rounded to two decimal places, and the magnitude of the scaled displacement (0.16, −0.14) of participant P2 from the origin is the square root of (0.10×0.10+−0.09×−0.09)=0.13, if rounded to two decimal places. Each of these magnitudes of displacements, 0.60 and 0.13, is less than or equal to the radius of the circle for Group C, i.e., 0.60, from Table XXVIII-B, above. Therefore, the visual representations of all the participants in Group C, i.e., participants P6 and P2, are distributed by the server device system 202 over an area of the visualization region 2401 that may be entirely enclosed within the circle for Group C. Similarly, the scaling of the displacements for the participants in each of Group A and Group B ensures that the visual representations of the participants in each respective group are distributed over an area of the visualization region 2401 that may be entirely enclosed within the circle for the respective group.

In this example, the scaled X- and Y-axis shifts for each of the participants P1-P7 are then translated so that the origin, i.e., the geometric center 2434 of the visualization region 2401, is translated to the geometric center of the

TABLE XXVIII-D

| Participant | Group (from Table XXVIII-A) | Scaled Displacement (from Table XXVIII-C) | Location of Group | Translated Displacement |
|---|---|---|---|---|
| P1 | A | (−0.13, 0.22) | (0, 1) | (−0.13, 1.22) |
| P2 | C | (0.10, −0.09) | (0.87, −0.5) | (0.97, −0.59) |
| P3 | B | (−0.55, 0.26) | (−0.87, −0.5) | (−1.42, −0.24) |
| P4 | A | (−0.62, 0.40) | (0, 1) | (−0.62, 1.40) |
| P5 | B | (−0.55, 0.26) | (−0.87, −0.5) | (−1.42, −0.24) |
| P6 | C | (0.51, −0.33) | (0.87, −0.5) | (1.38, −0.83) |
| P7 | A | (−0.13, 0.12) | (0, 1) | (−0.13, 1.12) |

The scaling of the displacements for the participants in Group C, i.e., participants P6 and P2, ensures that the visual representations of these participants are located within the closed shape for Group C. Recall that the magnitudes of the scaled displacements of participants P6 and P2 from the origin prior to the translation were 0.60 and 0.13, respectively, if rounded to two decimal places. Following the translation of these scaled displacements so that the origin, i.e., the geometric center 2434 of the visualization region 2401, is translated to the geometric center of Group C, the magnitudes of the displacements of participants P6 and P2 from the geometric center of Group C are 0.60 and 0.13, respectively, if rounded to two decimal places. Each of these magnitudes of displacements, 0.60 and 0.13, is less than or equal to the radius of the circle for Group C, i.e., 0.60, from Table XXVIII-B, above. Therefore, the visual representations of all the participants in Group C, i.e., participants P6 and P2, are located by the server device system 202 within the bounds of the closed shape for Group C. Similarly, the translation of the scaled displacements for the participants in each of Group A and Group B ensures that the visual representations of the participants in each respective group are located by the server device system 202 within the bounds of the closed shape for the respective group.

According to some embodiments, the shift for the group with which a participant is associated may be scaled down so that it does not overwhelm the shifts for each of the other groups. Recall that in this example, the locations of Groups A, B, and C are (0, 1), (−0.87, −0.5) and (0.87, −0.5), respectively, and group-association-values for participant P6 and Groups A, B, and C are 0.08, 0.13, and 0.75, respectively. Therefore, the X, Y displacements for participant P6 and Groups A, B, and C were 0.08×(0, 1)=(0, 0.08), 0.13×(−0.87, −0.5)=(−0.11, −0.06), and 0.75×(0.87, −0.5)=(0.65, −0.38), respectively, if rounded to two decimal places, and the total displacement for participant P6, before scaling and translation, was (0, 0.08)+(−0.11, −0.06)+(0.65, −0.38)=(0.54, −0.35), if rounded to two decimal places. Since the group-association-value for participant P6 and Group C, i.e., 0.75, is higher than the group-association-values for participant P6 and the other Groups A and B, i.e., 0.08 and 0.13, respectively, the displacement for participant P6 and Group C, i.e., 0.75×(0.87, −0.5)=(0.65, −0.38), is more significant than the displacements for participant P6 and Groups A and B, i.e., 0.08×(0, 1)=(0, 0.08) and 0.13×(−0.87, −0.5)=(−0.11, −0.06), respectively, so that the total displacement for participant P6 is more strongly toward the closed shape for Group C than toward the closed shapes for Group A and B. Recall also that since participant P6 is most closely associated or aligned with Group C, this total displacement of (0.54, −0.35) was scaled and translated so that the visual representation of participant P6 was located within the closed shape for Group C. Since, before scaling and translation, the total displacement for participant P6 was more strongly toward the closed shape for Group C, after this scaling and translation, the visual representation of participant P6 is located toward the outer edge of the closed shape for Group C.

Similarly, for participant P2, also associated with Group C, the group-association-value for participant P2 and Group C, i.e., 0.75, is higher than the group-association-values for participant P2 and the other Groups A and B, i.e., 0.58 and 0.63, respectively, so that the displacement for participant P2 and Group C, i.e., (0.65, −0.38), is more significant than the displacements for participant P2 and Groups A and B, i.e., (0, 0.58) and (−0.54, −0.31), respectively, so that the total displacement for participant P2 is more strongly toward the closed shape for Group C than toward the closed shapes for Groups A and B. Recall that since participant P2 is most closely associated or aligned with Group C, this total displacement of (0.11, −0.1) was scaled and translated so that the visual representation of participant P2 was located within the closed shape for Group C. Since, before scaling and translation, the total displacement for participant P2 was more strongly toward the closed shape for Group C, after this scaling and translation, the visual representation of participant P2 is located toward the outer edge of the closed shape for Group C.

In the same way, after scaling and translation, the visual representation of each of the other participants is located toward the outer edge of the closed shape for the group with which the respective participant is most closely associated or aligned. To avoid this tendency for the visual representations of participants to cluster toward the outer edge of the closed shapes, the displacement, before scaling and translation, for each of the participants and the group with which it is associated is scaled down by the server device system 202, in some embodiments, e.g., by dividing it by two. In this example, the X, Y displacements for participant P6 and the group with which it is most closely associated or aligned, i.e., Group C, may be divided by two, giving a displacement of 0.75×(0.87, −0.5)÷2=(0.33, −0.19), if rounded to two decimal places. With the X, Y displacements for participant P6 and the other groups, i.e., Groups A and B, unchanged, the total displacement for participant P6, before scaling and translation, is (0, 0.08)+(−0.11, −0.06)+(0.33, −0.19)=(0.22, −0.17), if rounded to two decimal places. Since, before scaling and translation, this total displacement for participant P6 is less strongly toward the closed shape for Group C, after scaling and translation, the visual representation of participant P6 is located less strongly toward the outer edge of the closed shape for Group C.

Similarly, the X, Y displacements for participant P2 and the group with which it is most closely associated or aligned, i.e., Group C, may be divided by two by the server device system 202, giving a displacement of (0.65, −0.38)÷2=(0.33, −0.19), if rounded to two decimal places. With the X, Y displacements for participant P2 and the other groups, i.e., Groups A and B, unchanged, the total displacement for participant P2, before scaling and translation, is (0, 0.58)+(−0.54, −0.31)+(0.33, −0.19)=(−0.21, 0.08), if rounded to two decimal places. Since, before scaling and translation, this total displacement for participant P2 is further toward the closed shapes for Groups A and B than the closed shape for Group C, after scaling and translation, the visual representation of participant P2 is located by the server device system 202 toward the inner edge rather than the outer edge of the closed shape for Group C.

In the same way, after scaling and translation, the visual representation of each of the other participants is located by the server device system 202 less strongly toward the outer edge of the closed shape for the group with which the respective participant is most closely associated or aligned. This arrangement may cause the visual representations of these participants to be distributed more evenly across the closed shapes for the group with which each respective participant is most closely associated in a way that better reflects the respective participant's relative associations with each of the Groups A, B, and C.

Of course, the example of Tables XXVIII to XXVIII-D is just one example of many possible examples according to various embodiments of the present invention that is provided for illustration purposes only. Accordingly, it should be noted that the present invention is not limited to the particular analysis of group-association-values performed in the example of Tables XXVIII to XXVIII-D and is not limited to the particular definitions of the displacement of a participant towards a group or the location of a participant.

For example, rather than being equally spaced around the circumference of a unit circle, the geometric centers of the groups may be unequally spaced, the distance between each group and each other group reflecting a measure of the closeness or alignment of the respective groups, based at least on a comparison of the "group" priority patterns for the respective groups. In some embodiments, a "group" priority pattern is determined by the server device system 202 for each respective group (e.g., at step 906b), equal to the average number of stars assigned by all the participants associated with the respective group to each qualitative response, and a group alignment value between each group and each other group is calculated from the average across all qualitative responses of the absolute difference between the average number of stars assigned by all the participants associated with the one respective group to the respective qualitative response and the average number of stars assigned by all the participants associated with the other respective group to the respective qualitative response. Continuing the example of Tables VI to VII, the average number of stars assigned by all the participants associated with each of the Groups A, B, and C to each of the qualitative responses QR1, QR2, and QR3, shown in Table VII above, are reproduced in Table XXVIII-E below.

TABLE XXVIII-E

| Group | Average Stars QR1 | Average Stars QR2 | Average Stars QR3 |
|---|---|---|---|
| A | 2.33 | 3.67 | 4 |
| B | 2 | 3.5 | 4 |
| C | 2 | 4.5 | 2.5 |

The average number of stars assigned by the participants in Group A to qualitative response QR1 is 2.33, if rounded to two decimal places, and the average number of stars assigned by the participants in Group B to qualitative response QR1 is 2, from Table VII or Table XXVIII-E, above. Therefore, the absolute difference between the average number of stars assigned by all the participants associated with Group A to the qualitative response QR1 and the average number of stars assigned by all the participants associated with Group B to qualitative response QR1 is |2.33−2|=0.33, if rounded to two decimal places. Similarly, the average number of stars assigned by the participants in Group A to qualitative response QR2 is 3.67, if rounded to two decimal places, and the average number of stars assigned by the participants in Group B to qualitative response QR2 is 3.5, from Table VII or Table XXVIII-E, above. Therefore, the server device system 202 may be configured by a program to determine the absolute difference between the average number of stars assigned by all the participants associated with Group A to the qualitative response QR2 and the average number of stars assigned by all the participants associated with Group B to qualitative response QR2 as |3.67−3.5|=0.17, if rounded to two decimal places. Similarly, the average number of stars assigned by the participants in Group A to qualitative response QR3 is 4, and the average number of stars assigned by the participants in Group B to qualitative response QR3 is also 4, from Table VII or Table XXVIII-E, above. Therefore, the server device system 202 may be configured by a program to determine the absolute difference between the average number of stars assigned by all the participants associated with Group A to the qualitative response QR3 and the average number of stars assigned by all the participants associated with Group B to qualitative response QR3 as |4−4|=0. The absolute difference between the average number of stars assigned by all the participants associated with each of the Groups A, B, and C to each of the qualitative responses QR1, QR2, and QR3 and the average number of stars assigned by all the participants associated with each of the other groups to the respective qualitative response is shown in Table XXVIII-F, below.

Therefore, the server device system 202 may be configured by a program to determine the average across all qualitative responses QR1, QR2, and QR3 of the absolute difference between the average number of stars assigned by all the participants associated with Group A to the respective qualitative response and the average number of stars assigned by all the participants associated with Group B to the respective qualitative response as (0.33+0.17+0)/3=0.17, if rounded to two decimal places. This value may be interpreted as a group alignment value between Groups A and B, in some embodiments. In other words, the server device system 202 is configured by a program at least to determine, for each particular group of a plurality of groups, a group alignment value with respect to the particular group (e.g., Group A) and each respective other group (e.g., each of Group B and Group C) of the plurality of groups, thereby determining a plurality of group alignment values (e.g., those shown in Table XXVIII-F, below) associated with each particular group (e.g., each of Groups A, B, and C) of the plurality of groups, according to some embodiments. The group alignment value between each of the Groups A, B, and C and each other group, calculated from the average across all qualitative responses of the absolute difference between the average number of stars assigned by all the participants associated with the one respective group to the respective qualitative response and the average number of stars assigned by all the participants associated with the other respective group to the respective qualitative response, is shown in Table XXVIII-F, below.

TABLE XXVIII-F

| Groups | Absolute Difference QR1 | Absolute Difference QR2 | Absolute Difference QR3 | Group Alignment Value |
|---|---|---|---|---|
| A & B | \|2.33 − 2\| = 0.33 | \|3.67 − 3.5\| = 0.17 | \|4 − 4\| = 0 | (0.33 + 0.17 + 0)/3 = 0.17 |
| B & C | \|2 − 2\| = 0 | \|3.5 − 4.5\| = 1 | \|4 − 2.5\| = 1.5 | (0 + 1 + 1.5)/3 = 0.83 |
| C & A | \|2 − 2.33\| = 0.33 | \|4.5 − 3.67\| = 0.83 | \|2.5 − 4\| = 1.5 | (0.33 + 0.83 + 1.5)/3 = 0.89 |

In this regard, it may be considered that the first group alignment value (0.17) in the first row of Table XXVIII-F and the third group alignment value (0.89) in the third row of Table XXVIII-F are a plurality of group alignment values associated with Group A. Similarly, it may be considered that the first group alignment value (0.17) in the first row of Table XXVIII-F and the second group alignment value (0.83) in the second row of Table XXVIII-F are a plurality of group alignment values associated with Group B. Similarly still, it may be considered that the second group alignment value (0.83) in the second row of Table XXVIII-F and the third group alignment value (0.89) in the third row of Table XXVIII-F are a plurality of group alignment values associated with Group C.

The group alignment value between each of the Groups A, B, and C and each other group may indicate the closeness of relationship, relatedness, or alignment of the respective groups, in some embodiments. For example, the group alignment value between Groups A and B is 0.17, from Table XXVIII-F above, a relatively low value, reflecting a relatively small difference in the "group" priority patterns for the respective groups. This relative similarity, or relatively high closeness of relationship or alignment between Groups A and B, can be seen by comparing the "group" priority pattern for Group A, i.e., {2.33, 3.67, 4}, and the "group" priority pattern for Group B, i.e., {2, 3.5, 4}, from Table VII or Table XXVIII-E, above. These "group" priority patterns are quite similar, in that the participants in Groups A and B assigned a relatively low average number of stars to qualitative response QR1 (i.e., 2.33 and 2, respectively), a higher average number of stars to qualitative response QR2 (i.e., 3.67 and 3.5, respectively), and a relatively high average number of stars to qualitative response QR3 (i.e., 4 and 4, respectively). In contrast, the group alignment value between Groups C and A is 0.89, from Table XXVIII-F above, a relatively high value, reflecting a relatively large difference in the "group" priority patterns for the respective groups. This relative dissimilarity, or relatively low closeness of relationship or alignment between Groups C and A, can be seen by comparing the "group" priority pattern for Group C, i.e., {2, 4.5, 2.5}, and the "group" priority pattern for Group A, i.e., {2.33, 3.67, 4}, from Table VII or Table XXVIII-E, above. These "group" priority patterns are quite dissimilar. For example, the participants in Group C assigned a relatively low average number of stars to qualitative response QR3 (i.e., 2.5), whereas the participants in Group A assigned a relatively high average number of stars to qualitative response QR3 (i.e., 4). In this regard, it can be seen that at least one of the plurality of group alignment values associated with Group A (e.g., the first group alignment value (0.17) in the first row of Table XXVIII-F, above), at least one of the plurality of group alignment values associated with the Group B (e.g., also the first group alignment value (0.17) in the first row of Table XXVIII-F, above), and at least one of the plurality of group alignment values associated with Group C (e.g., the third group alignment value (0.89) in the third row of Table XXVIII-F, above) indicate that Group A is more closely related to Group B than Group C, according to some embodiments, at least because the first group alignment value (0.17) between Groups A and B is lower than the third group alignment value (0.89) between Groups A and C.

Figure 25:
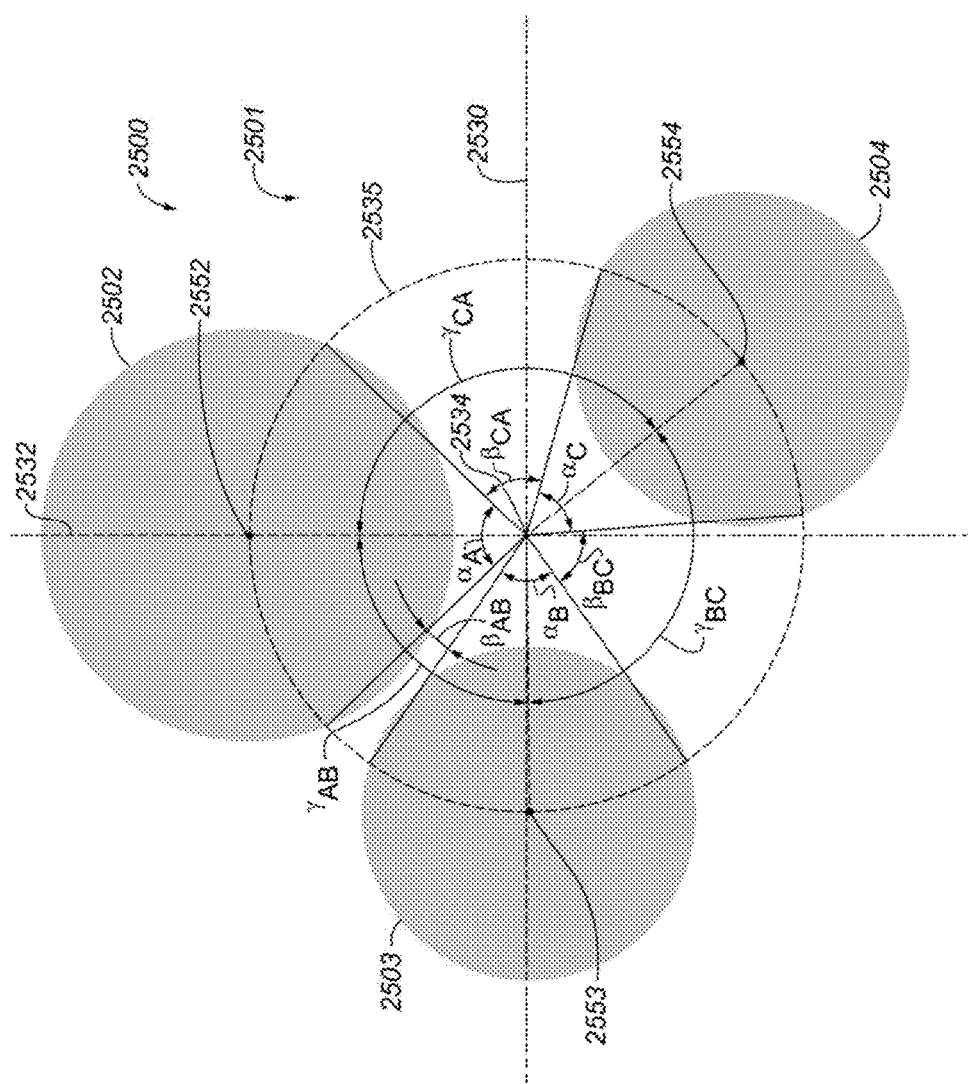
FIG. 25 illustrates unequal spacing, in a significant visualization presented via a user interface display or graphical user interface, between visual representations of groups of qualitative responses, participants, or both qualitative responses and participants as an indication of relative relatedness between such groups, according to some embodiments of the present invention.

In some embodiments, rather than being equally spaced around the circumference of a unit circle, the server device system 202 may be configured by a program to locate the geometric centers of the visual representations of the groups in the user interface display with unequal spacing around the circumference of a unit circle, the distance between each group and each other group reflecting the group alignment value for the respective groups. In this regard, FIG. 25 illustrates an example of a user interface display 2500 in which the visual representations of Groups A, B, and C are spaced unequally, according to some embodiments. Continuing with the example of Tables XXVIII to XXVIII-F, above, recall that the geometric center of each of the Groups A, B, and C were equally spaced around the circumference of a unit circle, i.e., a circle of radius 1, centered on the geometric center of the visualization region, with the locations of Groups A, B, and C being (0, 1), (−0.87, −0.5) and (0.87, −0.5), respectively, with coordinates rounded to two decimal places. In this example, the geometric centers 2552, 2553, and 2554 of the circles for Groups A, B, and C remain on the circumference of the unit circle, 2535, centered on the geometric center 2534 of the visualization region 2501, but, instead of being equally spaced, the server device system 202 is configured by a program to set the spacing between each of the Groups A, B, and C and each of the other groups to reflect the respective group alignment value for the respective groups, according to some embodiments.

The portion of the unit circle occupied by each of the Groups A, B, and C is represented by the angles $\alpha_A$, $\alpha_B$ and $\alpha_C$, respectively, shown on FIG. 25. It should be noted that such angles $\alpha_A$, $\alpha_B$ and $\alpha_C$, as well as the geometric center 2534, the circumference 2535 of the unit circle centered on the geometric center 2534, the axes 2530, 2532, the angles $\beta_{AB}$, $\beta_{BC}$, and $\beta_{CA}$, discussed below, and the angles $\gamma_{AB}$, $\gamma_{BC}$, and $\gamma_{CA}$, discussed below, are provided in FIG. 25 for illustration purposes and need not be present in the user interface display 2500 presented to a user. The angle $\alpha_X$ (where X=A, B, or C) for each group may be determined by the server device system 202 from the radius $r_X$ (where X=A, B, or C) of the circle for the respective group to be $\alpha_X = 4 \times \sin^{-1}(\frac{1}{2} \times r_X)$, according to some embodiments.

Figure 26:
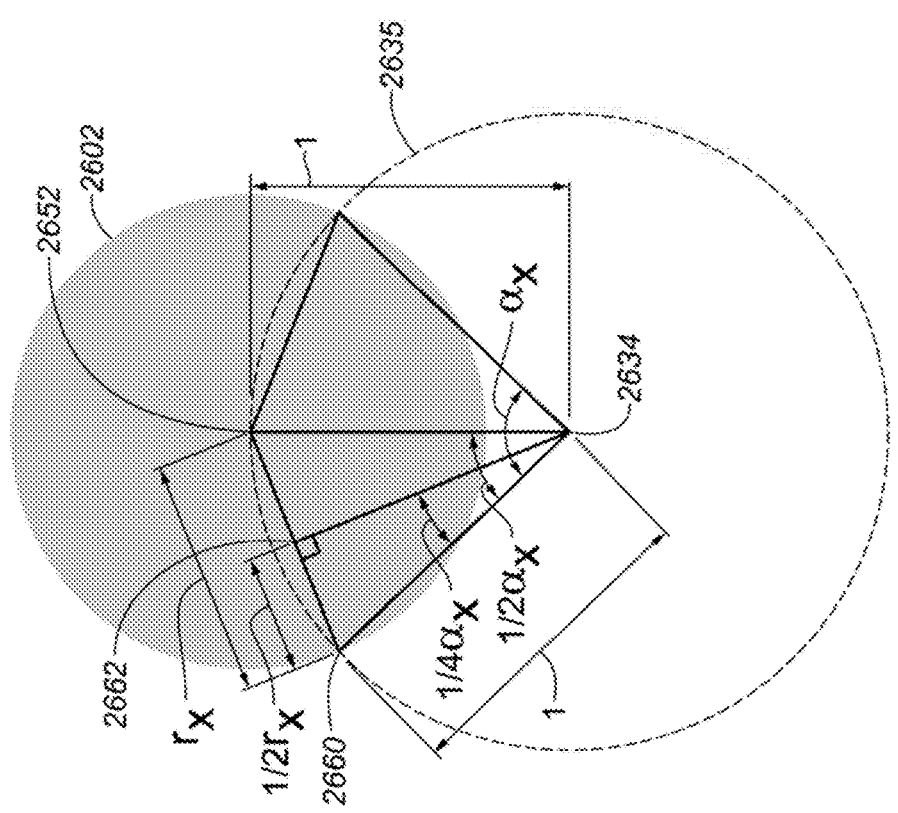
FIG. 26 illustrates details regarding a configuration of a data processing device system to place, in a significant visualization presented via a user interface display or graphical user interface, a visual representation of a group of qualitative responses, participants, or both qualitative responses and participants, according to some embodiments of the present invention.

FIG. 26 illustrates this trigonometric relationship between the angle $\alpha_X$, i.e., the portion of the unit circle 2635 taken by Group X 2602, and the radius $r_X$ of Group X 2602. The triangle whose vertices are the centre 2634 of the unit circle 2635, the centre 2652 of Group X 2602, and the intersection 2660 of the unit circle 2635 with the circumference of Group X 2602, is an isosceles triangle with two edges of length 1 (i.e., the radius of the unit circle 2635) and one edge of length $r_X$ (i.e., the radius of Group X 2602), where the angle between the two edges of length 1 is $\frac{1}{2} \times \alpha_X$ (i.e., half the portion of the unit circle 2635 taken by Group X 2602). This isosceles triangle may be bisected to give the right-angled triangle whose vertices are the centre 2634 of the unit circle 2635, the intersection 2660 of the unit circle 2635 with the circumference of Group X 2602, and the midpoint 2662 of the radius between the centre 2652 of Group X 2602 and the intersection 2660 of the unit circle 2635 with the circumference of Group X 2602. Considering this right-angled triangle in relation to the angle $\frac{1}{4} \times \alpha_X$ (i.e., half the angle $\frac{1}{2} \times \alpha_X$ between the two edges of length 1 of the isosceles triangle), the hypotenuse is of length 1 (i.e., the radius of the unit circle 2635) and the opposite side is of length $\frac{1}{2} \times r_X$ (i.e., the radius between the centre 2652 of Group X 2602 and the intersection 2660 of the unit circle 2635 with the circumference of Group X 2602). It follows from the trigonometric relationship sin(angle)=opposite÷hypotenuse that $\sin(\frac{1}{4} \times \alpha_X) = \frac{1}{2} \times r_X \div 1$. Therefore, $\alpha_X = 4 \times \sin^{-1}(\frac{1}{2} \times r_X)$.

For example, the radius $r_A$ of the circle for Group A is 0.74, from Table XXVIII-B, above. Therefore, the angle $\alpha_A$ for Group A is $4 \times \sin^{-1}(\frac{1}{2} \times 0.74) = 1.52$ radians, if rounded to two decimal places. Similarly, the radii $r_B$ and $r_C$ of the circles for Groups B and C are both 0.60, from Table XXVIII-B, above. Therefore, the angles $\alpha_B$ and $\alpha_C$ for Groups B and C are both $4 \times \sin^{-1}(\frac{1}{2} \times 0.60) = 1.22$ radians, if rounded to two decimal places. Therefore, the total portion of the unit circle taken by all three groups, A, B, and C, may be determined by the server device system 202 to be 1.52+1.22+1.22=3.96 radians, according to some embodiments, as shown in Table XXVIII-G, below.

TABLE XXVIII-G

| Group | Radius of Circle (from Table XXVIII-B) | Portion of Unit Circle for Group/radians |
| --- | --- | --- |
| A | 0.74 | $\alpha_A = 4 \times \sin^{-1}(\frac{1}{2} \times 0.74) = 1.52$ |
| B | 0.60 | $\alpha_B = 4 \times \sin^{-1}(\frac{1}{2} \times 0.60) = 1.22$ |
| C | 0.60 | $\alpha_C = 4 \times \sin^{-1}(\frac{1}{2} \times 0.60) = 1.22$ |
| Total | | 1.52 + 1.22 + 1.22 = 3.96 |

The portion of the unit circle occupied by the spaces between each of the Groups A, B, and C and each of the other groups is represented by the angles $\beta_{AB}$, $\beta_{BC}$, and $\beta_{CA}$, respectively, shown on FIG. 25. Since the total portion of the unit circle taken by the groups is 3.96 radians, and the total number of radians in a circle is $2\pi$, the total portion of the unit circle taken by the spaces between the groups is a $2\pi - 3.96$ radians=2.32 radians, if rounded to two decimal places, i.e., $\beta_{AB} + \beta_{BC} + \beta_{CA} = 2.32$ radians. The space between each group and each other group may be determined by the server device system 202 to be proportional to the group alignment value for the respective groups, in some embodiments. Recall that the group alignment value between Groups A and B is 0.17, the group alignment value between Groups B and C is 0.83, and the group alignment value between Groups C and A is 0.89, from Table XXVIII-F, above. Therefore, in order for the space between each group and each other group to be proportional to the group alignment value for the respective groups, according to some embodiments, $\beta_{AB}$=0.17×B, where B is a constant angle, $\beta_{BC}$=0.83×B, where B is the same constant angle, and $\beta_{CA}$=0.89×B, where B is the same constant angle. Since $\beta_{AB}+\beta_{BC}+\beta_{CA}$=2.32 radians, in this example, (0.17×B)+(0.83×B)+(0.89×B)=2.32 radians, and therefore, B=1.23 radians, if rounded to two decimal places. Therefore, in this example, $\beta_{AB}$=0.17×B=0.21, $\beta_{BC}$=0.83×B=1.02, and $\beta_{CA}$=0.89×B=1.09, if rounded to two decimal places, as shown in Table XXVIII-H, below.

TABLE XXVIII-H

| Groups | Group Alignment Value (from Table XXVIII-F) | Portion of Unit Circle for space between Groups/radians |
|---|---|---|
| A & B | 0.17 | $\beta_{AB}$ = 0.21 |
| B & C | 0.83 | $\beta_{BC}$ = 1.02 |
| C & A | 0.89 | $\beta_{CA}$ = 1.09 |
| Total | | 0.21 + 1.02 + 1.09 = 2.32 |

According to some embodiments, the server device system 202 is configured by a program to determine the location of the geometric center of each of the Groups A, B, and C around the circumference of a unit circle from the portions of the unit circle occupied by each of the groups, along with the portions of the unit circle occupied by the spaces between each of the groups, in some embodiments. In some embodiments, the server device system 202 is configured by a program to fix the geometric center of the circle for Group A at an angle of $\frac{1}{2}\pi$ radians counterclockwise from the positive X-axis (e.g., 2530), as shown in Table XXVIII-I, below. According to some embodiments, the geometric center of the circle for Group B is located counterclockwise around the circumference of the unit circle from that of the circle for Group A, and the geometric center of the circle for Group C is located counterclockwise around the circumference of the unit circle from that of the circle for Group B.

In order for the space between each of the Groups A, B, and C and each of the other groups to be proportional to the group alignment value for the respective groups, the angle between the geometric centers of Groups A and B, represented by the angle $\gamma_{AB}$ on FIG. 25, is set by the server device system 202 to be equal to half the portion of the unit circle occupied by Group A, plus the portion of the unit circle occupied by the space between Groups A and B, plus half the portion of the unit circle occupied by Group A, as determined above, according to some embodiments. Therefore, the server device system 202 is configured by a program to determine the angle between the geometric centers of Groups A and B as $\gamma_{AB}=\frac{1}{2}\alpha_A+\beta_{AB}+\frac{1}{2}\alpha_B=(\frac{1}{2}\times 1.52)+0.21+(\frac{1}{2}\times 1.22)=1.58$ radians, from Tables XXVIII-G and XXVIII-H, above, according to some embodiments. Therefore, the geometric center of Group B is at an angle of $\frac{1}{2}\pi+1.58=3.15$ radians counterclockwise from the positive X-axis (e.g., 2530), if rounded to two decimal places, as shown in Table XXVIII-I, below.

Similarly, the angle between the geometric centers of Groups B and C, represented by the angle $\gamma_{BC}$ on FIG. 25, is set by the server device system 202 to be equal to half the portion of the unit circle occupied by Group B, plus the portion of the unit circle occupied by the space between Groups B and C, plus half the portion of the unit circle occupied by Group C, as determined above, according to some embodiments. Therefore, the server device system 202 is configured by a program to determine the angle between the geometric centers of Groups B and C as $\gamma_{BC}=\frac{1}{2}\alpha_B+\beta_{BC}+\frac{1}{2}\alpha_C=(\frac{1}{2}\times 1.22)+1.02+(\frac{1}{2}\times 1.22)=2.24$ radians, from Tables XXVIII-G and XXVIII-H, above, according to some embodiments. Therefore, the geometric center of Group C is at an angle of 3.15+2.24=5.39 radians counterclockwise from the positive X-axis (e.g., 2530), as shown in Table XXVIII-I, below.

Similarly, the angle between the geometric centers of Groups C and A, represented by the angle $\gamma_{CA}$ on FIG. 25, is set by the server device system 202 to be equal to half the portion of the unit circle occupied by Group C, plus the portion of the unit circle occupied by the space between Groups C and A, plus half the portion of the unit circle occupied by Group A, as determined above, according to some embodiments. Therefore, the server device system 202 is configured by a program to determine the angle between the geometric centers of Groups C and A as $\gamma_{CA}=\frac{1}{2}\alpha_C+\beta_{CA}+\frac{1}{2}\alpha_A=(\frac{1}{2}\times 1.22)+1.09+(\frac{1}{2}\times 1.52)=2.46$ radians, from Tables XXVIII-G and XXVIII-H, above, according to some embodiments. Therefore, the total of the angles between the geometric centers of Groups A and B, Groups B and C, and Groups C and A is 1.58+2.24+2.46=6.28 radians, which correctly equals the total number of radians in a circle, i.e., $2\pi$ radians, rounded to two decimal places.

The locations of each of the geometric centers of Groups A, B, and C around the circumference of the unit circle may be determined by the server device system 202 by trigonometric calculation whereby the positions along the X-axis (e.g., 2530) and Y-axis (e.g., 2532) are determined to be the cosine and sine, respectively, of the angle of the respective geometric center counterclockwise from the positive X-axis (e.g., 2530). For example, for the geometric center of the circle for Group A, fixed at an angle of $\frac{1}{2}\pi$ radians counterclockwise from the positive X-axis (e.g., 2530) in this example, the server device system 202 is configured to determine the position along the X-axis as $\cos(\frac{1}{2}\pi)=0$ and the position along the Y-axis as $\sin(\frac{1}{2}\pi)=1$, as shown in Table XXVIII-I, below. Similarly, for the geometric center of the circle for Group B, at an angle of 3.15 radians counterclockwise from the positive X-axis (e.g., 2530), from Table XXVIII-I, below, the position along the X-axis is $\cos(3.15)=-1.00$ and the position along the Y-axis is $\sin(3.15)=-0.01$, if rounded to two decimal places, as shown in Table XXVIII-I, below. Similarly, for the geometric center of the circle for Group C, at an angle of 5.39 radians counterclockwise from the positive X-axis (e.g., 2530), from Table XXVIII-I, below, the position along the X-axis is $\cos(5.39)=0.63$ and the position along the Y-axis is $\sin(5.39)=-0.78$, if rounded to two decimal places, as shown in Table XXVIII-I, below.

TABLE XXVIII-I

| Group | Angle/radians counterclockwise from positive X-axis | Position |
|---|---|---|
| A | $\frac{1}{2}\pi$ | (0, 1) |
| B | 3.15 | (−1.00, −0.01) |
| C | 5.39 | (0.63, −0.78) |

With the Groups A, B, and C located by the server device system 202 on the user interface display 2500 at the positions shown in Table XXVIII-I, above, it can be seen from FIG. 25 that Group A 2502 and Group B 2503 are located relatively close to each other. This relative closeness reflects the relatively low group association value between Groups A and B, i.e., 0.17, from Table XXVIII-F above, which in turn reflects the relatively small difference in the "group" priority patterns for the respective groups. In other words, the relative closeness of Group A 2502 and Group B 2503 on the user interface display 2500 indicates the relative similarity of the priority values associated with the participants in Group A and the qualitative responses QR1, QR2, and QR3, and the priority values associated with the participants in Group B and the qualitative responses QR1, QR2, and QR3, e.g., the priorities assigned by the participants in the respective group to the respective qualitative response. In contrast, it can be seen from FIG. 25 that Group C 2504 is located relatively far from both Group A 2502 and Group B 2503. This relatively far distance reflects the relatively high group association values between Group C 2504 and Group A 2502, i.e., 0.89, and between Group B 2503 and Group C 2504, i.e., 0.83, from Table XXVIII-F above, which in turn reflects the relatively large difference in the "group" priority patterns for the respective groups. In other words, the relative distance of Group C 2504 from both Group A 2502 and Group B 2503 on the user interface display 2500 indicates the relative dissimilarity of the priority values associated with the participants in Group C and the qualitative responses QR1, QR2, and QR3, and the priority values associated with the participants in Groups A and B and the qualitative responses QR1, QR2, and QR3, e.g., the priorities assigned by the participants in the respective group to the respective qualitative response. In summary, the relative closeness of Group A 2502 and Group B 2503 on the user interface display 2500 indicates the relative closeness or alignment of Groups A and B, and the relative distance of Group C 2504 from Group A 2502 and Group B 2503 on the user interface display 2500 indicates the relative lack of closeness or lack of alignment of Group C with Groups A and B. In this regard, the user interface display 2500 shows that the visual presentation of one group (e.g., Group A 2502) is closer to the visual presentation of a second group (e.g., Group B 2503) than the visual presentation of a third group (e.g., Group C 2504), according to some embodiments. (It should be noted that, although not shown in FIG. 25, the user interface display 2500 may include the software buttons or keys shown on the side panel of each of FIGS. 12, 13, 16, 17, 19, 21, 22, and 24 and described in more detail herein. Further, although not shown in FIG. 25, the user interface display 2500 may include visual representations of qualitative responses, participants, or both qualitative responses and participants as described herein.)

In some embodiments, if there are more than three groups, the order of the visual representations of the groups around the circumference of the unit circle may reflect the closeness or alignment of the respective groups, based at least on a comparison of the "group" priority patterns for the respective groups. For example, consider four groups, Groups A, B, C, and D, with group alignment values as shown in Table XXVIII-J, below.

TABLE XXVIII-J

| Groups | Group Alignment Value |
|---|---|
| A & B | 0.48 |
| A & C | 0.12 |
| A & D | 0.76 |
| B & C | 0.89 |

TABLE XXVIII-J-continued

| Groups | Group Alignment Value |
|---|---|
| B & D | 0.20 |
| C & D | 0.33 |

If these four groups were located on a user interface display in the default order A-B-C-D around the circumference of the unit circle, then Groups B and C, which have the highest group alignment value (i.e., 0.89, from Table XXVIII-J, above), indicating a relative lack of closeness or lack of alignment, would be adjacent to each other around the circumference of the unit circle, while Groups A and C, which have the lowest group alignment value (i.e., 0.12, from Table XXVIII-J, above), indicating a relative closeness or alignment, would be opposite each other around the circumference of the unit circle. Instead, the four groups may be located around the circumference of the unit circle in an order that reflects the closeness or alignment of the respective groups, in some embodiments.

In some embodiments, the server device system 202 may be configured to place the groups around the circumference of the unit circle in the order that minimizes the average group alignment value between adjacent groups. For example, if there are four groups, Groups A, B, C, and D, there are three unique orderings of the four groups around the circumference of the unit circle (considering rotated orderings, e.g., A-B-C-D and D-A-B-C, to be equivalent, since in each case, Group B is adjacent to Groups A and C and opposite Group D; also considering reverse orderings, e.g., A-B-C-D and D-C-B-A, to be equivalent, since in each case, Group B is adjacent to Groups A and C and opposite Group D). These three unique orderings of the four groups are shown in Table XXVIII-K, below: A-C-D-B (in which Group A is adjacent to Groups B and C), A-D-B-C (in which Group A is adjacent to Groups C and D), and A-B-C-D (in which Group A is adjacent to Groups D and B).

Continuing the example of Table XXVIII-J, the server device system 202 may be configured by a program to determine the average group alignment value between adjacent groups for each of these unique orderings. For example, if the ordering is A-C-D-B, Groups A and C are adjacent, Groups C and D are adjacent, Groups D and B are adjacent, and Groups B and A are adjacent. The group alignment values between these adjacent groups are 0.12 (for Groups A and C), 0.33 (for Groups C and D), 0.20 (for Groups D and B) and 0.48 (for Groups B and A), from Table XXVIII-J, above. Therefore, the average group alignment value between adjacent groups is (0.12+0.33+0.20+0.48)÷4=0.28, if rounded to two decimal places. The average group alignment values between adjacent groups for each of the three orderings is shown in Table XXVIII-K, below.

TABLE XXVIII-K

| Unique Ordering | Group Alignment Value for Adjacent Groups #1 & #2 | Group Alignment Value for Adjacent Groups #2 & #3 | Group Alignment Value for Adjacent Groups #3 & #4 | Group Alignment Value for Adjacent Groups #4 & #1 | Average Group Alignment Value for Adjacent Groups |
|---|---|---|---|---|---|
| A-C-D-B | A & C 0.12 | C & D 0.33 | D & B 0.20 | B & A 0.48 | (0.12 + 0.33 + 0.20 + 0.48)/4 = 0.28 |

TABLE XXVIII-K-continued

| Unique Ordering | Group Alignment Value for Adjacent Groups #1 & #2 | Group Alignment Value for Adjacent Groups #2 & #3 | Group Alignment Value for Adjacent Groups #3 & #4 | Group Alignment Value for Adjacent Groups #4 & #1 | Average Group Alignment Value for Adjacent Groups |
|---|---|---|---|---|---|
| A-D-B-C | A & D 0.76 | D & B 0.20 | B & C 0.89 | C & A 0.12 | (0.76 + 0.20 + 0.89 + 0.12)/4 = 0.49 |
| A-B-C-D | A & B 0.48 | B & C 0.89 | C & D 0.33 | D & A 0.76 | (0.48 + 0.89 + 0.33 + 0.76)/4 = 0.62 |

Figure 27:
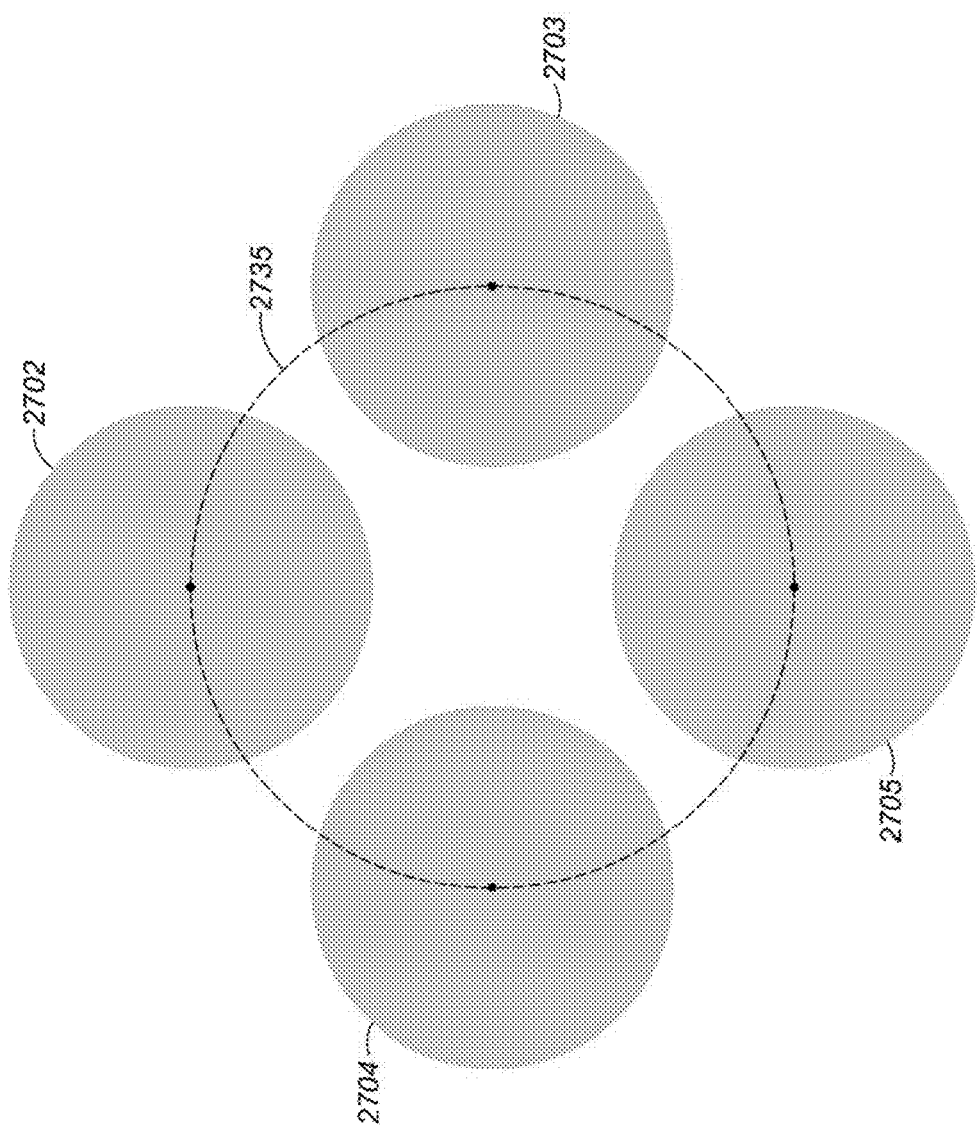
FIG. 27 illustrates an arrangement, in a significant visualization presented via a user interface display or graphical user interface, of visual representations of groups of qualitative responses, participants, or both qualitative responses and participants, where distance between groups provides an indication of relative relatedness between such groups, according to some embodiments of the present invention.

In this example, the average group alignment value between adjacent groups for the ordering A-C-D-B, i.e., 0.28, is less than the average group alignment value between adjacent groups for the ordering A-D-B-C, i.e., 0.49, and also less than the average group alignment value between adjacent groups for the ordering A-B-C-D, i.e., 0.62, from Table XXVIII-K, above. Therefore, the server device system 202 may be configured to place visual representations of the groups in the user interface display in a manner consistent with this ordering, which corresponds to the relatedness (e.g., group alignment values) between the groups. For instance, the server device system 202 may be configured to place visual representations of the groups in the user interface display in a manner where distance relationships between the visual representations of the groups correspond to the relatedness (e.g., group alignment values) between the at least four groups. In this regard, and with reference to the above example, the server device system 202 may be configured to place visual representations of the groups in a circumferential arrangement around the circumference of the unit circle in the circumferential order A-C-D-B, since this is the order that minimizes that average group alignment value between adjacent groups, in this example. FIG. 27 illustrates an example user interface display including visual representations of Group A 2702, Group B 2703, Group C 2704, and Group D 2705 arranged around the circumference of a unit circle 2735 in the order A-C-D-B, in some embodiments. As shown in FIG. 27, the distance between the groups is a function of the relatedness (e.g., group alignment values) between the groups. For example, in the example of FIG. 27, the visual representations of the two most closely related groups, i.e., Group A and Group C with the lowest group alignment value of 0.12 from Table XXVIII-J, above, are adjacent in the circumferential arrangement and in adjacent positions in the circumferential order A-C-D-B, and the two least closely related groups, i.e., Group B and Group C with the highest group alignment value of 0.89 from Table XXVIII-J, above, are non-adjacent and opposing in the circumferential arrangement and in non-adjacent and opposite positions in the circumferential order A-C-D-B. In this regard, this selected order A-C-D-B can be seen to be an improvement over the default order, A-B-C-D, discussed above, in that Groups B and C, which have the highest group alignment value (i.e., 0.89, from Table XXVIII-J, above), indicating a relative lack of closeness or lack of alignment, were adjacent to each other when placed in the default order A-B-C-D, but are opposite each other when placed in the improved order A-C-D-B. Further, Groups A and C, which have the lowest group alignment value (i.e., 0.12, from Table XXVIII-J, above), indicating a relative closeness or alignment, were opposite each when placed in the default order A-B-C-D, but are adjacent to each other when placed in the improved order A-C-D-B. Thus, the ordering A-C-D-B of the visual representations of the Groups A, B, C, and D around the circumference of the unit circle better reflects the closeness or alignment of the respective groups.

Of course, the examples of spacing and ordering the visual representations of groups on a user interface display in Tables XXVIII-E to XXVIII-K are just some examples of many possible examples according to various embodiments of the present invention that are provided for illustration purposes only. Accordingly, it should be noted that the present invention is not limited to the particular analysis of group-association-values or group alignment values performed in the examples of Tables XXVIII-E to XXVIII-K and is not limited to the particular definitions of the locations of the groups. For example, rather than being spaced around the circumference of a unit circle, the geometric centers of the groups may be at different distances from the geometric center of the visualization region, the distance for each reflecting a measure of the closeness or alignment of the respective group with the population as a whole, based at least on a comparison of the "group" priority pattern for the respective group and for the population as a whole. As another example, the groups may be located so as to leave a gap of a fixed size between the closed shapes for each pair of adjacent groups, regardless of the closeness or alignment of the respective groups.

Figure 19:
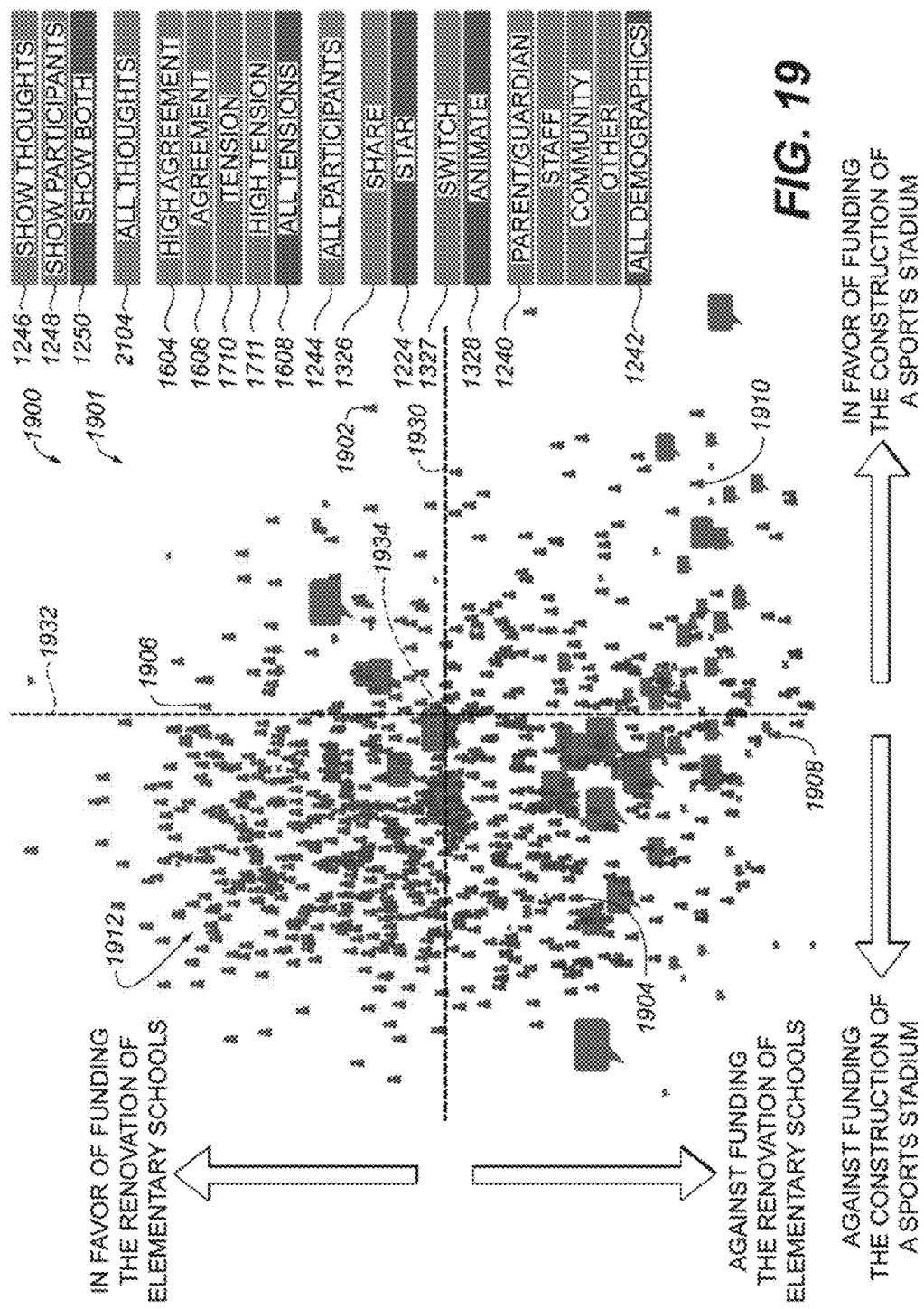
FIG. 19 illustrates a significant visualization presented via a user interface display or graphical user interface that provides visual representations of groups of participants of opposing orientations, according to some embodiments of the present invention.

According to some embodiments, the locations of the visual representations of participants in the user interface display is determined based at least on two or more independent identifications of groups, e.g., according to method 900, and determined independently of any location of any visual presentation of a shape representing an identified group. In this regard, FIG. 19 illustrates an example of a user interface display 1900, which visually presents information regarding results of the analysis performed at step 906, based on two independent identifications of groups by method 900, according to some embodiments of the present invention. The visual presentations of shapes representing the identified groups are not visually presented in the user interface display 1900 of FIG. 19, according to some embodiments, in contrast, e.g., to the visually presented circular shapes of groups 1202-1205 in user interface display 1200 of FIG. 12. In this regard, the location of the visual representations of participants (e.g., 1902, 1904, 1906) in the user interface display 1900 may be determined independently of the locations of any visual presentation of shapes representing the groups by the server device system 202 based at least on an analysis of the respective participant's above-discussed group-association-values with respect to at least each of the groups identified, e.g., according to step 906.

For example, assume that a first analysis performed by the server device system 202, e.g., according to method 900, of a process, e.g., 300, identifies two groups of participants with opposing orientations (e.g., according to FIG. 11), e.g., Group A reflecting the orientation "in favor of funding the construction of a sports stadium" and Group B reflecting the opposite orientation "against funding the construction of a sports stadium". Further, assume that a second analysis performed by the server device system 202, e.g., according to method 900, of the same process identifies two different groups of participants with different opposing orientations (e.g., according to FIG. 11), e.g., Group C reflecting the orientation "in favor of funding the renovation of elementary schools" and Group D reflecting the opposite orientation "against funding the renovation of elementary schools". Note that these two analyses may be independent. For example, a participant who is in favor of funding the construction of a sports stadium, so assigned to Group A in the first analysis, may be in favor of funding the renovation of elementary schools, so assigned to Group C in the second analysis, but may equally be against funding the renovation of elementary schools, so assigned to Group D in the second analysis. Similarly, a participant who is assigned to Group B in the first analysis may be assigned to either Group C or Group D in the second analysis.

In this example, the location of the visual representations of participants in the user interface display 1900 may be determined by the server device system 202 by determining a position along an X-axis (e.g., 1930) based on an analysis of the respective participant's group-association-values with respect to the groups identified in the first analysis, e.g., Groups A and B, and a position along a Y-axis (e.g., 1932) based on an analysis of the respective participant's group-association-values with respect to the groups identified in the second analysis, e.g., Groups C and D, assuming that the geometric center 1934 of the visualization region 1901 is an origin. A position along the X-axis (e.g., 1930) may be determined for each respective participant, equal to the group-association-value between the respective participant and Group A minus the group-association-value between the respective participant and Group B, in some embodiments. For example, if the group-association-value between participant 1902 and Group A is 0.9 and the group-association-value between participant 1902 and Group B is 0.1, the position of participant 1902 along the X-axis may be 0.9–0.1=0.8, i.e., the visual representation of participant 1902 may be displayed towards the positive end of the X-axis, indicating participant 1902's close alignment with Group A, reflecting the orientation "in favor of funding the construction of a sports stadium". Similarly, if the group-association-value between participant 1904 and Group A is 0.3 and the group-association-value between participant 1904 and Group B is 0.8, the position of participant 1904 along the X-axis may be 0.3–0.8=–0.5, i.e., the visual representation of participant 1904 may be displayed towards the negative end of the X-axis, indicating participant 1904's moderately close alignment with Group B, reflecting the opposite orientation "against funding the construction of a sports stadium".

Further, a position along the Y-axis (e.g., 1932) may be determined for each respective participant, equal to the group-association-value between the respective participant and Group C minus the group-association-value between the respective participant and Group D, in some embodiments. For example, if the group-association-value between participant 1906 and Group C is 0.9 and the group-association-value between participant 1906 and Group D is 0.3, the position of participant 1906 along the Y-axis may be 0.9–0.3=0.6, i.e., the visual representation of participant 1906 may be displayed towards the positive end of the Y-axis, indicating participant 1906's moderately close alignment with Group C, reflecting the orientation "in favor of funding the renovation of elementary schools". Similarly, if the group-association-value between participant 1908 and Group C is 0.2 and the group-association-value between participant 1908 and Group D is 1.0, the position of participant 1908 along the Y-axis may be 0.2–1.0=–0.8, i.e., the visual representation of participant 1908 may be displayed towards the negative end of the Y-axis, indicating participant 1908's close alignment with Group D, reflecting the opposite orientation "against funding the renovation of elementary schools".

Note that in this example, the results of the two independent analyses are reflected in the two independent positions of each participant along the X-axis (e.g., 1930) and the Y-axis (e.g., 1932). For instance, participant 1910 is displayed towards the positive end of the X-axis, indicating participant 1910's close alignment with Group A, reflecting the orientation "in favor of funding the construction of a sports stadium", but towards the negative end of the Y-axis, indicating participant 1910's close alignment with Group D, reflecting the independent orientation "against funding the renovation of elementary schools". In the same way, the overall distribution of participants across the visualization region 1901 of the user interface display 1900 reflects the overall orientation of the population of participants. For example, the large cluster of participants 1912 in the region towards the negative end of the X-axis and the positive end of the Y-axis indicates that a large number of participants are "against funding the construction of a sports stadium" but "in favor of funding the renovation of elementary schools".

In some embodiments, either or both of the two independent analyses reflected in the two independent positions of each participant along the X-axis and the Y-axis may identify only one group of participants reflecting one orientation, rather than two groups of participants with opposing orientations. For example, a first analysis may identify a group of participants with one orientation, e.g., Group A reflecting the orientation "in favor of funding the construction of a sports stadium", and a second analysis may identify another group of participants with a different orientation, e.g., Group B reflecting the orientation "in favor of funding the renovation of elementary schools". In this example, the location of the visual representations of participants in the user interface display 1900 may be determined by the server device system 202 by determining a position along an X-axis (e.g., 1930) based on an analysis of the respective participant's group-association-values with respect to the group identified in the first analysis, e.g., Group A, and a position along a Y-axis (e.g., 1932) based on an analysis of the respective participant's group-association-values with respect to the group identified in the second analysis, e.g., Group B. A position along the X-axis (e.g., 1930) may be determined for each respective participant, equal to twice the group-association-value between the respective participant and Group A minus one, in some embodiments. For example, if the group-association-value between participant 1902 and Group A is 0.9, the position of participant 1902 along the X-axis may be 2×0.9–1=0.8, i.e., the visual representation of participant 1902 may be displayed towards the positive end of the X-axis, indicating participant 1902's close alignment with Group A, reflecting the orientation "in favor of funding the construction of a sports stadium". Similarly, if the group-association-value between participant 1904 and Group A is 0.25, the position of participant 1904 along the X-axis may be 2×0.25–1=–0.5, i.e., the visual representation of participant 1904 may be displayed towards the negative end of the X-axis, indicating participant 1904's moderately distant alignment with Group A.

Further, a position along the Y-axis (e.g., 1932) may be determined for each respective participant, equal to twice the group-association-value between the respective participant and Group B minus one, in some embodiments. For example, if the group-association-value between participant 1906 and Group B is 0.8, the position of participant 1906 along the Y-axis may be 2×0.8–1=0.6, i.e., the visual representation of participant 1906 may be displayed towards the positive end of the Y-axis, indicating participant 1906's moderately close alignment with Group B, reflecting the orientation "in favor of funding the renovation of elementary schools". Similarly, if the group-association-value between participant 1908 and Group B is 0.1, the position of participant 1908 along the Y-axis may be 2×0.1−1=−0.8, i.e., the visual representation of participant 1908 may be displayed towards the negative end of the Y-axis, indicating participant 1908's distant alignment with Group B.

Of course, the above examples are just a few of many possible examples according to various embodiments of the present invention that are provided for illustration purposes only. Accordingly, it should be noted that the present invention is not limited to the particular analyses of group-association-values performed in the above example and is not limited to the particular arrangement of axes or the particular definition of the position of a participant along each axis. For example, three independent identifications of groups might be performed, rather than two, and positions for each participant might be determined along three axes, e.g., an X-axis, a Y-axis and a Z-axis, rather than two, to generate a three-dimensional visualization. In this regard, three-dimensional visualizations may be provided for any of the user interface displays herein (e.g., at least FIGS. 12-17, 19-25, and 27).

Returning to FIG. 12, the user interface display 1200 (as well as each of at least the subsequently described user interface displays of at least FIGS. 13-17, 19-25, and 27) may include software buttons or keys (e.g., reference numerals 1246, 1248, 1250, etc.) to cause execution of a respective function or functions. When such a software button or key is illustrated in dark gray (e.g., like the "show both" button 1250 in the state of FIG. 12), the dark gray indicates that the respective software button or key is in a selected or activated state. Such a software button or key illustrated in a medium gray (e.g., like the "show thoughts" button 1246 in the state of FIG. 12) indicates that the respective software button or key is in a non-selected or de-activated state. Such a software button or key illustrated in a light gray (e.g., like the "all participants" button 1244 in the state of FIG. 16) indicates that the respective software button or key is in an unavailable state, such as a state when the respective software button or key is unable to be selected or activated. It should be noted that, although software buttons or keys are illustrated, other user interface tools (e.g., of the data input-output device system 120) may be implemented to execute the respective function or functions.

Again, with respect to FIG. 12, in some embodiments, visual representations of different subsets of participants may be displayed by user selection of user interface software buttons or keys. For example, if each participant has been identified as belonging to one of the demographic groups "parent/guardian", "staff" member, "community" member and "other", user-activation of the "parent/guardian" software button or key 1240 may remove the visual representations of those participants in the demographic groups "staff" member, "community" member and "other" from the user interface display 1200, so that only visual representations of those participants in the demographic group "parent/guardian" are displayed. User-activation of the "all demographics" software button or key 1242, or the "all participants" software button or key 1244 may subsequently remove this demographic filter, so that visual representations of all participants are shown, regardless of demographic group. Selection or activation of the "all participants" button 1244 may remove a broader set of filters, besides just demographic filters, whereas selection of the "all demographics" button 1242 may merely remove all demographics filters, according to some embodiments. It should be noted that the present invention is not limited to identifying any particular different subsets of participants by demographic group. In this regard, user selection of user interface keys might cause different subsets of participants to be displayed according to the language, e.g., English or Spanish, in which each participant shared qualitative responses at step 312, or according to any other analysis of the characteristics of the participants.

In some embodiments, the user interface display 1200 includes visual representations of qualitative responses (e.g., 1214, 1216, 1218) with respect to the visually presented groups (e.g., 1202-1205). The locations of the respective visual representations of qualitative responses (e.g., 1214, 1216, 1218) in the user interface display 1200 may be determined by the server device system 202 based at least on an analysis of the group-association-values (which may be deemed resonance values indicating amounts that qualitative responses resonate with the groups of participants, according to some embodiments) associated with the respective qualitative responses (e.g., Table IX, above) with respect to at least each of the displayed groups (e.g., groups 1202-1205), in accordance with the above-discussion of placement of visual representations of participants based on their associated group-association-values.

In some embodiments, the server device system's (202) associating of each of at least some qualitative responses with each of at least some groups (e.g., per step 906c, step 910, or both steps 906c and 910) may include determining at least a first distance or spaced relationship (e.g., an X-axis shift, a Y-axis shift, or both) between a particular qualitative response and a first cluster or group (e.g., 1204) and a second distance or spaced relationship (e.g., an X-axis shift, a Y-axis shift, or both) between the particular qualitative response and a second cluster or group (e.g., 1203) based at least on an analysis of the priority values associated with the first qualitative response. The visual representation (e.g., 1218) of the particular qualitative response may be visually located between at least the two clusters or groups (e.g., 1203, 1204) consistent with the determined first distance and the determined second distance. Of course, distances or spaced relationships between a particular qualitative response and three or more clusters or groups may also be determined by the server device system 202 according to some embodiments.

In this regard, the server device system 202 may be configured by the program at least to associate (e.g., via respective group-association-values) each of at least some qualitative responses with each of at least some groups. This association may cause the server device system 202 to cause the visual presentation of user interface display 1200 to include a visual representation (e.g., 1214) of a qualitative response visually located within one of the groups (e.g., 1202) or corresponding cluster of visual representations of participants. Alternatively or in addition, the visual presentation of user interface display 1200 may include a visual representation of a qualitative response (e.g., 1218) visually located outside (e.g., between at least two groups) one of the groups (e.g., 1202) or corresponding cluster of visual representations of participants.

The example of Table XXVIII, above, illustrates an example of the determination of the location of the visual representations of participants in a user interface display (e.g., 1200), based on an analysis of the respective participant's group-association-values with respect to the groups.

The location of the visual representations of qualitative responses in a user interface display (e.g., 1200), based on an analysis of the respective qualitative response's group-association-values with respect to the groups, may be determined in the same or a similar way. For example, the group-association-values for qualitative responses was discussed above with respect to step 906c. In this regard, a displacement from the origin (e.g., 1234) towards the geometric center of each of the groups in the user interface display (e.g., 1200) may be determined for each of the qualitative responses, equal to the respective qualitative response's group-association-value with respect to the respective group multiplied by the vector location of the respective group, in some embodiments. The location of the visual representation of a qualitative response in the user interface display may be equal to the total of the displacements for the respective qualitative response and each of the groups, in some embodiments. In this way, the location of the visual representation of each of the qualitative responses relative to the geometric center of each of the groups in the user interface display may reflect the group-association-value for the respective qualitative response and the respective group.

In some embodiments, the visual representations of each respective qualitative response may be located by the server device system 202 within the closed shape for a group with which the respective qualitative response is associated, e.g., the group for which the respective resonance values, which indicate an amount that the respective qualitative response resonates with at least the participants in each of the groups (e.g., as determined in step 906c, step 910, or both steps 906c and 910), indicate that the respective qualitative response resonates with the participants in the respective group more than with the participants in any other group. Returning to FIG. 24, the example of Tables XXVIII-A to XXVIII-D, above, illustrates an example result of a determination by the server device system 202 of locations of visual representations of participants in a user interface display 2400, the visual representations of each of the participants associated with each of the respective groups being shown within the visual representation of a closed shape for the respective group, based on an analysis of the respective participant's group-association-values with respect to the groups, according to some embodiments. The location of visual representations of qualitative responses in the user interface display 2400 by the server device system 202, the visual representations of each of the qualitative responses associated with each of the respective groups being shown within the visual representation of a closed shape for the respective group, based on an analysis of the respective qualitative response's group-association-values with respect to the groups, may be determined in the same or a similar way. For example, the group-association-values for qualitative responses was discussed above with respect to step 906c. In this regard, a displacement from the origin (e.g., 2434) towards the geometric center of each of the groups in the user interface display (e.g., 2400) may be determined for each of the qualitative responses, as discussed above with regard to the example of Table XXVIII. The location of the visual representation of a qualitative response in the user interface display may be determined by the server device system 202 as equal to the total of the displacements for the respective qualitative response and each of the groups, scaled (e.g., by dividing by the highest magnitude of the displacement from the origin across all the qualitative responses in the group with which the respective qualitative response is most closely associated or aligned, and multiplying by the radius of the circle for the group with which the respective qualitative response is most closely associated or aligned) and translated (e.g., so that the origin is translated to the geometric center of the group with which the respective qualitative response is most closely associated or aligned) so that the visual representation of each respective qualitative response is located within the closed shape for the group with which the respective qualitative response is most closely associated or aligned, in some embodiments. In this way, the location of the visual representation of each of the qualitative responses within the closed shape for the group with which the respective qualitative response is associated, relative to the offset of the geometric center of each of the groups from the origin of the user interface display, may reflect the group-association-value for the respective qualitative response and the respective group.

In this regard, as shown in FIG. 24, each of the visual representations (or at least the geometric centers of each of the visual representations) of the qualitative responses in cluster 2406 are located within the bounds of the closed shape of group 2402, and none associated with cluster 2406 are located outside the bounds of the closed shape of group 2402, for example, according to some embodiments. The same applies to the other groups 2403, 2404, 2405 in FIG. 24. In this regard, the cluster (e.g., cluster 2406) of visual representations of the participants in a group (e.g., group 2402) is represented in a manner consistent with one or more results of an analysis of priority values (e.g., as part of step 906c, as discussed above, which may involve the determination of group-association-values, which may be deemed resonance values, as discussed herein), according to some embodiments. The one or more results of the analysis may indicate at least that the respective resonance values for each of the qualitative responses in a particular group (e.g., group 2402) most closely align the qualitative responses in the particular group with the particular group as compared to each other group (e.g., groups 2403, 2404, 2405) of the plurality of groups (e.g., groups 2402-2405). Further in this regard, the location of the visual representations of qualitative responses in the user interface display 2400 may be determined by the server device system 202 based at least on an analysis of the above-discussed group-association-values (which may be deemed resonance values indicating an amount that the qualitative responses resonate with the respective groups, according to some embodiments) with respect to at least each of the displayed groups (e.g., groups 2402-2405).

The example discussed above with respect to FIG. 19 illustrates an example of the determination of the locations of the visual representations of participants in a user interface display 1900 independently of any location of any visual presentation of a shape representing an identified group and based at least on an analysis of the respective participant's group-association-values with respect to at least each of the groups identified, e.g., according to step 906. The location of the visual representations of qualitative responses in a user interface display (e.g., 1900), based at least on an analysis of the respective qualitative response's group-association-values with respect to the groups, may be determined in the same or a similar way, independently of any location of any visual presentation of a shape representing an identified group. For example, the group-association-values for qualitative responses was discussed above with respect to step 906c. Assume, as the example of FIG. 19, above, that a first analysis performed by the server device system 202, e.g., according to method 900, of a process, e.g., 300, identifies two groups of participants with opposing orientations (e.g., according to FIG. 11), e.g., Groups A and B, and that a second analysis, e.g., according to method 900, of the same process identifies two different groups of participants with different opposing orientations (e.g., according to FIG. 11), e.g., Groups C and D. In this regard, a position along an X-axis (e.g., 1930) may be determined for each respective qualitative response, equal to the group-association-value between the respective qualitative response and Group A minus the group-association-value between the respective qualitative response and Group B, in some embodiments. Further, a position along the Y-axis (e.g., 1932) may be determined for each respective qualitative response, equal to the group-association-value between the respective qualitative response and Group C minus the group-association-value between the respective qualitative response and Group D, in some embodiments. In this way, the location of the visual representation of each of the qualitative responses along each of the two or more axes in the user interface display may reflect the group-association-values for the respective qualitative response and the groups identified in each of the two or more independent identifications of groups.

Returning to FIG. 12, according to some embodiments, different visual characteristics may be applied at step 910 within various categories of objects (e.g., groups, participants, qualitative responses) to further improve efficiency of viewer understanding of the information presented. For example, each group 1202-1205 may be visually presented with a different color, a different size, or both. In this regard, a group with more associated participants, qualitative responses, or both, may be presented visually with a larger size than a group having fewer associated participants, qualitative responses, or both. In some embodiments, respective participants may be visually presented in a color that matches the color of the shape of the group to which the respective participant is most closely aligned (e.g., according to the respective participant's group-association-values, as discussed above). For example, group 1202 may be presented visually in a red-color-gradient, and all visual representations of participants (e.g., in cluster 1206) that are most closely aligned with group 1202 may be presented visually in a red color, while group 1205 may be presented visually in a yellow-color-gradient, and all visual representations of participants (e.g., in cluster 1207) that are most closely aligned with group 1205 may be presented visually in a yellow color. In this regard, although FIG. 12 shows qualitative response visual representations (e.g., 1214) as having a same color, they could instead acquire different colors, e.g., matching the color of their most-closely-associated groups (e.g., by analysis of respective group-association-values), in some embodiments. In some embodiments, qualitative responses may be visually presented with different sizes indicating the relative priority assigned to the respective qualitative response by the participants at step 330. For example, the visual representation of the qualitative response 1216 may be presented larger than the visual representation of the qualitative response 1218, at least because the qualitative response associated with the visual representation 1216 may have had a higher total priority value (e.g., sum of priority values) assigned to it by the participants at step 330 than the qualitative response associated with the visual representation 1218.

It should be noted, however, that the invention is not limited to the particular visual characteristics or differences therein discussed above or shown in FIG. 12 (or any other user interface display described herein, for example, the user interface displays of FIGS. 13-17, 19-25, and 27), which are provided for illustration purposes only. Further, not all of the elements of the user interface display 1200 shown in FIG. 12 (or any other user interface display described herein, for example, the user interface displays of FIGS. 13-17, 19-25, and 27) need to be displayed concurrently or at all, according to some embodiments. For example, the shapes of groups 1202-1205 need not be visually presented, thereby leaving the clusters of participants (e.g., at least 1206, 1207), e.g., color-coded by respective group, the visual representations of the qualitative responses (e.g., at least 1214, 1216, 1218), or both the clusters of participants (e.g., at least 1206, 1207) and the visual representations of the qualitative responses (e.g., at least 1214, 1216, 1218) to identify the respective groups, according to some embodiments. For instance, according to some embodiments, the user interface display 1200 may display a plurality of clusters of participants, each representing its participants in a unique color, to communicate to the viewer the different groups of participants. Locations of the visually represented qualitative responses with respect to these clusters may indicate to the viewer to which groups the respective qualitative responses belong.

Further in this regard, in some embodiments, the visual representations of the qualitative responses (e.g., at least 1214, 1216, 1218) are not shown in the user interface display 1200. For example, the user interface display 1200 may not display the visual representations of the qualitative responses, while displaying at least the clusters of participants (e.g., at least 1206, 1207), the shapes of groups 1202-1205, or both the clusters of participants (e.g., at least 1206, 1207) and the shapes of groups 1202-1205, according to some embodiments of the present invention.

Further still, in some embodiments, the visual representations of the clusters of participants (e.g., at least 1206, 1207) are not shown in the user interface display 1200. For instance the user interface display may not display the visual representations of the clusters of participants, while displaying at least the visual representations of the qualitative responses (e.g., at least 1214, 1216, 1218), the shapes of groups 1202-1205, or both the visual representations of the qualitative responses (e.g., at least 1214, 1216, 1218) and the shapes of groups 1202-1205, according to some embodiments.

In some embodiments, the visual representations of the qualitative responses and the participants may be shown or hidden by user selection of user interface software buttons or keys. For example, user-activation of the "show thoughts" software button or key 1246 may remove the visual representations of the participants from the user interface display 1200, so that only the visual representations of the qualitative responses are displayed. Similarly, user-activation of the "show thoughts" software button or key 1248 may remove the visual representations of the qualitative responses from the user interface display 1200, so that only the visual representations of the participants are displayed. User-activation of the "show both" software button or key 1250 may cause visual representations of both the qualitative responses and the participants to be shown. In this regard, only one of the software buttons or keys 1246, 1248, 1250 may be in a selected or activated state at a time, according to some embodiments.

In some embodiments, the user interface display 1200 illustrates a relative positioning of participants with respect to groups based at least on an analysis of how each respective participant assigned priority values to the qualitative responses at step 330. In other words, in some embodiments, the user interface display 1200 may be based at least on an analysis performed at step 906 that analyzes how each respective participant assigned priority values to qualitative responses at step 330. Accordingly, in some embodiments where the priority values assigned by participants at step 330 are numbers of stars, the user interface display 1200 may be referred to as a "star cohort display".

Figure 13:
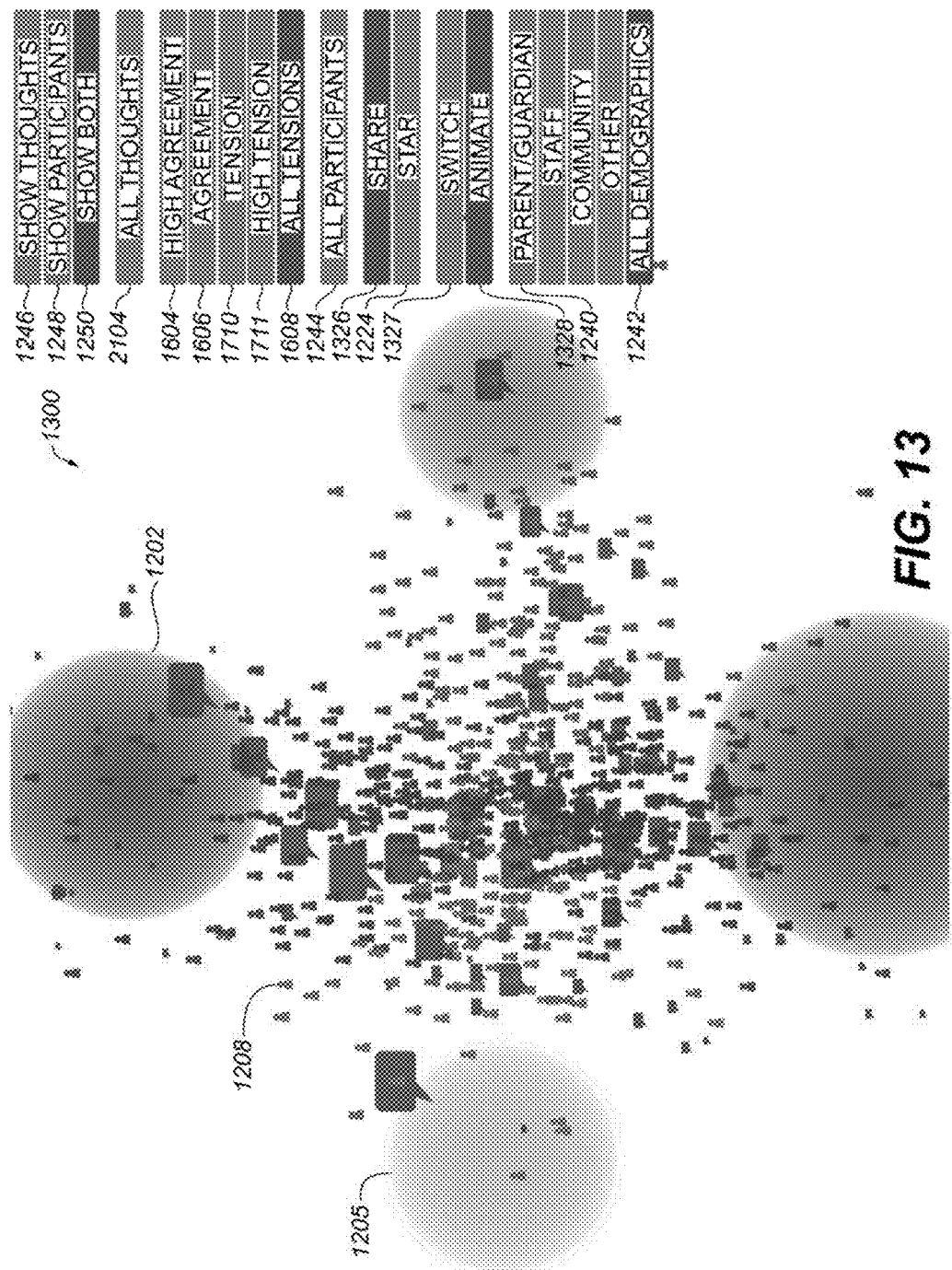
FIG. 13 illustrates a significant visualization presented via a user interface display or graphical user interface that provides visual representations of groups of participants and qualitative responses, according to some embodiments of the present invention.

On the other hand, it may be beneficial to the viewer in some circumstances to understand the relationships between the participants and the groups based on how each respective participant's self-originated qualitative responses aligned with the respective groups. In other words, each of at least some of the participants generated one or more qualitative responses at step 312, and each of at least some of these participant-generated qualitative responses from step 312 was evaluated at step 330. Accordingly, each respective participant may be associated with one or more groups at step 906, in some embodiments, based at least on an analysis of how each respective participant's own qualitative responses, which were generated by the respective participant at step 312, were evaluated at step 330. Results of such an analysis may be presented to a viewer in a "share cohort display", an example of which is shown in FIG. 13, according to some embodiments. Such a display may be referred to as a "share cohort display", at least because each respective participant is associated with one or more groups based on an analysis of the qualitative responses that such respective participant shared.

In some embodiments, this association may be implemented by configuring the server device system 202 (e.g., according to program instructions) to determine a group-association-value for each respective participant and each respective group, based at least on an analysis of group-association-values for the respective group and each of a first set of qualitative responses associated with the respective participant. This first set of qualitative responses may be the qualitative responses that the particular participant provided, shared, or generated at step 312. In some embodiments, the group-association-value for each respective participant and each respective group may be equal to the average of the group-association-values for the respective group and each of the first set of qualitative responses associated with the respective participant.

The example of Table XXIX, below, illustrates an example of determining a group-association-value for a particular participant and each respective group, based on an analysis of group-association-values for the respective group and each of the qualitative responses generated by the particular participant at step 312. Continuing with the example of Tables VI, VII, VIII, and IX, suppose that participant P1 generated qualitative responses QR1 and QR2 at step 312. In this example, the group-association-values for qualitative response QR1 and Groups A, B, and C are 0.47, 0.73, and 0.8, respectively, from Table IX, and the group-association-values for qualitative response QR2 and Groups A, B, and C are 0.67, 0.7, and 0.9, respectively, also from Table IX. In this regard, the server device system 202 may be configured, according to some embodiments, to associate, in a first process, each respective qualitative response in a first set of the plurality of qualitative responses with each respective group of at least one of the plurality of identified groups based at least on an analysis of the priority values associated with the respective qualitative response, the first set of the plurality of qualitative responses (e.g., QR1 and QR2 in this example) associated with a particular participant (e.g., participant P1 in this example). In some embodiments, the identification of such respective group-association-values may be considered an identification of the respective particular groups (e.g., Groups A, B, and C) based on an analysis of one or more results of the first process.

Continuing with the example in the previous paragraph, the average group-association-values for Groups A, B, C and each of the qualitative responses generated or shared by participant P1 are (0.47+0.67)/2=0.57, (0.73+0.7)/2=0.72 and (0.8+0.9)/2=0.85, respectively, if rounded to two decimal places. In some embodiments, the group with the group-association-value indicating the closest degree of association may be identified as a first particular group most closely related to the particular participant (e.g., Group C with a group-association-value of 0.85 may be identified by the server device system 202 as being most closely related to participant P1) in the case of evaluating the qualitative responses shared by the particular participant at step 312. This first particular group may indicate the group to which the particular participant was most closely aligned when the participant shared his or her responses at step 312 before viewing others' responses.

With the respective group-association-values determined, the particular participant may be placed on the map of FIG. 13 according to the group-association-values in the second row of Table XXIX, below, by the server device system 202, according to the techniques described above, according to some embodiments. On the other hand, the particular participant may be placed on the map of FIG. 12, according to the group-association-values in the third row of Table XXIX, below by the server device system 202, according to the techniques described above, according to some embodiments.

In Table XXIX, below, these group-association-values, based on participant P1's generation of qualitative responses at step 312, are compared with the group-association-values determined in the example of Tables VI, VII, and VIII, above, based on participant P1's evaluation of qualitative responses at step 330.

TABLE XXIX

|  | Group-Association-Value for Group A | Group-Association-Value for Group B | Group-Association-Value for Group C |
| --- | --- | --- | --- |
| based on participant P1's generation of qualitative responses | 0.57 | 0.72 | 0.85 |
| based on participant P1's evaluation of qualitative responses | 0.50 | 0.38 | 0.25 |

The group-association-values in Table XXIX, above, indicate that, in this example, participant P1 may have shifted, with respect to Groups A, B, and C, between step 312, when he or she generated qualitative responses QR1 and QR2, and step 330, when he or she evaluated his or her own qualitative responses QR1 and QR2 as well as another participant's qualitative response QR3. For example, the group-association-value for Group C based on participant P1's generation of qualitative responses at step 312, i.e., 0.85, is significantly higher than the group-association-value for Group C based on participant P1's evaluation of qualitative responses at step 330, i.e., 0.25, which may indicate that participant P1's evaluation of his or her own and others' qualitative responses may have shifted him or her significantly away from Group C, in this example. In this regard, in some embodiments, the group with the group-association-value indicating the closest degree of association may be identified as a second particular group most closely related to the particular participant (e.g., now Group A with a group-association-value of 0.50 in Table XXIX may be identified by the server device system 202 as being most closely related to participant P1), in the case of evaluating the qualitative responses starred or otherwise evaluated by the particular participant at step 330. This second particular group may indicate the group to which the particular participant was most closely aligned after viewing others' responses at step 330. The difference between the first particular group and the second particular group may be visually presented (e.g., via user interface displays 1200 and 1300) and may be useful in understanding how the particular participant shifted between steps 312 and 330, according to some embodiments.

Of course, the example of Table XXIX is just one example of many possible examples according to various embodiments of the present invention that is provided for illustration purposes only. Accordingly, it should be noted that the present invention is not limited to the particular analysis of group-association-values performed in the example of Table XXIX and is not limited to the particular definition of the group-association-value based on a participant's generation of qualitative responses. For example, the group-association-values based on a particular participant's generation of qualitative responses may be normalized so that the total of these group-association-values across all the groups is one. Similarly, the group-association-values based on a particular participant's evaluation of qualitative responses may be normalized so that the total of these group-association-values across all the groups is one. Further, the group-association-values based on a particular participant's generation of qualitative responses may be scaled relative to the group-association-values based on the particular participant's evaluation of qualitative responses, to make the comparison between the different group-association-values more meaningful.

With regard to the placement of a particular participant on the map of FIG. 13 by the server device system 202, it can be seen that, in some embodiments, the server device system 202 may be configured by program instructions at least to associate, in a first process, each respective qualitative response in a first set of qualitative responses with each respective group (e.g., 1202-1205) based at least on an analysis of the priority values associated with the respective qualitative response. The first set of qualitative responses may be associated with a particular participant, and the first process may include determining one or more group-association-values associating the first set of qualitative responses with each respective group (e.g., 1202-1205). In some embodiments, the server device system 202 may be configured by program instructions at least to identify a first particular group based at least on an analysis of one or more results of the first process. This first particular group (e.g., a "share cohort") may represent the group to which the particular participant's shared qualitative responses (e.g., the first set of qualitative responses) are most closely aligned or related (e.g., with the highest group-association-value). In the example of FIG. 13, this first particular group may be group 1202, which represents the group the participant visually represented by visual representation 1208 is most closely aligned, according to some embodiments. In some embodiments, the server device system 202 may be configured by program instructions at least to identify a second particular group based at least on an analysis of priority values associated with the particular participant with respect to each group (e.g., 1202-1205). This second particular group (e.g., the "star cohort") may represent the group to which the participant him or herself is most closely aligned or related based on how the particular participant evaluated (e.g., assigned priority values to) qualitative responses at step 330. In the example of FIG. 12, the second particular group may be group 1205, which represents the group the participant visually represented by visual representation 1208 is most closely aligned, according to some embodiments (e.g., the particular participant represented by 1208 is closer to group 1205 in FIG. 12 (which represents an analysis of the particular participant's evaluations performed at step 330), but is closer to group 1202 in FIG. 13 (which represents an analysis of the particular participant's provided qualitative responses at step 312).

As discussed above, FIG. 13 illustrates an example of a user interface display 1300, which may be referred to as a "share cohort display", according to some embodiments. Such a "share cohort display" may be toggled "on" by user selection of user interface key 1326, whereas a "star cohort display" may be toggled "on" by user selection of user interface key 1224, according to some embodiments of the present invention. In the example of FIG. 13, the user interface key 1326 is shown in the selected or "on" position (illustrated with the dark gray background of the key 1326 in FIG. 13), while the user interface key 1224 is shown in the unselected or "off" position (illustrated with the light gray background of the key 1224 in FIG. 13). (On the other hand, note that FIG. 12, which illustrates the "star cohort display", shows the "share" software button or key 1326 in the light-gray unselected or "off" position and the "star" software button or key 1224 in the dark-gray selected or "on" position.)

Accordingly, in some embodiments, the user is able to view how the participants changed or shifted with respect to the groups between the "share cohort display" of FIG. 13 and the "star cohort display" of FIG. 12 by toggling "on" or "off" the respective user interface keys 1326, 1224. In some embodiments, the shifting of participants is accompanied by a change in visual characteristics of one or more of the corresponding visual representations of the participants. For example, if a participant changes groups between the "share cohort display" of FIG. 13 and the "star cohort display" of FIG. 12, the visual representation of such participant may change color to adopt the color of the newly assigned (e.g., most closely associated) group. Of course, other visual characteristic changes may occur as well. According to some embodiments, an "animate" user interface key 1328 may be selected or activated by the viewer, which instructs the server device system 202 to generate an animation (e.g., an automatic gradual change over a period of time) from the user interface display 1300 to the user interface display 1200 whenever the user activates the "star" user interface key 1224, and from the user interface display 1200 back to the user interface display 1300 whenever the user activates the "share" user interface key 1326. In contrast, a "switch" user interface key 1327 may instruct the server device system 202 to switch instantaneously from the user interface display 1300 to the user interface display 1200 whenever the user activates the "star" user interface key 1224, and from the user interface display 1200 back to the user interface display 1300 whenever the user activates the "share" user interface key 1326. With either the "animate" or "switch" approach, the changes between the user interface displays 1300, 1200, or vice versa, may help the viewer understand the relative changes or movement of position that the participants (e.g., participant represented by 1208) undergo between such user interface displays. Such changes of position are useful in some circumstances to illustrate how a particular participant was influenced by reviewing other participants' qualitative responses at step 330, as compared to the time when the particular participant provided his or her own qualitative responses at step 312 and was unaware of the other participant's qualitative responses. In this regard, for example, the visual representation 1208 of a particular participant moves between the visual representation of group 1202 (an example of the above-discussed first particular group, which may be deemed the particular participant's "share cohort") and group 1205 (an example of the above-discussed second particular group, which may be deemed the particular participant's "star cohort") when moving from user interface display 1300 in FIG. 13 to user interface display 1200 in FIG. 12. In some embodiments, the graphical animation including movement of the visual representation 1208 of the particular participant between the visual representation of the first particular group 1202 and the visual representation of the second particular group 1205 includes movement of the visual representation 1208 of the particular participant only within an intermediate display region that does not contact the visual representation (e.g., the closed shape in some embodiments) of the first particular group 1202 and the visual representation of the second particular group 1205, as shown in FIGS. 12 and 13.

According to some embodiments, the server device system 202 is configured at least by program instructions that implement at least part of step 910 and FIG. 9 to generate a visualization (e.g., via a display device system of data input-output device system 120 of the server device system 202) that allows a particular participant to explore his or her placement, or the placement of his or her own qualitative responses or those from other participants provided or derived from those provided at step 312, relative to qualitative responses, other participants, or both qualitative responses and other participants. Such a visualization may be referred to as a "cohort discovery" visualization, as it allows a particular participant to discover his or her relative placement, the placement of his or her own or other participant provided qualitative responses at step 312, or both. Such a visualization may be educational to the particular participant and may act as an incentive for a participant to participate in the process 300 of FIG. 3.

In some embodiments of the present invention, the "cohort discovery" visualization is based at least on the server device system 202 identifying a plurality of groups of qualitative responses based at least on a first analysis of priority values at step 906 (e.g., 906c) in FIG. 9. In addition or in the alternative, the "cohort discovery" visualization may be based at least on the server device system 202 associating the particular participant with each of the identified plurality of groups at step 906 (e.g., 906b). According to some embodiments, the associating performed at step 906 may include the server device system 202 generating the above-discussed respective group-association-values.

The group that has the group-association-value indicating the highest degree of association with the particular participant may be considered a "primary group" for the particular participant. In this regard, in some embodiments, step 906 may be considered to associate the particular participant with at least a primary group of the plurality of groups identified at step 906 based at least on a second analysis of a first set of priority values, which may include those provided by a plurality of participants. The second analysis may be an analysis that leads to generation of the above-discussed group-association-values for the particular participant. In some embodiments, the first set of priority values are those associated with a first set of qualitative responses, where the particular participant is associated with the first set of qualitative responses in the processor-accessible memory device system 212 (or one or more databases to stored therein). For example, the first set of qualitative responses could be those qualitative responses evaluated by the particular participant at step 330, those qualitative responses provided by or derived from those provided by the particular participant at step 312, or both, according to some embodiments.

In some embodiments, the "primary group" of qualitative responses whose respective associated priority values of the plurality of priority values exhibit a pattern that is similar to a first priority pattern a within a first threshold range (e.g., exhibited by comparison of respective group-association-values and the first threshold range, as discussed above), the first priority pattern being a pattern of at least some of the plurality of priority values associated with the particular participant (e.g., as exhibited by one or more group-association-values associated with the particular participant). In some embodiments, at least the "primary group" includes a "secondary group" or a subgroup of qualitative responses whose respective associated priority values exhibit a pattern that is similar to the first priority pattern within a second threshold range wider than the first threshold range and excluding the first threshold range. For example, the "secondary group" may include qualitative responses that are less-closely-related to the particular participant than other qualitative responses in the "primary group". Such a circumstance may be beneficial to allow visual presentation (e.g., to the particular participant) of a sequence of sets of qualitative responses, each successive set having a less-close-association with the particular participant. For example, the particular participant may be visually presented with a first set of qualitative responses that are most closely related to the particular participant and, thereafter, the particular participant may be visually presented with a second set of qualitative responses excluding the first set, which are less-closely-related to the particular participant than the first set, and so on. The particular participant may continue to explore successively less-closely-related sets of qualitative responses, according to some embodiments.

Having associated (a) the particular participant, (b) the particular participant's qualitative responses provided at step 312, (c) qualitative responses the particular participant evaluated at step 330, or a combination of some or all of (a)-(c), the server device system 202 may be configured at least by program instructions implementing at least part of step 910 to facilitate, e.g., via a display device system of data input-output device system 120, visual presentation of a visual representation of at least one result of such association. In some embodiments, the visual presentation includes a visual representation of at least one qualitative response (e.g., a qualitative response shared by the particular participant at step 312, a qualitative response evaluated by the particular participant at step 330, or a qualitative response that was neither shared nor evaluated by the particular participant) in the above-discussed "primary group". In this regard, it may be beneficial to inform the particular participant of the group of qualitative responses which the participant is most closely aligned. However, the invention is not limited to merely visually presenting one or more qualitative responses from the particular participant's "primary group", and other information from a result of the association of the above-discussed (a), (b), (c), or the combination of some or all of (a)-(c) may be presented, according to some embodiments.

Figure 14:
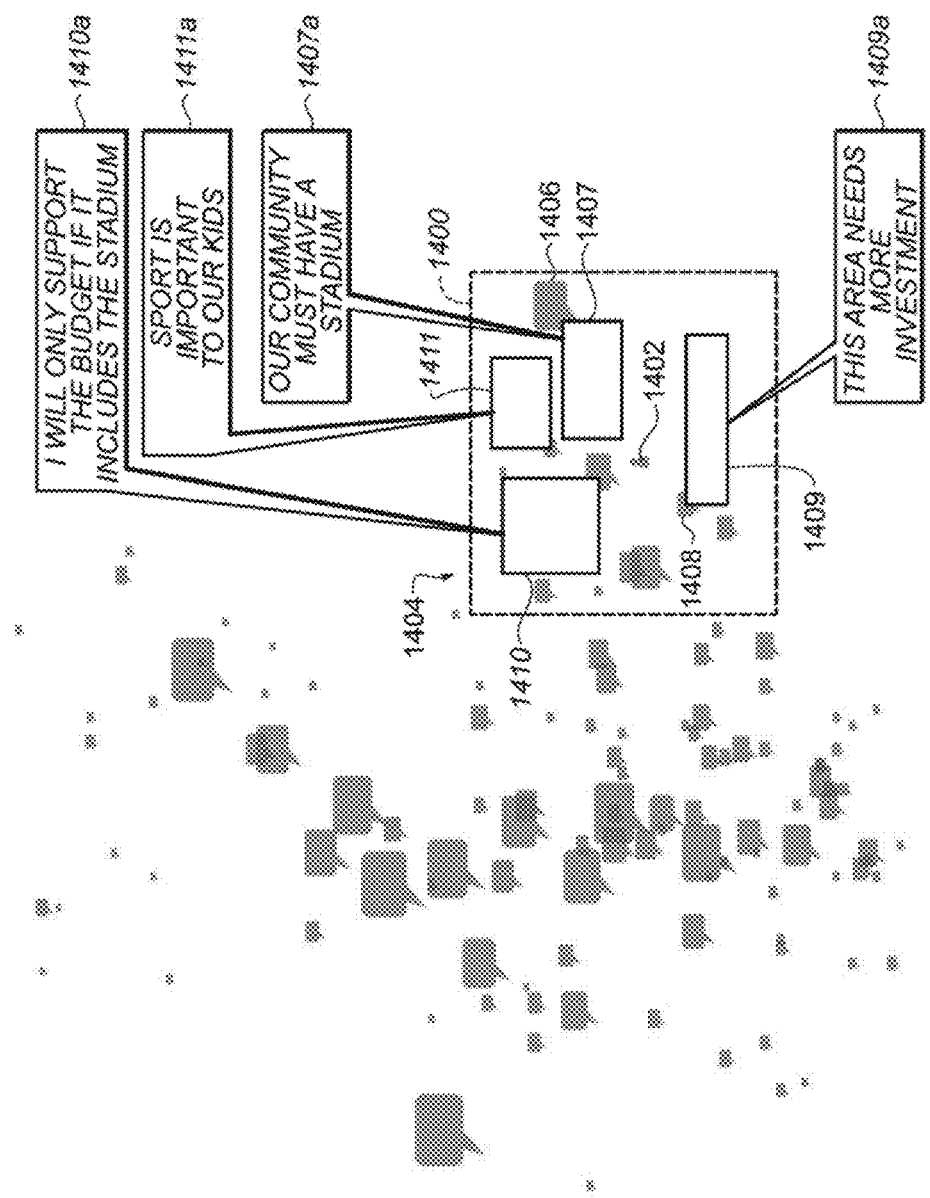
FIGS. 14 and 15 illustrate significant cohort discovery visualizations presented via user interface display(s) or graphical user interface(s), according to some embodiments of the present invention.
Figure 15:
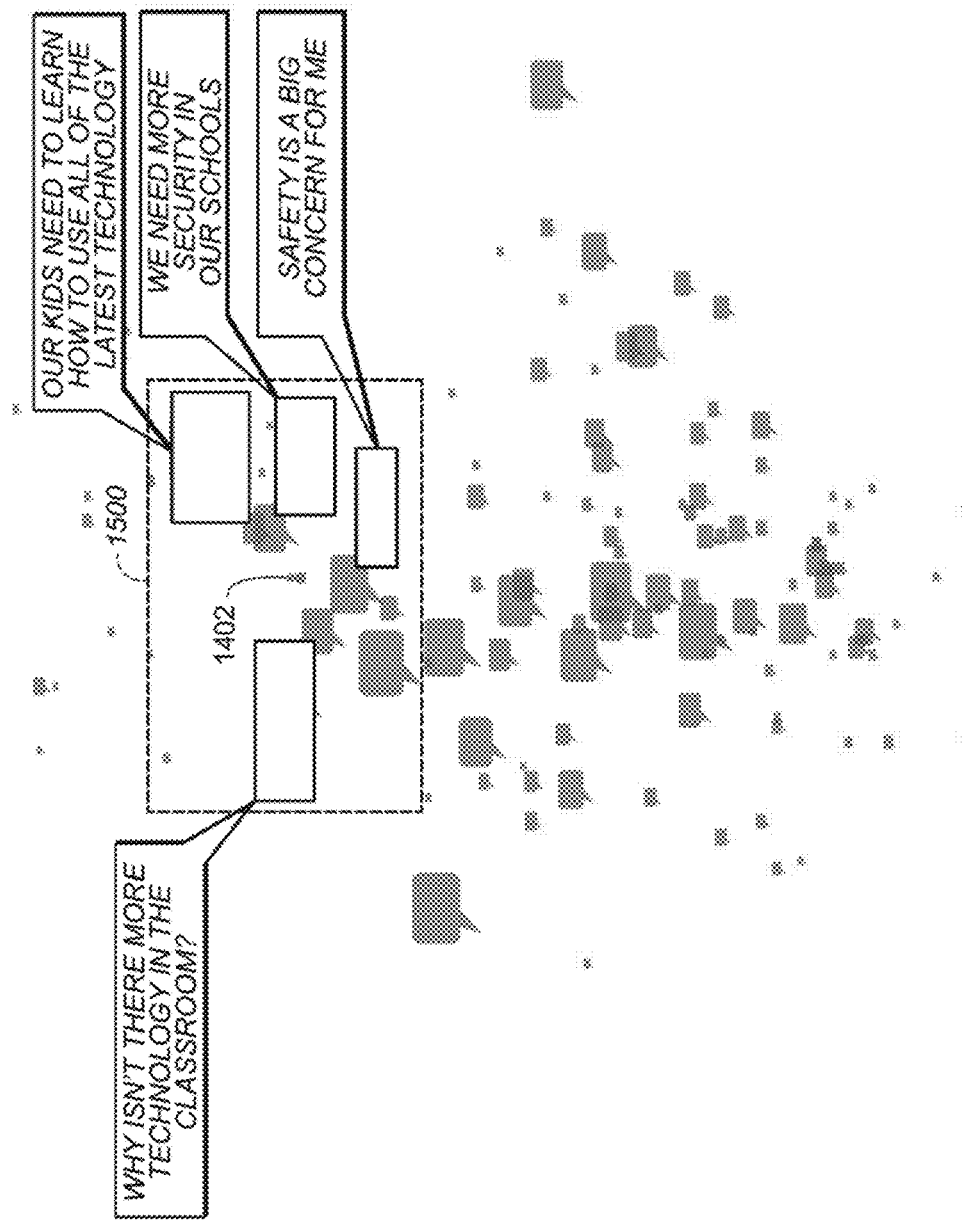

For example, FIG. 14 illustrates a user interface display 1400 for a "cohort discovery" visualization, which may be displayed as at least part of step 910 according to some embodiments. In FIG. 14, the user interface display 1400 comprises only the broken-line region associated with reference numeral 1400, according to some embodiments. In this regard, only the visual representations within broken-line region 1400 are displayed to the particular participant in a particular state of the "cohort discovery" visualization in some embodiments. In this regard, FIG. 14 illustrates a broader context of qualitative responses outside broken-line region 1400 that are relatively spaced from the particular participant represented by visual representation 1402, but such broader context of qualitative responses outside broken-line region 1400 are not displayed to the particular participant in the state of FIG. 14, according to some embodiments. Alternatively, the qualitative responses beyond the broken-line region may be dimmed or inaccessible to the user, e.g., the user is not able to read the text of these more distant qualitative responses or such qualitative responses are otherwise visually presented less prominently. These arrangements allow the particular participant to 'digest' or view only the qualitative responses he or she was most-closely associated with, within a predetermined threshold. For example, the user interface display 1400 may visually present only one or more of the qualitative responses in the particular participant's above-discussed "primary group", such one or more qualitative responses having a spaced relationship with the visual representation (e.g., 1402 in FIG. 14) of the particular participant that reflects a degree of agreement (e.g., based on an analysis of respective group-association values) between the particular participant and the respectively visually presented qualitative responses.

In the user interface display 1400, the particular participant associated with visual representation 1402 is represented with respect to his or her relationship to multiple qualitative responses 1404 (including individual qualitative responses 1406, 1408, for example), according to some embodiments. The qualitative responses 1404 may represent the particular participant's (e.g., represented by visual representation 1402) qualitative responses provided at step 312, the qualitative responses the particular participant evaluated at step 330, or qualitative responses that were neither shared nor evaluated by the particular participant, or a combination of some or all of these types of qualitative responses, according to some embodiments.

In some embodiments, the user interface display 1400 may be a subset of the information presented in a user interface display like user interface display 1200 in FIG. 12. In other words, the server device system 202 may generate a user interface display like that in FIG. 12 according to the processes described above, but when a particular participant instructs display of the "cohort discovery" visualization, the server device system 202 may remove at least the visual representations of the participants (e.g., like 1208, etc.) other than the particular participant, maybe also remove the shapes of the groups (e.g., like 1202-1205), and maybe also remove some of the visual representations of the qualitative responses (e.g., those that the particular participant did not generate at step 312, those that the particular participant did not evaluate at step 330, those that are not closely related to the particular participant within a threshold value range, or some combination of some or all of these items) to produce a user interface display like 1400.

In some embodiments, user selection (such as by a mouse-click, hovering of a mouse cursor, or touching of a touch-screen on the applicable visual representation) of a qualitative response (e.g., 1406 or 1408) may cause display of the text of the corresponding qualitative response, as shown, for example, by text boxes 1407 and 1409, with respect to qualitative responses 1406 and 1408, respectively. (Note that the text that would be displayed within text boxes 1407 and 1409, as well as text boxes 1410 and 1411 associated with other qualitative responses, is illustrated by call-outs 1407a, 1409a, 1410a, and 1411a in FIG. 14, respectively, for readability, but an actual user interface displaying display 1400 may include such text within the respective text boxes. The same applies to FIG. 15, discussed below, which illustrates text box text via respective call-outs due for readability.) Alternatively or in addition, the text of one or more qualitative responses within a threshold range (e.g., the X qualitative responses most closely related to the participant, where X is an integer threshold greater than one) are displayed automatically by default.

According to some embodiments, the "cohort discovery" visualization may provide the particular participant with access to a progression of user interface displays that successively provide the particular participant with additional information. For example, initial user interface display 1400 of the "cohort discovery" visualization may be an initial visual presentation to the particular participant or another user to visually present qualitative responses that are aligned with the particular participant within a first threshold value range. Then, a subsequent user interface display 1500 in FIG. 15 may visually present qualitative responses that are aligned with the particular participant within a second threshold value range, which may be wider or larger than, or mutually exclusive with, the first threshold value range in order to show to the particular participant (also represented by visual representation 1402 in FIG. 15) those qualitative responses (e.g., in the above-discussed "secondary group") that are less or differently aligned with the particular participant. Although the sequence of FIGS. 14 and 15 visually present, e.g., at least one qualitative response in the above-discussed "secondary group" presented in user interface display 1500 after visual representation of at least one qualitative response in the above-discussed "primary group" in user interface display 1400, other embodiments show less-closely-associated qualitative responses with another form of lower visual priority, such as merely displaying the less-closely-associated qualitative responses with a further distance from the visual representation (e.g., 1402) of the particular participant. In some embodiments an initial user interface display of the "cohort discovery" visualization may visually present qualitative responses that the particular participant generated at step 312, while a subsequent user interface display of the "cohort discovery" visualization may visually present qualitative responses that the particular participant evaluated at step 330, according to some embodiments.

According to some embodiments of the present invention, the server device system 202 is configured, at least by program instructions implementing at least part of step 336 in FIG. 3, to identify and visually present a set of qualitative responses that the participants relatively agreed upon during the evaluation of step 330, a set of qualitative responses that the participants relatively disagreed upon during the evaluation of step 330, or both.

For example, a plurality of qualitative responses may be associated by the server device system 202 with a plurality of groups at step 906c in FIG. 9. As part of this association process, according to some embodiments, the server device system 202 may determine, for each qualitative response of the plurality of qualitative responses, and with respect to each respective group, a respective resonance value indicating an amount that the respective qualitative response resonates with at least the participants in the respective group. This resonance value may be the above-discussed group-association-value that relates a qualitative response to a group. Accordingly, each qualitative response may have a respective resonance value for each of the plurality of groups identified as at least part of step 906.

In this regard, the process 900 of FIG. 9 may include an optional step 908, where the server device system 202 is configured to identify a first set of qualitative responses associated with multiple of the groups identified at step 906, and which is associated with respective resonance values within a first range, according to some embodiments. In some embodiments, the respective resonance values may be the above-discussed group-association-values associated with qualitative responses (e.g., Table IX, above). The first range may be predefined to capture qualitative responses whose priority values assigned by the participants at step 330 in FIG. 3 exhibit a predefined amount of uniformity. In this regard, the first set of qualitative responses may represent responses to which the participants relatively agreed when performing the participant evaluation of step 330.

For example, in some embodiments, this first set of qualitative responses that indicate relative agreement among participants may be identified as those whose group-association-values do not particularly associate the respective qualitative response with any particular group more than another group. For instance, all qualitative responses that have about the same group-association-values (e.g., within a first threshold value range) may be determined by the server device system 202 to be those that exhibit relative agreement among the participants. If group-association-values between one and zero are used, the first threshold-value might be 0.10, such that a qualitative response having respective group-association-values of {0.33, 0.30, 0.36, and 0.33} would be determined by the server device system 202 to belong to the first set of qualitative responses that indicate relative agreement among participants, because all of the group-association-values are within the first range or first threshold value range of less than or equal to 0.10, according to some embodiments. However, a qualitative response having respective group-association-values of {0.20, 0.46, 0.33, 0.33} would be determined by the server device system 202 to not belong to the first set of qualitative responses that indicate relative agreement among participants, because the span between the group-association-value of 0.46 and the group-association-value of 0.20 is 0.16, which is outside the first threshold-value-range of less than or equal to 0.10, according to some embodiments.

In some embodiments, the server device system 202 uses the standard deviation, rather than the span, of the group-association-values associated with a particular qualitative response as a measure of the range of these group-association-values. For example, a qualitative response having respective group-association-values of {0.33, 0.30, 0.36, and 0.33} may be determined by the server device system 202 to belong to the first set of qualitative responses that indicate relative agreement among participants, because the standard deviation of these group-association-values is 0.02, if calculated to two decimal places, which is less than the first threshold-value of 0.10 (i.e., the first range or first threshold value range of less than or equal to 0.10). However, a qualitative response having respective group-association-values of {0.20, 0.46, 0.33, 0.33} may be determined by the server device system 202 to not belong to the first set of qualitative responses that indicate relative agreement among participants, because the standard deviation of these group-association-values is 0.11, if calculated to two decimal places, which is greater than the first threshold-value of 0.10 (i.e., is outside the first threshold value range of less than or equal to 0.10).

In view of the above-discussion, step 908 may represent a configuration of the server device system 202 to determine, for each respective qualitative response of the plurality of qualitative responses evaluated at step 330, and with respect to each respective group of the identified plurality of groups identified at step 906 (e.g., step 906a, 906b, or both), a respective resonance value (e.g., such as the above-discussed group-association-value in some embodiments) indicating an amount that the respective qualitative response resonates with at least the participants in the respective group. In this regard, step 908 may be considered part of step 906c in some embodiments. Step 908 may also include the server device system 202 identifying a first set of the plurality of qualitative responses indicating relative participant agreement and associated with multiple of the identified plurality of groups (e.g., via at least respective group-association-values), the determined respective resonance values (e.g., group-association-values) associated with the first set within a first range (e.g., all qualitative responses in the first set including associated respective group-association-values within a threshold range of each other, as discussed above).

In some embodiments, step 908 in FIG. 9 may include the server device system 202 identifying a second set of qualitative responses associated with multiple of the groups identified at step 906 and which is associated with respective resonance values within a second range different than the first range, according to some embodiments. The second range may be predefined to capture qualitative responses whose priority values assigned by the participants at step 330 in FIG. 3 exhibit a predefined amount of non-uniformity. In this regard, the second set of qualitative responses may represent responses to which the participants relatively disagreed when performing the participant evaluation of step 330.

For example, in some embodiments, this second set of qualitative responses that indicate relative disagreement among participants may be identified as those whose group-association-values particularly associate the respective qualitative response with one or more groups as compared to the other group(s). For instance, all qualitative responses that have a group-association-value that is vastly different than another group-association-value (e.g., are different from each other in excess of a second threshold value) for the respective qualitative response may be determined by the server device system 202 to be those that exhibit relative disagreement among the participants. If group-association-values between one and zero are used, the second threshold value might be 0.75, such that a qualitative response having respective group-association-values of {0.90, 0.05, 0.03, and 0.02} would be determined by the server device system 202 to belong to the second set of qualitative responses that indicate relative disagreement among participants, because the span between the maximum group-association-value of 0.90 and the minimum group-association-value of 0.02 is 0.88, which is greater than the second threshold value of 0.75 (i.e., the second range or second threshold value range may be greater than or equal to 0.75), according to some embodiments. However, a qualitative response having respective group-association-values of {0.55, 0.15, 0.15, 0.15} would be determined by the server device system 202 to not belong to the second set of qualitative responses that indicate relative disagreement among participants, because the span between the maximum group-association-value of 0.55 and the minimum group-association-value of 0.15 is 0.40, which is less than the second threshold value of 0.75, according to some embodiments. In some embodiments, the server device system 202 uses the standard deviation, rather than the span, of the group-association-values associated with a particular qualitative response as a measure of the range of these group-association-values, as discussed above.

In view of the above-discussion, step 908 may represent a configuration of the server device system 202 to identify a second set of the plurality of qualitative responses indicating relative participant disagreement and associated with multiple of the identified plurality of groups (e.g., via at least respective group-association-values), the determined respective resonance values (e.g., group-association-values) associated with the second set within a second range (e.g., all qualitative responses in the second set including associated respective group-association-values that meet the criteria of the second threshold range, as discussed above), the second range different than the first range.

It should be noted that qualitative responses, in addition to or in lieu of being assigned to sets of the plurality of qualitative responses indicating relative participant agreement or disagreement in step 908, may be characterized by a relative degree-of-agreement. For instance, in some embodiments, an agreement-value of 1 (or 100%) for a respective qualitative response indicates that the group-association-values between the respective qualitative response and each group of the plurality of groups is the same. A lower value or percentage may indicate differences among the group-association-values between the respective qualitative response and each group of the plurality of groups. Relatively lower values or percentages of agreement-values may indicate relatively greater differences, according to some embodiments, but any convention may be used. In some embodiments, the server device system 202 determines an agreement-value for each respective qualitative response equal to one minus the standard deviation of the group-association-values between the respective qualitative response and each group of the plurality of groups. For example, the server device system 202 may determine the agreement-value for a qualitative response having respective group-association-values of {0.33, 0.30, 0.36, and 0.33} to be 1−0.02=0.98, since the standard deviation of these group-association-values is 0.02, if calculated to two decimal places. As another example, the server device system 202 may determine the agreement-value for a qualitative response having respective group-association-values of {0.90, 0.05, 0.03, and 0.02} to be 1−0.43=0.57, since the standard deviation of these group-association-values is 0.43, if calculated to two decimal places. However, it should be noted that the present invention is not limited to the particular definition of the agreement-values for qualitative responses in these examples. For example, the agreement-value for each respective qualitative response, rather than being equal to one minus the standard deviation of the group-association-values between the respective qualitative response and each group of the plurality of groups, may be equal to one divided by the standard deviation of the group-association-values between the respective qualitative response and each group of the plurality of groups.

Having identified at step 908 a first set of qualitative responses which exhibit relative participant agreement, a second set of qualitative responses which exhibit relative participant disagreement, or both the first set and the second set, the server device system 202 may facilitate at step 910, e.g., via a display device system of the data input-output device system 120, visual presentation of one or more indications (a) that at least some of the qualitative responses in the first set represent relative participant agreement, (b) that at least some of the qualitative responses in the second set represent relative participant tension, or both (a) and (b).

Figure 16:
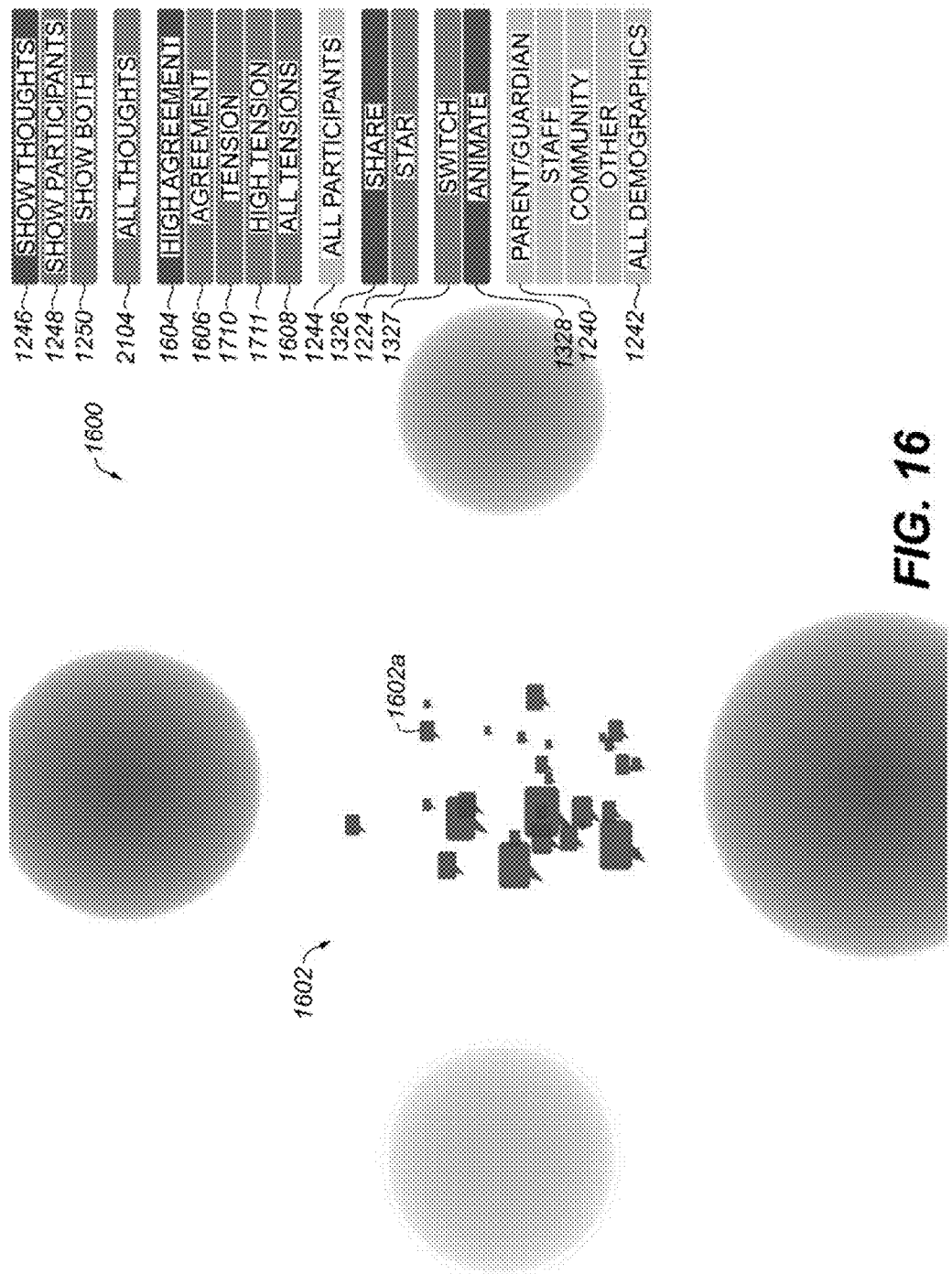
FIGS. 16 and 17 illustrate significant visualizations presented via user interface display(s) or graphical user interface(s) of results of a tension-and-agreement analysis for qualitative responses, according to some embodiments of the present invention.

For example, FIG. 16 illustrates a user interface display 1600, according to some embodiments, visually presented by the server device system 202 via its input-output device system (e.g., 120), like the above-mentioned other user interface displays. In some embodiments, the user interface display 1600 visually presents visual representations 1602 of qualitative responses (including visual representation 1602a of a particular qualitative response, for example) that exhibit high agreement among the participants, based on an analysis of the priority values assigned by the participants at step 330. The visual representations 1602 may represent the above-discussed qualitative responses in the first set exhibiting relative participant agreement. The user interface display 1600 may be caused to be displayed by user-activation of the "show thoughts" software button or key 1246 and a "high agreement" software button or key 1604. Since the user interface display 1600, as well as the user interface displays 1700 and 2000, discussed below, are associated with a state where qualitative responses are visually represented, but participants are not, the "all participants" software button or key 1244 may be in the unavailable state, according to some embodiments.

In the context of FIG. 16, with the "show thoughts" software button or key 1246 and the "high agreement" software button or key 1604 in their activated states, the visual representations 1602 of the above-discussed qualitative responses in the first set exhibiting relative participant agreement are displayed, according to some embodiments. In this regard, activation of "agreement" software button or key 1606 may adjust the above-discussed first threshold-value range in order to revise the displayed visual representations of qualitative responses 1602 to include visual representations of qualitative responses that exhibit slightly less agreement. User-activation of the "all tensions" software button or key 1608 may subsequently remove this agreement filter, so that visual representations of all qualitative responses are shown in the user interface display 1600, regardless of level of agreement or disagreement (also referred to as tension).

Figure 17:
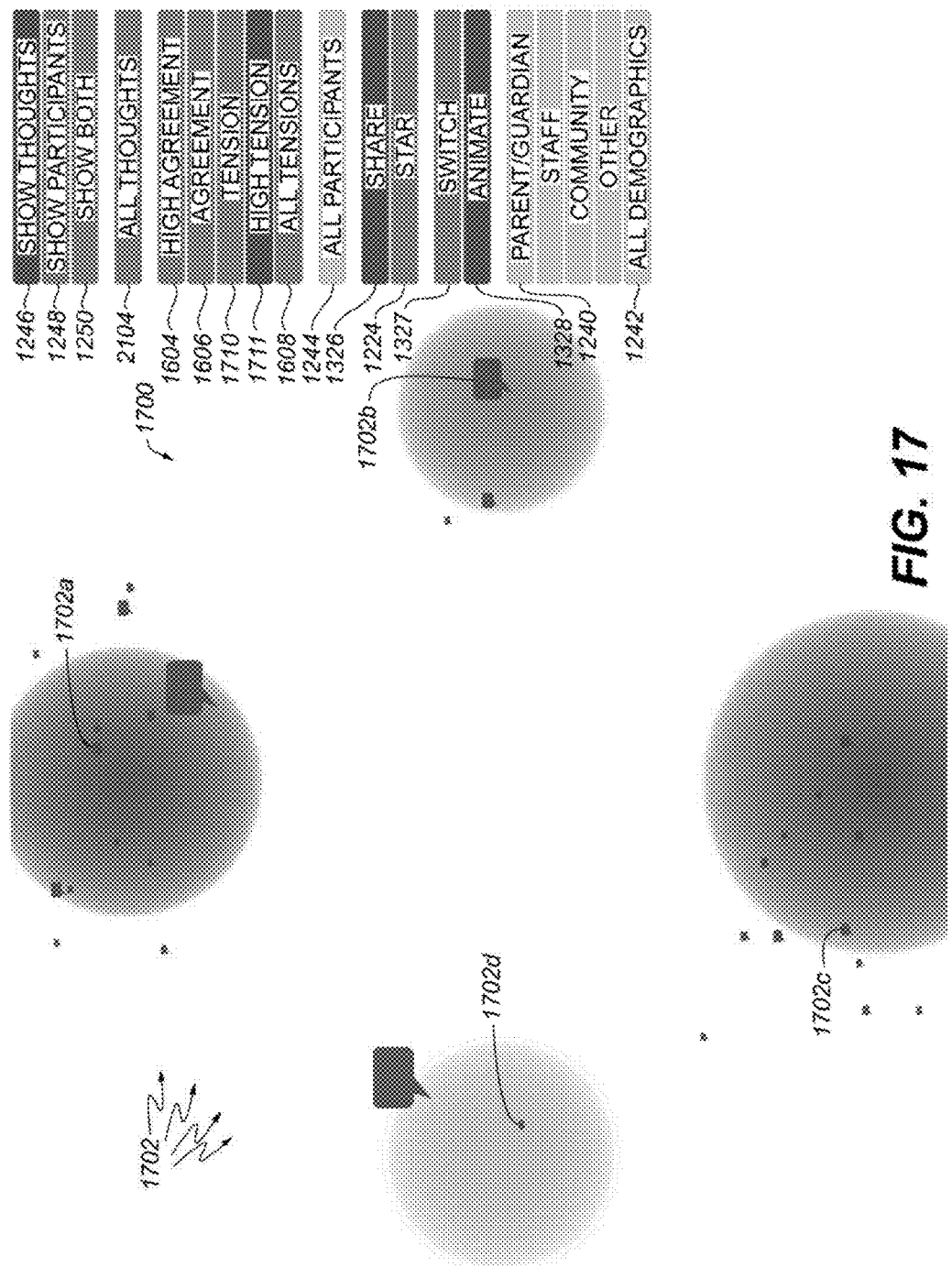

FIG. 17 illustrates a user interface display 1700, according to some embodiments, visually presented by the server device system 202 via its input-output device system (e.g., 120), like the above-mentioned other user interface displays. In some embodiments, the user interface display 1700 visually presents visual representations 1702 of qualitative responses (including visual representations 1702a, 1702b, 1702c, and 1702d of respective qualitative responses in respective groups, for example) that exhibit high disagreement among the participants, based on an analysis of the priority values assigned by the participants at step 330. The visual representations 1702 may represent the above-discussed qualitative responses in the second set exhibiting relative participant tension. The user interface display 1700 may be caused to be displayed by user-activation of the "show thoughts" software button or key 1246 and a "high tension" software button or key 1711. In this regard, activation of "tension" software button or key 1710 may adjust the above-discussed second threshold value range in order to revise the displayed visual representations of qualitative responses 1702 to include visual representations of qualitative responses that exhibit slightly less disagreement. Again, user-activation of the "all tensions" software button or key 1608 may subsequently remove this agreement filter, so that visual representations of all qualitative responses are shown in the user interface display 1700, regardless of level of agreement or tension.

Figure 20:
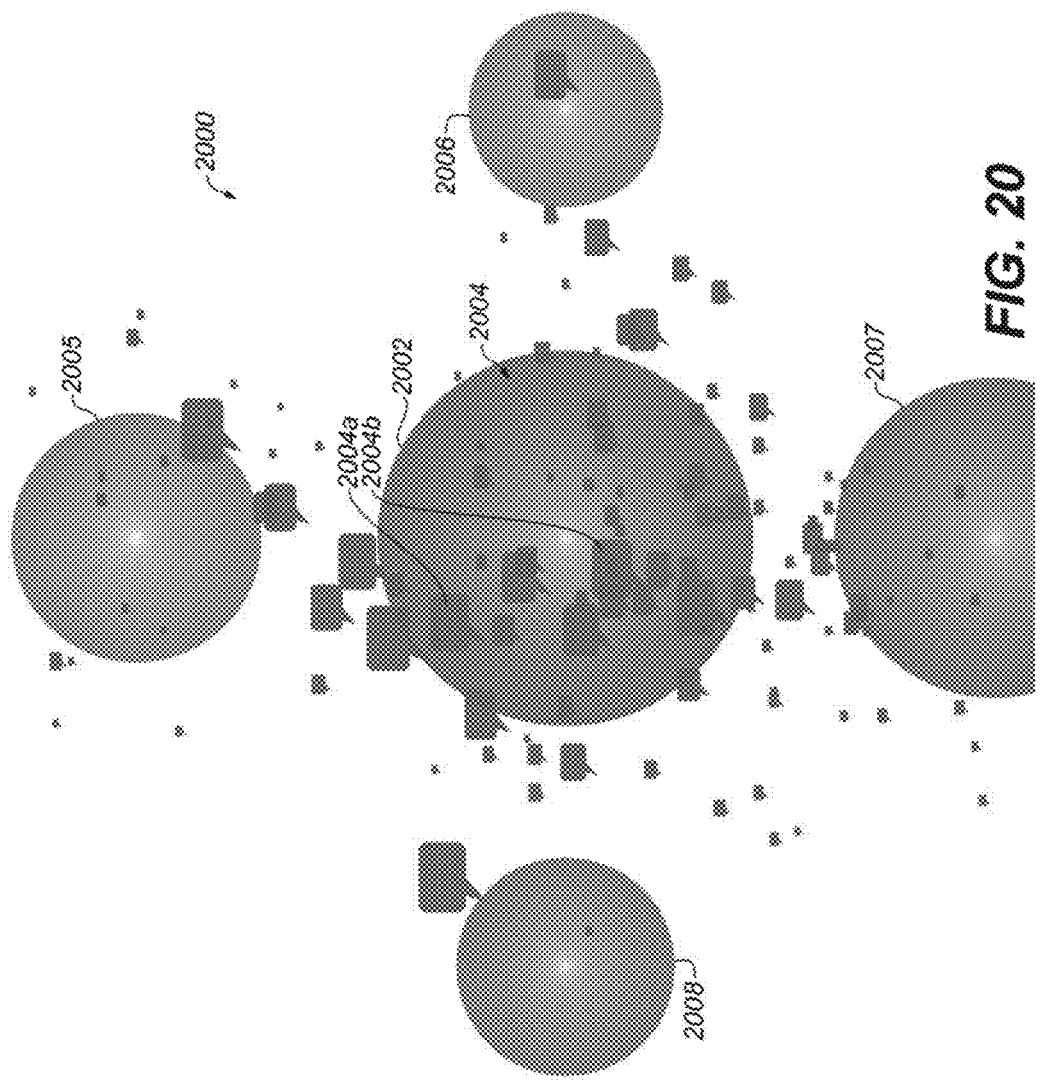
FIG. 20 illustrates a significant visualization presented via a user interface display or graphical user interface of results of a tension-and-agreement analysis for qualitative responses, according to some embodiments of the present invention.

In addition, having identified at step 908 at least a first set of qualitative responses which exhibit relative participant agreement, the server device system 202 may facilitate at step 910, e.g., via a display device system of the data input-output device system 120, visual presentation of a visual representation of an agreement group, and visual representations of at least some of the qualitative responses in the first set within the visual representation of this agreement group. For example, FIG. 20 illustrates a user interface display 2000, according to some embodiments, visually presented by the server device system 202 via its input-output device system (e.g., 120), like the above-mentioned other user interface displays. In some embodiments, the user interface display 2000 visually presents an agreement group 2002, surrounded by the visual representations of the other groups 2005, 2006, 2007, 2008 (which may be the same as or similar to the other groups shown in FIGS. 16 and 17 (however, groups, including agreement group 2002, need not be represented with the shapes shown and may merely be represented by a cluster of visual representations according to some embodiments)). Further, the user interface display 2000 visually presents visual representations 2004 of at least some of the qualitative responses that exhibit high agreement among the participants, based on an analysis of the priority values assigned by the participants at step 330, within the agreement group 2002. In this regard, the visual representations 2004 may include visual representations 2004a, 2004b of respective qualitative responses in the agreement group 2002, for example. The qualitative responses that are visually represented (e.g., 2004) in the agreement group 2002 may be those that exhibit high agreement, as discussed above with respect to FIG. 16, for example. On the other hand, at least some of the qualitative responses that are visually represented in the periphery of the user interface display 2000 (e.g., at least some of the qualitative responses visually represented in the groups 2005, 2006, 2007, 2008) may be those that exhibit high disagreement, as discussed above with respect to FIG. 17, for example. Accordingly, it can be seen that the user interface display 2000 may be like a combined display of user interface displays 1600 and 1700 of FIGS. 16 and 17, respectively, where qualitative responses exhibiting high agreement and qualitative responses indicating high tension are both visually represented in the user interface display 2000, except that some or all of the qualitative responses exhibiting high agreement are visually represented within the agreement group 2002. Further in this regard, although not shown in FIG. 20, the user interface display 2000 may include the software buttons or keys shown on the side panel of each of FIGS. 12, 13, 16, 17, 19, 21, 22, and 24, and, in the case of FIG. 20, the "show thoughts" software button or key 1246 and the "all tensions" software button or key 1608 would be in a selected or activated state, according to some embodiments, so that qualitative responses of all agreement/tension levels are visually represented in the user interface display 2000.

According to some embodiments of the present invention, the server device system 202 is configured, at least by program instructions implementing at least part of step 336 in FIG. 3, to identify and visually present a set of participants in relative agreement with the population as a whole during the evaluation of step 330, a set of participants in relative disagreement with the population as a whole during the evaluation of step 330, or both.

For example, a plurality of participants may be associated by the server device system 202 with a plurality of groups at step 906 (e.g., step 906a, 906b, or both) in FIG. 9. As part of this association process, according to some embodiments, the server device system 202 may determine, for each participant of the plurality of participants, and with respect to each respective group, a respective resonance value indicating an amount that the respective participant is in agreement with at least the participants in the respective group. This resonance value may be the above-discussed group-association-value that relates a participant to a group. Accordingly, each participant may have a respective resonance value for each of the plurality of groups identified as at least part of step 906.

In this regard, the process 900 of FIG. 9 may include an optional step 909, where the server device system 202 is configured to identify a first set of participants associated with multiple of the groups identified at step 906, and which is associated with respective resonance values within a first range, according to some embodiments. In some embodiments, the respective resonance values may be the above-discussed group-association-values associated with participants (e.g., Table VIII, above). The first range may be predefined to capture participants whose priority values assigned at step 330 in FIG. 3 exhibit a predefined amount of conformity with those assigned by the population as a whole. In this regard, the first set of participants may represent participants in relative agreement with the population as a whole when performing the evaluation of qualitative responses of step 330.

For example, in some embodiments, this first set of participants in relative agreement with the population as a whole may be identified as those whose group-association-values do not particularly associate the respective participant with any particular group more than another group. For instance, all participants who have about the same group-association-values (e.g., within a first threshold value range) may be determined by the server device system 202 to be those that exhibit relative agreement with the population as a whole. If group-association-values between one and zero are used, the first threshold-value might be 0.20, such that a participant having respective group-association-values of {0.58, 0.63, and 0.75} would be determined by the server device system 202 to belong to the first set of participants that indicate relative agreement with the population as a whole, because the span between the group-association-value of 0.58 and the group-association-value of 0.75 is 0.17, which is within the first range or first threshold-value-range of less than or equal to 0.20, according to some embodiments. However, a participant having respective group-association-values of {0.33, 0.38, 0.00} would be determined by the server device system 202 to not belong to the first set of participants that indicate relative agreement with the population as a whole, because the span of group-association-values is 0.38, which is outside the first threshold-value-range of less than or equal to 0.20, according to some embodiments.

In some embodiments, the server device system 202 uses the standard deviation, rather than the span, of the group-association-values associated with a particular participant as a measure of the range of these group-association-values. For example, a participant having respective group-association-values of {0.58, 0.63, and 0.75} may be determined by the server device system 202 to belong to the first set of participants that indicate relative agreement with the population as a whole, because the standard deviation of these group-association-values is 0.09, if calculated to two decimal places, which is less than the first threshold-value of 0.20 (i.e., the first range or first threshold value range of less than or equal to 0.20). However, a participant having respective group-association-values of {0.33, 0.38, 0.00} may be determined by the server device system 202 to not belong to the first set of qualitative responses that indicate relative agreement with the population as a whole, because the standard deviation of these group-association-values is 0.21, if calculated to two decimal places, which is greater than the first threshold-value of 0.20.

In view of the above-discussion, step 909 may represent a configuration of the server device system 202 to determine, for each respective participant of the plurality of participants who assign priority values at step 330, and with respect to each respective group of the identified plurality of groups identified at step 906 (e.g., step 906a, 906b, or both), a respective resonance value (e.g., such as the above-discussed group-association-value in some embodiments) indicating an amount that the respective participant is in agreement with at least the participants in the respective group. In this regard, step 909 may be considered part of step 906a, 906b, or both in some embodiments. Step 909 may also include the server device system 202 identifying a first set of the plurality of participants indicating relative agreement with the population as a whole and associated with multiple of the identified plurality of groups (e.g., via at least respective group-association-values), the determined respective resonance values (e.g., group-association-values) associated with the first set within a first range (e.g., all participants in the first set including associated respective group-association-values within a threshold range of each other, as discussed above).

In some embodiments, step 909 in FIG. 9 may include the server device system 202 identifying a second set of participants associated with multiple of the groups identified at step 906 and which is associated with respective resonance values within a second range different than the first range, according to some embodiments. The second range may be predefined to capture participants whose priority values assigned at step 330 in FIG. 3 exhibit a predefined amount of non-conformity with those assigned by the population as a whole. In this regard, the second set of participants may represent participants in relative disagreement with the population as a whole when performing the evaluation of qualitative responses of step 330.

For example, in some embodiments, this second set of participants in relative disagreement with the population as a whole may be identified as those whose group-association-values particularly associate the respective participant with one or more groups as compared to the other group(s). For instance, all participants that have a group-association-value that is vastly different than another group-association-value (e.g., are different from each other in excess of a second threshold value) for the respective participant may be determined by the server device system 202 to be those that exhibit relative disagreement with the population as a whole. If group-association-values between one and zero are used, the second threshold value might be 0.5, such that a participant having respective group-association-values of {0.08, 0.13, and 0.75} would be determined by the server device system 202 to belong to the second set of participants that indicate relative disagreement with the population as a whole, because the span between the maximum group-association-value of 0.75 and the minimum group-association-value of 0.08 is 0.67, which is greater than the second threshold value of 0.5 (i.e., the second range or second threshold value range may be greater than or equal to 0.5), according to some embodiments. However, a participant having respective group-association-values of {0.58, 0.63, 0.25} would be determined by the server device system 202 to not belong to the second set of participants that indicate relative disagreement with the population as a whole, because the span between the maximum group-association-value of 0.63 and the minimum group-association-value of 0.25 is 0.38, which is less than the second threshold value of 0.5, according to some embodiments. In some embodiments, the server device system 202 uses the standard deviation, rather than the span, of the group-association-values associated with a particular participant as a measure of the range of these group-association-values, as discussed above.

In view of the above-discussion, step 909 may represent a configuration of the server device system 202 to identify a second set of the plurality of participants indicating relative disagreement with the population as a whole and associated with multiple of the identified plurality of groups (e.g., via at least respective group-association-values), the determined respective resonance values (e.g., group-association-values) associated with the second set within a second range (e.g., all participants in the second set including associated respective group-association-values that meet the criteria of the second threshold range, as discussed above), the second range different than the first range.

It should be noted that participants, in addition to or in lieu of being assigned to sets of the plurality of participants indicating relative agreement or disagreement with the population as a whole in step 909, may be characterized by a relative degree-of-agreement. For instance, in some embodiments, an agreement-value of 1 (or 100%) for a respective participant indicates that the group-association-values between the respective participant and each group of the plurality of groups is the same. A lower value or percentage may indicate differences among the group-association-values between the respective participants and each group of the plurality of groups. Relatively lower values or percentages of agreement-values may indicate relatively greater differences, according to some embodiments, but any convention may be used. In some embodiments, the server device system 202 determines an agreement-value for each respective participant equal to one minus the standard deviation of the group-association-values between the respective participant and each group of the plurality of groups. For example, the server device system 202 may determine the agreement-value for a participant having respective group-association-values of {0.58, 0.63, and 0.75} to be 1−0.09=0.91, since the standard deviation of these group-association-values is 0.09, if calculated to two decimal places. As another example, the server device system 202 may determine the agreement-value for a participant having respective group-association-values of {0.08, 0.13, and 0.75} to be 1−0.37=0.63, since the standard deviation of these group-association-values is 0.37, if calculated to two decimal places. However, it should be noted that the present invention is not limited to the particular definition of the agreement-values for participants in these examples. For example, the agreement-value for each respective participant, rather than being equal to one minus the standard deviation of the group-association-values between the respective participant and each group of the plurality of groups, may be equal to one divided by the standard deviation of the group-association-values between the respective participant and each group of the plurality of groups.

Having identified at step 909 a first set of participants who exhibit relative agreement with the population as a whole, a second set of participants who exhibit relative disagreement with the population as a whole, or both the first set and the second set, the server device system 202 may facilitate at step 910, e.g., via a display device system of the data input-output device system 120, visual presentation of one or more indications (a) that at least some of the participants in the first set exhibit relative agreement with the population as a whole, (b) that at least some of the participants in the second set exhibit relative tension with the population as a whole, or both (a) and (b).

Figure 21:
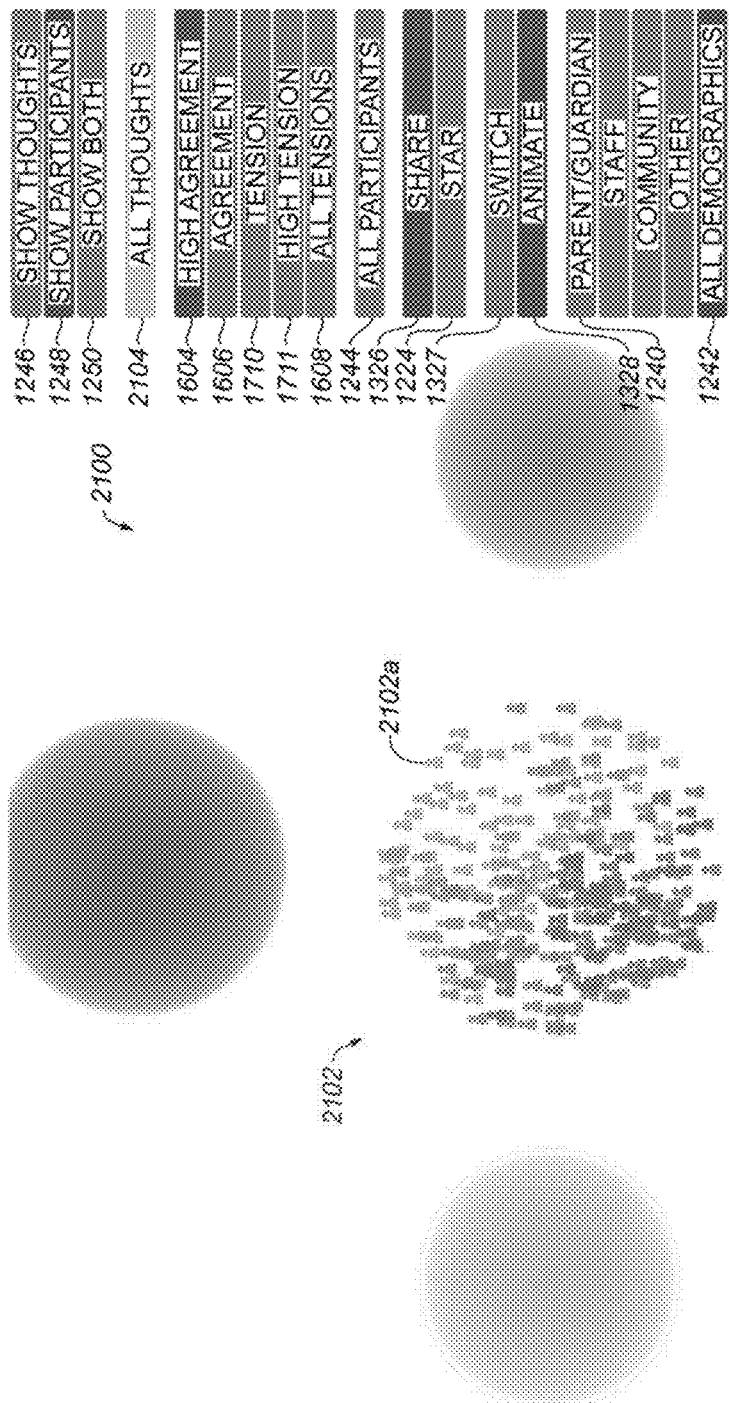
FIGS. 21, 22, and 23 illustrate significant visualizations presented via user interface display(s) or graphical user interface(s) of results of a tension-and-agreement analysis for participants, according to some embodiments of the present invention.

For example, FIG. 21 illustrates a user interface display 2100, according to some embodiments, visually presented by the server device system 202 via its input-output device system (e.g., 120), like the above-mentioned other user interface displays. In some embodiments, the user interface display 2100 visually presents visual representations 2102 of participants (including visual representation 2102*a* of a particular participant) who exhibit high agreement with the population as a whole, based on an analysis of the priority values assigned by the participants at step 330. The visual representations 2102 may represent the above-discussed participants in the first set exhibiting relative agreement with the population as a whole. The user interface display 2100 may be caused to be displayed by user-activation of the "show participants" software button or key 1248 and the "high agreement" software button or key 1604. Since the user interface display 2100, as well as the user interface displays 2200 and 2300, discussed below, are associated with a state where participants are visually represented, but qualitative responses are not, the "all thoughts" software button or key 2104 may be in the unavailable state, according to some embodiments.

In this regard, in the context of FIG. 21, activation of "agreement" software button or key 1606 may adjust the above-discussed first threshold-value range in order to revise the displayed visual representations of participants 2102 to include visual representations of participants who exhibit slightly less agreement. User-activation of the "all tensions" software button or key 1608 may subsequently remove this agreement filter, so that visual representations of all participants are shown in the user interface display 2100, regardless of level of agreement or tension.

Figure 22:
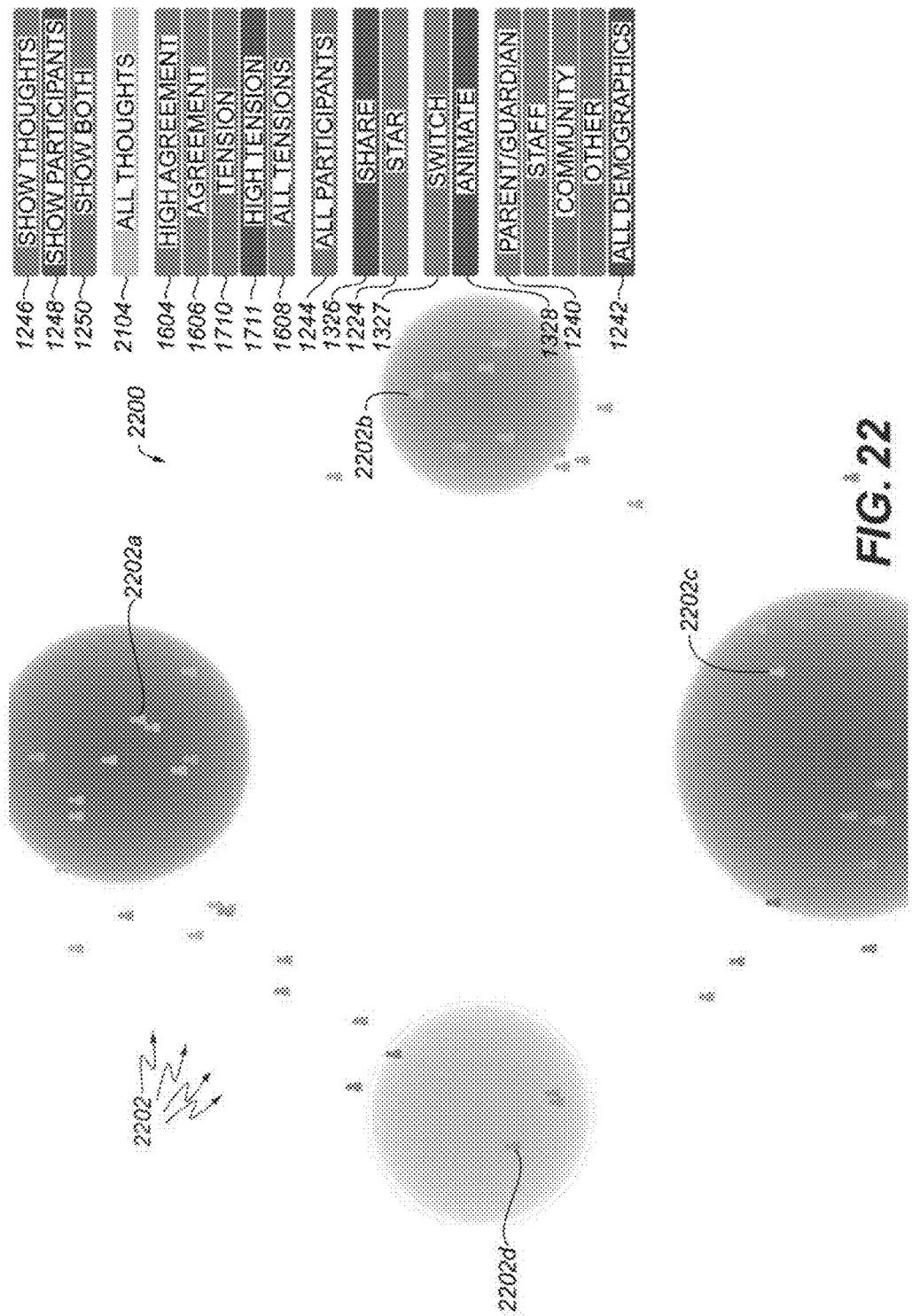

FIG. 22 illustrates a user interface display 2200, according to some embodiments, visually presented by the server device system 202 via its input-output device system (e.g., 120), like the above-mentioned other user interface displays. In some embodiments, the user interface display 2200 visually presents visual representations 2202 of participants (including visual representations 2202*a*, 2202*b*, 2202*c*, 2202*d* of respective participants in respective groups, for example) who exhibit high disagreement with the population as a whole, based on an analysis of the priority values assigned by the participants at step 330. The visual representations 2202 may represent the above-discussed participants in the second set exhibiting relative tension with the population as a whole. The user interface display 2200 may be caused to be displayed by user-activation of the "show participants" software button or key 1248 and the "high tension" software button or key 1711. In this regard, in the context of FIG. 22, activation of "tension" software button or key 1710 may adjust the above-discussed second threshold value range in order to revise the displayed visual representations of participants 2202 to include visual representations of participants who exhibit slightly less disagreement with the population as a whole. Again, user-activation of the "all tensions" software button or key 1608 may subsequently remove this agreement filter, so that visual representations of all participants are shown in the user interface display 2100, regardless of level of agreement or tension.

Figure 23:
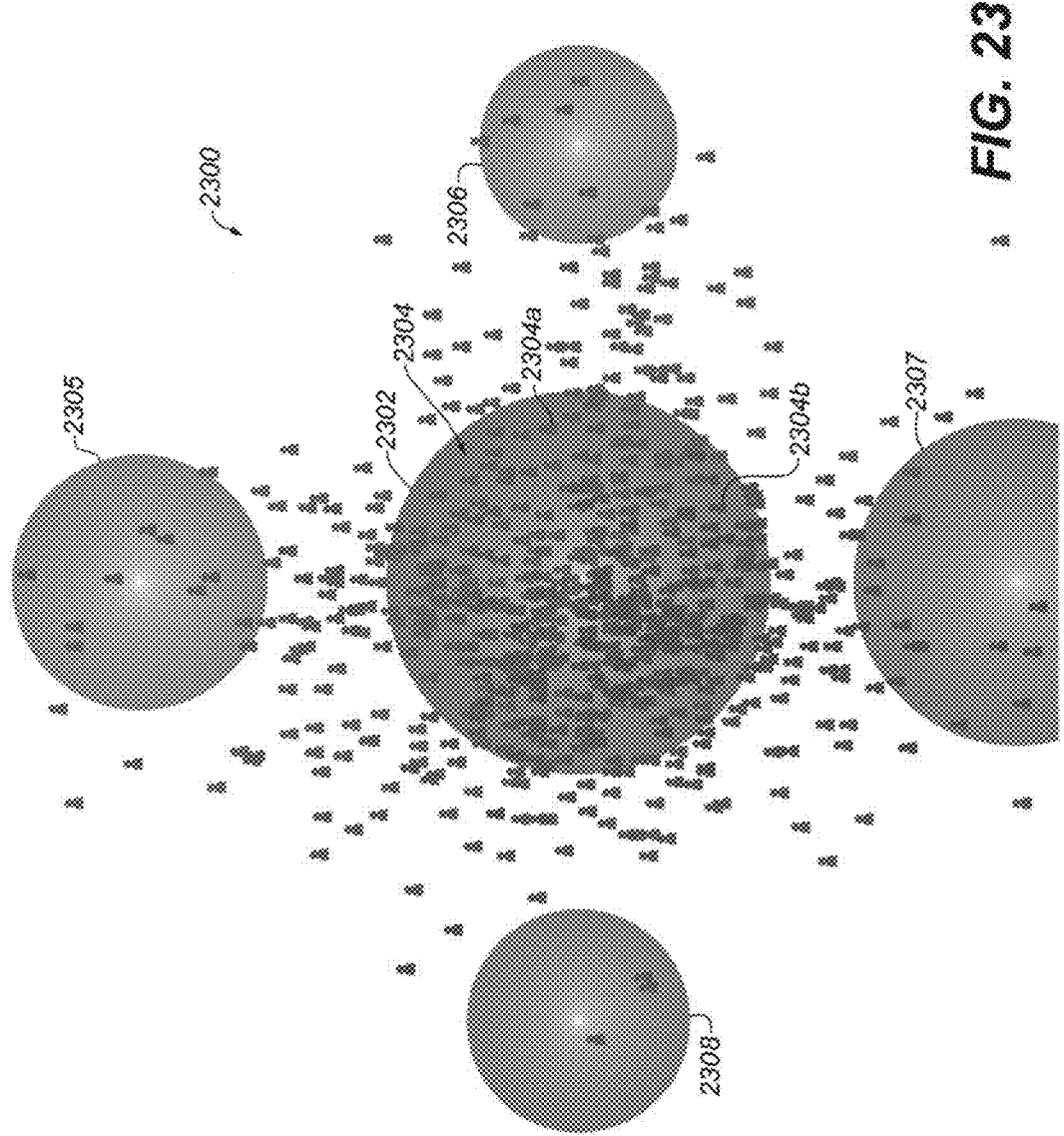

In addition, having identified at step 909 at least a first set of participants who exhibit relative agreement with the population as a whole, the server device system 202 may facilitate at step 910, e.g., via a display device system of the data input-output devices to 120, visual presentation of a visual representation of an agreement group, and visual representations of at least some of the participants in the first set within the visual representation of this agreement group. For example, FIG. 23 illustrates a user interface display 2300, according to some embodiments, visually presented by the server device system 202 via its input-output device system (e.g., 120), like the above-mentioned other user interface displays. In some embodiments, the user interface display 2300 visually presents an agreement group 2302 of participants (in contrast to the agreement group 2002 of qualitative responses in FIG. 20, for example), surrounded by the visual representations of the other groups 2305, 2306, 2307, 2308 (which may be the same as or similar to the other groups shown in FIG. 21 or 22 (however, groups need not be represented with the shapes shown and may merely be represented by a cluster of visual representations according to some embodiments)). Further, the user interface display 2300 visually presents visual representations 2304 of at least some of the participants who exhibit high agreement with the population as a whole, based on an analysis of the priority values assigned by the participants at step 330, within the agreement group 2302. In this regard, the visual representations 2304 may include visual representations 2304*a*, 2304*b* of respective participants in the agreement group 2302, for example. The participants that are visually represented (e.g., 2304) in the agreement group 2302 may be those that exhibit high agreement, as discussed above with respect to FIG. 21, for example. On the other hand, at least some of the participants that are visually represented in the periphery of the user interface display 2300 (e.g., at least some of the participants visually represented in or between the groups 2305, 2306, 2307, 2308) may be those that exhibit high disagreement, as discussed above with respect to FIG. 22, for example. Accordingly, it can be seen that the user interface display 2300 may be like a combined display of user interface displays 2100 and 2200 of FIGS. 21 and 22, respectively, where participants representing relative participant agreement (e.g., from the "first set" of participants discussed above with respect to FIG. 21) and participants representing relative tension (e.g., from the "second set" of participants discussed above with respect to FIG. 22) are both visually represented in the user interface display 2300, except that some or all of the participants exhibiting relative agreement are visually represented within the agreement group 2302. Further in this regard, although not shown in FIG. 23, the user interface display 2300 may include the software buttons or keys shown on the side panel of each of FIGS. 12, 13, 16, 17, 19, 21, 22, and 24, and, in the case of FIG. 23, the "show participants" software button or key 1248 and the "all tensions" software button or key 1608 would be in a selected or activated state, according to some embodiments, so that participants of all agreement/tension levels are visually represented in the user interface display 2300.

Still further in this regard, although FIG. 23 may represent a state where the "show participants" software button or key 1248 is selected, and FIG. 20 may represent a state where the "show thoughts" software button or key 1246 is selected, some other embodiments may instead represent a state where the "show both" software button or key 1248 is selected, which may result in a merged user interface display that appears as an overlay of the visual representations of the qualitative responses of FIG. 20 and the visual representations of the participants of FIG. 23, where both qualitative responses and participants are visually represented. In the merged user interface display, it may be considered that group 2005 of FIG. 20 and group 2305 of FIG. 23 are a same "one group" including both the cluster of visual representations of qualitative responses within the closed shape of group 2005 in FIG. 20 and the cluster of visual representations of participants within the closed shape of group 2305 in FIG. 20, according to some embodiments. In this regard, it may be considered that the merged user interface display includes visual representations of qualitative responses and participants (e.g., those in group 2006 in FIG. 20 and group 2306 in FIG. 23) that are not in the "one group" (i.e., the merged group formed by groups 2005 and 2305) separated from the cluster of visual representations of participants and qualitative responses within the "one group", according to some embodiments. Of course, visual representations of participants and qualitative responses need not be located within a shape of a group (e.g., the merged group formed by groups 2006 and 2306) and may be between shapes of groups (e.g., between the merged group formed by groups 2006 and 2306 and the "one group") and still be considered separated from the cluster of visual representations of participants and qualitative responses of the "one group", according to some embodiments.

Further, in the merged user interface, it may be considered that at least some of the qualitative responses and at least some of the participants in the above-discussed respective first sets representing relative agreement are visually represented within the visual representation of a merged agreement group (e.g., the merging of agreement group 2002 in FIG. 20 and the agreement group 2302 in FIG. 23). In other words, in the merged user interface combining FIGS. 20 and 23, the visual representations of some or all of the qualitative responses within agreement group 2002 of FIG. 20 and the visual representations of some or all of the participants within the agreement group 2302 of FIG. 20 may be located within the merged agreement group and may represent those qualitative responses and participants exhibiting relative agreement.

On the other hand, in the merged user interface, it may be considered that at least some of the qualitative responses and at least some of the participants in the above-discussed respective second sets representing relative tension are visually represented within the visual representation of the "one group" (e.g., the merging of group 2005 in FIG. 20 and the group 2305 in FIG. 23). For example, in the merged user interface combining FIGS. 20 and 23, the visual representations of some or all of the qualitative responses within group 2005 of FIG. 20 and the visual representations of some or all of the participants within the group 2305 of FIG. 20 may be located within the "one group" and may represent those qualitative responses and participants exhibiting relative tension. Of course, the same may be said for each of the other peripheral groups in FIGS. 20 and 23.

In some embodiments, the visual representations of some or all of the participants who exhibit high agreement with the population as a whole, based on an analysis of the priority values assigned by the participants at step 330, are located within the agreement group, while the visual representation of each of the other participants is located within the closed shape for the group with which the respective participant is associated, e.g., the group to which the respective participant is assigned based on an analysis of priority patterns, iterative or otherwise, e.g., at least at step 906b in FIG. 9. In this regard, the example of Tables XXVIII-A to XXVIII-D of the determination of the location of the visual representations of participants in a user interface display, may be applied equally in cases in which some or all of participants are located within the agreement group. In this example, the visual representations of each of the participants is located within the closed shape for the group with which the respective participant is associated, based on an analysis of the respective participant's group-association-values with respect to the groups. Just as the displacement for each of the participants is scaled and translated in the example of Tables XXVIII-A to XXVIII-D so that the visual representation of the respective participant is located within the closed shape for the group with which the respective participant is most closely associated, so the displacement for each of the participants in the agreement group could be scaled and translated so that the visual representation of the respective participant is located within the closed shape for the agreement group (in the case in which the geometric center of the agreement group is located at the geometric center of the visualization region, no translation would be required for the participants in the agreement group, only scaling).

Similarly, in some embodiments, the visual representations of some or all of the qualitative responses that exhibit high agreement among the participants, based on an analysis of the priority values assigned by the participants at step 330, are located within the agreement group, while the visual representation of each of the other qualitative responses is located within the closed shape for the group with which the respective qualitative response is associated, e.g., the group for which the respective resonance values indicating an amount that the respective qualitative response resonates with at least the participants in the each of the groups (e.g., as determined in step 906c, step 910, or both steps 906c and 910) indicates that the respective qualitative response resonates with the participants in the respective group more than with the participants in any other group. In this regard, the above discussion of the extension of the example of Tables XXVIII-A to XXVIII-D to the determination of the location of the visual representations of qualitative responses in a user interface display, may be applied equally in cases in which some or all of qualitative responses are located within the agreement group. In this discussion, the visual representations of each of the qualitative responses is located within the closed shape for the group with which the respective qualitative response is associated, based on an analysis of the respective qualitative response's group-association-values with respect to the groups. Just as the displacement for each of the qualitative responses is scaled and translated, according to this discussion, so that the visual representation of the respective qualitative response is located within the closed shape for the group with which the respective qualitative response is most closely associated, so the displacement for each of the qualitative responses in the agreement group could be scaled and translated so that the visual representation of the respective qualitative response is located within the closed shape for the agreement group (again, in the case in which the geometric center of the agreement group is located at the geometric center of the visualization region, no translation would be required for the qualitative responses in the agreement group, only scaling).

In some embodiments, rather than being equally spaced around the agreement group, the geometric centers of the other groups may be unequally spaced, the distance between each group and each other group reflecting a measure of the closeness or alignment of the respective groups, based at least on a comparison of the "group" priority patterns for the respective groups. In this regard, the examples of spacing and ordering the visual representations of groups on a user interface display in Tables XXVIII-E to XXVIII-K may be applied equally in cases in which some or all of participants or qualitative responses exhibiting high agreement are visually represented within an agreement group. For example, in the example of Tables XXVIII-E to XXVIII-I, in which the spacing between the visual representations of each of the Groups A, B, and C and each of the other groups reflects the closeness or alignment of the respective groups, a visual representation of an agreement group could be added to the user interface display 2500 (FIG. 25), e.g., centered on the geometric center 2534 of the visualization region 2501 (e.g., like agreement group 2002 in FIG. 20, agreement group 2302 in FIG. 23, or both), and the locations of the geometric centers 2552, 2553, 2554, of Groups A 2502, B 2503, and C 2504, respectively, could be determined in the same way as before, except with the participants in the agreement group excluded from the calculations of the group alignment values. In this regard, the visual representation of the agreement group, if added to the user interface display 2500, may be a visual representation unto itself, similar to but other than the visual representations of Groups A 2502, B 2503, and C 2504, respectively. In some embodiments, the visual representation of the agreement group, if centered on the geometric center 2534 of the user interface display 2500, would be surrounded, at least in part, by the visual representations of Groups A 2502, B 2503, and C 2504, although other configurations may be implemented where the agreement group is not centered on the geometric center 2534 and is, nonetheless, surrounded at least in part, by visual representations of groups. For another example, in the example of Tables XXVIII-J to XXVIII-K, in which the order of the visual representations of the Groups A, B, C, and D reflects the closeness or alignment of the respective groups, the order of Groups A, B, C, and D could be determined in the same way as before, except with the participants in an agreement group excluded from the calculations of the group alignment values.

Further in this regard, FIGS. 20 and 23 illustrate user interface displays (2000 and 2300 respectively), on each of which the visual representation of the agreement group (2002 and 2302 respectively) is located at the geometric center of the visualization region, and the visual representations of the other groups (2005-2008 and 2305-2308 respectively) are located around the agreement group, so that the visual representation of the agreement group is surrounded, at least in part, by the visual representations of the other groups. In some embodiments, the visual representation of the agreement group may not be located at the geometric center of the visualization region, and may not be surrounded by the visual representations of the other groups. For example, a group other than the agreement group, of particular interest to the user, may be located at the geometric center of the visualization region, and the other groups, including the agreement group, may be located around it. In some embodiments, a user interface key may be added to the user interface display for each of the groups, including the agreement group, to allow the user to move (e.g., switch or animate) the selected group to the geometric center of the visualization region, and move (e.g., switch or animate) the other groups to locations around it. In some embodiments, rather than initiating this rearrangement of the groups by activating a user interface software button or key, a user may do so in another manner, for example, by clicking or tapping the group to be moved to the geometric center of the visualization region, or by dragging this group towards the geometric center of the visualization region.

Subsets or combinations of various embodiments described above provide further embodiments. For example, although embodiments associated with FIGS. 9-27 are described in the context of step 336 of FIG. 3, other embodiments allow the content and associated descriptions of FIGS. 9-27 to exist independently of the methods of FIG. 3. These and other changes may be made to the invention in light of the above-detailed description and still fall within the scope of the present invention. In general, in the following claims, the terms used should not be construed to limit the invention to the specific embodiments disclosed in the specification and the claims. Accordingly, the invention is not limited by the disclosure, but instead its scope is to be determined entirely by the following claims.

What is claimed is:

1. An inquiry-response evaluation device system comprising:
   a data processing device system;
   an input-output device system communicatively connected to the data processing device system; and
   a processor-accessible memory device system communicatively connected to the data processing device system and storing a program executable by the data processing device system,
   wherein the data processing device system is configured by the program at least to:
   access a plurality of qualitative responses to open-ended inquiries from the processor-accessible memory device system;
   access a plurality of priority values from the processor-accessible memory device system, each priority value of the plurality of priority values associated with a respective participant of a plurality of participants and associated with a respective qualitative response of the plurality of qualitative responses, and each priority value of the plurality of priority values indicating a priority assigned by the respective participant to the respective qualitative response;
   determine, for each respective participant of the plurality of participants, a respective individual priority pattern associated with the respective participant based at least on an analysis of priority values of the plurality of priority values associated with the respective participant;
   determine, as part of a first iteration of a participant-to-group assignment, a first group priority pattern associated with a first group of participants based at least on an analysis of priority values of the plurality of priority values associated with a first set of unassigned participants of the plurality of participants that have not yet been assigned to a group of participants;
   determine, for each respective participant in the first set of unassigned participants and as part of the first iteration of the participant-to-group assignment, whether the respective individual priority pattern associated with the respective participant is similar to the first group priority pattern within a first threshold range, and assign the respective participant to the first group of participants in a state in which it is determined that the respective individual priority pattern is similar to the first group priority pattern within the first threshold range;

determine, as part of a second iteration of the participant-to-group assignment, a second group priority pattern associated with a second group of participants based at least on an analysis of priority values of the plurality of priority values associated with a second set of unassigned participants of the plurality of participants that have not yet been assigned to a group of participants, the second set of unassigned participants excluding participants assigned to the first group of participants in the first iteration of the participant-to-group assignment;

determine, for each respective participant in the second set of unassigned participants and as part of the second iteration of the participant-to-group assignment, whether the respective individual priority pattern associated with the respective participant is similar to the second group priority pattern within a second threshold range providing for less similarity than the first threshold range, and assign the respective participant to the second group of participants in a state in which it is determined that the respective individual priority pattern is similar to the second group priority pattern within the second threshold range;

identify a plurality of groups of participants of the plurality of participants based at least on the first group of participants and the second group of participants; and facilitate, via the input-output device system, visual presentation of at least one group of the identified plurality of groups of participants, the visual presentation including at least a cluster of visual representations of the participants in the one group and including at least a visual representation of at least one participant of the plurality of participants that is not in the one group separated from the cluster.

2. The system of claim 1, wherein each qualitative response of at least some of the plurality of qualitative responses is associated in the processor-accessible memory device system with a respective participant of a plurality of participants, and each qualitative response of the plurality of qualitative responses indicates a response provided by the respective participant to an open-ended inquiry.

3. The system of claim 1, wherein each qualitative response of at least some of the plurality of qualitative responses represents multiple individual qualitative responses from a plurality of participants.

4. The system of claim 1, wherein the data processing device system is configured by the program at least to determine the first group priority pattern based at least on an analysis of priority values of the plurality of priority values associated with at least one of the plurality of qualitative responses and the first set of unassigned participants.

5. The system of claim 4, wherein the data processing device system is configured by the program at least to determine the respective individual priority pattern for each respective participant of the plurality of participants based at least on an analysis of priority values of the plurality of priority values associated with the at least one of the plurality of qualitative responses and the respective participant.

6. The system of claim 1, wherein, for each respective participant of at least some of the plurality of participants, the data processing device system is configured by the program at least to store a group-association-value set in the processor-accessible memory device system, the group-association-value set indicating a degree of association between the respective participant and a group of the plurality of groups.

7. The system of claim 1, wherein the data processing device system is configured by the program at least to:
associate the plurality of qualitative responses with the identified plurality of groups;
determine, for each respective qualitative response of the plurality of qualitative responses, and with respect to each respective group of the identified plurality of groups, a respective resonance value indicating an amount that the respective qualitative response resonates with at least some of the participants in the respective group;
identify a first set of the plurality of qualitative responses associated with multiple of the identified plurality of groups, the determined respective resonance values associated with the first set within a first range;
identify a second set of the plurality of qualitative responses associated with multiple of the identified plurality of groups, the determined respective resonance values associated with the second set within a second range different than the first range; and
facilitate, via the input-output device system, visual presentation of one or more indications (a) that at least some of the qualitative responses in the first set represent relative participant agreement, (b) that at least some of the qualitative responses in the second set represent relative participant tension, or both (a) and (b).

8. The system of claim 7, wherein the first range, the second range, or both, are derived from a standard deviation.

9. The system of claim 7,
wherein the visual presentation of the at least one group further includes a visual representation of the one group of the plurality of groups and a visual representation of an agreement group of the plurality of groups, and
wherein the data processing device system is configured by the program at least to facilitate, via the input-output device system, visual presentation of visual representations of the at least some of the qualitative responses in the first set within the visual representation of the agreement group, and visual presentation of visual representations of the at least some of the qualitative responses in the second set within the visual representation of the one group.

10. The system of claim 1, wherein the data processing device system is configured by the program at least to:
determine, for each respective participant of the plurality of participants, and with respect to each respective group of the identified plurality of groups, a respective resonance value indicating an amount that priority values assigned by the respective participant resonate with at least some of the participants in the respective group;
identify a first set of the plurality of participants associated with multiple of the identified plurality of groups, the determined respective resonance values associated with the first set of the plurality of participants within a first range;

identify a second set of the plurality of participants associated with multiple of the identified plurality of groups, the determined respective resonance values associated with the second set of the plurality of participants within a second range different than the first range; and facilitate, via the input-output device system, visual presentation of one or more indications (a) that at least some of the participants in the first set of the plurality of participants represent relative participant agreement, (b) that at least some of the participants in the second set of the plurality of participants represent relative participant tension, or both (a) and (b).

11. The system of claim 10, wherein the first range, the second range, or both, are derived from a standard deviation.

12. The system of claim 10,
wherein the visual presentation of the at least one group further includes a visual representation of the one group of the plurality of groups and an agreement group of the plurality of groups, and
wherein the data processing device system is configured by the program at least to facilitate, via the input-output device system, visual presentation of visual representations of the at least some of the participants in the first set of the plurality of participants within the visual representation of the agreement group, and visual presentation of visual representations of the at least some of the participants in the second set of the plurality of participants within the visual representation of the one group.

13. The system of claim 1, wherein the data processing device system is configured by the program at least to:
associate the plurality of qualitative responses with the identified plurality of groups based at least on an analysis of the plurality of priority values associated with the plurality of qualitative responses; and
facilitate, via the input-output device system, visual presentation of at least one of the plurality of qualitative responses with respect to the at least one group of the identified plurality of groups in a manner consistent with one or more results of the analysis of the plurality of priority values associated with the plurality of qualitative responses.

14. The system of claim 13, wherein the visual presentation of the at least one of the plurality of qualitative responses with respect to the at least one group includes a visual representation of the one group as a closed shape.

15. The system of claim 14, wherein the visual presentation of the at least one of the plurality of qualitative responses with respect to the at least one group includes a visual representation of the at least one of the plurality of qualitative responses within the closed shape.

16. The system of claim 15, wherein the analysis of the plurality of priority values associated with the plurality of qualitative responses includes determining, for each respective qualitative response of the plurality of qualitative responses, and with respect to each respective group of the identified plurality of groups, a respective resonance value indicating an amount that the respective qualitative response resonates with at least the participants in the respective group, and wherein the one or more results of the analysis of the plurality of priority values associated with the plurality of qualitative responses indicate at least that the respective resonance values for each of the at least one of the plurality of qualitative responses most closely align the at least one of the plurality of qualitative responses with the one group as compared to each other group of the identified plurality of groups.

17. The system of claim 14, wherein the closed shape is circular.

18. The system of claim 17, wherein the closed shape is visually presented with a color gradient that decreases in color intensity from a geometric center of the closed shape towards an exterior edge of the closed shape.

19. The system of claim 13, wherein the second analysis includes determining, for each respective qualitative response of the plurality of qualitative responses, and with respect to each respective group of the identified plurality of groups, a respective resonance value indicating an amount that the respective qualitative response resonates with at least the participants in the respective group, and wherein the visual presentation of the one of the plurality of qualitative responses is in a spaced relationship with the one group, the spaced relationship consistent at least with the respective resonance value for the one of the plurality of qualitative responses with respect to the one group.

20. The system of claim 19, wherein the spaced relationship results in a representation of the one of the plurality of qualitative responses located within the cluster of visual representations of the participants in the one group.

21. The system of claim 19, wherein the spaced relationship results in a representation of the one of the plurality of qualitative responses located outside the cluster of visual representations of the participants in the one group.

22. The system of claim 1, wherein the data processing device system is configured by the program at least to:
associate, in a first process, each respective qualitative response in a first set of the plurality of qualitative responses with each respective group of at least one of the plurality of identified groups based at least on an analysis of the priority values associated with the respective qualitative response, the first set of the plurality of qualitative responses associated with a particular participant of the plurality of participants;
identify a first particular group of the plurality of identified groups based at least on an analysis of one or more results of the first process;
identify a second particular group of the plurality of identified groups based at least on an analysis of priority values associated with the particular participant with respect to each of the identified plurality of groups; and
facilitate, via the input-output device system, visual presentation of at least visual representations of the particular participant, the first particular group, and the second particular group.

23. The system of claim 22, wherein the identifying of the first particular group based at least on the analysis of the one or more results of the first process includes:
identifying the first particular group as most closely related, as compared to each other of the plurality of identified groups, to the first set of the plurality of qualitative responses.

24. The system of claim 22, wherein the identifying of the second particular group based at least on the analysis of priority values associated with the particular participant with respect to each of the identified plurality of groups includes:
identifying the second particular group as most closely related, as compared to each other of the plurality of identified groups, to the priority values associated with the particular participant.

25. The system of claim 22, wherein visual presentation of at least visual representations of the particular participant, the first particular group, and the second particular group includes a graphical animation including movement of a visual representation of the particular participant between a visual representation of the first particular group and a visual representation of the second particular group.

26. The system of claim 25, wherein the graphical animation including movement of the visual representation of the particular participant between the visual representation of the first particular group and the visual representation of the second particular group includes movement of the visual representation of the particular participant only within an intermediate display region that does not contact the visual representation of the first particular group and the visual representation of the second particular group.

27. The system of claim 1, wherein the visual presentation of the at least one group includes a visual representation of the one group as a closed shape.

28. The system of claim 27, wherein the cluster of visual representations of the participants in the one group are visually represented within the closed shape.

29. The system of claim 28,
wherein the cluster of visual representations of the participants in the one group is represented in a manner consistent with one or more results of the analysis of the plurality of priority values,
wherein the analysis of the plurality of priority values includes determining, for each respective participant of the plurality of participants, and with respect to each respective group of the identified plurality of groups, a respective resonance value indicating an amount that the respective participant resonates with at least the participants in the respective group, and
wherein the one or more results of the analysis of the plurality of priority values indicate at least that the respective resonance values for each of the participants in the one group most closely align the participants in the one group with the one group as compared to each other group of the identified plurality of groups.

30. The system of claim 27, wherein the closed shape is circular.

31. The system of claim 30, wherein the closed shape is visually presented with a color gradient that decreases in color intensity from a geometric center of the closed shape towards an exterior edge of the closed shape.

32. The system of claim 1,
wherein the data processing device system is configured by the program at least to determine, for each particular group of the plurality of groups, a group alignment value with respect to the particular group and each respective other group of the plurality of groups, thereby determining a plurality of group alignment values associated with each particular group of the plurality of groups,
wherein the visual presentation of the at least one group includes a visual representation of the one group, a visual representation of a second particular group of the plurality of groups, and a visual representation of a third particular group of the plurality of groups, the visual representation of the one group closer to the visual representation of the second particular group than the visual representation of the third particular group, and
wherein at least one of the plurality of group alignment values associated with the one group, at least one of the plurality of group alignment values associated with the second particular group, and at least one of the plurality of group alignment values associated with the third particular group indicate that the one group is more closely related to the second particular group than the third particular group.

33. The system of claim 32, wherein the visual presentation of the at least one group further includes a visual representation of an agreement group of the plurality of groups, the agreement group different than the one group, the second particular group, and the third particular group.

34. The system of claim 33, wherein the visual representation of the agreement group is surrounded, at least in part, by the visual representations of the one group, the second particular group, and the third particular group.

35. The system of claim 1, wherein the visual presentation of the at least one group includes a visual representation of the one group, a visual representation of a second particular group of the plurality of groups, and a visual representation of a third particular group of the plurality of groups, the visual representation of the one group closer to the visual representation of the second particular group than the visual representation of the third particular group.

36. The system of claim 1, wherein the visual presentation of the at least one group includes visual representations of at least four groups of the plurality of groups, the visual representations of the at least four groups exhibiting distance relationships therebetween that correspond to relatedness between the at least four groups.

37. The system of claim 1, wherein the visual presentation of the at least one group includes visual representations of at least four groups of the plurality of groups, the visual representations of the at least four groups circumferentially arranged in a circumferential order with at least two most closely related groups of the at least four groups in adjacent positions in the circumferential order and at least two least closely related groups of the plurality of groups in non-adjacent positions in the circumferential order.

38. The system of claim 1, wherein the data processing device system is configured by the program at least to:
determine a plurality of group alignment values for each of a plurality of pairs of at least four groups of the plurality of groups; and
determine a circumferential order of visual representations of the at least four groups that places at least two most closely related groups of the at least four groups in adjacent positions in the circumferential order and places at least two least closely related groups of the at least four groups in opposite positions in the circumferential order based at least on an analysis of the plurality of group alignment values,
wherein the visual presentation of the at least one group includes visual representations of the at least four groups, the visual representations of the at least four groups circumferentially arranged in the circumferential order with at least two most closely related groups of the at least four groups in adjacent positions in the circumferential order and at least two least closely related groups of the plurality of groups in non-adjacent positions in the circumferential order.

39. The system of claim 1, wherein the one group is a first particular group, the cluster is a first cluster, and the visual presentation includes a second particular group of the identified plurality of groups of participants, wherein the visual presentation includes at least a second cluster of visual representations of the participants in the second particular group, and wherein the visual representation of the one participant of the plurality of participants that is not in the first particular group is visually located between the first cluster and the second cluster.

40. The system of claim 39,
wherein the visual representation of the one participant is visually located between the first cluster and the second cluster at a position, with respect to the first cluster and the second cluster, that is consistent at least with: (a) a first relationship between a participant priority pattern associated with the one participant and a first group priority pattern associated with the first particular group, and (b) a second relationship between the participant priority pattern and a second group priority pattern associated with the second particular group,
wherein the participant priority pattern is a priority pattern of a first set of priority values of the plurality of priority values associated with at least some of the plurality of qualitative responses and the one participant,
wherein the first group priority pattern is a priority pattern of a second set of priority values of the plurality of priority values associated with at least some of the plurality of qualitative responses associated with the first particular group, and
wherein the second group priority pattern is a priority pattern of a third set of priority values of the plurality of priority values associated with at least some of the plurality of qualitative responses associated with the second particular group.

41. The system of claim 1, wherein the visual representations of the participants in the one group are presented with a first set of visual characteristics, and wherein the at least the visual representation of the at least one participant of the plurality of participants that is not in the one group is presented with a second set of visual characteristics different than the first set of visual characteristics.

42. The system of claim 41, wherein the first set of visual characteristics includes a first color, and the second set of visual characteristics includes a second color different than the first color.

43. The system of claim 1, wherein the visual presentation includes a visual representation of a first qualitative response of the plurality of qualitative responses visually located within one of the groups of the identified plurality of groups.

44. The system of claim 1, wherein the visual presentation includes a visual representation of a first qualitative response of the plurality of qualitative responses visually located between at least two of the groups of the identified plurality of groups.

45. The system of claim 44, wherein the data processing device system is configured by the program at least to associate each of at least some of the qualitative responses with each of at least some of the identified plurality of groups.

46. The system of claim 45, wherein the associating of each of the at least some of the qualitative responses with each of the at least some of the identified plurality of groups includes determining at least a first distance between the first qualitative response and a first particular group of the two of the groups and a second distance between the first qualitative response and a second particular group of the two of the groups based at least on the analysis of the priority values associated with the first qualitative response, and wherein the visual representation of the first qualitative response is visually located between at least the two of the groups consistent with the determined first distance and the determined second distance.

47. The system of claim 46, wherein the at least two of the groups is at least three of the groups of the identified plurality of groups, wherein the associating of each of the at least some of the qualitative responses with each of the at least some of the identified plurality of groups includes determining at least a third distance between the first qualitative response and a third particular group of the three of the groups based at least on the analysis of the priority values associated with the first qualitative response, and wherein the visual representation of the first qualitative response is visually located between at least the three of the groups consistent with the determined first distance, the determined second distance, and the determined third distance.

48. The system of claim 1, wherein each of at least some of the priority values indicates a category of emotion exhibited by the respective participant in response to perceiving the respective qualitative response.

49. The system of claim 48, wherein each category of emotion is represented by a distinct numerical value.

50. The system of claim 1, wherein each of at least some of the priority values indicates a number of stars assigned by the respective participant to the respective qualitative response.

51. An inquiry-response evaluation method executed by a data processing device system according to a program stored by a processor-accessible memory device system communicatively connected to the data processing device system, the data processing device system further communicatively connected to an input-output device system, and the method comprising:
accessing a plurality of qualitative responses to open-ended inquiries from the processor-accessible memory device system;
accessing a plurality of priority values from the processor-accessible memory device system, each priority value of the plurality of priority values associated with a respective participant of a plurality of participants and associated with a respective qualitative response of the plurality of qualitative responses, and each priority value of the plurality of priority values indicating a priority assigned by the respective participant to the respective qualitative response;
determining, for each respective participant of the plurality of participants, a respective individual priority pattern associated with the respective participant based at least on an analysis of priority values of the plurality of priority values associated with the respective participant;
determining, as part of a first iteration of a participant-to-group assignment, a first group priority pattern associated with a first group of participants based at least on an analysis of priority values of the plurality of priority values associated with a first set of unassigned participants of the plurality of participants that have not yet been assigned to a group of participants;
determining, for each respective participant in the first set of unassigned participants and as part of the first iteration of the participant-to-group assignment, whether the respective individual priority pattern associated with the respective participant is similar to the first group priority pattern within a first threshold range, and assigning the respective participant to the first group of participants in a state in which it is determined that the respective individual priority pattern is similar to the first group priority pattern within the first threshold range;
determining, as part of a second iteration of the participant-to-group assignment, a second group priority pattern associated with a second group of participants based at least on an analysis of priority values of the plurality of priority values associated with a second set of unassigned participants of the plurality of participants that have not yet been assigned to a group of participants, the second set of unassigned participants excluding participants assigned to the first group of participants in the first iteration of the participant-to-group assignment;

determining, for each respective participant in the second set of unassigned participants and as part of the second iteration of the participant-to-group assignment, whether the respective individual priority pattern associated with the respective participant is similar to the second group priority pattern within a second threshold range providing for less similarity than the first threshold range, and assigning the respective participant to the second group of participants in a state in which it is determined that the respective individual priority pattern is similar to the second group priority pattern within the second threshold range;

identifying a plurality of groups of participants of the plurality of participants based at least on the first group of participants and the second group of participants; and facilitating, via the input-output device system, visual presentation of at least one group of the identified plurality of groups of participants, the visual presentation including at least a cluster of visual representations of the participants in the one group and including at least a visual representation of at least one participant of the plurality of participants that is not in the one group separated from the cluster.

52. One or more non-transitory computer-readable storage mediums storing a program executable by one or more data processing devices of a data processing device system communicatively connected to an input-output device system, the program comprising:

first access instructions that cause the data processing device system to access a plurality of qualitative responses to open-ended inquiries from a processor-accessible memory device system;

second access instructions that cause the data processing device system to access a plurality of priority values from the processor-accessible memory device system, each priority value of the plurality of priority values associated with a respective participant of a plurality of participants and associated with a respective qualitative response of the plurality of qualitative responses, and each priority value of the plurality of priority values indicating a priority assigned by the respective participant to the respective qualitative response;

first determination instructions that cause the data processing device system to determine, for each respective participant of the plurality of participants, a respective individual priority pattern associated with the respective participant based at least on an analysis of priority values of the plurality of priority values associated with the respective participant;

second determination instructions that cause the data processing device system to determine, as part of a first iteration of a participant-to-group assignment, a first group priority pattern associated with a first group of participants based at least on an analysis of priority values of the plurality of priority values associated with a first set of unassigned participants of the plurality of participants that have not yet been assigned to a group of participants;

third determination instructions that cause the data processing device system to determine, for each respective participant in the first set of unassigned participants and as part of the first iteration of the participant-to-group assignment, whether the respective individual priority pattern associated with the respective participant is similar to the first group priority pattern within a first threshold range, and to assign the respective participant to the first group of participants in a state in which it is determined that the respective individual priority pattern is similar to the first group priority pattern within the first threshold range;

fourth determination instructions that cause the data processing device system to determine, as part of a second iteration of the participant-to-group assignment, a second group priority pattern associated with a second group of participants based at least on an analysis of priority values of the plurality of priority values associated with a second set of unassigned participants of the plurality of participants that have not yet been assigned to a group of participants, the second set of unassigned participants excluding participants assigned to the first group of participants in the first iteration of the participant-to-group assignment;

fifth determination instructions that cause the data processing device system to determine, for each respective participant in the second set of unassigned participants and as part of the second iteration of the participant-to-group assignment, whether the respective individual priority pattern associated with the respective participant is similar to the second group priority pattern within a second threshold range providing for less similarity than the first threshold range, and to assign the respective participant to the second group of participants in a state in which it is determined that the respective individual priority pattern is similar to the second group priority pattern within the second threshold range;

identification instructions that cause the data processing device system to identify a plurality of groups of participants of the plurality of participants based at least on the first group of participants and the second group of participants; and visual presentation instructions that cause the data processing device system to facilitate, via the input-output device system, visual presentation of at least one group of the identified plurality of groups of participants, the visual presentation including at least a cluster of visual representations of the participants in the one group and including at least a visual representation of at least one participant of the plurality of participants that is not in the one group separated from the cluster.

* * * * *